United States Patent
Hirai et al.

(10) Patent No.: US 7,403,609 B2
(45) Date of Patent: Jul. 22, 2008

(54) MULTI-CHANNEL ECHO CANCEL METHOD, MULTI-CHANNEL SOUND TRANSFER METHOD, STEREO ECHO CANCELLER, STEREO SOUND TRANSFER APPARATUS AND TRANSFER FUNCTION CALCULATION APPARATUS

(75) Inventors: Toru Hirai, Shizuoka (JP); Mikio Tohyama, Tokyo (JP); Hiraku Okumura, Shizuoka (JP); Yoshikazu Honji, Shizuoka (JP); Hiroshi Iriyama, Shizuoka (JP); Koji Niimi, Shizuoka (JP)

(73) Assignee: Yamaha Corporation, Hamamatsu-shi (JP)

( * ) Notice: Subject to any disclaimer, the term of this patent is extended or adjusted under 35 U.S.C. 154(b) by 427 days.

(21) Appl. No.: 10/705,794

(22) Filed: Nov. 7, 2003

(65) Prior Publication Data

US 2004/0174991 A1    Sep. 9, 2004

Related U.S. Application Data

(63) Continuation of application No. PCT/JP02/06968, filed on Jul. 10, 2002.

(30) Foreign Application Priority Data

Jul. 11, 2001 (JP) ............... 2001-211279
Jun. 20, 2002 (JP) ............... 2002-179722

(51) Int. Cl.
*H04M 9/08* (2006.01)
(52) U.S. Cl. ............... 379/406.01; 370/286
(58) Field of Classification Search ........ 379/388, 379/390, 406; 370/286–292; 455/570; 708/322
See application file for complete search history.

(56) References Cited

U.S. PATENT DOCUMENTS 6,738,480 B1 * 5/2004 Berthault et al. ............... 381/66

FOREIGN PATENT DOCUMENTS

EP     0766446 A2    4/1997

(Continued)

OTHER PUBLICATIONS

Alberge, et al., "A Combined FDAF/WSAF Algorithm for Stereophonic Acoustic Echo Cancellation", May 12-15, 1988, IEEE, Proceedings of the 1998 IEEE International Conference on Acoustics, Speech, and Signal Processing, 1998, pp. 1413-1416.

(Continued)

*Primary Examiner*—Sinh Tran
*Assistant Examiner*—Walter F Briney, III
(74) *Attorney, Agent, or Firm*—Pillsbury Winthrop Shaw Pittman LLP

(57) ABSTRACT

Stereo sound signals are reproduced directly from loudspeakers (SP(L), SP(R)). By using a sum signal and a difference signal of the stereo sound signals as a reference signal, and according to a cross spectrum calculation of the reference signal with a microphone-collected sound signal, calculation is performed to obtain transfer functions of four sound transfer systems between the loudspeakers (SP(L), SP(R)) and microphones (MC(L), MC(R)). The transfer functions obtained are subjected to inverse Fourier transform to obtain impulse responses, which are set in filter means (40-1 to 40-4) to create echo cancel signals and perform echo canceling. This solves the problem of an indefinite coefficient in the echo cancel technique of a multi-channel sound signal.

21 Claims, 43 Drawing Sheets

FOREIGN PATENT DOCUMENTS

| | | | |
|---|---|---|---|
| EP | 0841799 | A2 | 5/1998 |
| EP | 0944228 | A1 | 9/1999 |
| JP | 60051400 | A * | 3/1985 |
| WO | WO 98/47276 | A | 10/1998 |

OTHER PUBLICATIONS

Benesty, et al., "A Better Understanding and an Improved Solution to the Specific Problems of Stereophonic Acoustic Echo Cancellation", IEEE Transactions on Speech and Audio Processing, vol. 6, No. 2, (Mar. 1998), pp. 156-165.

Benesty, et al., "A Hybrid Mono/Stereo Acoustic Echo Canceler", IEEE Transactions on Speech and Audio Processing, vol. 6, No. 5, (Sep. 1998), pp. 468-475.

Muratza Ali, "Stereophonic Acoustic Echo Cancellation System Using Time-Varying All-Pass Filtering for Signal Decorrelation", Proceedings of the 1998 IEEE International Conference on Acoustic, Speech, and Signal Processing, vol. 6, (1998), pp. 3689 to 3691.

Shimauchi et al., "New Configuration for a Stereo Echo Canceller with Nonlinear Pre-Processing", Proceedings on the 1998 IEEE International Conference on Acoustic, Speech, and Signal Processing, vol. 6, (1998), pp. 3685 to 3692.

Tokura et al., "Stereo shingo no Muso Kanka ni yoru 2 Channel Densokei no Suitei", The Acoustical Society of Japan (ASJ) 3, 2001 nen Shuuki Kenkyu Happyokai Koen Ronbunshu I, Oct. 2, 2001, pp. 699 to 700 (3-Q-22).

Takatoshi, et al., "Frame Sokan to Cross-spectrum Shori ni yoru Echo Yokuatsu", The Acoustical Society of Japan (ASJ) 3, Heisei 8 nendo (1996) Shunki Kenkyu Happyokai Koen Ronbunshu I, Mar. 26, 1996, pp. 543 to 544 (2-6-1).

Horiuchi, et al., "2 Ten Juon Shuseibun Bunseki ni yoru Sentakuteki Shuon", 1998 nen The Institute of Electronics, Information and Communication Engineers Kiso Kyokai Society Taikai Koen Ronbunshi, 07, Sep. 8, 1998, p. 135 (A-10-3).

Trevor N. Yensen, et al., "Synthetic Stereo Acoustic Echo Cancellation Structure for Multiple Participant VoIP Conferences," IEEE Transactions on Speech and Audio Processing, IEEE, vol. 9 ( No. 2), p. 168-174, (Feb. 2001).

Yann Joncour and Akihiko Sugiyama, "A Stereo Echo Canceler with Correct Echo-Path Identification and Good Sound Localization," Proceedings of the Digital Signal Processing Symposium of the IEICE of Japan, C&C Media Research Laboratories, NEC Corporation (Japan), p. 531-536, (1997).

Supplementary European Search Report, The Hague, Nov. 28, 2006.

* cited by examiner

FIG.4
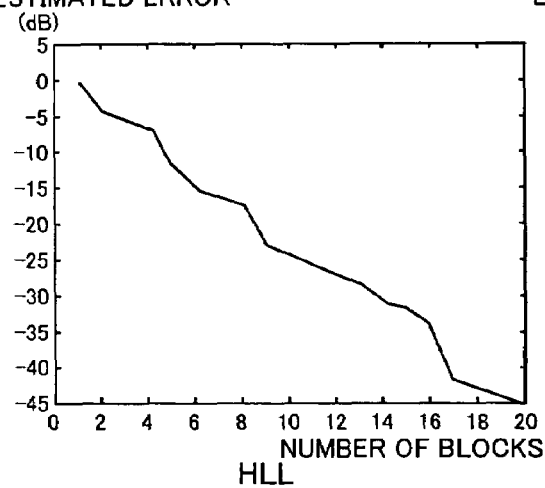
HLL
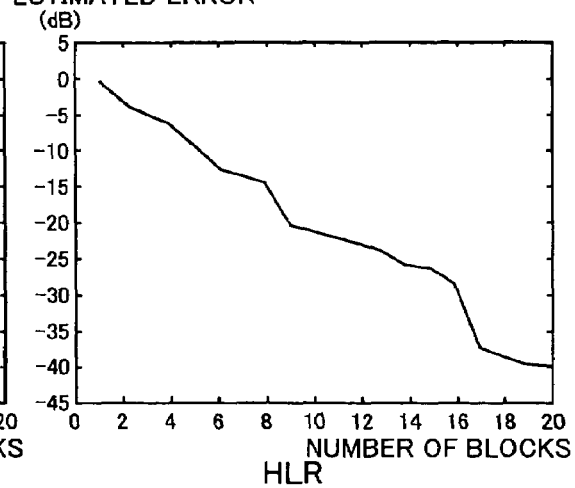
HLR
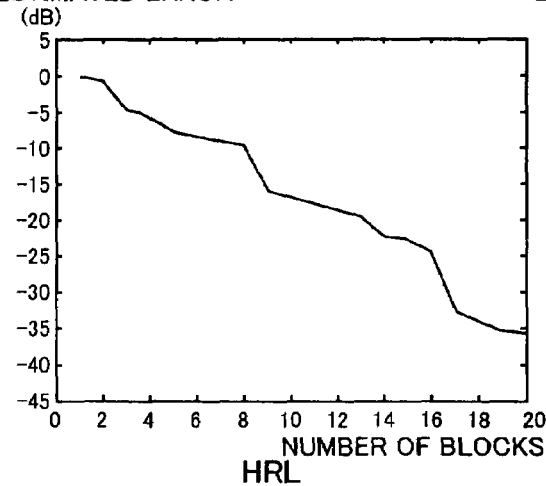
HRL
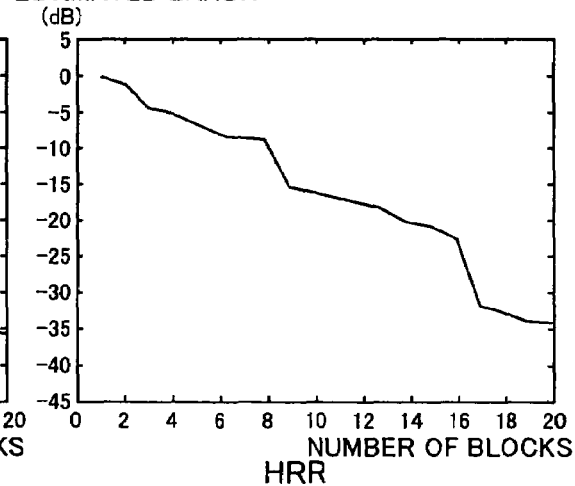
HRR

FIG.5
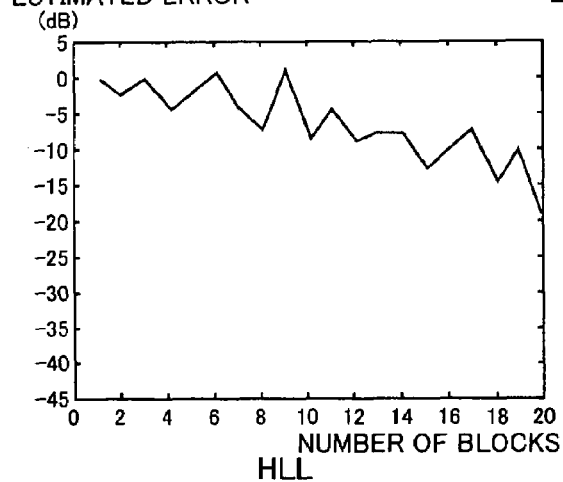
HLL
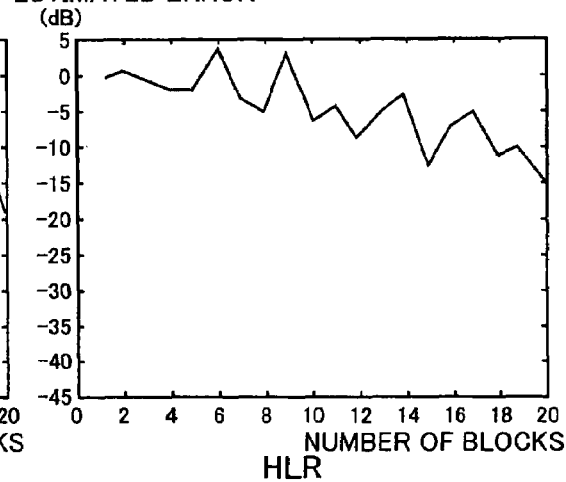
HLR
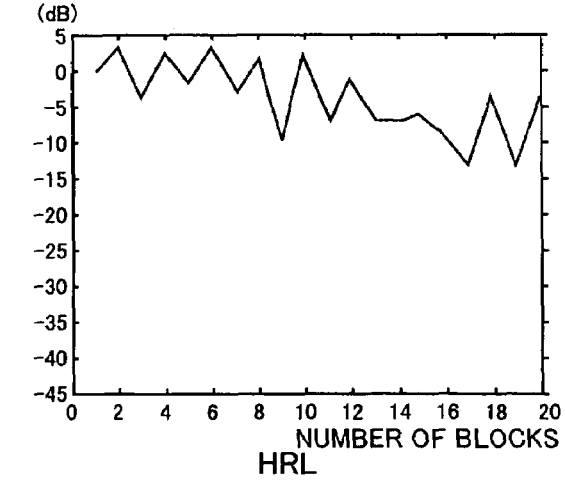
HRL
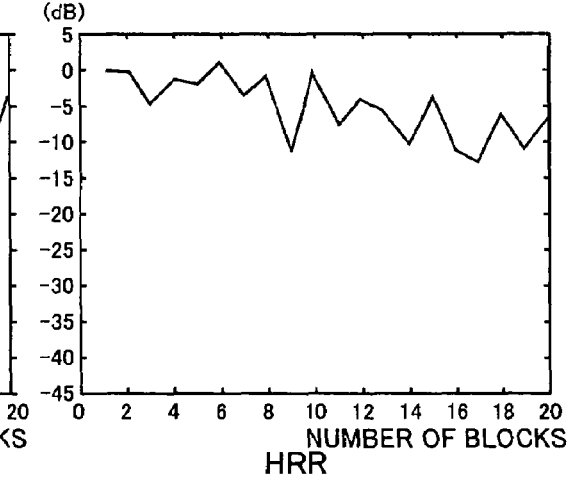
HRR

FIG.8
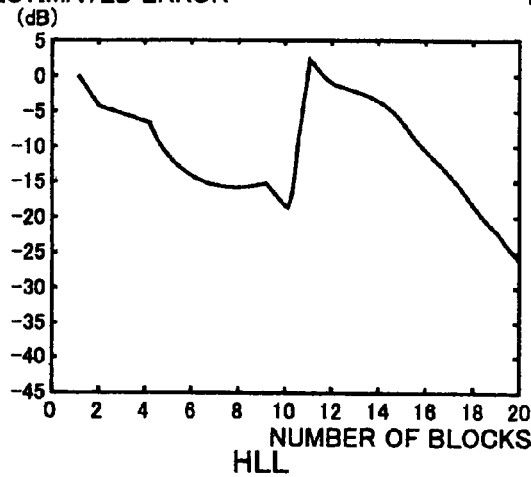
HLL
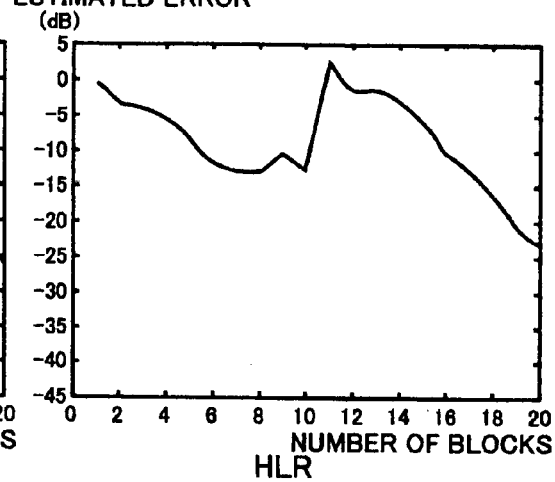
HLR
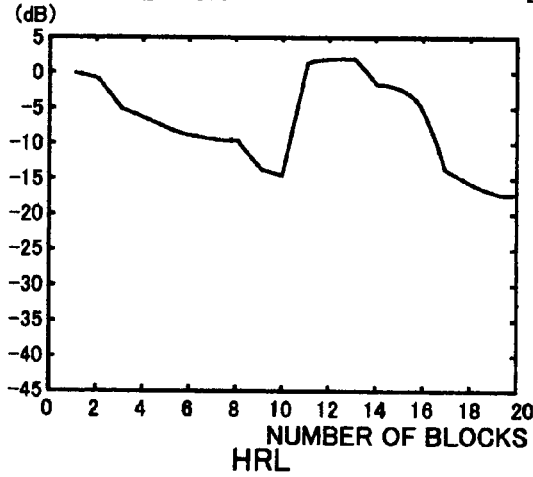
HRL
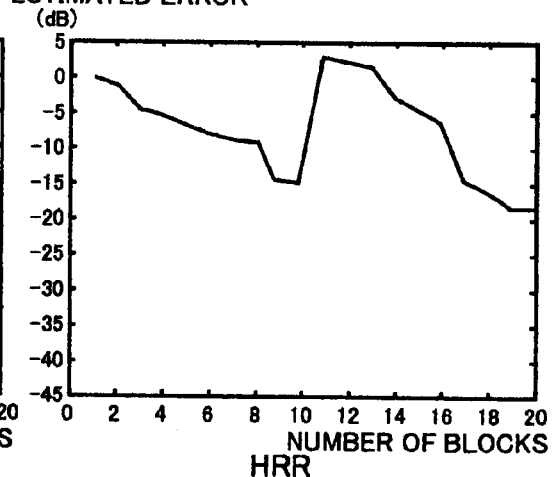
HRR

FIG. 20

COEFFICIENT UPDATE BLOCK: 4
FRAMES (63 TIMES IN AVERAGE)
DOUBLE TALK PRESENT

COEFFICIENT UPDATE BLOCK: 8
FRAMES (127 TIMES IN AVERAGE)
DOUBLE TALK PRESENT

COEFFICIENT UPDATE BLOCK: 16 FRAMES (255 TIMES IN AVERAGE)
DOUBLE TALK PRESENT

COEFFICIENT UPDATE BLOCK: 2 FRAMES (31 TIMES IN AVERAGE)
NO DOUBLE TALK

COEFFICIENT UPDATE BLOCK: 4
FRAMES (63 TIMES IN AVERAGE)
NO DOUBLE TALK

COEFFICIENT UPDATE BLOCK: 8
FRAMES (127 TIMES IN AVERAGE)
NO DOUBLE TALK

COEFFICIENT UPDATE BLOCK: 16 FRAMES (255 TIMES IN AVERAGE) NO DOUBLE TALK

COEFFICIENT UPDATE BLOCK: 2 FRAMES (31 TIMES IN AVERAGE) DOUBLE TALK PRESENT

MULTI-CHANNEL ECHO CANCEL METHOD, MULTI-CHANNEL SOUND TRANSFER METHOD, STEREO ECHO CANCELLER, STEREO SOUND TRANSFER APPARATUS AND TRANSFER FUNCTION CALCULATION APPARATUS

RELATED APPLICATIONS

This application is a continuation of PCT application No. PCT/JP02/06968, filed Jul. 10, 2002, which is based upon, and claims priority from, Japanese Patent Application No. 2001-211279, filed Jul. 11, 2001 and Japanese Patent Application No. 2002-179722, filed Jun. 20, 2002.

TECHNICAL FIELD

This invention relates to an echo cancellation technique for multi-channel audio signals and a transfer function calculation technique, and solves a problem of indefinite coefficient by a new technique.

BACKGROUND ART

In two-way stereo audio transmission that is used in teleconferencing systems and so forth, the problem of indefinite coefficient of echo cancellers has conventionally been pointed out and, for solving it, there have been proposed various techniques (see Journal of The Institute of Electronics, Information and Communication Engineers, vol. 81, No. 3, pp. 266-274, March 1998). As one of the techniques for solving the problem of indefinite coefficient, there is a method of reducing the interchannel correlation. As concrete techniques therefor, there have conventionally been proposed the addition of random noise, the correlation removal by filters, the interchannel frequency shift, the use of an interleave comb filter, the nonlinear processing (Laid-Open Patent Publication No. H10-190848) and so forth.

According to the foregoing conventional techniques, since original stereo signals are subjected to processing and then reproduced, there has been a problem that deterioration more or less occurs in reproduced signals. Further, when the processing is complicated, a delay occurs in the reproduced signals, so that there has been a problem of difficulty in conversation in the teleconference and so forth. Further, when the processing is complicated and the processing capability of a processing circuit is low, there have been those instances where it is difficult to update a coefficient of an echo canceller in real time while carrying out the echo cancel processing.

This invention provides an echo cancellation technique for multi-channel audio signals and a transfer function calculation technique that have solved the foregoing problems in the conventional techniques.

DISCLOSURE OF THE INVENTION

A multi-channel echo cancel method of this invention is a method wherein, with respect to a space provided therein with a plurality of loudspeakers and one or a plurality of microphones and forming a plurality of audio transfer systems in which multi-channel sounds inputted from an outside and reproduced by said respective loudspeakers and having a correlation with each other are collected by said microphones, individual transfer functions of said plurality of audio transfer systems or a plurality of composite transfer functions obtained by suitably combining said individual transfer functions are estimated so as to set corresponding filter characteristics, respectively, echo cancel signals are respectively produced by giving said set filter characteristics to corresponding individual signals to be reproduced by said respective loudspeakers or a plurality of composite signals obtained by suitably combining said individual signals, and said echo cancel signals are subtracted from corresponding individual collected audio signals of said one or plurality of microphones, or a plurality of composite signals obtained by suitably combining said individual collected audio signals, thereby performing echo cancellation, and wherein, using as reference signals (representing those signals that are referred to for estimating the transfer functions or the composite transfer functions) a set of a plurality of low-correlation composite signals which correspond to signals obtained by suitably combining said multi-channel audio signals and which have a lower correlation with each other than that between said multi-channel audio signals (e.g. suitably combining said multi-channel audio signals to produce a plurality of low-correlation composite signals having a lower correlation with each other than that between said multi-channel audio signals and using a set of said plurality of low-correlation composite signals as reference signals, or directly inputting a set of a plurality of low-correlation composite signals which correspond to signals obtained by suitably combining said multi-channel audio signals and which have a lower correlation with each other than that between said multi-channel audio signals and using the set of said plurality of low-correlation composite signals as reference signals, or the like), individual transfer functions of the respective audio transfer systems or a plurality of composite transfer functions obtained by suitably combining said individual transfer functions are respectively derived, thereby to set corresponding filter characteristics. According to this invention, using as reference signals a set of a plurality of low-correlation composite signals which correspond to signals obtained by suitably combining multi-channel audio signals having a correlation therebetween and which have a lower correlation with each other than that between such multi-channel audio signals, individual transfer functions of the respective audio transfer systems or a plurality of composite transfer functions obtained by suitably combining such individual transfer functions are respectively derived, and corresponding filter characteristics are set, thereby to enable echo cancellation. In accordance therewith, since the multi-channel audio signals can be reproduced from the loudspeakers with no or less processing, which induces deterioration, applied to the multi-channel audio signals, excellent reproduced tone quality can be achieved. Further, there is no or only a small delay in reproduced signals. Thus, when applying to the teleconferencing system or the like, natural conversation can be conducted. The calculation of respectively deriving the individual transfer functions of the respective audio transfer systems or the plurality of composite transfer functions obtained by suitably combining said individual transfer functions, using as the reference signals the set of the plurality of low-correlation composite signals, may be, for example, a calculation of respectively deriving the individual transfer functions of the respective audio transfer systems or the plurality of composite transfer functions obtained by suitably combining said individual transfer functions, based on a cross-spectrum calculation between the plurality of low-correlation composite signals and the individual collected audio signals of the microphones, or the plurality of composite signals obtained by suitably combining said individual collected audio signals. Further, the calculation of respectively deriving the individual transfer functions of said plurality of audio transfer systems or the plurality of composite transfer functions obtained by suitably combining said individual transfer functions, based on said cross-spectrum calculation, may be, for example, a calculation of respectively deriving the individual transfer functions of said plurality of audio transfer systems or the plurality of composite transfer functions obtained by suitably combining said individual transfer functions, by combining said multi-channel audio signals through addition or subtraction to produce a plurality of low-correlation composite signals having a lower correlation with each other than that between said multi-channel audio signals, deriving cross spectra between said plurality of low-correlation composite signals and the individual collected audio signals of the microphones, or the plurality of composite signals obtained by suitably combining said individual collected audio signals, and ensemble-averaging them in a predetermined time period per cross spectrum.

A multi-channel echo cancel method of this invention is a method wherein, with respect to a space provided therein with a plurality of loudspeakers and one or a plurality of microphones and forming a plurality of audio transfer systems in which multi-channel sounds inputted from an outside and reproduced by said respective loudspeakers and having a correlation with each other are collected by said microphones, individual transfer functions of said plurality of audio transfer systems or a plurality of composite transfer functions obtained by suitably combining said individual transfer functions are estimated so as to set corresponding filter characteristics, respectively, echo cancel signals are respectively produced by giving said set filter characteristics to corresponding individual signals to be reproduced by said respective loudspeakers or a plurality of composite signals obtained by suitably combining said individual signals, and said echo cancel signals are subtracted from corresponding individual collected audio signals of said one or plurality of microphones, or a plurality of composite signals obtained by suitably combining said individual collected audio signals, thereby performing echo cancellation, wherein, using as reference signals a set of a plurality of low-correlation composite signals which correspond to signals obtained by suitably combining said multi-channel audio signals and which have a lower correlation with each other than that between said multi-channel audio signals (e.g. suitably combining said multi-channel audio signals to produce a plurality of low-correlation composite signals having a lower correlation with each other than that between said multi-channel audio signals and using a set of said plurality of low-correlation composite signals as reference signals, or directly inputting a set of a plurality of low-correlation composite signals which correspond to signals obtained by suitably combining said multi-channel audio signals and which have a lower correlation with each other than that between said multi-channel audio signals and using the set of said plurality of low-correlation composite signals as reference signals, or the like), estimated errors of individual transfer functions of the respective audio transfer systems or a plurality of composite transfer functions obtained by suitably combining said individual transfer functions are respectively derived, thereby to update corresponding filter characteristics to values that cancel said estimated errors. According to this invention, using as reference signals a set of a plurality of low-correlation composite signals which correspond to signals obtained by suitably combining multi-channel audio signals having a correlation therebetween and which have a lower correlation with each other than that between such multi-channel audio signals, estimated errors of individual transfer functions of the respective audio transfer systems or a plurality of composite transfer functions obtained by suitably combining such individual transfer functions are respectively derived so as to successively update the corresponding filter characteristics to values that cancel such estimated errors, thereby to enable echo cancellation. In accordance therewith, since the multi-channel audio signals can be reproduced from the loudspeakers with no or less processing, which induces deterioration, applied to the multi-channel audio signals, excellent reproduced tone quality can be achieved. Further, there is no or only a small delay in reproduced signals. Thus, when applying to the teleconferencing system or the like, natural conversation can be conducted. Further, it is possible to update the filter characteristics in real time. The calculation of respectively deriving the estimated errors of the individual transfer functions of the respective audio transfer systems or the plurality of composite transfer functions obtained by suitably combining said individual transfer functions, using as the reference signals the set of the plurality of low-correlation composite signals, may be, for example, a calculation of respectively deriving the estimated errors of the individual transfer functions of the respective audio transfer systems or the plurality of composite transfer functions obtained by suitably combining said individual transfer functions, based on a cross-spectrum calculation between said plurality of low-correlation composite signals and echo cancel error signals obtained by subtracting the echo cancel signals from the corresponding individual collected audio signals of said one or plurality of microphones, or the plurality of composite signals obtained by suitably combining said individual collected audio signals. Further, the calculation of respectively deriving the estimated errors of the individual transfer functions of said plurality of audio transfer systems or the plurality of composite transfer functions obtained by suitably combining said individual transfer functions, based on said cross-spectrum calculation, may be, for example, a calculation of respectively deriving the estimated errors of the individual transfer functions of said plurality of audio transfer systems or the plurality of composite transfer functions obtained by suitably combining said individual transfer functions, by combining said multi-channel audio signals through addition or subtraction to produce a plurality of low-correlation composite signals having a lower correlation with each other than that between said multi-channel audio signals, deriving cross spectra between said plurality of low-correlation composite signals and the echo cancel error signals obtained by subtracting the echo cancel signals from the corresponding individual collected audio signals of said one or plurality of microphones, or the plurality of composite signals obtained by suitably combining said individual collected audio signals, and ensemble-averaging them in a predetermined time period per cross spectrum. Further, the correlation between said plurality of low-correlation composite signals is detected and, when a value of said correlation is no less than a prescribed value, updating of said filter characteristics is stopped, thereby to prevent the echo cancel error signals from unexpectedly increasing.

A multi-channel sound transfer method of this invention is such that, with respect to two spaces each forming said plurality of audio transfer systems, any of the foregoing multi-channel echo cancel methods is carried out, so that the multi-channel audio signals, which have been echo-canceled by performing said method, are transmitted between said two spaces. In accordance therewith, the multi-channel audio transmission with reduced echo cancellation can be performed between two spots, which, for example, can be applied to the teleconferencing system or the like.

A stereo echo cancel method of this invention is a method wherein, with respect to a space provided therein with two loudspeakers and one or two microphones and forming two or four audio transfer systems in which stereo sounds reproduced by said respective loudspeakers are collected by said microphones, individual transfer functions of said two or four audio transfer systems or a plurality of composite transfer functions obtained by suitably combining said individual transfer functions are estimated so as to set corresponding filter characteristics, respectively, echo cancel signals are respectively produced by giving said set filter characteristics to corresponding individual signals to be reproduced by said respective loudspeakers or a plurality of composite signals obtained by suitably combining said individual signals, and said echo cancel signals are subtracted from corresponding individual collected audio signals of said one or two microphones, or a plurality of composite signals obtained by suitably combining said individual collected audio signals, thereby performing echo cancellation, and wherein, using a sum signal and a difference signal of said stereo audio signals as reference signals, individual transfer functions of said two or four audio transfer systems or a plurality of composite transfer functions obtained by suitably combining said individual transfer functions are respectively derived, thereby to set corresponding filter characteristics. According to this invention, since the sum signal and the difference signal of the stereo audio signals have a low correlation therebetween, the transfer functions of the two or four audio transfer systems or their composite transfer functions are respectively derived using the sum signal and the difference signal as reference signals, so as to set the corresponding filter characteristics, thereby to enable echo cancellation. In accordance therewith, since the stereo signals can be reproduced from the loudspeakers with no or less processing, which induces deterioration, applied to the stereo signals, excellent reproduced tone quality can be achieved. Further, there is no or only a small delay in reproduced signals. Thus, when applying to the teleconferencing system or the like, natural conversation can be conducted. The calculation of respectively deriving the individual transfer functions of said two or four audio transfer systems or the plurality of composite transfer functions obtained by suitably combining said individual transfer functions, using the sum signal and the difference signal of said stereo audio signals as the reference signals, may be, for example, a calculation of respectively deriving the individual transfer functions of said two or four audio transfer systems or the plurality of composite transfer functions obtained by suitably combining said individual transfer functions, based on a cross-spectrum calculation between the sum signal and the difference signal, and the individual collected audio signals of the microphones, or the plurality of composite signals obtained by suitably combining said individual collected audio signals. Further, the calculation of respectively deriving the individual transfer functions of said two or four audio transfer systems or the plurality of composite transfer functions obtained by suitably combining said individual transfer functions, based on said cross-spectrum calculation, may be, for example, a calculation of respectively deriving the individual transfer functions of said two or four audio transfer systems or the plurality of composite transfer functions obtained by suitably combining said individual transfer functions, by deriving cross spectra between the sum signal and the difference signal of said stereo audio signals and the individual collected audio signals of the microphones or the plurality of composite signals obtained by suitably combining said individual collected audio signals, and ensemble-averaging them in a predetermined time period per cross spectrum.

A stereo echo cancel method of this invention is a method wherein, with respect to a space provided therein with two loudspeakers and one or two microphones and forming two or four audio transfer systems in which stereo sounds reproduced by said respective loudspeakers are collected by said microphones, individual transfer functions of said two or four audio transfer systems or a plurality of composite transfer functions obtained by suitably combining said individual transfer functions are estimated so as to set corresponding filter characteristics, respectively, echo cancel signals are respectively produced by giving said set filter characteristics to corresponding individual signals to be reproduced by said respective loudspeakers or a plurality of composite signals obtained by suitably combining said individual signals, and said echo cancel signals are subtracted from corresponding individual collected audio signals of said one or two microphones, or a plurality of composite signals obtained by suitably combining said individual collected audio signals, thereby performing echo cancellation, and wherein, using a sum signal and a difference signal of said stereo audio signals as reference signals, estimated errors of individual transfer functions of said two or four audio transfer systems or a plurality of composite transfer functions obtained by suitably combining said individual transfer functions are respectively derived, thereby to update corresponding filter characteristics to values that cancel said estimated errors. According to this invention, since the sum signal and the difference signal of the stereo audio signals have a low correlation therebetween, the estimated errors of the transfer functions of the two or four audio transfer systems or their composite transfer functions are respectively derived using the sum signal and the difference signal as reference signals, so as to successively update the corresponding filter characteristics to the values that cancel the estimated errors, thereby to enable echo cancellation. In accordance therewith, since the stereo signals can be reproduced from the loudspeakers with no or less processing, which induces deterioration, applied to the stereo signals, excellent reproduced tone quality can be achieved. Further, there is no or only a small delay in reproduced signals. Thus, when applying to the teleconferencing system or the like, natural conversation can be conducted. The calculation of respectively deriving the estimated errors of the individual transfer functions of said two or four audio transfer systems or the plurality of composite transfer functions obtained by suitably combining said individual transfer functions, using the sum signal and the difference signal of said stereo audio signals as the reference signals, may be, for example, a calculation of respectively deriving the estimated errors of the individual transfer functions of said two or four audio transfer systems or the plurality of composite transfer functions obtained by suitably combining said individual transfer functions, based on a cross-spectrum calculation between the sum signal and the difference signal of said stereo audio signals and respective echo cancel error signals obtained by subtracting the corresponding echo cancel signals from the individual collected audio signals of said one or two microphones, or the plurality of composite signals obtained by suitably combining said individual collected audio signals. The calculation of respectively deriving the estimated errors of the individual transfer functions of said two or four audio transfer systems or the plurality of composite transfer functions obtained by suitably combining said individual transfer functions, based on the cross-spectrum calculation between the sum signal and the difference signal of said stereo audio signals and said echo cancel error signals, may be, for example, a calculation of respectively deriving the estimated errors of the individual transfer functions of said two or four audio transfer systems or the plurality of composite transfer functions obtained by suitably combining said individual transfer functions, by deriving cross spectra between the sum signal and the difference signal of said stereo audio signals and said echo cancel error signals, and ensemble-averaging them in a predetermined time period per cross spectrum. Further, the correlation between the sum signal and the difference signal of said stereo audio signals is detected and, when a value of said correlation is no less than a prescribed value, updating of said filter characteristics is stopped, thereby to prevent the echo cancel error signals from unexpectedly increasing.

A stereo audio transmission method of this invention is such that, with respect to two spaces each forming said four audio transfer systems, any of the foregoing multi-channel echo cancel methods is carried out, so that the stereo audio signals, which have been echo-canceled by performing said method, are transmitted between said two spaces. In accordance therewith, the stereo audio transmission with reduced echo cancellation can be performed between two spots, which, for example, can be applied to the teleconferencing system or the like.

In this invention, the plurality of composite signals obtained by suitably combining the individual signals to be reproduced by the respective loudspeakers, and the plurality of low-correlation composite signals used as reference signals {in this specification, "low-correlation composite signals" is used as including the meaning of uncorrelated signals (uncorrelated composite signals)} may be, for example, common signals.

A multi-channel echo cancel method of this invention is a method wherein, with respect to a space provided therein with a plurality of loudspeakers and one or a plurality of microphones and forming a plurality of audio transfer systems in which multi-channel sounds (e.g. multi-channel stereo sounds such as two-channel, four-channel, . . . ) inputted from an outside and reproduced by said respective loudspeakers and having a correlation with each other are collected by said microphones, transfer functions of said plurality of audio transfer systems are estimated so as to set corresponding filter characteristics, respectively, echo cancel signals are respectively produced by giving said filter characteristics to corresponding signals to be reproduced by said respective loudspeakers, and said echo cancel signals are subtracted from corresponding collected audio signals of said one or plurality of microphones, thereby performing echo cancellation, and wherein, using as reference signals a set of a plurality of low-correlation composite signals which correspond to signals obtained by suitably combining said multi-channel audio signals and which have a lower correlation with each other than that between said multi-channel audio signals (e.g. suitably combining said multi-channel audio signals to produce a plurality of low-correlation composite signals having a lower correlation with each other than that between said multi-channel audio signals and using a set of said plurality of low-correlation composite signals as reference signals, or directly inputting a set of a plurality of low-correlation composite signals which correspond to signals obtained by suitably combining said multi-channel audio signals and which have a lower correlation with each other than that between said multi-channel audio signals and using the set of said plurality of low-correlation composite signals as reference signals, or the like), transfer functions of the respective audio transfer systems are respectively derived, thereby to set corresponding filter characteristics. According to this invention, using as reference signals a set of a plurality of low-correlation composite signals which correspond to signals obtained by suitably combining multi-channel audio signals having a correlation therebetween and which have a lower correlation with each other than that between such multi-channel audio signals, the transfer functions of the respective audio transfer systems are respectively derived, and corresponding filter characteristics are set, thereby to enable echo cancellation. In accordance therewith, since the multi-channel audio signals can be reproduced from the loudspeakers with no or less processing, which induces deterioration, applied to the multi-channel audio signals, excellent reproduced tone quality can be achieved. Further, there is no or only a small delay in reproduced signals. Thus, when applying to the teleconferencing system or the like, natural conversation can be conducted. The calculation of respectively deriving the transfer functions of the respective audio transfer systems using as the reference signals the set of the plurality of low-correlation composite signals, may be, for example, a calculation of respectively deriving the transfer functions of the respective audio transfer systems based on a cross-spectrum calculation between the plurality of low-correlation composite signals and the respective microphone collected audio signals. Further, the calculation of respectively deriving the transfer functions of said plurality of audio transfer systems based on said cross-spectrum calculation, may be, for example, a calculation of combining said multi-channel audio signals through addition or subtraction to produce a plurality of low-correlation composite signals having a lower correlation with each other than that between said multi-channel audio signals, deriving cross spectra between said plurality of low-correlation composite signals and the respective microphone collected audio signals, and ensemble-averaging them in a predetermined time period per cross spectrum to derive a plurality of kinds of composite transfer functions obtained by combining transfer functions of a plurality of suitable systems among said plurality of audio transfer systems, thereby to derive transfer functions of said plurality of audio transfer systems based on said plurality of kinds of composite transfer functions.

A multi-channel echo cancel method of this invention is a method wherein, with respect to a space provided therein with a plurality of loudspeakers and one or a plurality of microphones and forming a plurality of audio transfer systems in which multi-channel sounds inputted from an outside and reproduced by said respective loudspeakers and having a correlation with each other are collected by said microphones, transfer functions of said plurality of audio transfer systems are estimated so as to set corresponding filter characteristics, respectively, echo cancel signals are respectively produced by giving said filter characteristics to corresponding signals to be reproduced by said respective loudspeakers, and said echo cancel signals are subtracted from corresponding collected audio signals of said one or plurality of microphones, thereby performing echo cancellation, and wherein, using as reference signals a set of a plurality of low-correlation composite signals which correspond to signals obtained by suitably combining said multi-channel audio signals and which have a lower correlation with each other than that between said multi-channel audio signals (e.g. suitably combining said multi-channel audio signals to produce a plurality of low-correlation composite signals having a lower correlation with each other than that between said multi-channel audio signals and using a set of said plurality of low-correlation composite signals as reference signals, or directly inputting a set of a plurality of low-correlation composite signals which correspond to signals obtained by suitably combining said multi-channel audio signals and which have a lower correlation with each other than that between said multi-channel audio signals and using the set of said plurality of low-correlation composite signals as reference signals, or the like), estimated errors of transfer functions of the respective audio transfer systems are respectively derived, thereby to update corresponding filter characteristics to values that cancel said estimated errors. According to this invention, using as a reference signals a set of a plurality of low-correlation composite signals which correspond to signals obtained by suitably combining multi-channel audio signals having a correlation therebetween and which have a lower correlation with each other than that between such multi-channel audio signals, the estimated errors of the transfer functions of the respective audio transfer systems are respectively derived so as to successively update the corresponding filter characteristics to the values that cancel said estimated errors, thereby to enable echo cancellation. In accordance therewith, since the multi-channel audio signals can be reproduced from the loudspeakers with no or less processing, which induces deterioration, applied to the multi-channel audio signals, excellent reproduced tone quality can be achieved. Further, there is no or only a small delay in reproduced signals. Thus, when applying to the teleconferencing system or the like, natural conversation can be conducted. It is also possible to update the filter characteristics in real time. The filter characteristics can be updated, for example, per suitably determined prescribed time period (e.g. time period of performing said ensemble averaging). The calculation of respectively deriving the estimated errors of the transfer functions of the respective audio transfer systems using the set of the plurality of low-correlation composite signals as the reference signals, may be, for example, a calculation of respectively deriving the estimated errors of the transfer functions of the respective audio transfer systems based on a cross-spectrum calculation between said plurality of low-correlation composite signals and echo cancel error signals obtained by subtracting the corresponding echo cancel signals from the collected audio signals of said one or plurality of microphones. Further, the calculation of respectively deriving the estimated errors of the transfer functions of said plurality of audio transfer systems based on said cross-spectrum calculation, may be, for example, a calculation of combining said multi-channel audio signals through addition or subtraction to produce a plurality of low-correlation composite signals having a lower correlation with each other than that between said multi-channel audio signals, deriving cross spectra between said plurality of low-correlation composite signals and the echo cancel error signals obtained by subtracting the corresponding echo cancel signals from the collected audio signals of said one or plurality of microphones, and ensemble-averaging them in a predetermined time period per cross spectrum to derive a plurality of kinds of transfer function composite estimated errors obtained by combining estimated errors of transfer functions of a plurality of suitable systems among said plurality of audio transfer systems, thereby to derive estimated errors of the transfer functions of said plurality of audio transfer systems based on said plurality of kinds of transfer function composite estimated errors. Further, the correlation between said plurality of low-correlation composite signals is detected and, when a value of said correlation is no less than a prescribed value, updating of said filter characteristics is stopped, thereby to prevent the echo cancel error signals from unexpectedly increasing.

Further, the calculation of respectively deriving the transfer functions of said plurality of audio transfer systems based on said cross-spectrum calculation, may be, for example, a calculation of producing a plurality of mutually orthogonal uncorrelated composite signals by applying a principal component analysis to said multi-channel audio signals, deriving cross spectra between said plurality of uncorrelated composite signals and the respective microphone collected audio signals, and ensemble-averaging them in a predetermined time period per cross spectrum, thereby to derive the transfer functions of said plurality of audio transfer systems based on the ensemble-averaged values.

Further, the calculation of respectively deriving the estimated errors of the transfer functions of said plurality of audio transfer systems based on said cross-spectrum calculation, may be, for example, a calculation of producing a plurality of mutually orthogonal uncorrelated composite signals by applying a principal component analysis to said multi-channel audio signals, deriving cross spectra between said plurality of uncorrelated composite signals and the echo cancel error signals obtained by subtracting the corresponding echo cancel signals from the collected audio signals of said one or plurality of microphones, and ensemble-averaging them in a predetermined time period per cross spectrum, thereby to derive the estimated errors of the transfer functions of said plurality of audio transfer systems based on the ensemble-averaged values. In this case, it may be arranged that double talk in which sounds other than those reproduced by said loudspeakers are inputted into said microphones is detected and, when the double talk is detected, an update period of said filter characteristics is made relatively longer, whereas, when the double talk is not detected, the update period of said filter characteristics is made relatively shorter, so that it is possible to fully converge the estimated errors when the double talk exists, and further, quicken the convergence of the estimated errors when there is no double talk.

A multi-channel sound transfer method of this invention is such that, with respect to two spaces each forming said plurality of audio transfer systems, any of the foregoing multi-channel echo cancel methods is carried out, so that the multi-channel audio signals, which have been echo-canceled by performing said method, are transmitted between said two spaces. In accordance therewith, the multi-channel audio transmission with reduced echo cancellation can be performed between two spots, which, for example, can be applied to the teleconferencing system or the like.

A stereo echo cancel method of this invention is a method wherein, with respect to a space provided therein with two loudspeakers and one or two microphones and forming two or four audio transfer systems in which stereo sounds reproduced by said respective loudspeakers are collected by said microphones, transfer functions of said two or four audio transfer systems are estimated so as to set corresponding filter characteristics, respectively, echo cancel signals are respectively produced by giving said filter characteristics to corresponding signals to be reproduced by said respective loudspeakers, and said echo cancel signals are subtracted from corresponding collected audio signals of said one or two microphones, thereby performing echo cancellation, and wherein, using a sum signal and a difference signal of said stereo audio signals as reference signals, transfer functions of said two or four audio transfer systems are respectively derived, thereby to set corresponding filter characteristics. According to this invention, since the sum signal and the difference signal of the stereo audio signals have a low correlation therebetween, the transfer functions of the two or four audio transfer systems are respectively derived using the sum signal and the difference signal as reference signals, so as to set the corresponding filter characteristics, thereby to enable echo cancellation. In accordance therewith, since the stereo signals can be reproduced from the loudspeakers with no or less processing, which induces deterioration, applied to the stereo signals, excellent reproduced tone quality can be achieved. Further, there is no or only a small delay in reproduced signals. Thus, when applying to the teleconferencing system or the like, natural conversation can be conducted. The calculation of respectively deriving the transfer functions of said two or four audio transfer systems using the sum signal and the difference signal of said stereo audio signals as the reference signals, may be, for example, a calculation of respectively deriving the transfer functions of said two or four audio transfer systems based on a cross-spectrum calculation between the sum signal and the difference signal, and the respective microphone collected audio signals. Further, the calculation of respectively deriving the transfer functions of said two or four audio transfer systems based on said cross-spectrum calculation, may be, for example, a calculation of deriving cross spectra between the sum signal and the difference signal of said stereo audio signals and the respective microphone collected audio signals, and ensemble-averaging them in a predetermined time period per cross spectrum to derive a plurality of kinds of composite transfer functions obtained by combining transfer functions of a plurality of suitable systems among said two or four audio transfer systems, thereby to derive transfer functions of said two or four audio transfer systems based on said plurality of kinds of composite transfer functions. Further, the cross-spectrum calculation in case of the four systems may calculate, for example, respective cross spectra between said sum signal and the first microphone collected audio signal, between said sum signal and the second microphone collected audio signal, between said difference signal and the first microphone collected audio signal, and between said difference signal and the second microphone collected audio signal. Further, said composite transfer functions may include, for example, the first composite transfer function that is the sum of a transfer function between the first loudspeaker and the first microphone and a transfer function between the second loudspeaker and the first microphone, the second composite transfer function that is a difference between the transfer function between the first loudspeaker and the first microphone and the transfer function between the second loudspeaker and the first microphone, the third composite transfer function that is the sum of a transfer function between the first loudspeaker and the second microphone and a transfer function between the second loudspeaker and the second microphone, and the fourth composite transfer function that is a difference between the transfer function between the first loudspeaker and the second microphone and the transfer function between the second loudspeaker and the second microphone. The calculation of deriving the transfer functions of said four audio transfer systems may include, for example, a calculation of deriving a transfer function of the first audio transfer system from the sum of the first composite transfer function and the second composite transfer function, a calculation of deriving a transfer function of the second audio transfer system from a difference between the first composite transfer function and the second composite transfer function, a calculation of deriving a transfer function of the third audio transfer system from the sum of the third composite transfer function and the fourth composite transfer function, and a calculation of deriving a transfer function of the fourth audio transfer system from a difference between the third composite transfer function and the fourth composite transfer function.

A stereo echo cancel method of this invention is a method wherein, with respect to a space provided therein with two loudspeakers and one or two microphones and forming two or four audio transfer systems in which stereo sounds reproduced by said respective loudspeakers are collected by said microphones, transfer functions of said two or four audio transfer systems are estimated so as to set corresponding filter characteristics, respectively, echo cancel signals are respectively produced by giving said filter characteristics to corresponding signals to be reproduced by said respective loudspeakers, and said echo cancel signals are subtracted from corresponding collected audio signals of said one or two microphones, thereby performing echo cancellation, and wherein, using a sum signal and a difference signal of said stereo audio signals as reference signals, estimated errors of transfer functions of said two or four audio transfer systems are respectively derived, thereby to update corresponding filter characteristics to values that cancel said estimated errors. According to this invention, since the sum signal and the difference signal of the stereo audio signals have a low correlation therebetween, the estimated errors of the transfer functions of the two or four audio transfer systems are respectively derived using the sum signal and the difference signal as reference signals, so as to successively update the corresponding filter characteristics to the values that cancel the estimated errors, thereby to enable echo cancellation. In accordance therewith, since the stereo signals can be reproduced from the loudspeakers with no or less processing, which induces deterioration, applied to the stereo signals, excellent reproduced tone quality can be achieved. Further, there is no or only a small delay in reproduced signals. Thus, when applying to the teleconferencing system or the like, natural conversation can be conducted. It is also possible to update the echo cancel coefficients (filter characteristics) in real time. The filter characteristics can be updated, for example, per suitably determined prescribed time period (e.g. time period of performing said ensemble averaging). The calculation of respectively deriving the estimated errors of the transfer functions of said two or four audio transfer systems using the sum signal and the difference signal of said stereo audio signals as the reference signals, may be, for example, a calculation of respectively deriving the estimated errors of the transfer functions of said two or four audio transfer systems based on a cross-spectrum calculation between the sum signal and the difference signal of said stereo audio signals and respective echo cancel error signals obtained by subtracting the corresponding echo cancel signals from the collected audio signals of said one or two microphones. Further, the calculation of respectively deriving the estimated errors of the transfer functions of said two or four audio transfer systems based on the cross-spectrum calculation between the sum signal and the difference signal of said stereo audio signals and said echo cancel error signals, may be, for example, a calculation of deriving cross spectra between the sum signal and the difference signal of said stereo audio signals and said echo cancel error signals, and ensemble-averaging them in a predetermined time period per cross spectrum to derive a plurality of kinds of transfer function composite estimated errors obtained by combining estimated errors of transfer functions of a plurality of suitable systems among said two or four audio transfer systems, thereby to derive estimated errors of the transfer functions of said two or four audio transfer systems based on said plurality of kinds of transfer function composite estimated errors. Further, the cross-spectrum calculation in case of the four systems may calculate, for example, respective cross spectra between said sum signal and the first echo cancel error signal, between said sum signal and the second echo cancel error signal, between said difference signal and the first echo cancel error signal, and between said difference signal and the second echo cancel error signal. Further, said transfer function composite estimated errors may include, for example, the first transfer function composite estimated error that is the sum of an estimated error of a transfer function between the first loudspeaker and the first microphone and an estimated error of a transfer function between the second loudspeaker and the first microphone, the second transfer function composite estimated error that is a difference between the estimated error of the transfer function between the first loudspeaker and the first microphone and the estimated error of the transfer function between the second loudspeaker and the first microphone, the third transfer function composite estimated error that is the sum of an estimated error of a transfer function between the first loudspeaker and the second microphone and an estimated error of a transfer function between the second loudspeaker and the second microphone, and the fourth transfer function composite estimated error that is a difference between the estimated error of the transfer function between the first loudspeaker and the second microphone and the estimated error of the transfer function between the second loudspeaker and the second microphone. The calculation of deriving the estimated errors of the transfer functions of said four audio transfer systems may include, for example, a calculation of deriving an estimated error of a transfer function of the first audio transfer system from the sum of the first transfer function composite estimated error and the second transfer function composite estimated error, a calculation of deriving an estimated error of a transfer function of the second audio transfer system from a difference between the first transfer function composite estimated error and the second transfer function composite estimated error, a calculation of deriving an estimated error of a transfer function of the third audio transfer system from the sum of the third transfer function composite estimated error and the fourth transfer function composite estimated error, and a calculation of deriving an estimated error of a transfer function of the fourth audio transfer system from a difference between the third transfer function composite estimated error and the fourth transfer function composite estimated error. Further, the correlation between the sum signal and the difference signal of said stereo audio signals is detected and, when a value of said correlation is no less than a prescribed value, updating of said filter characteristics is stopped, thereby to prevent the echo cancel error signals from unexpectedly increasing.

A stereo echo cancel method of this invention is a method wherein, with respect to a space provided therein with two loudspeakers and one or two microphones and forming two or four audio transfer systems in which stereo sounds reproduced by said respective loudspeakers are collected by said microphones, transfer functions of said two or four audio transfer systems are estimated so as to set corresponding filter characteristics, respectively, echo cancel signals are respectively produced by giving said filter characteristics to corresponding signals to be reproduced by said respective loudspeakers, and said echo cancel signals are subtracted from corresponding collected audio signals of said one or two microphones, thereby performing echo cancellation, and wherein a principal component analysis is applied to said stereo audio signals to produce two uncorrelated composite signals that are orthogonal to each other, and transfer functions of said two or four audio transfer systems are respectively derived using a set of said two uncorrelated composite signals as reference signals, thereby to set corresponding filter characteristics. According to this invention, since the mutually orthogonal two signals produced by applying the principal component analysis to the stereo audio signals are uncorrelated with each other, the transfer functions of said two or four audio transfer systems are respectively derived using such two signals, thereby to set the corresponding filter characteristics to enable echo cancellation. In accordance therewith, since the stereo signals can be reproduced from the loudspeakers with no or less processing, which induces deterioration, applied to the stereo signals, excellent reproduced tone quality can be achieved. Further, there is no or only a small delay in reproduced signals. Thus, when applying to the teleconferencing system or the like, natural conversation can be conducted. The calculation of respectively deriving the transfer functions of said two or four audio transfer systems using the set of said two uncorrelated composite signals as the reference signals may be, for example, a calculation of respectively deriving transfer functions of said two or four audio transfer systems based on a cross-spectrum calculation between said two uncorrelated composite signals and the respective microphone collected audio signals. Further, the calculation of respectively deriving the transfer functions of said two or four audio transfer systems based on said cross-spectrum calculation may be, for example, a calculation of deriving cross spectra between said two uncorrelated composite signals and the respective microphone collected audio signals, and ensemble-averaging them in a predetermined time period per cross spectrum derive a plurality of kinds of composite transfer functions obtained by combining transfer functions of a plurality of suitable systems among said two or four audio transfer systems, thereby to derive transfer functions of said two or four audio transfer systems based on said plurality of kinds of composite transfer functions.

A stereo echo cancel method of this invention is a method wherein, with respect to a space provided therein with two loudspeakers and one or two microphones and forming two or four audio transfer systems in which stereo sounds reproduced by said respective loudspeakers are collected by said microphones, transfer functions of said two or four audio transfer systems are estimated so as to set corresponding filter characteristics, respectively, echo cancel signals are respectively produced by giving said filter characteristics to corresponding signals to be reproduced by said respective loudspeakers, and said echo cancel signals are subtracted from corresponding collected audio signals of said one or two microphones, thereby performing echo cancellation, and wherein a principal component analysis is applied to said stereo audio signals to produce two uncorrelated composite signals that are orthogonal to each other, and estimated errors of transfer functions of said two or four audio transfer systems are respectively derived using a set of said two uncorrelated composite signals as reference signals, thereby to update corresponding filter characteristics to values that cancel said estimated errors. According to this invention, since the mutually orthogonal two signals produced by applying the principal component analysis to the stereo audio signals are uncorrelated with each other, the estimated errors of the transfer functions of said two or four audio transfer systems are respectively derived using such two signals so as to successively update the corresponding filter characteristics to the values that cancel such estimated errors, thereby to enable echo cancellation. In accordance therewith, since the stereo signals can be reproduced from the loudspeakers with no or less processing, which induces deterioration, applied to the stereo signals, excellent reproduced tone quality can be achieved. Further, there is no or only a small delay in reproduced signals. Thus, when applying to the teleconferencing system or the like, natural conversation can be conducted. It is also possible to update the echo cancel coefficients (filter characteristics) in real time. The filter characteristics can be updated, for example, per suitably determined prescribed time period (e.g. time period of performing said ensemble averaging). The calculation of respectively deriving the estimated errors of the transfer functions of said two or four audio transfer systems using the set of said two uncorrelated composite signals as the reference signals may be, for example, a calculation of respectively deriving estimated errors of transfer functions of said two or four audio transfer systems based on a cross-spectrum calculation between said two uncorrelated composite signals and respective echo cancel error signals obtained by subtracting the corresponding echo cancel signals from the collected audio signals of said one or two microphones. Further, the calculation of respectively deriving the estimated errors of the transfer functions of said two or four audio transfer systems based on the cross-spectrum calculation between said two uncorrelated composite signals and said echo cancel error signals, may be, for example, a calculation of deriving cross spectra between said two uncorrelated composite signals and said echo cancel error signals, and ensemble-averaging them in a predetermined time period per cross spectrum to derive a plurality of kinds of transfer function composite estimated errors obtained by combining estimated errors of transfer functions of a plurality of suitable systems among said two or four audio transfer systems, thereby to derive estimated errors of the transfer functions of said two or four audio transfer systems based on said plurality of kinds of transfer function composite estimated errors. In this case, it may be arranged that double talk in which sounds other than those reproduced by said loudspeakers are inputted into said microphones is detected and, when the double talk is detected, an update period of said filter characteristics is made relatively longer, whereas, when the double talk is not detected, the update period of said filter characteristics is made relatively shorter, so that it is possible to fully converge the estimated errors when the double talk exists, and further, quicken the convergence of the estimated errors when there is no double talk.

A stereo audio transmission method of this invention is such that, with respect to two spaces each forming said four audio transfer systems, any of the foregoing multi-channel echo cancel methods is carried out, so that the stereo audio signals, which have been echo-canceled by performing said method, are transmitted between said two spaces. In accordance therewith, the stereo audio transmission with reduced echo cancellation can be performed between two spots, which, for example, can be applied to the teleconferencing system or the like.

A stereo echo canceller of this invention is a stereo echo canceller wherein, with respect to a space provided therein with two loudspeakers and two microphones and forming four audio transfer systems in which stereo sounds reproduced by said respective loudspeakers are collected by said respective microphones, an audio signal supplied to the first loudspeaker is subjected to convolution calculations by first and second filter means, respectively, which are provided corresponding to the first and second microphones, so as to produce first and second echo cancel signals, an audio signal supplied to the second loudspeaker is subjected to convolution calculations by third and fourth filter means, respectively, which are provided corresponding to the first and second microphones, so as to produce third and fourth echo cancel signals, echo cancellation is performed by subtracting, using first subtracting means, said first and third echo cancel signals from a collected audio signal of the first microphone, and echo cancellation is performed by subtracting, using second subtracting means, said second and fourth echo cancel signals from a collected audio signal of the second microphone, said stereo echo canceller comprising: transfer function calculating means for respectively deriving filter characteristics corresponding to transfer functions of said four audio transfer systems based on a cross-spectrum calculation between a sum signal and a difference signal of stereo audio signals to be reproduced by said respective loudspeakers and the collected audio signals of said respective microphones, thereby to set said derived filter characteristics to corresponding ones of said first to fourth filter means, respectively. It may be arranged, for example, that the stereo echo canceller of this invention comprises input means for inputting said stereo audio signals; sum/difference signal producing means for producing a sum signal and a difference signal of the stereo audio signals inputted from said input means; and a main signal transmission system for transmitting the stereo audio signals inputted from said input means to said respective loudspeakers not through said sum/difference signal producing means, wherein said transfer function calculating means derives the filter characteristics corresponding to the transfer functions of said four audio transfer systems based on the cross-spectrum calculation between the sum signal and the difference signal produced by said sum/difference signal producing means and the respective microphone collected audio signals, and sets the derived filter characteristics to corresponding ones of said first to fourth filter means, respectively. Alternatively, it may be arranged that the stereo echo canceller comprises input means for inputting said stereo audio signals; sum/difference signal producing means for producing a sum signal and a difference signal of the stereo audio signals inputted from said input means; and stereo audio signal demodulating means for calculating the sum of and a difference between the sum signal and the difference signal produced by said sum/difference signal producing means so as to recover the original stereo audio signals, wherein the stereo audio signals recovered by said stereo audio signal demodulating means is transmitted to said respective loudspeakers, and said transfer function calculating means derives the filter characteristics corresponding to the transfer functions of said four audio transfer systems based on the cross-spectrum calculation between the sum signal and the difference signal produced by said sum/difference signal producing means and the respective microphone collected audio signals, and sets the derived filter characteristics to corresponding ones of said first to fourth filter means, respectively. Alternatively, it may also be arranged that the stereo echo canceller comprises input means for inputting a sum signal and a difference signal of said stereo audio signals; and stereo audio signal demodulating means for calculating the sum of and a difference between said inputted sum signal and difference signal so as to recover the original stereo audio signals, wherein the stereo audio signals recovered by said stereo audio signal demodulating means is transmitted to said respective loudspeakers, and said transfer function calculating means derives the filter characteristics corresponding to the transfer functions of said four audio transfer systems based on the cross-spectrum calculation between said inputted sum signal and difference signal and the respective microphone collected audio signals, and sets the derived filter characteristics to corresponding ones of said first to fourth filter means, respectively.

A stereo echo canceller of this invention is a stereo echo canceller wherein, with respect to a space provided therein with two loudspeakers and two microphones and forming four audio transfer systems in which stereo sounds reproduced by said respective loudspeakers are collected by said respective microphones, an audio signal supplied to the first loudspeaker is subjected to convolution calculations by first and second filter means, respectively, which are provided corresponding to the first and second microphones, so as to produce first and second echo cancel signals, an audio signal supplied to the second loudspeaker is subjected to convolution calculations by third and fourth filter means, respectively, which are provided corresponding to the first and second microphones, so as to produce third and fourth echo cancel signals, echo cancellation is performed by subtracting, using first subtracting means, said first and third echo cancel signals from a collected audio signal of the first microphone, and echo cancellation is performed by subtracting, using second subtracting means, said second and fourth echo cancel signals from a collected audio signal of the second microphone, said stereo echo canceller comprising: transfer function calculating means for respectively deriving estimated errors of transfer functions of said four audio transfer systems based on a cross-spectrum calculation between a sum signal and a difference signal of stereo audio signals to be reproduced by said respective loudspeakers and respective echo cancel error signals obtained by subtracting the corresponding echo cancel signals from the collected audio signals of said two microphones, thereby to update filter characteristics of said first to fourth filter means to values that cancel said estimated errors, respectively. It may be arranged, for example, that the stereo echo canceller of this invention comprises input means for inputting said stereo audio signals; sum/difference signal producing means for producing a sum signal and a difference signal of the stereo audio signals inputted from said input means; and a main signal transmission system for transmitting the stereo audio signals inputted from said input means to said respective loudspeakers not through said sum/difference signal producing means, wherein said transfer function calculating means derives the estimated errors of the transfer functions of said four audio transfer systems based on the cross-spectrum calculation between the sum signal and the difference signal produced by said sum/difference signal producing means and the respective echo cancel error signals, and updates the filter characteristics of said first to fourth filter means to the values that cancel said estimated errors, respectively. Alternatively, it may be arranged that the stereo echo canceller comprises input means for inputting said stereo audio signals; sum/difference signal producing means for producing a sum signal and a difference signal of the stereo audio signals inputted from said input means; and stereo audio signal demodulating means for calculating the sum of and a difference between the sum signal and the difference signal produced by said sum/difference signal producing means so as to recover the original stereo audio signals, wherein the stereo audio signals recovered by said stereo audio signal demodulating means is transmitted to said respective loudspeakers, and said transfer function calculating means derives the estimated errors of the transfer functions of said four audio transfer systems based on the cross-spectrum calculation between the sum signal and the difference signal produced by said sum/difference signal producing means and the respective echo cancel error signals, and updates the filter characteristics of said first to fourth filter means to the values that cancel said estimated errors, respectively. Alternatively, it may also be arranged that the stereo echo canceller comprises input means for inputting a sum signal and a difference signal of said stereo audio signals; and stereo audio signal demodulating means for calculating the sum of and a difference between said inputted sum signal and difference signal so as to recover the original stereo audio signals, wherein the stereo audio signals recovered by said stereo audio signal demodulating means is transmitted to said respective loudspeakers, and said transfer function calculating means derives the estimated errors of the transfer functions of said four audio transfer systems based on the cross-spectrum calculation between said inputted sum signal and difference signal produced by said sum/difference signal producing means and the respective echo cancel error signals, and updates the filter characteristics of said first to fourth filter means to the values that cancel said estimated errors, respectively.

A stereo echo canceller of this invention is a stereo echo canceller wherein, with respect to a space provided therein with two loudspeakers and two microphones and forming four audio transfer systems in which stereo sounds reproduced by said respective loudspeakers are collected by said respective microphones, an audio signal supplied to the first loudspeaker is subjected to convolution calculations by first and second filter means, respectively, which are provided corresponding to the first and second microphones, so as to produce first and second echo cancel signals, an audio signal supplied to the second loudspeaker is subjected to convolution calculations by third and fourth filter means, respectively, which are provided corresponding to the first and second microphones, so as to produce third and fourth echo cancel signals, echo cancellation is performed by subtracting, using first subtracting means, said first and third echo cancel signals from a collected audio signal of the first microphone, and echo cancellation is performed by subtracting, using second subtracting means, said second and fourth echo cancel signals from a collected audio signal of the second microphone, said stereo echo canceller comprising: transfer function calculating means for respectively deriving filter characteristics corresponding to transfer functions of said four audio transfer systems based on a cross-spectrum calculation between mutually orthogonal two uncorrelated composite signals produced by applying a principal component analysis to stereo audio signals to be reproduced by said respective loudspeakers and the respective microphone collected audio signals, thereby to set said derived filter characteristics to corresponding ones of said first to fourth filter means, respectively. It may be arranged, for example, that the stereo echo canceller of this invention comprises input means for inputting said stereo audio signals; orthogonalizing means for applying a principal component analysis to the stereo audio signals inputted from said input means to produce mutually orthogonal two uncorrelated composite signals; and a main signal transmission system for transmitting the stereo audio signals inputted from said input means to said respective loudspeakers not through said orthogonalizing means, wherein said transfer function calculating means derives the filter characteristics corresponding to the transfer functions of said four audio transfer systems based on the cross-spectrum calculation between the two uncorrelated composite signals produced by said orthogonalizing means and the respective microphone collected audio signals, and sets the derived filter characteristics to corresponding ones of said first to fourth filter means, respectively.

A stereo echo canceller of this invention is a stereo echo canceller wherein, with respect to a space provided therein with two loudspeakers and two microphones and forming four audio transfer systems in which stereo sounds reproduced by said respective loudspeakers are collected by said respective microphones, an audio signal supplied to the first loudspeaker is subjected to convolution calculations by first and second filter means, respectively, which are provided corresponding to the first and second microphones, so as to produce first and second echo cancel signals, an audio signal supplied to the second loudspeaker is subjected to convolution calculations by third and fourth filter means, respectively, which are provided corresponding to the first and second microphones, so as to produce third and fourth echo cancel signals, echo cancellation is performed by subtracting, using first subtracting means, said first and third echo cancel signals from a collected audio signal of the first microphone, and echo cancellation is performed by subtracting, using second subtracting means, said second and fourth echo cancel signals from a collected audio signal of the second microphone, said stereo echo canceller comprising: transfer function calculating means for respectively deriving estimated errors of transfer functions of said four audio transfer systems based on a cross-spectrum calculation between mutually orthogonal two uncorrelated composite signals produced by applying a principal component analysis to stereo audio signals to be reproduced by said respective loudspeakers and respective echo cancel error signals obtained by subtracting the corresponding echo cancel signals from the collected audio signals of said two microphones, thereby to update filter characteristics of said first to fourth filter means to values that cancel said estimated errors, respectively. It may be arranged, for example, that the stereo echo canceller of this invention comprises input means for inputting said stereo audio signals; orthogonalizing means for applying a principal component analysis to the stereo audio signals inputted from said input means to produce mutually orthogonal two uncorrelated composite signals; and a main signal transmission system for transmitting the stereo audio signals inputted from said input means to said respective loudspeakers not through said orthogonalizing means, wherein said transfer function calculating means derives the estimated errors of the transfer functions of said four audio transfer systems based on the cross-spectrum calculation between the two uncorrelated composite signals produced by said orthogonalizing means and the respective echo cancel error signals, and updates the filter characteristics of said first to fourth filter means to the values that cancel said estimated errors, respectively. In this case, it may be arranged that double talk detecting means is provided for detecting double talk in which sounds other than those reproduced by said loudspeakers are inputted into said microphones and, when the double talk is detected, said transfer function calculating means makes relatively longer an update period of said filter characteristics, whereas, when the double talk is not detected, it makes relatively shorter the update period of said filter characteristics, so that it is possible to fully converge the estimated errors when the double talk exists, and further, quicken the convergence of the estimated errors when there is no double talk.

The stereo echo canceller of this invention may be further provided with correlation detecting means for detecting the correlation between the sum signal and the difference signal of said stereo audio signals and, when a value of said correlation is no less than a prescribed value, stopping updating of said filter characteristics, thereby to prevent the echo cancel error signals from unexpectedly increasing.

A stereo sound transfer apparatus of this invention is such that, with respect to two spaces each forming said four audio transfer systems, any of said stereo echo cancellers is arranged in each space, so that the stereo audio signals, which have been echo-canceled by said stereo echo cancellers, are transmitted between said two spaces.

A multi-channel echo cancel method of this invention is a method wherein, with respect to a space provided therein with a plurality of loudspeakers and one or a plurality of microphones and forming a plurality of audio transfer systems in which multi-channel sounds reproduced by said respective loudspeakers and having a correlation with each other are collected by said microphones, composite transfer functions of said plurality of audio transfer systems are estimated so as to set corresponding filter characteristics, respectively, echo cancel signals are respectively produced by giving said set filter characteristics to composite signals of individual signals to be reproduced by said respective loudspeakers, and said echo cancel signals are subtracted from individual collected audio signals of said one or plurality of microphones, thereby performing echo cancellation, and wherein, using as reference signals a set of a plurality of low-correlation composite signals which correspond to signals obtained by suitably combining said multi-channel audio signals and which have a lower correlation with each other than that between said multi-channel audio signals (e.g. suitably combining said multi-channel audio signals to produce a plurality of low-correlation composite signals having a lower correlation with each other than that between said multi-channel audio signals and using a set of said plurality of low-correlation composite signals as reference signals, or directly inputting a set of a plurality of low-correlation composite signals which correspond to signals obtained by suitably combining said multi-channel audio signals and which have a lower correlation with each other than that between said multi-channel audio signals and using the set of said plurality of low-correlation composite signals as reference signals, or the like), composite transfer functions of said plurality of audio transfer systems are respectively derived, thereby to set corresponding filter characteristics. According to this invention, using as reference signals a set of a plurality of low-correlation composite signals which correspond to signals obtained by suitably combining multi-channel audio signals having a correlation therebetween and which have a lower correlation with each other than that between such multi-channel audio signals, the composite transfer functions of said plurality of audio transfer systems are respectively derived, and corresponding filter characteristics are set, thereby to enable echo cancellation. In accordance therewith, since the multi-channel audio signals can be reproduced from the loudspeakers with no or less processing, which induces deterioration, applied to the multi-channel audio signals, excellent reproduced tone quality can be achieved. Further, there is no or only a small delay in reproduced signals. Thus, when applying to the teleconferencing system or the like, natural conversation can be conducted. The calculation of respectively deriving the composite transfer functions of said plurality of audio transfer systems using as the reference signals the set of the plurality of low-correlation composite signals, may be, for example, a calculation of respectively deriving the composite transfer functions of said plurality of audio transfer systems based on a cross-spectrum calculation between the plurality of low-correlation composite signals and the individual collected audio signals of the respective microphones. Further, the calculation of respectively deriving the composite transfer functions of said plurality of audio transfer systems based on said cross-spectrum calculation, may be, for example, a calculation of combining said multi-channel audio signals through addition or subtraction to produce a plurality of low-correlation composite signals having a lower correlation with each other than that between said multi-channel audio signals, deriving cross spectra between said plurality of low-correlation composite signals and the individual collected audio signals of the respective microphones, and ensemble-averaging them in a predetermined time period per cross spectrum to derive composite transfer functions of said plurality of audio transfer systems.

A multi-channel echo cancel method of this invention is a method wherein, with respect to a space provided therein with a plurality of loudspeakers and one or a plurality of microphones and forming a plurality of audio transfer systems in which multi-channel sounds reproduced by said respective loudspeakers and having a correlation with each other are collected by said microphones, composite transfer functions of said plurality of audio transfer systems are estimated so as to set corresponding filter characteristics, respectively, echo cancel signals are respectively produced by giving said set filter characteristics to composite signals of individual signals to be reproduced by said respective loudspeakers, and said echo cancel signals are subtracted from individual collected audio signals of said one or plurality of microphones, thereby performing echo cancellation, and wherein, using as reference signals a set of a plurality of low-correlation composite signals which correspond to signals obtained by suitably combining said multi-channel audio signals and which have a lower correlation with each other than that between said multi-channel audio signals (e.g. suitably combining said multi-channel audio signals to produce a plurality of low-correlation composite signals having a lower correlation with each other than that between said multi-channel audio signals and using a set of said plurality of low-correlation composite signals as reference signals, or directly inputting a set of a plurality of low-correlation composite signals which correspond to signals obtained by suitably combining said multi-channel audio signals and which have a lower correlation with each other than that between said multi-channel audio signals and using the set of said plurality of low-correlation composite signals as reference signals, or the like), estimated errors of composite transfer functions of said plurality of audio transfer systems are respectively derived, thereby to update corresponding filter characteristics to values that cancel said estimated errors. According to this invention, using as reference signals a set of a plurality of low-correlation composite signals which correspond to signals obtained by suitably combining multi-channel audio signals having a correlation therebetween and which have a lower correlation with each other than that between such multi-channel audio signals, the estimated errors of the composite transfer functions of said plurality of audio transfer systems are respectively derived so as to successively update the corresponding filter characteristics to the values that cancel said estimated errors, thereby to enable echo cancellation. In accordance therewith, since the multi-channel audio signals can be reproduced from the loudspeakers with no or less processing, which induces deterioration, applied to the multi-channel audio signals, excellent reproduced tone quality can be achieved. Further, there is no or only a small delay in reproduced signals. Thus, when applying to the teleconferencing system or the like, natural conversation can be conducted. It is also possible to update the filter characteristics in real time. The calculation of respectively deriving the estimated errors of the composite transfer functions of said plurality of audio transfer systems using the set of the plurality of low-correlation composite signals as the reference signals, may be, for example, a calculation of respectively deriving the estimated errors of the composite transfer functions of said plurality of audio transfer systems based on a cross-spectrum calculation between said plurality of low-correlation composite signals and echo cancel error signals obtained by subtracting the corresponding echo cancel signals from the individual collected audio signals of said one or plurality of microphones. Further, the calculation of respectively deriving the estimated errors of the composite transfer functions of said plurality of audio transfer systems based on said cross-spectrum calculation, may be, for example, a calculation of combining said multi-channel audio signals through addition or subtraction to produce a plurality of low-correlation composite signals having a lower correlation with each other than that between said multi-channel audio signals, deriving cross spectra between said plurality of low-correlation composite signals and the echo cancel error signals obtained by subtracting the corresponding echo cancel signals from the individual collected audio signals of said one or plurality of microphones, and ensemble-averaging them in a predetermined time period per cross spectrum to derive estimated errors of the composite transfer functions of said plurality of audio transfer systems. Further, the correlation between said plurality of low-correlation composite signals is detected and, when a value of said correlation is no less than a prescribed value, updating of said filter characteristics is stopped, thereby to prevent the echo cancel error signals from unexpectedly increasing.

A multi-channel sound transfer method of this invention is such that, with respect to two spaces each forming said plurality of audio transfer systems, any of the foregoing multi-channel echo cancel methods is carried out, so that the multi-channel audio signals, which have been echo-canceled by performing said method, are transmitted between said two spaces. In accordance therewith, the multi-channel audio transmission with reduced echo cancellation can be performed between two spots, which, for example, can be applied to the teleconferencing system or the like.

A stereo echo cancel method of this invention is a method wherein, with respect to a space provided therein with two loudspeakers and one or two microphones and forming two or four audio transfer systems in which stereo sounds reproduced by said respective loudspeakers are collected by said microphones, composite transfer functions of said two or four audio transfer systems are estimated so as to set corresponding filter characteristics, respectively, echo cancel signals are respectively produced by giving said set filter characteristics to composite signals of individual signals to be reproduced by said respective loudspeakers, and said echo cancel signals are subtracted from individual collected audio signals of said one or two microphones, thereby performing echo cancellation, and wherein, using a sum signal and a difference signal of said stereo audio signals as reference signals, composite transfer functions of said two or four audio transfer systems are respectively derived, thereby to set corresponding filter characteristics. According to this invention, since the sum signal and the difference signal of the stereo audio signals have a low correlation therebetween, the composite transfer functions of the two or four audio transfer systems are respectively derived using the sum signal and the difference signal as reference signals, so as to set the corresponding filter characteristics, thereby to enable echo cancellation. In accordance therewith, since the stereo signals can be reproduced from the loudspeakers with no or less processing, which induces deterioration, applied to the stereo signals, excellent reproduced tone quality can be achieved. Further, there is no or only a small delay in reproduced signals. Thus, when applying to the teleconferencing system or the like, natural conversation can be conducted. The calculation of respectively deriving the composite transfer functions of said two or four audio transfer systems using the sum signal and the difference signal of said stereo audio signals as the reference signals, may be, for example, a calculation of respectively deriving the composite transfer functions of said two or four audio transfer systems based on a cross-spectrum calculation between the sum signal and the difference signal, and the individual collected audio signals of the respective microphones. Further, the calculation of respectively deriving the composite transfer functions of said two or four audio transfer systems based on said cross-spectrum calculation, may be, for example, a calculation of deriving cross spectra between the sum signal and the difference signal of said stereo audio signals and the individual collected audio signals of the respective microphones, and ensemble-averaging them in a predetermined time period per cross spectrum to derive composite transfer functions of said two or four audio transfer systems.

A stereo echo cancel method of this invention is a method wherein, with respect to a space provided therein with two loudspeakers and one or two microphones and forming two or four audio transfer systems in which stereo sounds reproduced by said respective loudspeakers are collected by said microphones, composite transfer functions of said two or four audio transfer systems are estimated so as to set corresponding filter characteristics, respectively, echo cancel signals are respectively produced by giving said set filter characteristics to composite signals of individual signals to be reproduced by said respective loudspeakers, and said echo cancel signals are subtracted from individual collected audio signals of said one or two microphones, thereby performing echo cancellation, and wherein, using a sum signal and a difference signal of said stereo audio signals as reference signals, estimated errors of composite transfer functions of said two or four audio transfer systems are respectively derived, thereby to update corresponding filter characteristics to values that cancel said estimated errors. According to this invention, since the sum signal and the difference signal of the stereo audio signals have a low correlation therebetween, the estimated errors of the composite transfer functions of the two or four audio transfer systems are respectively derived using the sum signal and the difference signal as reference signals, so as to successively update the corresponding filter characteristics to the values that cancel the estimated errors, thereby to enable echo cancellation. In accordance therewith, since the stereo signals can be reproduced from the loudspeakers with no or less processing, which induces deterioration, applied to the stereo signals, excellent reproduced tone quality can be achieved. Further, there is no or only a small delay in reproduced signals. Thus, when applying to the teleconferencing system or the like, natural conversation can be conducted. The calculation of respectively deriving the estimated errors of the composite transfer functions of said two or four audio transfer systems using the sum signal and the difference signal of said stereo audio signals as the reference signals, may be, for example, a calculation of respectively deriving the estimated errors of the composite transfer functions of said two or four audio transfer systems based on a cross-spectrum calculation between the sum signal and the difference signal of said stereo audio signals and respective echo cancel error signals obtained by subtracting the corresponding echo cancel signals from the individual collected audio signals of said one or two microphones. Further, the calculation of respectively deriving the estimated errors of the composite transfer functions of said two or four audio transfer systems based on the cross-spectrum calculation between the sum signal and the difference signal of said stereo audio signals and said echo cancel error signals, may be, for example, a calculation of deriving cross spectra between the sum signal and the difference signal of said stereo audio signals and said echo cancel error signals, and ensemble-averaging them in a predetermined time period per cross spectrum to derive estimated errors of the composite transfer functions of said two or four audio transfer systems. Further, the correlation between the sum signal and the difference signal of said stereo audio signals is detected and, when a value of said correlation is no less than a prescribed value, updating of said filter characteristics is stopped, thereby to prevent the echo cancel error signals from unexpectedly increasing.

A stereo audio transmission method of this invention is such that, with respect to two spaces each forming said four audio transfer systems, any of the foregoing multi-channel echo cancel methods is carried out, so that the stereo audio signals, which have been echo-canceled by performing said method, are transmitted between said two spaces. In accordance therewith, the stereo audio transmission with reduced echo cancellation can be performed between two spots, which, for example, can be applied to the teleconferencing system or the like.

A stereo echo canceller of this invention is a stereo echo canceller wherein, with respect to a space provided therein with two loudspeakers and two microphones and forming four audio transfer systems in which stereo sounds reproduced by said respective loudspeakers are collected by said respective microphones, a sum signal of stereo audio signals to be reproduced by said respective loudspeakers is subjected to convolution calculations by first and second filter means, respectively, so as to produce first and second echo cancel signals, a difference signal of the stereo audio signals to be reproduced by said respective loudspeakers is subjected to convolution calculations by third and fourth filter means, respectively, so as to produce third and fourth echo cancel signals, echo cancellation is performed by subtracting, using first subtracting means, said first and third echo cancel signals from a collected audio signal of the first microphone, and echo cancellation is performed by subtracting, using second subtracting means, said second and fourth echo cancel signals from a collected audio signal of the second microphone, said stereo echo canceller comprising: transfer function calculating means for respectively deriving filter characteristics corresponding to composite transfer functions of said four audio transfer systems based on a cross-spectrum calculation between the sum signal and the difference signal of the stereo audio signals to be reproduced by said respective loudspeakers and the respective microphone collected audio signals, thereby to set said derived filter characteristics to corresponding ones of said first to fourth filter means, respectively. It may be arranged, for example, that the stereo echo canceller of this invention comprises input means for inputting said stereo audio signals; sum/difference signal producing means for producing a sum signal and a difference signal of the stereo audio signals inputted from said input means; and a main signal transmission system for transmitting the stereo audio signals inputted from said input means to said respective loudspeakers not through said sum/difference signal producing means, wherein said transfer function calculating means derives the filter characteristics corresponding to the composite transfer functions of said four audio transfer systems based on the cross-spectrum calculation between the sum signal and the difference signal produced by said sum/difference signal producing means and the respective microphone collected audio signals, and sets the derived filter characteristics to corresponding ones of said first to fourth filter means, respectively.

A stereo echo canceller of this invention is a stereo echo canceller wherein, with respect to a space provided therein with two loudspeakers and two microphones and forming four audio transfer systems in which stereo sounds reproduced by said respective loudspeakers are collected by said respective microphones, a sum signal of stereo audio signals to be reproduced by said respective loudspeakers is subjected to convolution calculations by first and second filter means, respectively, so as to produce first and second echo cancel signals, a difference signal of the stereo audio signals to be reproduced by said respective loudspeakers is subjected to convolution calculations by third and fourth filter means, respectively, so as to produce third and fourth echo cancel signals, echo cancellation is performed by subtracting, using first subtracting means, said first and third echo cancel signals from a collected audio signal of the first microphone, and echo cancellation is performed by subtracting, using second subtracting means, said second and fourth echo cancel signals from a collected audio signal of the second microphone, said stereo echo canceller comprising: transfer function calculating means for respectively deriving estimated errors of composite transfer functions of said four audio transfer systems based on a cross-spectrum calculation between the sum signal and the difference signal of the stereo audio signals to be reproduced by said respective loudspeakers and respective echo cancel error signals obtained by subtracting the corresponding echo cancel signals from the collected audio signals of said two microphones, thereby to update filter characteristics of said first to fourth filter means to values that cancel said estimated errors, respectively. It may be arranged, for example, that the stereo echo canceller of this invention comprises input means for inputting said stereo audio signals; sum/difference signal producing means for producing a sum signal and a difference signal of the stereo audio signals inputted from said input means; and a main signal transmission system for transmitting the stereo audio signals inputted from said input means to said respective loudspeakers not through said sum/difference signal producing means, wherein said transfer function calculating means derives the estimated errors of the composite transfer functions of said four audio transfer systems based on the cross-spectrum calculation between the sum signal and the difference signal produced by said sum/difference signal producing means and the respective echo cancel error signals, and updates the filter characteristics of said first to fourth filter means to the values that cancel said estimated errors, respectively.

The stereo echo canceller of this invention may be further provided with correlation detecting means for detecting the correlation between the sum signal and the difference signal of said stereo audio signals and, when a value of said correlation is no less than a prescribed value, stopping updating of said filter characteristics, thereby to prevent the echo cancel error signals from unexpectedly increasing.

A stereo sound transfer apparatus of this invention is such that, with respect to two spaces each forming said four audio transfer systems, any of said stereo echo cancellers is arranged in each space, so that the stereo audio signals, which have been echo-canceled by said stereo echo cancellers, are transmitted between said two spaces.

A multi-channel echo cancel method of this invention is a method wherein, with respect to a space provided therein with a plurality of loudspeakers and one or a plurality of microphones and forming a plurality of audio transfer systems in which multi-channel sounds reproduced by said respective loudspeakers and having a correlation with each other are collected by said microphones, composite transfer functions of said plurality of audio transfer systems are estimated so as to set corresponding filter characteristics, respectively, echo cancel signals are respectively produced by giving said set filter characteristics to individual signals to be reproduced by said respective loudspeakers, and said echo cancel signals are subtracted from composite signals of individual collected audio signals of said one or plurality of microphones, thereby performing echo cancellation, and wherein, using as reference signals a set of a plurality of low-correlation composite signals which correspond to signals obtained by suitably combining said multi-channel audio signals and which have a lower correlation with each other than that between said multi-channel audio signals (e.g. suitably combining said multi-channel audio signals to produce a plurality of low-correlation composite signals having a lower correlation with each other than that between said multi-channel audio signals and using a set of said plurality of low-correlation composite signals as reference signals, or directly inputting a set of a plurality of low-correlation composite signals which correspond to signals obtained by suitably combining said multi-channel audio signals and which have a lower correlation with each other than that between said multi-channel audio signals and using the set of said plurality of low-correlation composite signals as reference signals, or the like), composite transfer functions of said plurality of audio transfer systems are respectively derived, thereby to set corresponding filter characteristics. According to this invention, using as reference signals a set of a plurality of low-correlation composite signals which correspond to signals obtained by suitably combining multi-channel audio signals having a correlation therebetween and which have a lower correlation with each other than that between such multi-channel audio signals, the composite transfer functions of said plurality of audio transfer systems are respectively derived, and corresponding filter characteristics are set, thereby to enable echo cancellation. In accordance therewith, since the multi-channel audio signals can be reproduced from the loudspeakers with no or less processing, which induces deterioration, applied to the multi-channel audio signals, excellent reproduced tone quality can be achieved. Further, there is no or only a small delay in reproduced signals. Thus, when applying to the teleconferencing system or the like, natural conversation can be conducted. The calculation of respectively deriving the composite transfer functions of said plurality of audio transfer systems using as the reference signals the set of the plurality of low-correlation composite signals, may be, for example, a calculation of respectively deriving the composite transfer functions of said plurality of audio transfer systems based on a cross-spectrum calculation between the plurality of low-correlation composite signals and the composite signals of the individual collected audio signals of the respective microphones. Further, the calculation of respectively deriving the composite transfer functions of said plurality of audio transfer systems based on said cross-spectrum calculation, may be, for example, a calculation of combining said multi-channel audio signals through addition or subtraction to produce a plurality of low-correlation composite signals having a lower correlation with each other than that between said multi-channel audio signals, deriving cross spectra between said plurality of low-correlation composite signals and the composite signals of the individual collected audio signals of the respective microphones, and ensemble-averaging them in a predetermined time period per cross spectrum to derive composite transfer functions of said plurality of audio transfer systems.

A multi-channel echo cancel method of this invention is a method wherein, with respect to a space provided therein with a plurality of loudspeakers and one or a plurality of microphones and forming a plurality of audio transfer systems in which multi-channel sounds reproduced by said respective loudspeakers and having a correlation with each other are collected by said microphones, composite transfer functions of said plurality of audio transfer systems are estimated so as to set corresponding filter characteristics, respectively, echo cancel signals are respectively produced by giving said set filter characteristics to individual signals to be reproduced by said respective loudspeakers, and said echo cancel signals are subtracted from composite signals of individual collected audio signals of said one or plurality of microphones, thereby performing echo cancellation, and wherein, using as reference signals a set of a plurality of low-correlation composite signals which correspond to signals obtained by suitably combining said multi-channel audio signals and which have a lower correlation with each other than that between said multi-channel audio signals (e.g. suitably combining said multi-channel audio signals to produce a plurality of low-correlation composite signals having a lower correlation with each other than that between said multi-channel audio signals and using a set of said plurality of low-correlation composite signals as reference signals, or directly inputting a set of a plurality of low-correlation composite signals which correspond to signals obtained by suitably combining said multi-channel audio signals and which have a lower correlation with each other than that between said multi-channel audio signals and using the set of said plurality of low-correlation composite signals as reference signals, or the like), estimated errors of composite transfer functions of said plurality of audio transfer systems are respectively derived, thereby to update corresponding filter characteristics to values that cancel said estimated errors. According to this invention, using as reference signals a set of a plurality of low-correlation composite signals which correspond to signals obtained by suitably combining multi-channel audio signals having a correlation therebetween and which have a lower correlation with each other than that between such multi-channel audio signals, the estimated errors of the composite transfer functions of said plurality of audio transfer systems are respectively derived so as to successively update the corresponding filter characteristics to the values that cancel said estimated errors, thereby to enable echo cancellation. In accordance therewith, since the multi-channel audio signals can be reproduced from the loudspeakers with no or less processing, which induces deterioration, applied to the multi-channel audio signals, excellent reproduced tone quality can be achieved. Further, there is no or only a small delay in reproduced signals. Thus, when applying to the teleconferencing system or the like, natural conversation can be conducted. It is also possible to update the filter characteristics in real time. The calculation of respectively deriving the estimated errors of the composite transfer functions of said plurality of audio transfer systems using the set of the plurality of low-correlation composite signals as the reference signals, may be, for example, a calculation of respectively deriving the estimated errors of the composite transfer functions of said plurality of audio transfer systems based on a cross-spectrum calculation between said plurality of low-correlation composite signals and echo cancel error signals obtained by subtracting the corresponding echo cancel signals from the composite signals of the individual collected audio signals of said one or plurality of microphones. Further, the calculation of respectively deriving the estimated errors of the composite transfer functions of said plurality of audio transfer systems based on said cross-spectrum calculation, may be, for example, a calculation of combining said multi-channel audio signals through addition or subtraction to produce a plurality of low-correlation composite signals having a lower correlation with each other than that between said multi-channel audio signals, deriving cross spectra between said plurality of low-correlation composite signals and the echo cancel error signals obtained by subtracting the corresponding echo cancel signals from the composite signals of the individual collected audio signals of said one or plurality of microphones, and ensemble-averaging them in a predetermined time period per cross spectrum to derive estimated errors of the composite transfer functions of said plurality of audio transfer systems. Further, the correlation between said plurality of low-correlation composite signals is detected and, when a value of said correlation is no less than a prescribed value, updating of said filter characteristics is stopped, thereby to prevent the echo cancel error signals from unexpectedly increasing.

A multi-channel sound transfer method of this invention is such that, with respect to two spaces each forming said plurality of audio transfer systems, any of the foregoing multi-channel echo cancel methods is carried out, so that the multi-channel audio signals, which have been echo-canceled by performing said method, are transmitted between said two spaces. In accordance therewith, the multi-channel audio transmission with reduced echo cancellation can be performed between two spots, which, for example, can be applied to the teleconferencing system or the like.

A stereo echo cancel method of this invention is a method wherein, with respect to a space provided therein with two loudspeakers and one or two microphones and forming two or four audio transfer systems in which stereo sounds reproduced by said respective loudspeakers are collected by said microphones, composite transfer functions of said two or four audio transfer systems are estimated so as to set corresponding filter characteristics, respectively, echo cancel signals are respectively produced by giving said set filter characteristics to individual signals to be reproduced by said respective loudspeakers, and said echo cancel signals are subtracted from composite signals of individual collected audio signals of said one or two microphones, thereby performing echo cancellation, and wherein, using a sum signal and a difference signal of said stereo audio signals as reference signals, composite transfer functions of said two or four audio transfer systems are respectively derived, thereby to set corresponding filter characteristics. According to this invention, since the sum signal and the difference signal of the stereo audio signals have a low correlation therebetween, estimated errors of the composite transfer functions of the two or four audio transfer systems are respectively derived using the sum signal and the difference signal as reference signals, so as to successively update the corresponding filter characteristics to values that cancel said estimated errors, thereby to enable echo cancellation. In accordance therewith, since the stereo signals can be reproduced from the loudspeakers with no or less processing, which induces deterioration, applied to the stereo signals, excellent reproduced tone quality can be achieved. Further, there is no or only a small delay in reproduced signals. Thus, when applying to the teleconferencing system or the like, natural conversation can be conducted. The calculation of respectively deriving the composite transfer functions of said two or four audio transfer systems using the sum signal and the difference signal of said stereo audio signals as the reference signals, may be, for example, a calculation of respectively deriving the composite transfer functions of said two or four audio transfer systems based on a cross-spectrum calculation between the sum signal and the difference signal, and the composite signals of the individual collected audio signals of the respective microphones. Further, the calculation of respectively deriving the composite transfer functions of said two or four audio transfer systems based on said cross-spectrum calculation, may be, for example, a calculation of deriving cross spectra between the sum signal and the difference signal of said stereo audio signals and the composite signals of the individual collected audio signals of the respective microphones, and ensemble-averaging them in a predetermined time period per cross spectrum to derive composite transfer functions of said two or four audio transfer systems.

A stereo echo cancel method of this invention is a method wherein, with respect to a space provided therein with two loudspeakers and one or two microphones and forming two or four audio transfer systems in which stereo sounds reproduced by said respective loudspeakers are collected by said microphones, composite transfer functions of said two or four audio transfer systems are estimated so as to set corresponding filter characteristics, respectively, echo cancel signals are respectively produced by giving said set filter characteristics to individual signals to be reproduced by said respective loudspeakers, and said echo cancel signals are subtracted from composite signals of individual collected audio signals of said one or two microphones, thereby performing echo cancellation, and wherein, using a sum signal and a difference signal of said stereo audio signals as reference signals, estimated errors of composite transfer functions of said two or four audio transfer systems are respectively derived, thereby to update corresponding filter characteristics to values that cancel said estimated errors. According to this invention, using as reference signals a set of a plurality of low-correlation composite signals which correspond to signals obtained by suitably combining multi-channel audio signals having a correlation therebetween and which have a lower correlation with each other than that between such multi-channel audio signals, the estimated errors of the composite transfer functions of said plurality of audio transfer systems are respectively derived, so as to successively update the corresponding filter characteristics to the values that cancel the estimated errors, thereby to enable echo cancellation. In accordance therewith, since the multi-channel audio signals can be reproduced from the loudspeakers with no or less processing, which induces deterioration, applied to the multi-channel audio signals, excellent reproduced tone quality can be achieved. Further, there is no or only a small delay in reproduced signals. Thus, when applying to the teleconferencing system or the like, natural conversation can be conducted. It is also possible to update the filter characteristics in real time. The calculation of respectively deriving the estimated errors of the composite transfer functions of said two or four audio transfer systems using the sum signal and the difference signal of said stereo audio signals as the reference signals, may be, for example, a calculation of respectively deriving the estimated errors of the composite transfer functions of said two or four audio transfer systems based on a cross-spectrum calculation between the sum signal and the difference signal of said stereo audio signals and respective echo cancel error signals obtained by subtracting the corresponding echo cancel signals from the composite signals of the individual collected audio signals of said one or two microphones. Further, the calculation of respectively deriving the estimated errors of the composite transfer functions of said two or four audio transfer systems based on the cross-spectrum calculation between the sum signal and the difference signal of said stereo audio signals and said echo cancel error signals, may be, for example, a calculation of deriving cross spectra between the sum signal and the difference signal of said stereo audio signals and said echo cancel error signals, and ensemble-averaging them in a predetermined time period per cross spectrum to derive estimated errors of the composite transfer functions of said two or four audio transfer systems. Further, the correlation between the sum signal and the difference signal of said stereo audio signals is detected and, when a value of said correlation is no less than a prescribed value, updating of said filter characteristics is stopped, thereby to prevent the echo cancel error signals from unexpectedly increasing.

A stereo audio transmission method of this invention is such that, with respect to two spaces each forming said four audio transfer systems, any of the foregoing multi-channel echo cancel methods is carried out, so that the stereo audio signals, which have been echo-canceled by performing said method, are transmitted between said two spaces. In accordance therewith, the stereo audio transmission with reduced echo cancellation can be performed between two spots, which, for example, can be applied to the teleconferencing system or the like.

A stereo echo canceller of this invention is a stereo echo canceller wherein, with respect to a space provided therein with two loudspeakers and two microphones and forming four audio transfer systems in which stereo sounds reproduced by said respective loudspeakers are collected by said respective microphones, an audio signal supplied to the first loudspeaker is subjected to convolution calculations by first and second filter means, respectively, so as to produce first and second echo cancel signals, an audio signal supplied to the second loudspeaker is subjected to convolution calculations by third and fourth filter means, respectively, so as to produce third and fourth echo cancel signals, echo cancellation is performed by subtracting, using first subtracting means, said first and third echo cancel signals from a sum signal of collected audio signals of the respective microphones, and echo cancellation is performed by subtracting, using second subtracting means, said second and fourth echo cancel signals from a difference signal of the collected audio signals of the respective microphones, said stereo echo canceller comprising: transfer function calculating means for respectively deriving filter characteristics corresponding to composite transfer functions of said four audio transfer systems based on a cross-spectrum calculation between a sum signal and a difference signal of stereo audio signals to be reproduced by said respective loudspeakers and the sum signal and the difference signal of the respective microphone collected audio signals, thereby to set said derived filter characteristics to corresponding ones of said first to fourth filter means, respectively.

A stereo echo canceller of this invention is a stereo echo canceller wherein, with respect to a space provided therein with two loudspeakers and two microphones and forming four audio transfer systems in which stereo sounds reproduced by said respective loudspeakers are collected by said respective microphones, an audio signal supplied to the first loudspeaker is subjected to convolution calculations by first and second filter means, respectively, so as to produce first and second echo cancel signals, an audio signal supplied to the second loudspeaker is subjected to convolution calculations by third and fourth filter means, respectively, so as to produce third and fourth echo cancel signals, echo cancellation is performed by subtracting, using first subtracting means, said first and third echo cancel signals from a sum signal of collected audio signals of the respective microphones, and echo cancellation is performed by subtracting, using second subtracting means, said second and fourth echo cancel signals from a difference signal of the collected audio signals of the respective microphones, said stereo echo canceller comprising: transfer function calculating means for respectively deriving estimated errors of composite transfer functions of said four audio transfer systems based on a cross-spectrum calculation between a sum signal and a difference signal of stereo audio signals to be reproduced by said respective loudspeakers and respective echo cancel error signals obtained by subtracting the corresponding echo cancel signals from the sum signal and the difference signal of the respective microphone collected audio signals, thereby to update filter characteristics of said first to fourth filter means to values that cancel said estimated errors, respectively.

The stereo echo canceller of this invention may be further provided with correlation detecting means for detecting the correlation between the sum signal and the difference signal of said stereo audio signals and, when a value of said correlation is no less than a prescribed value, stopping updating of said filter characteristics, thereby to prevent the echo cancel error signals from unexpectedly increasing.

A stereo sound transfer apparatus of this invention is such that, with respect to two spaces each forming said four audio transfer systems, any of said stereo echo cancellers is arranged in each space, so that the stereo audio signals, which have been echo-canceled by said stereo echo cancellers, are transmitted between said two spaces.

A multi-channel echo cancel method of this invention is a method wherein, with respect to a space provided therein with a plurality of loudspeakers and one or a plurality of microphones and forming a plurality of audio transfer systems in which multi-channel sounds reproduced by said respective loudspeakers and having a correlation with each other are collected by said microphones, composite transfer functions of said plurality of audio transfer systems are estimated so as to set corresponding filter characteristics, respectively, echo cancel signals are respectively produced by giving said set filter characteristics to composite signals of individual signals to be reproduced by said respective loudspeakers, and said echo cancel signals are subtracted from composite signals of individual collected audio signals of said one or plurality of microphones, thereby performing echo cancellation, and wherein, using as reference signals a set of a plurality of low-correlation composite signals which correspond to signals obtained by suitably combining said multi-channel audio signals and which have a lower correlation with each other than that between said multi-channel audio signals (e.g. suitably combining said multi-channel audio signals to produce a plurality of low-correlation composite signals having a lower correlation with each other than that between said multi-channel audio signals and using a set of said plurality of low-correlation composite signals as reference signals, or directly inputting a set of a plurality of low-correlation composite signals which correspond to signals obtained by suitably combining said multi-channel audio signals and which have a lower correlation with each other than that between said multi-channel audio signals and using the set of said plurality of low-correlation composite signals as reference signals, or the like), composite transfer functions of said plurality of audio transfer systems are respectively derived, thereby to set corresponding filter characteristics. According to this invention, using as reference signals a set of a plurality of low-correlation composite signals which correspond to signals obtained by suitably combining multi-channel audio signals having a correlation therebetween and which have a lower correlation with each other than that between such multi-channel audio signals, the composite transfer functions of said plurality of audio transfer systems are respectively derived, and corresponding filter characteristics are set, thereby to enable echo cancellation. In accordance therewith, since the multi-channel audio signals can be reproduced from the loudspeakers with no or less processing, which induces deterioration, applied to the multi-channel audio signals, excellent reproduced tone quality can be achieved. Further, there is no or only a small delay in reproduced signals. Thus, when applying to the teleconferencing system or the like, natural conversation can be conducted. The calculation of respectively deriving the composite transfer functions of said plurality of audio transfer systems using as the reference signals the set of the plurality of low-correlation composite signals, may be, for example, a calculation of respectively deriving the composite transfer functions of said plurality of audio transfer systems based on a cross-spectrum calculation between the plurality of low-correlation composite signals and the composite signals of the individual collected audio signals of the respective microphones. Further, the calculation of respectively deriving the composite transfer functions of said plurality of audio transfer systems based on said cross-spectrum calculation, may be, for example, a calculation of combining said multi-channel audio signals through addition or subtraction to produce a plurality of low-correlation composite signals having a lower correlation with each other than that between said multi-channel audio signals, deriving cross spectra between said plurality of low-correlation composite signals and the composite signals of the individual collected audio signals of the respective microphones, and ensemble-averaging them in a predetermined time period per cross spectrum to derive composite transfer functions of said plurality of audio transfer systems.

A multi-channel echo cancel method of this invention is a method wherein, with respect to a space provided therein with a plurality of loudspeakers and one or a plurality of microphones and forming a plurality of audio transfer systems in which multi-channel sounds reproduced by said respective loudspeakers and having a correlation with each other are collected by said microphones, composite transfer functions of said plurality of audio transfer systems are estimated so as to set corresponding filter characteristics, respectively, echo cancel signals are respectively produced by giving said set filter characteristics to composite signals of individual signals to be reproduced by said respective loudspeakers, and said echo cancel signals are subtracted from composite signals of individual collected audio signals of said one or plurality of microphones, thereby performing echo cancellation, and wherein, using as reference signals a set of a plurality of low-correlation composite signals which correspond to signals obtained by suitably combining said multi-channel audio signals and which have a lower correlation with each other than that between said multi-channel audio signals (e.g. suitably combining said multi-channel audio signals to produce a plurality of low-correlation composite signals having a lower correlation with each other than that between said multi-channel audio signals and using a set of said plurality of low-correlation composite signals as reference signals, or directly inputting a set of a plurality of low-correlation composite signals which correspond to signals obtained by suitably combining said multi-channel audio signals and which have a lower correlation with each other than that between said multi-channel audio signals and using the set of said plurality of low-correlation composite signals as reference signals, or the like), estimated errors of composite transfer functions of said plurality of audio transfer systems are respectively derived, thereby to update corresponding filter characteristics to values that cancel said estimated errors. According to this invention, using as reference signals a set of a plurality of low-correlation composite signals which correspond to signals obtained by suitably combining multi-channel audio signals having a correlation therebetween and which have a lower correlation with each other than that between such multi-channel audio signals, the estimated errors of the composite transfer functions of said plurality of audio transfer systems are respectively derived so as to successively update the corresponding filter characteristics to the values that cancel said estimated errors, thereby to enable echo cancellation. In accordance therewith, since the multi-channel audio signals can be reproduced from the loudspeakers with no or less processing, which induces deterioration, applied to the multi-channel audio signals, excellent reproduced tone quality can be achieved. Further, there is no or only a small delay in reproduced signals. Thus, when applying to the teleconferencing system or the like, natural conversation can be conducted. It is also possible to update the filter characteristics in real time. The calculation of respectively deriving the estimated errors of the composite transfer functions of said plurality of audio transfer systems using the set of the plurality of low-correlation composite signals as the reference signals, may be, for example, a calculation of respectively deriving the estimated errors of the composite transfer functions of said plurality of audio transfer systems based on a cross-spectrum calculation between said plurality of low-correlation composite signals and echo cancel error signals obtained by subtracting the corresponding echo cancel signals from the composite signals of the individual collected audio signals of said one or plurality of microphones. Further, the calculation of respectively deriving the estimated errors of the composite transfer functions of said plurality of audio transfer systems based on said cross-spectrum calculation, may be, for example, a calculation of combining said multi-channel audio signals through addition or subtraction to produce a plurality of low-correlation composite signals having a lower correlation with each other than that between said multi-channel audio signals, deriving cross spectra between said plurality of low-correlation composite signals and the echo cancel error signals obtained by subtracting the corresponding echo cancel signals from the composite signals of the individual collected audio signals of said one or plurality of microphones, and ensemble-averaging them in a predetermined time period per cross spectrum to derive estimated errors of the composite transfer functions of said plurality of audio transfer systems. Further, the correlation between said plurality of low-correlation composite signals is detected and, when a value of said correlation is no less than a prescribed value, updating of said filter characteristics is stopped, thereby to prevent the echo cancel error signals from unexpectedly increasing.

A multi-channel sound transfer method of this invention is such that, with respect to two spaces each forming said plurality of audio transfer systems, any of the foregoing multi-channel echo cancel methods is carried out, so that the multi-channel audio signals, which have been echo-canceled by performing said method, are transmitted between said two spaces. In accordance therewith, the multi-channel audio transmission with reduced echo cancellation can be performed between two spots, which, for example, can be applied to the teleconferencing system or the like.

A stereo echo cancel method of this invention is a method wherein, with respect to a space provided therein with two loudspeakers and one or two microphones and forming two or four audio transfer systems in which stereo sounds reproduced by said respective loudspeakers are collected by said microphones, composite transfer functions of said two or four audio transfer systems are estimated so as to set corresponding filter characteristics, respectively, echo cancel signals are respectively produced by giving said set filter characteristics to composite signals of individual signals to be reproduced by said respective loudspeakers, and said echo cancel signals are subtracted from composite signals of individual collected audio signals of said one or two microphones, thereby performing echo cancellation, and wherein, using a sum signal and a difference signal of said stereo audio signals as reference signals, composite transfer functions of said two or four audio transfer systems are respectively derived, thereby to set corresponding filter characteristics. According to this invention, since the sum signal and the difference signal of the stereo audio signals have a low correlation therebetween, estimated errors of the composite transfer functions of the two or four audio transfer systems are respectively derived using the sum signal and the difference signal as reference signals, so as to successively update the corresponding filter characteristics to values that cancel said estimated errors, thereby to enable echo cancellation. In accordance therewith, since the stereo signals can be reproduced from the loudspeakers with no or less processing, which induces deterioration, applied to the stereo signals, excellent reproduced tone quality can be achieved. Further, there is no or only a small delay in reproduced signals. Thus, when applying to the teleconferencing system or the like, natural conversation can be conducted. The calculation of respectively deriving the composite transfer functions of said two or four audio transfer systems using the sum signal and the difference signal of said stereo audio signals as the reference signals, may be, for example, a calculation of respectively deriving the composite transfer functions of said two or four audio transfer systems based on a cross-spectrum calculation between the sum signal and the difference signal, and the composite signals of the individual collected audio signals of the respective microphones. Further, the calculation of respectively deriving the composite transfer functions of said two or four audio transfer systems based on said cross-spectrum calculation, may be, for example, a calculation of deriving cross spectra between the sum signal and the difference signal of said stereo audio signals and the composite signals of the individual collected audio signals of the respective microphones, and ensemble-averaging them in a predetermined time period per cross spectrum to derive composite transfer functions of said two or four audio transfer systems.

A stereo echo cancel method of this invention is a method wherein, with respect to a space provided therein with two loudspeakers and one or two microphones and forming two or four audio transfer systems in which stereo sounds reproduced by said respective loudspeakers are collected by said microphones, composite transfer functions of said two or four audio transfer systems are estimated so as to set corresponding filter characteristics, respectively, echo cancel signals are respectively produced by giving said set filter characteristics to composite signals of individual signals to be reproduced by said respective loudspeakers, and said echo cancel signals are subtracted from composite signals of individual collected audio signals of said one or two microphones, thereby performing echo cancellation, and wherein, using a sum signal and a difference signal of said stereo audio signals as reference signals, estimated errors of composite transfer functions of said two or four audio transfer systems are respectively derived, thereby to update corresponding filter characteristics to values that cancel said estimated errors. According to this invention, using as reference signals a set of a plurality of low-correlation composite signals which correspond to signals obtained by suitably combining multi-channel audio signals having a correlation therebetween and which have a lower correlation with each other than that between such multi-channel audio signals, the estimated errors of the composite transfer functions of said plurality of audio transfer systems are respectively derived, so as to successively update the corresponding filter characteristics to the values that cancel the estimated errors, thereby to enable echo cancellation. In accordance therewith, since the multi-channel audio signals can be reproduced from the loudspeakers with no or less processing, which induces deterioration, applied to the multi-channel audio signals, excellent reproduced tone quality can be achieved. Further, there is no or only a small delay in reproduced signals. Thus, when applying to the teleconferencing system or the like, natural conversation can be conducted. It is also possible to update the filter characteristics in real time. The calculation of respectively deriving the estimated errors of the composite transfer functions of said two or four audio transfer systems using the sum signal and the difference signal of said stereo audio signals as the reference signals, may be, for example, a calculation of respectively deriving the estimated errors of the composite transfer functions of said two or four audio transfer systems based on a cross-spectrum calculation between the sum signal and the difference signal of said stereo audio signals and respective echo cancel error signals obtained by subtracting the corresponding echo cancel signals from the composite signals of the individual collected audio signals of said one or two microphones. Further, the calculation of respectively deriving the estimated errors of the composite transfer functions of said two or four audio transfer systems based on the cross-spectrum calculation between the sum signal and the difference signal of said stereo audio signals and said echo cancel error signals, may be, for example, a calculation of deriving cross spectra between the sum signal and the difference signal of said stereo audio signals and said echo cancel error signals, and ensemble-averaging them in a predetermined time period per cross spectrum to derive estimated errors of the composite transfer functions of said two or four audio transfer systems. Further, the correlation between the sum signal and the difference signal of said stereo audio signals is detected and, when a value of said correlation is no less than a prescribed value, updating of said filter characteristics is stopped, thereby to prevent the echo cancel error signals from unexpectedly increasing.

A stereo audio transmission method of this invention is such that, with respect to two spaces each forming said four audio transfer systems, any of the foregoing multi-channel echo cancel methods is carried out, so that the stereo audio signals, which have been echo-canceled by performing said method, are transmitted between said two spaces. In accordance therewith, the stereo audio transmission with reduced echo cancellation can be performed between two spots, which, for example, can be applied to the teleconferencing system or the like.

A stereo echo canceller of this invention is a stereo echo canceller wherein, with respect to a space provided therein with two loudspeakers and two microphones and forming four audio transfer systems in which stereo sounds reproduced by said respective loudspeakers are collected by said respective microphones, a sum signal of stereo audio signals to be reproduced by said respective loudspeakers is subjected to convolution calculations by first and second filter means, respectively, so as to produce first and second echo cancel signals, a difference signal of the stereo audio signals to be reproduced by said respective loudspeakers is subjected to convolution calculations by third and fourth filter means, respectively, so as to produce third and fourth echo cancel signals, echo cancellation is performed by subtracting, using first subtracting means, said first and third echo cancel signals from a sum signal of collected audio signals of the respective microphones, and echo cancellation is performed by subtracting, using second subtracting means, said second and fourth echo cancel signals from a difference signal of the collected audio signals of the respective microphones, said stereo echo canceller comprising: transfer function calculating means for respectively deriving filter characteristics corresponding to composite transfer functions of said four audio transfer systems based on a cross-spectrum calculation between the sum signal and the difference signal of the stereo audio signals to be reproduced by said respective loudspeakers and the sum signal and the difference signal of the respective microphone collected audio signals, thereby to set said derived filter characteristics to corresponding ones of said first to fourth filter means, respectively.

A stereo echo canceller of this invention is a stereo echo canceller wherein, with respect to a space provided therein with two loudspeakers and two microphones and forming four audio transfer systems in which stereo sounds reproduced by said respective loudspeakers are collected by said respective microphones, a sum signal of stereo audio signals to be reproduced by said respective loudspeakers is subjected to convolution calculations by first and second filter means, respectively, so as to produce first and second echo cancel signals, a difference signal of the stereo audio signals to be reproduced by said respective loudspeakers is subjected to convolution calculations by third and fourth filter means, respectively, so as to produce third and fourth echo cancel signals, echo cancellation is performed by subtracting, using first subtracting means, said first and third echo cancel signals from a sum signal of collected audio signals of the respective microphones, and echo cancellation is performed by subtracting, using second subtracting means, said second and fourth echo cancel signals from a difference signal of the collected audio signals of the respective microphones, said stereo echo canceller comprising: transfer function calculating means for respectively deriving estimated errors of composite transfer functions of said four audio transfer systems based on a cross-spectrum calculation between the sum signal and the difference signal of the stereo audio signals to be reproduced by said respective loudspeakers and respective echo cancel error signals obtained by subtracting the corresponding echo cancel signals from the sum signal and the difference signal of the respective microphone collected audio signals, thereby to update filter characteristics of said first to fourth filter means to values that cancel said estimated errors, respectively.

The stereo echo canceller of this invention may be further provided with correlation detecting means for detecting the correlation between the sum signal and the difference signal of said stereo audio signals and, when a value of said correlation is no less than a prescribed value, stopping updating of said filter characteristics, thereby to prevent the echo cancel error signals from unexpectedly increasing.

A stereo sound transfer apparatus of this invention is such that, with respect to two spaces each forming said four audio transfer systems, any of said stereo echo cancellers is arranged in each space, so that the stereo audio signals, which have been echo-canceled by said stereo echo cancellers, are transmitted between said two spaces.

A transfer function calculation apparatus of this invention is a transfer function calculation apparatus which, with respect to a space provided therein with a plurality of loudspeakers and one or a plurality of microphones and forming a plurality of audio transfer systems in which multi-channel sounds inputted from an outside and reproduced by said respective loudspeakers and having a correlation with each other are collected by said microphones, estimates individual transfer functions of said plurality of audio transfer systems or a plurality of composite transfer functions obtained by suitably combining said individual transfer functions, wherein, using as reference signals a set of a plurality of low-correlation composite signals which correspond to signals obtained by suitably combining said multi-channel audio signals and which have a lower correlation with each other than that between said multi-channel audio signals (e.g. suitably combining said multi-channel audio signals to produce a plurality of low-correlation composite signals having a lower correlation with each other than that between said multi-channel audio signals and using a set of said plurality of low-correlation composite signals as reference signals, or directly inputting a set of a plurality of low-correlation composite signals which correspond to signals obtained by suitably combining said multi-channel audio signals and which have a lower correlation with each other than that between said multi-channel audio signals and using the set of said plurality of low-correlation composite signals as reference signals, or the like), individual transfer functions of the respective audio transfer systems or a plurality of composite transfer functions obtained by suitably combining said individual transfer functions are estimated. The calculation of respectively deriving the individual transfer functions of the respective audio transfer systems or the plurality of composite transfer functions obtained by suitably combining said individual transfer functions, using as the reference signals the set of the plurality of low-correlation composite signals, may be, for example, a calculation of respectively deriving the individual transfer functions of the respective audio transfer systems or the plurality of composite transfer functions obtained by suitably combining said individual transfer functions, based on a cross-spectrum calculation between the plurality of low-correlation composite signals and the individual collected audio signals of the microphones, or the plurality of composite signals obtained by suitably combining said individual collected audio signals. Further, the calculation of respectively deriving the individual transfer functions of said plurality of audio transfer systems or the plurality of composite transfer functions obtained by suitably combining said individual transfer functions, based on said cross-spectrum calculation, may be, for example, a calculation of respectively deriving the individual transfer functions of said plurality of audio transfer systems or the plurality of composite transfer functions obtained by suitably combining said individual transfer functions, by combining said multi-channel audio signals through addition or subtraction to produce a plurality of low-correlation composite signals having a lower correlation with each other than that between said multi-channel audio signals, deriving cross spectra between said plurality of low-correlation composite signals and the individual collected audio signals of the microphones, or the plurality of composite signals obtained by suitably combining said individual collected audio signals, and ensemble-averaging them in a predetermined time period per cross spectrum. The calculation of respectively deriving the individual transfer functions of said plurality of audio transfer systems based on said cross-spectrum calculation may also be a calculation of respectively deriving the individual transfer functions of said plurality of audio transfer systems by producing a plurality of mutually orthogonal uncorrelated composite signals by applying a principal component analysis to said multi-channel audio signals, deriving cross spectra between said plurality of uncorrelated composite signals and the individual collected audio signals of the microphones, and ensemble-averaging them in a predetermined time period per cross spectrum.

A transfer function calculation apparatus of this invention is a transfer function calculation apparatus which, with respect to a space provided therein with two loudspeakers and two microphones and forming four audio transfer systems in which stereo sounds reproduced by said respective loudspeakers are collected by said respective microphones, estimates individual transfer functions of said four audio transfer systems or a plurality of composite transfer functions obtained by suitably combining said individual transfer functions, wherein, using a sum signal and a difference signal of said stereo audio signals as reference signals, individual transfer functions of said four audio transfer systems or a plurality of composite transfer functions obtained by suitably combining said individual transfer functions are estimated. The calculation of respectively deriving the individual transfer functions of said four audio transfer systems or the plurality of composite transfer functions obtained by suitably combining said individual transfer functions, using the sum signal and the difference signal of said stereo audio signals as the reference signals, may be, for example, a calculation of respectively deriving the individual transfer functions of said four audio transfer systems or the plurality of composite transfer functions obtained by suitably combining said individual transfer functions, based on a cross-spectrum calculation between said sum signal and said difference signal, and individual collected audio signals of the microphones, or a plurality of composite signals obtained by suitably combining said individual collected audio signals. Further, the calculation of respectively deriving the individual transfer functions of said four audio transfer systems or the plurality of composite transfer functions obtained by suitably combining said individual transfer functions, based on said cross-spectrum calculation, may be a calculation of deriving cross spectra between the sum signal and the difference signal of said stereo audio signals and the individual collected audio signals of the microphones, or the plurality of composite signals obtained by suitably combining said individual collected audio signals, and ensemble-averaging them in a predetermined time period per cross spectrum, thereby to respectively derive the individual transfer functions of said four audio transfer systems or the plurality of composite transfer functions obtained by suitably combining said individual transfer functions.

A transfer function calculation apparatus of this invention is a transfer function calculation apparatus which, with respect to a space provided therein with two loudspeakers and two microphones and forming four audio transfer systems in which stereo sounds reproduced by said respective loudspeakers are collected by said respective microphones, estimates individual transfer functions of said four audio transfer systems, wherein mutually orthogonal two uncorrelated composite signals are produced by applying a principal component analysis to said stereo audio signals, and individual transfer functions of said four audio transfer systems are estimated using a set of said two uncorrelated composite signals as reference signals. The calculation of respectively deriving the individual transfer functions of said four audio transfer systems using said two uncorrelated composite signals as the reference signals, may be, for example, a calculation of respectively deriving the individual transfer functions of said four audio transfer systems based on a cross-spectrum calculation between said two uncorrelated composite signals and the individual collected audio signals of the microphones. Further, the calculation of respectively deriving the individual transfer functions of said four audio transfer systems based on said cross-spectrum calculation, may be, for example, a calculation of deriving cross spectra between said two uncorrelated composite signals and the individual collected audio signals of the microphones, and ensemble-averaging them in a predetermined time period per cross spectrum, thereby to respectively derive the individual transfer functions of said four audio transfer systems. In this case, by making relatively longer a time period of performing said ensemble averaging when double talk is detected where sounds other than those reproduced by said loudspeakers are inputted into said microphones, while making it relatively shorter when the double talk is not detected, it is possible to fully converge the estimated errors when the double talk exists, and further, quicken the convergence of the estimated errors when there is no double talk.

An inventive echo cancel method is associated to a space provided therein with a plurality of loudspeakers and one or a plurality of microphones for forming a plurality of audio transfer systems through which audio signals of multi-channels having a correlation with each other are reproduced by said respective loudspeakers and are collected by said microphones, and designed for performing an echo cancellation by subtracting an echo cancel signal from the audio signals collected by the respective microphone or from composite signals obtained by combining the collected audio signals. The inventive method comprises inputting a plurality of low-correlation audio signals which are obtained by suitably combining first audio signals of multi-channels and which have a lower correlation with each other than that among said first audio signals of multi-channels, generating second audio signals of multi-channels having a correlation with each other by computation based on the inputted low-correlation audio signals, feeding the generated second audio signals to the respective loudspeakers so as to reproduce audio sounds, feeding the generated second audio signals or the inputted low-correlation audio signals to filters, estimating individual transfer functions of said plurality of said audio transfer systems or a plurality of composite transfer functions obtained by suitably combining said individual transfer functions based on the inputted low-correlation audio signals so as to set corresponding filter characteristics, producing echo cancel signals by applying said set filter characteristics to the second audio signals or the low-correlation audio signals fed to the filters, and subtracting said echo cancel signals from collected audio signals obtained by collecting the reproduced audio sounds by the microphones or from composite audio signals obtained by suitably combining said collected audio signals, thereby performing the echo cancellation.

Preferably, in the inventive echo cancel method, the inputted low-correlation audio signals are obtained by adding or subtracting the first audio signals of multi-channels with each other.

Another inventive echo cancel method is associated to a space provided therein with a plurality of loudspeakers and one or a plurality of microphones for forming a plurality of audio transfer systems through which audio signals of multi-channels having a correlation with each other are reproduced by said respective loudspeakers and are collected by said microphones, and designed for performing an echo cancellation by subtracting an echo cancel signal from the audio signals collected by the respective microphone or from composite signals obtained by combining the collected audio signals. The inventive method comprises inputting a plurality of first low-correlation audio signals which are obtained by suitably combining first audio signals of multi-channels and which have a lower correlation with each other than that among said first audio signals of multi-channels, generating second audio signals of multi-channels having a correlation with each other by computation based on the inputted first low-correlation audio signals, feeding the generated second audio signals to the respective loudspeakers so as to reproduce audio sounds, generating second low-correlation audio signals of multi-channels based on the generated second audio signals, feeding the generated second audio signals or the generated second low-correlation audio signals to filters, estimating individual transfer functions of said plurality of said audio transfer systems or a plurality of composite transfer functions obtained by suitably combining said individual transfer functions based on the generated second low-correlation audio signals so as to set corresponding filter characteristics, producing echo cancel signals by applying said set filter characteristics to the second audio signals or the second low-correlation audio signals fed to the filters, and subtracting said echo cancel signals from collected audio signals obtained by collecting the reproduced audio sounds at the microphones or from composite audio signals obtained by suitably combining said collected audio signals, thereby performing the echo cancellation.

Preferably, in the inventive echo cancel method, the inputted first low-correlation audio signals are obtained by adding or subtracting the first audio signals of multi-channels with each other.

An inventive echo canceller is associated to a space provided therein with a plurality of loudspeakers and one or a plurality of microphones for forming a plurality of audio transfer systems through which audio signals of multi-channels having a correlation with each other are reproduced by said respective loudspeakers and are collected by said microphones, and designed for performing an echo cancellation by subtracting an echo cancel signal from the audio signals collected by the respective microphone or from composite signals obtained by combining the collected audio signals. The inventive echo canceller comprises an inputting means for inputting a plurality of low-correlation audio signals which are obtained by suitably combining first audio signals of multi-channels and which have a lower correlation with each other than that among said first audio signals of multi-channels, a demodulating means provided for generating second audio signals of multi-channels having a correlation with each other by demodulating the inputted low-correlation audio signals, and for feeding the generated second audio signals to the respective loudspeakers so as to reproduce audio sounds, an estimating means for estimating individual transfer functions of said plurality of said audio transfer systems or a plurality of composite transfer functions obtained by suitably combining said individual transfer functions based on the inputted low-correlation audio signals so as to set corresponding filter characteristics, a filter means for producing echo cancel signals by applying said set filter characteristics to the second audio signals or the low-correlation audio signals fed to the filter means, and a subtracting means for subtracting said echo cancel signals from collected audio signals obtained by collecting the reproduced audio sounds at the microphones or from composite audio signals obtained by suitably combining said collected audio signals, thereby performing the echo cancellation.

Preferably, in the inventive echo canceller, the inputted low-correlation audio signals are obtained by adding or subtracting the first audio signals of multi-channels with each other.

Another inventive echo canceller is associated to a space provided therein with a plurality of loudspeakers and one or a plurality of microphones for forming a plurality of audio transfer systems through which audio signals of multi-channels having a correlation with each other are reproduced by said respective loudspeakers and are collected by said microphones, and designed for performing an echo cancellation by subtracting an echo cancel signal from the audio signals collected by the respective microphone or from composite signals obtained by combining the collected audio signals. The inventive echo canceller comprises an inputting means for inputting a plurality of first low-correlation audio signals which are obtained by suitably combining first audio signals of multi-channels and which have a lower correlation with each other than that among said first audio signals of multi-channels, a demodulating means provided for generating second audio signals of multi-channels having a correlation with each other by demodulating the inputted first low-correlation audio signals, and for feeding the generated second audio signals to the respective loudspeakers so as to reproduce audio sounds, an estimating means provided for generating second low-correlation audio signals of multi-channels based on the generated second audio signals, and for estimating individual transfer functions of said plurality of said audio transfer systems or a plurality of composite transfer functions obtained by suitably combining said individual transfer functions based on the generated second low-correlation audio signals so as to set corresponding filter characteristics, a filter means for producing echo cancel signals by applying said set filter characteristics to the second audio signals or the second low-correlation audio signals fed to the filter means, and a subtracting means for subtracting said echo cancel signals from collected audio signals obtained by collecting the reproduced audio sounds at the microphones or from composite audio signals obtained by suitably combining said collected audio signals, thereby performing the echo cancellation.

Preferably, in the inventive echo canceller, the inputted first low-correlation audio signals are obtained by adding or subtracting the first audio signals of multi-channels with each other.

Preferably, in a inventive multi-channel echo canceller, the multi-channel audio signals being inputted from an outside and having a correlation with each other are reproduced by said respective loudspeakers without lowering the correlation of the inputted multi-channel audio signals.

Preferably, the multi-channel audio signals being inputted from an outside and having a correlation with each other are provisionally modulated to lower the correlation, then demodulated to restore the correlation, and thereafter reproduced by said respective loudspeakers. Further, the multi-channel audio signals are provisionally modulated to lower the correlation by adding and subtracting the multi-channel audio signals with each other, or by orthogonalizing the multi-channel audio signals with each other.

In this invention, "audio signal" is not limited to human voices, but covers all acoustic signals in the audible frequency band.

BRIEF DESCRIPTION OF THE DRAWINGS

FIG. 4 is a diagram showing the simulation measurement results of the echo cancel performance of the stereo echo canceller 16, 24 of FIG. 1.

FIG. 5 is a diagram showing the simulation measurement results of the echo cancel performance of the stereo echo canceller 16, 24 of FIG. 1.

FIG. 8 is a diagram showing the simulation measurement results of the echo cancel performance of the stereo echo canceller 16, 24 of FIG. 1.

FIG. 20 is a block diagram showing another structural example in the stereo echo canceller 16, 24 of FIG. 2.

BEST MODE FOR CARRYING OUT THE INVENTION

Figure 2:
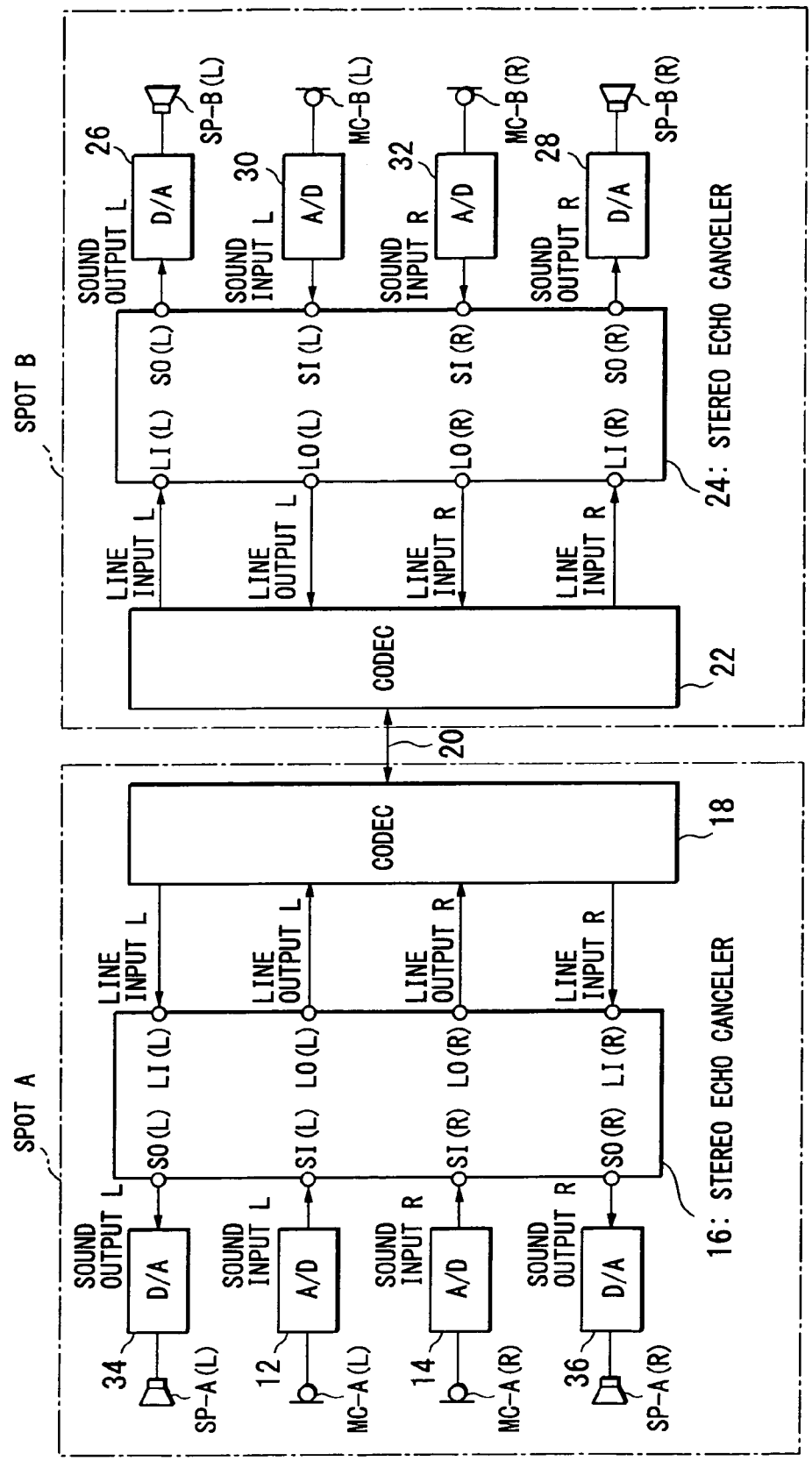
FIG. 2 is a block diagram showing an embodiment of a stereo sound transfer apparatus of this invention.

Embodiments of the present invention will be described hereinbelow. FIG. 2 shows the whole structure of a two-way stereo sound transfer apparatus according to this invention. This is for performing two-way stereo transmission between a spot A and a spot B and, for example, is applicable to the teleconferencing system. In the spot A, two loudspeakers SP-A(L) and SP-A(R) and two microphones MC-A(L) and MC-A(R) are arranged in one space. Collected audio signals of the microphones MC-A(L) and MC-A(R) are converted into digital signals at A/D converters 12 and 14, respectively, and applied with echo cancel processing at a stereo echo canceller 16, then modulated at a CODEC (CODER and DECODER) 18 and transmitted to the spot B via a wire or radio transmission line 20. In the spot B, two loudspeakers SP-B(L) and SP-B(R) and two microphones MC-B(L) and MC-B(R) are arranged in one space. Incidentally, assuming a situation that participants in the spots A and B talk with each other in a face-to-face manner in the teleconferencing system, loudspeakers and microphones are arranged such that a sound collected by a microphone on the participant's left in one spot is reproduced from a loudspeaker on the participant's right in the other spot whereas a sound collected by a microphone on the participant's right in one spot is reproduced from a loudspeaker on the participant's left in the other spot. Specifically, when the loudspeaker SP-A(L) and the microphone MC-A(L) are arranged on the participant's left and the loudspeaker SP-A(R) and the microphone MC-A(R) are arranged on the participant's right in the spot A, the loudspeaker SP-B(L) and the microphone MC-B(L) are arranged on the participant's right and the loudspeaker SP-B(R) and the microphone MC-B(R) are arranged on the participant's left in the spot B.

The signals transmitted from the spot A are inputted into a CODEC 22 where the collected audio signals of the microphones MC-A(L) and MC-A(R) are demodulated. These demodulated collected audio signals of the microphones MC-A(L) and MC-A(R) are respectively converted into analog signals at D/A converters 26 and 28 via a stereo echo canceller 24, and respectively reproduced at the loudspeakers SP-B(L) and SP-B(R). Collected audio signals of the microphones MC-B(L) and MC-B(R) in the spot B are converted into digital signals at A/D converters 30 and 32, respectively, and applied with echo cancel processing at the stereo echo canceller 24, then modulated at the CODEC 22 and transmitted to the spot A via the transmission line 20. The signals transmitted to the spot A are inputted into the CODEC 18 where the collected audio signals of the microphones MC-B(L) and MC-B(R) are demodulated. These demodulated collected audio signals of the microphones MC-B(L) and MC-B(R) are respectively converted into analog signals at D/A converters 34 and 36 via the stereo echo canceller 16, and respectively reproduced at the loudspeakers SP-A(L) and SP-A(R).

Figure 1:
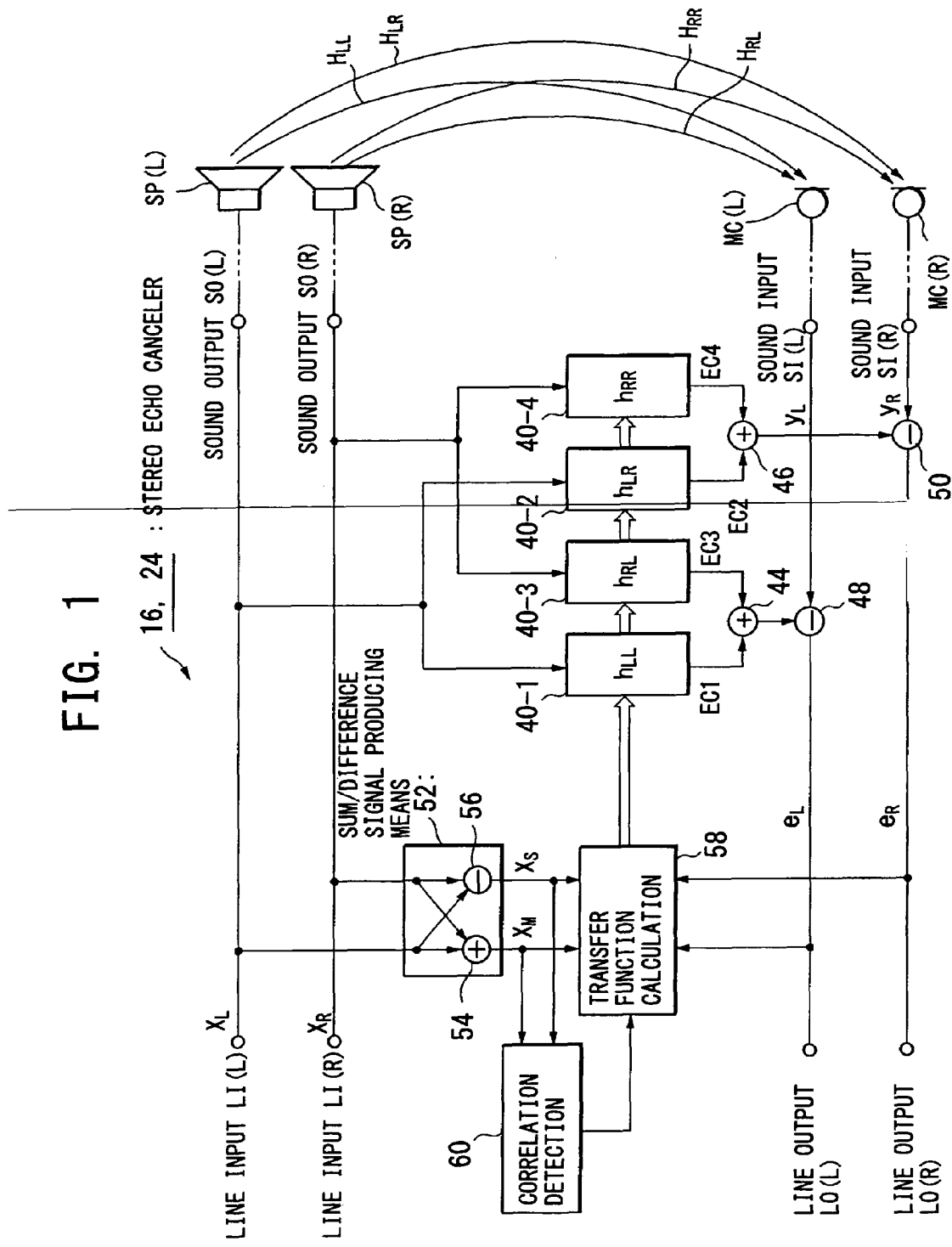
FIG. 1 is a block diagram showing a structural example in a stereo echo canceller 16, 24 of FIG. 2.

FIG. 1 shows a structural example in the stereo echo canceller 16, 24. Left/right two-channel stereo signals $x_L$ and $x_R$ transmitted from the spot on the counterpart side and inputted into line input ends LI(L) and LI (R) are outputted from sound output ends SO(L) and SO(R) as they are (i.e. not through sum/difference signal producing means 52), and reproduced at loudspeakers SP(L) {representing SP-A(L) or SP-B(L)} and SP(R) {representing SP-A(R) or SP-B(R)}, respectively.

Filer means 40-1 to 40-4 are formed by, for example, FIR filters. Of them, the filter means 40-1 is set with an impulse response corresponding to a transfer function between the loudspeaker SP(L) and a microphone MC(L) {representing MC-A(L) or MC-B(L)} and performs, using such an impulse response, a convolution calculation of a signal to be outputted from the sound output end SO(L), thereby producing an echo cancel signal EC1 corresponding to a signal obtained such that the signal outputted from the sound output end SO(L) is reproduced at the loudspeaker SP(L), collected by the microphone MC(L) and inputted into a sound input end SI(L). The filter means 40-2 is set with an impulse response corresponding to a transfer function between the loudspeaker SP(L) and a microphone MC(R) {representing MC-A(R) or MC-B(R)} and performs, using such an impulse response, a convolution calculation of a signal to be outputted from the sound output end SO(L), thereby producing an echo cancel signal EC2 corresponding to a signal obtained such that the signal outputted from the sound output end SO(L) is reproduced at the loudspeaker SP(L), collected by the microphone MC(R) and inputted into a sound input end SI(R). The filter means 40-3 is set with an impulse response corresponding to a transfer function between the loudspeaker SP(R) and the microphone MC(L) and performs, using such an impulse response, a convolution calculation of a signal to be outputted from the sound output end SO(R), thereby producing an echo cancel signal EC3 corresponding to a signal obtained such that the signal outputted from the sound output end SO(R) is reproduced at the loudspeaker SP(R), collected by the microphone MC(L) and inputted into the sound input end SI(L). The filter means 40-4 is set with an impulse response corresponding to a transfer function between the loudspeaker SP(R) and the microphone MC(R) and performs, using such an impulse response, a convolution calculation of a signal to be outputted from the sound output end SO(R), thereby producing an echo cancel signal EC4 corresponding to a signal obtained such that the signal outputted from the sound output end SO(R) is reproduced at the loudspeaker SP(R), collected by the microphone MC(R) and inputted into the sound input end SI (R).

An adder 44 performs a calculation of EC1+EC3. An adder 46 performs a calculation of EC2+EC4. A subtracter 48 subtracts an echo cancel signal EC1+EC3 from a collected audio signal of the microphone MC(L) inputted from the sound input end SI(L), thereby to perform echo cancellation. A subtracter 50 subtracts an echo cancel signal EC2+EC4 from a collected audio signal of the microphone MC(R) inputted from the sound input end SI(R), thereby to perform echo cancellation. These echo-canceled signals of the respective left and right channels are outputted from line output ends LO(L) and LO(R), respectively, and transmitted toward the spot on the counterpart side.

The sum/difference signal producing means 52 performs addition, using an adder 54, of the left/right two-channel stereo signals $x_L$ and $x_R$ inputted into the line input ends LI (L) and LI (R) so as to produce a sum signal $x_L+x_R$, while performs subtraction thereof using a subtracter 56 so as to produce a difference signal $x_L-x_R$ (or it may also be $x_R-x_L$). In case of the left/right two-channel stereo signals, the sum signal $x_L+x_R$ and the difference signal $x_L-x_R$ are in general low in correlation therebetween, and frequently, approximately uncorrelated. Transfer function calculating means 58 implements a cross-spectrum calculation between the sum signal $x_L+x_R$ and the difference signal $x_L-x_R$ produced by the sum/difference signal producing means 52 and signals $e_L$ and $e_R$ outputted from the subtracters 48 and 50 and, based on this cross-spectrum calculation, sets filter characteristics (impulse responses) of the filter means 40-1 to 40-4. Specifically, upon starting the system, the filter characteristics of the filter means 40-1 to 40-4 are not set, i.e. coefficients are all set to zero, so that the echo cancel signals EC1 to EC4 are zero, and thus the collected audio signals of the microphones MC(L) and MC(R) themselves are outputted from the subtracters 48 and 50. Therefore, at this time, the transfer function calculating means 58 performs the cross-spectrum calculation between the sum signal $x_L+x_R$ and the difference signal $x_L-x_R$ produced by the sum/difference signal producing means 52 and the collected audio signals $e_L$ and $e_R$ of the microphones MC(L) and MC(R) outputted from the subtracters 48 and 50 and, based on this cross-spectrum calculation, derives transfer functions of four audio transfer systems between the loudspeakers SP(L) and SP(R) and the microphones MC(L) and MC(R), respectively, and implements initial setting of the filter characteristics of the filter means 40-1 to 40-4 to values corresponding to such transfer functions. After the initial setting, since the echo cancel signals are produced by the filter means 40-1 to 40-4, the echo cancel error signals $e_L$ and $e_R$ corresponding to difference signals between the collected audio signals of the microphones MC(L) and MC(R) and the echo cancel signals EC1 to EC4 are outputted from the subtracters 48 and 50. Therefore, at this time, the transfer function calculating means 58 performs the cross-spectrum calculation between the sum signal $x_L+x_R$ and the difference signal $x_L-x_R$ produced by the sum/difference signal producing means 52 and the echo cancel error signals $e_L$ and $e_R$ outputted from the subtracters 48 and 50 and, based on this cross-spectrum calculation, derives estimated errors of the transfer functions of the four audio transfer systems between the loudspeakers SP(L) and SP(R) and the microphones MC(L) and MC(R), respectively, and updates the filter characteristics of the filter means 40-1 to 40-4 to values that cancel the estimated errors, respectively. By repeating this updating operation per prescribed time period, the echo cancel error can be converged to a minimum value. Further, even if the transfer functions change due to movement of the microphone positions or the like, the echo cancel error can be converged to a minimum value by sequentially updating the filter characteristics of the filter means 40-1 to 40-4 depending thereon.

Correlation detecting means 60 detects a correlation between the sum signal $x_L+x_R$ and the difference signal $x_L-x_R$ based on a correlation value calculation or the like, and stops updating of the foregoing filter characteristics when the correlation value is no less than a prescribed value. When the correlation value becomes lower than the prescribed value, updating of the foregoing filter characteristics is restarted. Incidentally, as a concrete technique for deriving the correlation between the sum signal $x_L+x_R$ and the difference signal $x_L-x_R$, any of the known techniques for detecting a correlation of two signals may be used.

Herein, the filter characteristics (impulse responses) that are set to the filter means 40-1 to 40-4 by the transfer function calculating means 58 will be described. In the following description, the transfer functions and the filter characteristics are expressed using the following symbols.

$H_{xx}$: a transfer function (frequency-axis expression)

$h_{xx}$: an impulse response (time-axis expression) corresponding to $H_{xx}$ $\hat{H}_{xx}$: an estimated transfer function (a transfer function set to a filter)

$\hat{h}_{xx}$: an impulse response corresponding to $\hat{H}_{xx}$ $\Delta H_{xx}$: a transfer function estimated error $\Delta h_{xx}$: an impulse response corresponding to $\Delta H_{xx}$ (note: Suitable symbols are allocated to xx.)

The sum signal and the difference signal are respectively defined as follows.

sum signal: $x_M(=x_L+x_R)$ difference signal: $x_S(=x_L-x_R)$

The transfer functions of the four audio transfer systems between the loudspeakers SP(L) and SP(R) and the microphones MC(L) and MC(R) are respectively defined as follows.

$H_{LL}$: a transfer function of the system from the loudspeaker SP(L) to the microphone MC(L)

$H_{LR}$: a transfer function of the system from the loudspeaker SP(L) to the microphone MC(R)

$H_{RL}$: a transfer function of the system from the loudspeaker SP(R) to the microphone MC(L)

$H_{RR}$: a transfer function of the system from the loudspeaker SP(R) to the microphone MC(R)

The input signals $x_L$ and $x_R$ at the line input ends LI(L) and LI(R) of the stereo echo canceller 16, 24 are replaced by $x_L=(x_M+x_S)/2$ $x_R=(x_M-x_S)/2$.

Then, a calculation shown below is carried out in the transfer function calculating means 58. The signals $e_L$ and $e_R$ {the collected audio signals of the microphones MC(L) and MC(R) as they are before the initial setting of the filter means 40-1 to 40-4 whereas the echo cancel error signals after the initial setting} outputted from the subtracters 48 and 50, assuming that frequency-axis expressions of the signals $x_M$, $x_S$, $e_L$ and $e_R$ are respectively given as $X_M$, $X_S$, $E_L$ and $E_R$, become $$E_L = \{(X_M + X_S)H_{LL}/2\} + \{(X_M - X_S)H_{RL}/2\}$$

$$E_R = \{(X_M + X_S)H_{LR}/2\} + \{(X_M - X_S)H_{RR}/2\}$$

hence $$2E_L = (X_M + X_S)H_{LL} + (X_M - X_S)H_{RL} \tag{1}$$
$$= X_M(H_{LL} + H_{RL}) + X_S(H_{LL} - H_{RL})$$

$$2E_R = (X_M + X_S)H_{LR} + (X_M - X_S)H_{RR} \tag{2}$$
$$= X_M(H_{LR} + H_{RR}) + X_S(H_{LR} - H_{RR}).$$

When both sides of the equation (1) are multiplied by complex conjugates $X_M^*$ and $X_S^*$ of $X_M$ and $X_S$ (i.e. deriving cross spectra) and ensemble-averaged, $$\Sigma X_M^* \cdot 2E_L = \Sigma X_M^* \cdot X_M(H_{LL}+H_{RL}) + \Sigma X_M^* \cdot X_S(H_{LL}-H_{RL}) \tag{3}$$

$$\Sigma X_S^* \cdot 2E_L = \Sigma X_S^* \cdot X_M(H_{LL}+H_{RL}) + \Sigma X_S^* \cdot X_S(H_{LL}-H_{RL}) \tag{4}$$

are respectively obtained. Similarly, when both sides of the equation (2) are multiplied by complex conjugates $X_M^*$ and $X_S^*$ of $X_M$ and $X_S$, $$\Sigma X_M^* \cdot 2E_R = \Sigma X_M^* \cdot X_M(H_{LR}+H_{RR}) + \Sigma X_M^* \cdot X_S(H_{LR}-H_{RR}) \tag{5}$$

$$\Sigma X_S^* \cdot 2E_R = \Sigma X_S^* \cdot X_M(H_{LR}+H_{RR}) + \Sigma X_S^* \cdot X_S(H_{LR}-H_{RR}) \tag{6}$$

are respectively obtained.

In the equations (3) to (6), since $X_M$ and $X_S$ are approximately uncorrelated with each other, such a term having $X_M^* \cdot X_S$ or $X_S^* \cdot X_M$ becomes approximately zero when ensemble-averaged. Further, $$X_M^* \cdot X_M = |X_M|^2$$

$$X_S^* \cdot X_S = |X_S|^2$$

hence, the equations (3) to (6) respectively become $$\Sigma X_M^* \cdot 2E_L = \Sigma |X_M|^2 (H_{LL}+H_{RL}) \tag{3'}$$

$$\Sigma X_S^* \cdot 2E_L = \Sigma |X_S|^2 (H_{LL}-H_{RL}) \tag{4'}$$

$$\Sigma X_M^* \cdot 2E_R = \Sigma |X_M|^2 (H_{LR}+H_{RR}) \tag{5'}$$

$$\Sigma X_S^* \cdot 2E_R = \Sigma |X_S|^2 (H_{LR}-H_{RR}) \tag{6'}.$$

By transforming the equations (3') to (6'), the following composite transfer functions each in the form of combination of two transfer functions are respectively derived.

$$H_{LL}+H_{RL} = \Sigma X_M^* \cdot 2E_L / \Sigma |X_M|^2 \tag{3''}$$

$$H_{LL}-H_{RL} = \Sigma X_S^* \cdot 2E_L / \Sigma |X_S|^2 \tag{4''}$$

$$H_{LR}+H_{RR} = \Sigma X_M^* \cdot 2E_R / \Sigma |X_M|^2 \tag{5''}$$

$$H_{LR}-H_{RR} = \Sigma X_S^* \cdot 2E_R / \Sigma |X_S|^2 \tag{6''}$$

When the corresponding sides of the equations (3'') and (4'') are added together, $$H_{LL} = (\Sigma X_M^* \cdot E_L / \Sigma |X_M|^2) + (\Sigma X_S^* \cdot E_L / \Sigma |X_S|^2) \tag{7}.$$

When subtraction is performed between the corresponding sides of the equations (3'') and (4''), $$H_{RL} = (\Sigma X_M^* \cdot E_L / \Sigma |X_M|^2) + (\Sigma X_S^* \cdot E_L / \Sigma |X_S|^2) \tag{8}.$$

When the corresponding sides of the equations (5'') and (6'') are added together, $$H_{LR} = (\Sigma X_M^* \cdot E_R / \Sigma |X_M|^2) + (\Sigma X_S^* \cdot E_R / \Sigma |X_S|^2) \tag{9}.$$

When subtraction is performed between the corresponding sides of the equations (5'') and (6''), $$H_{RR} = (\Sigma X_M^* \cdot E_R / \Sigma |X_M|^2) - (\Sigma X_S^* \cdot E_R / \Sigma |X_S|^2) \tag{10}.$$

Hence, transfer functions $H_{LL}$, $H_{RL}$, $H_{LR}$ and $H_{RR}$ are respectively derived. Impulse responses $h_{LL}$, $h_{RL}$, $h_{LR}$ and $h_{RR}$ obtained by applying the inverse Fourier transformation to these derived transfer functions are the filter characteristics to be set to the filter means 40-1, 40-2, 40-3 and 40-4, respectively. Therefore, the transfer function calculating means 58 derives the respective transfer functions $H_{LL}$, $H_{RL}$, $H_{LR}$ and $H_{RR}$ from the equations (7) to (10) based on the sum signal $x_M$, the difference signal $x_S$, and the output signals $e_L$ and $e_R$ of the subtracters 48 and 50 that are inputted, derives the impulse responses $h_{LL}$, $h_{RL}$, $h_{LR}$ and $h_{RR}$ by applying the inverse Fourier transformation to those derived transfer functions, sets the derived impulse responses to the filter means 40-1, 40-2, 40-3 and 40-4 as $\hat{h}_{LL}$, $\hat{h}_{RL}$, $\hat{h}_{LR}$ and $\hat{h}_{RR}$, respectively, and further, updates the impulse responses by repeating this calculation per suitably determined prescribed time period (e.g. time period of performing ensemble averaging).

When the foregoing impulse response updating technique is explained using estimated error parameters, it becomes as follows. Output signals (collected audio signals) $y_L$ and $y_R$ of the microphones MC(L) and MC(R), assuming that frequency-axis expressions of $x_L$, $x_R$, $y_L$ and $y_R$ are respectively given as $X_L$, $X_R$, $Y_L$ and $Y_R$, become $$Y_L = (X_M + X_S)H_{LL}/2 + (X_M - X_S)H_{RL}/2$$

$$Y_R = (X_M + X_S)H_{LR}/2 + (X_M - X_S)H_{RR}/2.$$

The signal $E_L$ outputted from the subtracter 48 becomes $$E_L = Y_L - (X_L \cdot \hat{H}_{LL} + X_R \cdot \hat{H}_{RL})$$
$$= \{(X_M + X_S)H_{LL}/2 + (X_M - X_S)H_{RL}/2\} -$$
$$\{(X_M + X_S)\hat{H}_{LL}/2 + (X_M - X_S)\hat{H}_{RL}/2\}$$

hence $$2E_L = X_M(H_{LL}+H_{RL}-\hat{H}_{LL}-\hat{H}_{RL}) + X_S(H_{LL}-H_{RL}-\hat{H}_{LL}+\hat{H}_{RL}) \tag{11}.$$

The signal $E_R$ outputted from the subtracter 50 becomes $$E_R = Y_R - (X_L \cdot \hat{H}_{LR} + X_R \cdot \hat{H}_{RR})$$
$$= \{(X_M + X_S)H_{LR}/2 + (X_M - X_S)H_{RR}/2\} -$$
$$\{(X_M + X_S)\hat{H}_{LR}/2 + (X_M - X_S)\hat{H}_{RR}/2\}$$

hence $$2E_R = X_M(H_{LR}+H_{RR}-\hat{H}_{LR}-\hat{H}_{RR}) + X_S(H_{LR}-H_{RR}-\hat{H}_{LR}+\hat{H}_{RR}) \tag{12}.$$

When the estimated errors are given as $$\Delta H_{LL} = H_{LL} - H'_{LL}$$

$$\Delta H_{RL} = H_{RL} - H'_{RL}$$

$$\Delta H_{LR} = H_{LR} - H'_{LR}$$

$$\Delta H_{RR} = H_{RR} - H'_{RR}$$

the equations (11) and (12) become $$2E_L = X_M(\Delta H_{LL} + \Delta H_{RL}) + X_S(\Delta H_{LL} - \Delta H_{RL}) \quad (11')$$

$$2E_R = X_M(\Delta H_{LR} + \Delta H_{RR}) + X_S(\Delta H_{LR} - \Delta H_{RR}) \quad (12')$$

When both sides of the equation (11') are multiplied by complex conjugates $X_M^*$ and $X_S^*$ of $X_M$ and $X_S$ (i.e. deriving cross spectra) and ensemble-averaged, $$\Sigma X_M^* \cdot 2E_L = \Sigma X_M^* \cdot X_M(\Delta H_{LL} + \Delta H_{RL}) + \Sigma X_M^* \cdot X_S(\Delta H_{LL} - \Delta H_{RL}) \quad (13)$$

$$\Sigma X_S^* \cdot 2E_L = \Sigma X_S^* \cdot X_M(\Delta H_{LL} + \Delta H_{RL}) + \Sigma X_S^* \cdot X_S(\Delta H_{LL} - \Delta H_{RL}) \quad (14)$$

are respectively obtained. Similarly, when both sides of the equation (12') are multiplied by complex conjugates $X_M^*$ and $X_S^*$ of $X_M$ and $X_S$, $$\Sigma X_M^* \cdot 2E_R = \Sigma X_M^* \cdot X_M(\Delta H_{LR} + \Delta H_{RR}) + \Sigma X_M^* \cdot X_S(\Delta H_{LL} - \Delta H_{RR}) \quad (15)$$

$$\Sigma X_S^* \cdot 2E_R = \Sigma X_S^* \cdot X_M(\Delta H_{LR} + \Delta H_{RR}) + \Sigma X_S^* \cdot X_S(\Delta H_{LL} - \Delta H_{RR}) \quad (16)$$

are respectively obtained.

In the equations (13) to (16), since $X_M$ and $X_S$ are approximately uncorrelated with each other, such a term having $X_M^* \cdot X_S$ or $X_S^* \cdot X_M$ becomes approximately zero when ensemble-averaged. Further, $$X_M^* \cdot X_M = |X_M|^2$$

$$X_S^* \cdot X_S = |X_S|^2$$

hence, the equations (13) to (16) respectively become $$\Sigma X_M^* \cdot 2E_L = \Sigma |X_M|^2 (\Delta H_{LL} + \Delta H_{RL}) \quad (13')$$

$$\Sigma X_S^* \cdot 2E_L = \Sigma |X_S|^2 (\Delta H_{LL} - \Delta H_{RL}) \quad (14')$$

$$\Sigma X_M^* \cdot 2E_R = \Sigma |X_M|^2 (\Delta H_{LR} + \Delta H_{RR}) \quad (15')$$

$$\Sigma X_S^* \cdot 2E_R = \Sigma |X_S|^2 (\Delta H_{LR} - \Delta H_{RR}) \quad (16')$$

From the equations (13') to (16'), $$\Delta H_{LL} = \Sigma X_M^* \cdot E_L / \Sigma |X_M|^2 + \Sigma X_S^* \cdot E_L / \Sigma |X_S|^2 \quad (17)$$

$$\Delta H_{RL} = \Sigma X_M^* \cdot E_L / \Sigma |X_M|^2 - \Sigma X_S^* \cdot E_L / \Sigma |X_S|^2 \quad (18)$$

$$\Delta H_{LR} = \Sigma X_M^* \cdot E_R / \Sigma |X_M|^2 + \Sigma X_S^* \cdot E_R / \Sigma |X_S|^2 \quad (19)$$

$$\Delta H_{RR} = \Sigma X_M^* \cdot E_R / \Sigma |X_M|^2 - \Sigma X_S^* \cdot E_R / \Sigma |X_S|^2 \quad (20)$$

are respectively derived.

Using the estimated errors $\Delta H_{LL}$, $\Delta H_{RL}$, $\Delta H_{LR}$ and $\Delta H_{RR}$ derived from the equations (17) to (20), the filter characteristics of the filter means 40-1, 40-2, 40-3 and 40-4 are updated per suitably determined prescribed time period (e.g. time period of performing ensemble averaging). For example, assuming that impulse responses $h_{LL}$, $h_{RL}$, $h_{LR}$ and $h_{RR}$ after K-th updating are given as $h_{LL}(k)$, $h_{RL}(k)$, $h_{LR}(k)$ and $h_{RR}(k)$, using impulse responses $\Delta h_{LL}$, $\Delta H_{RL}$, $\Delta h_{LR}$ and $\Delta h_{RR}$ corresponding to the derived estimated errors $\Delta H_{LL}$, $\Delta H_{RL}$, $\Delta H_{LR}$ and $\Delta H_{RR}$, $$h_{LL}(k+1) = h_{LL}(k) + \alpha \Delta h_{LL} \quad (21)$$

$$h_{RL}(k+1) = h_{RL}(k) + \alpha \Delta h_{RL} \quad (22)$$

$$h_{LR}(k+1) = h_{LR}(k) + \alpha \Delta h_{LR} \quad (23)$$

$$h_{RR}(k+1) = h_{RR}(k) + \alpha \Delta h_{RR} \quad (24)$$

where $\alpha$ is a suitably set convergence coefficient.

Using these updating equations, (k+1)th impulse responses $h_{LL}(k+1)$, $h_{RL}(k+1)$, $h_{LR}(k+1)$ and $h_{RR}(k+1)$ are derived and set to the filter means 40-1, 40-2, 40-3 and 40-4, respectively, which is repeated per suitably determined prescribed time period (e.g. time period of performing ensemble averaging).

The results of carrying out simulations using the signals $x_L$ and $x_R$ or the sum and difference signals $x_M$ and $x_S$ as reference signals with respect to the stereo echo canceller 16, 24 of FIG. 1, are shown in FIGS. 3 to 8 for each of the audio transfer systems. As the signals $x_L$ and $x_R$, stereo audio signals based on a human voice were used. In FIGS. 3 to 8, the axis of abscissas represents the number of blocks (one block represents a time period of performing ensemble averaging and is set to about 2.3 seconds in the simulations), and the filter characteristics are updated per block. The filter characteristics are not set in the first block, the initial setting is executed in the second block, then updating is carried out per block. The axis of ordinates represents the estimated error (dB) of the transfer function, and the initial state where the filter characteristics are not set is defined as 0 dB. Table 1 shows the conditions of the respective simulations of FIGS. 3 to 8.

TABLE 1

Figure 3:
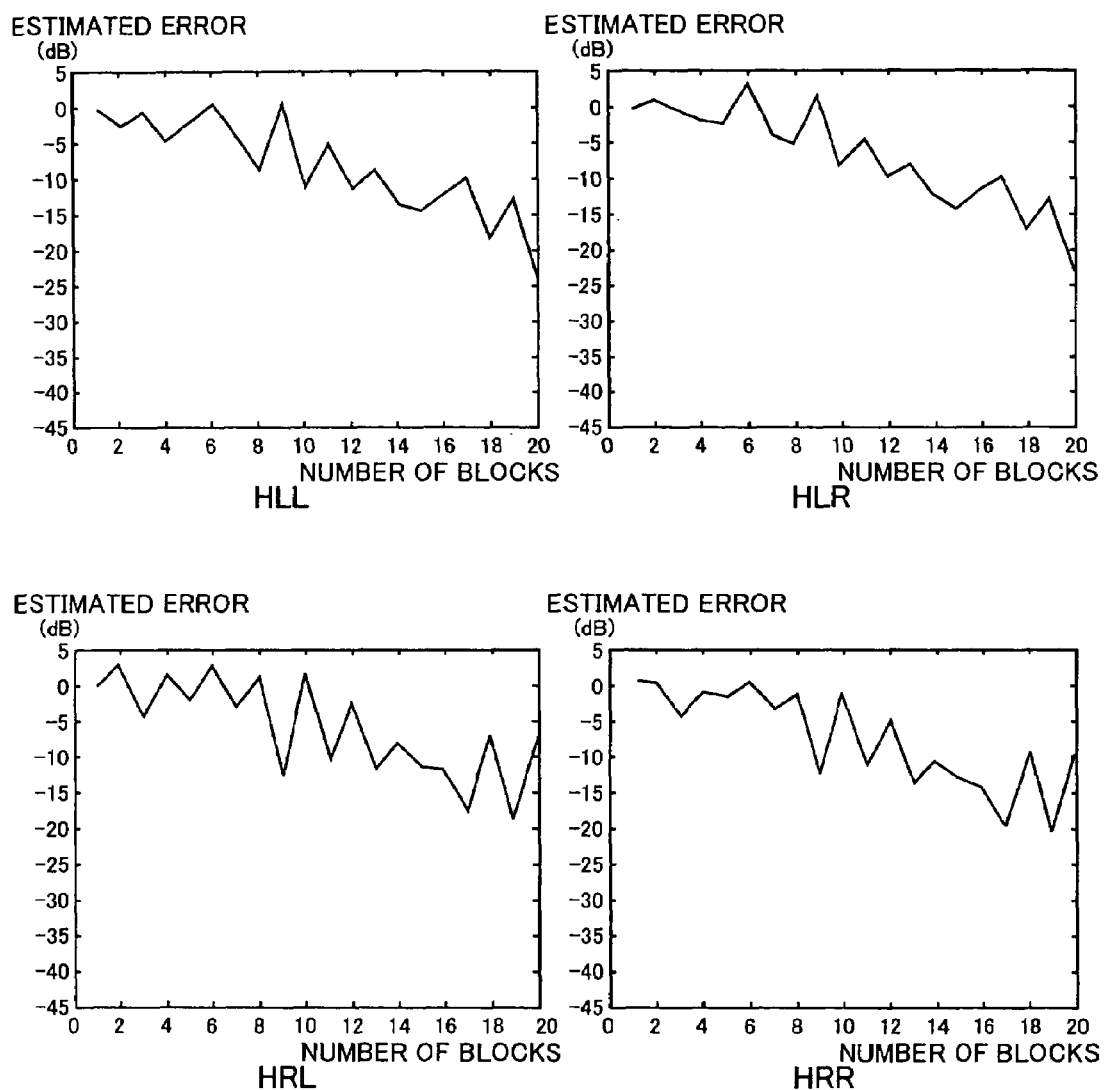
FIG. 3 is a diagram showing the simulation measurement results of the echo cancel performance of the stereo echo canceller 16, 24 of FIG. 1.
Figure 6:
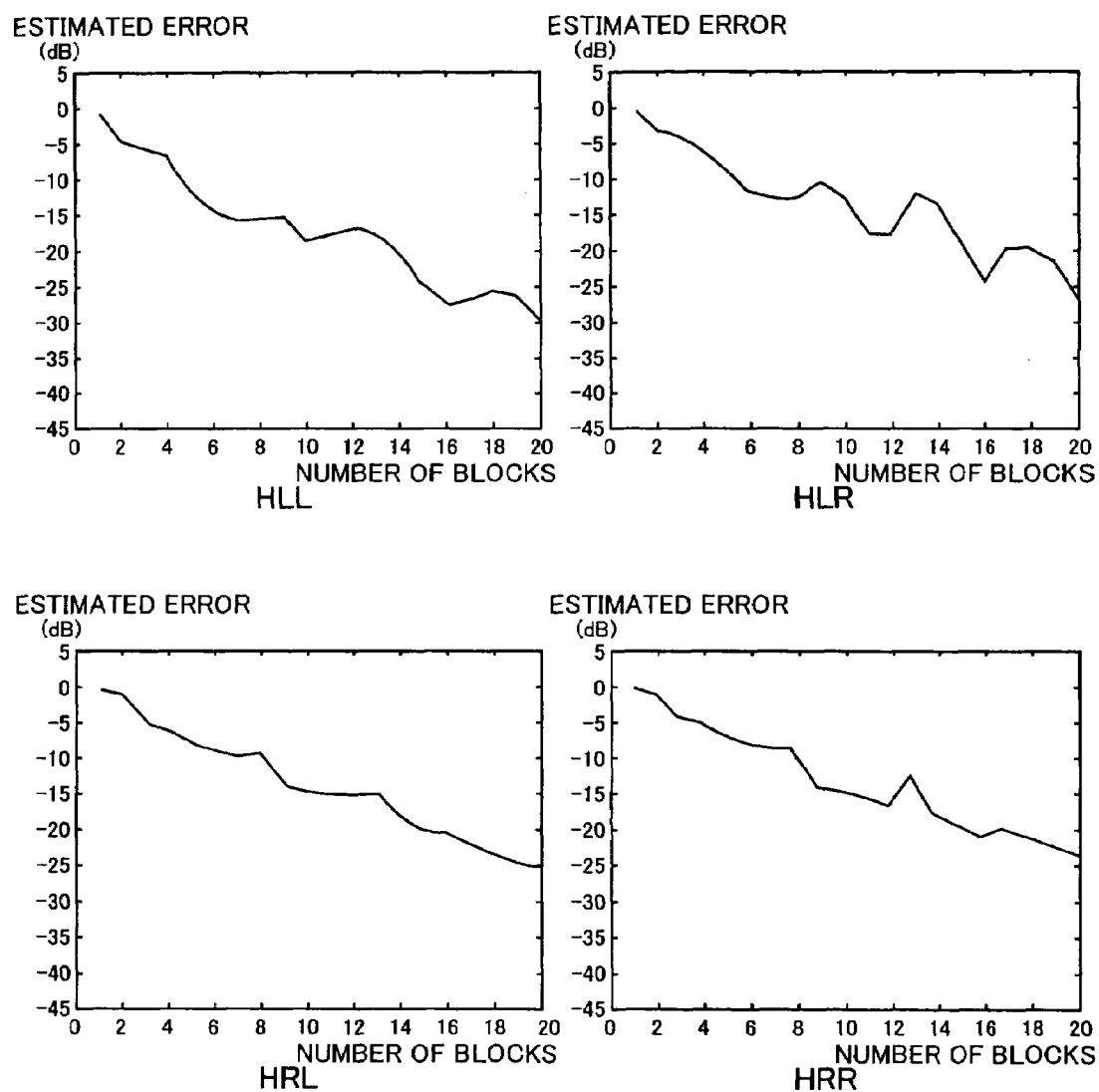
FIG. 6 is a diagram showing the simulation measurement results of the echo cancel performance of the stereo echo canceller 16, 24 of FIG. 1.
Figure 7:
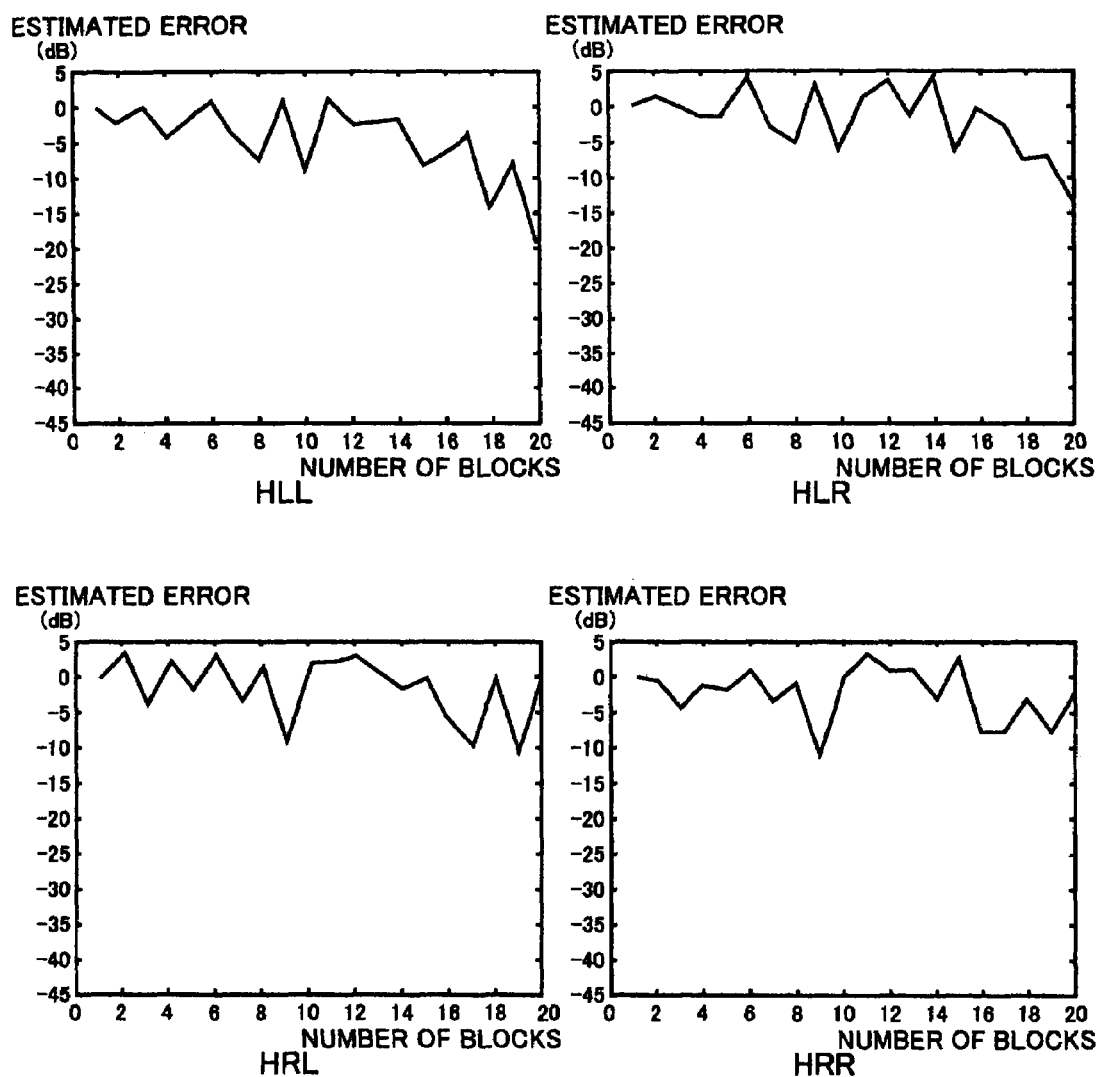
FIG. 7 is a diagram showing the simulation measurement results of the echo cancel performance of the stereo echo canceller 16, 24 of FIG. 1.

| Figure Number | Reference Signal | Double Talk | Change in Transfer System |
|---|---|---|---|
| FIG. 3 | $x_L$, $x_R$ | NO | NO |
| FIG. 4 | $x_M$, $x_S$ | NO | NO |
| FIG. 5 | $x_L$, $x_R$ | YES | NO |
| FIG. 6 | $x_M$, $x_S$ | YES | NO |
| FIG. 7 | $x_L$, $x_R$ | YES | YES |
| FIG. 8 | $x_M$, $x_S$ | YES | YES |

In Table 1, "Double Talk" represents the state where sounds reproduced from the loudspeakers SP(L) and SP(R) as well as a voice uttered by a person present in that room are simultaneously collected by the microphones MC(L) and MC(R). Since the teleconferencing system is used in general in the state where the double talk occurs, it is required that the sufficient echo cancel performance can be achieved even when the double talk occurs. On the other hand, in Table 1, "Change in Transfer System" represents changing the transfer functions while the estimated errors are converging, supposing a case where the microphone positions are moved, or the like. As an operation of the echo canceller, it is required that even if the estimated error temporarily increases due to change in transfer function, it again go toward convergence.

The simulation results of FIGS. 3 to 8 are considered. Comparing FIGS. 3 and 4, when the signals $x_L$ and $x_R$ are used as reference signals (FIG. 3), because a correlation between the signals $x_L$ and $x_R$ is high, estimated errors only drop to about −15 to −25 dB at most in the 20th block (about 45 seconds) from the start of the operation. In contrast, when the signals $x_M$ and $x_S$ are used as reference signals (FIG. 4), because a correlation between the signals $x_M$ and $x_S$ is low, estimated errors drop to about −35 to −45 dB in the 20th block from the start of the operation, and thus it is seen that the sufficient echo cancel performance can be achieved. Comparing FIGS. 5 and 6 showing cases where the double talk exists, when the signals $x_L$ and $x_R$ are used as reference signals (FIG. 5), estimated errors only drop to about −10 to −20 dB at most in the 20th block from the start of the operation. In contrast, when the signals $x_M$ and $x_S$ are used as reference signals (FIG. 6), estimated errors drop to about −23 to −30 dB, and thus it is seen that even if the double talk exists, the sufficient echo cancel performance can be achieved. This is because, since a voice uttered by a person present in a room is uncorrelated with sounds reproduced from the loudspeakers SP(L) and SP(R), when the transfer function calculating means 58 calculates transfer functions of the respective systems, components of the voice uttered by the person in the room are canceled through the foregoing cross-spectrum calculation and ensemble-average calculation, so that the transfer functions of the respective systems can be derived with no influence of the double talk. Comparing FIGS. 7 and 8 showing cases where the double talk and the change of the transfer systems are present, when the signals $x_L$ and $x_R$ are used as reference signals (FIG. 7), convergence of estimated errors is poor after giving a change to the transfer systems in the 11th block so that the estimated errors only drop to about −5 to −15 dB at most in the 20th block. In contrast, when the signals $x_M$ and $x_S$ are used as reference signals (FIG. 8), convergence of estimated errors is excellent even after the change is given to the transfer systems in the 11th block so that the estimated errors drop to about −17 to −26 dB in the 20th block, and thus it is seen that even if the double talk and the change of the transfer systems exist, the sufficient echo cancel performance can be achieved.

Figure 9:
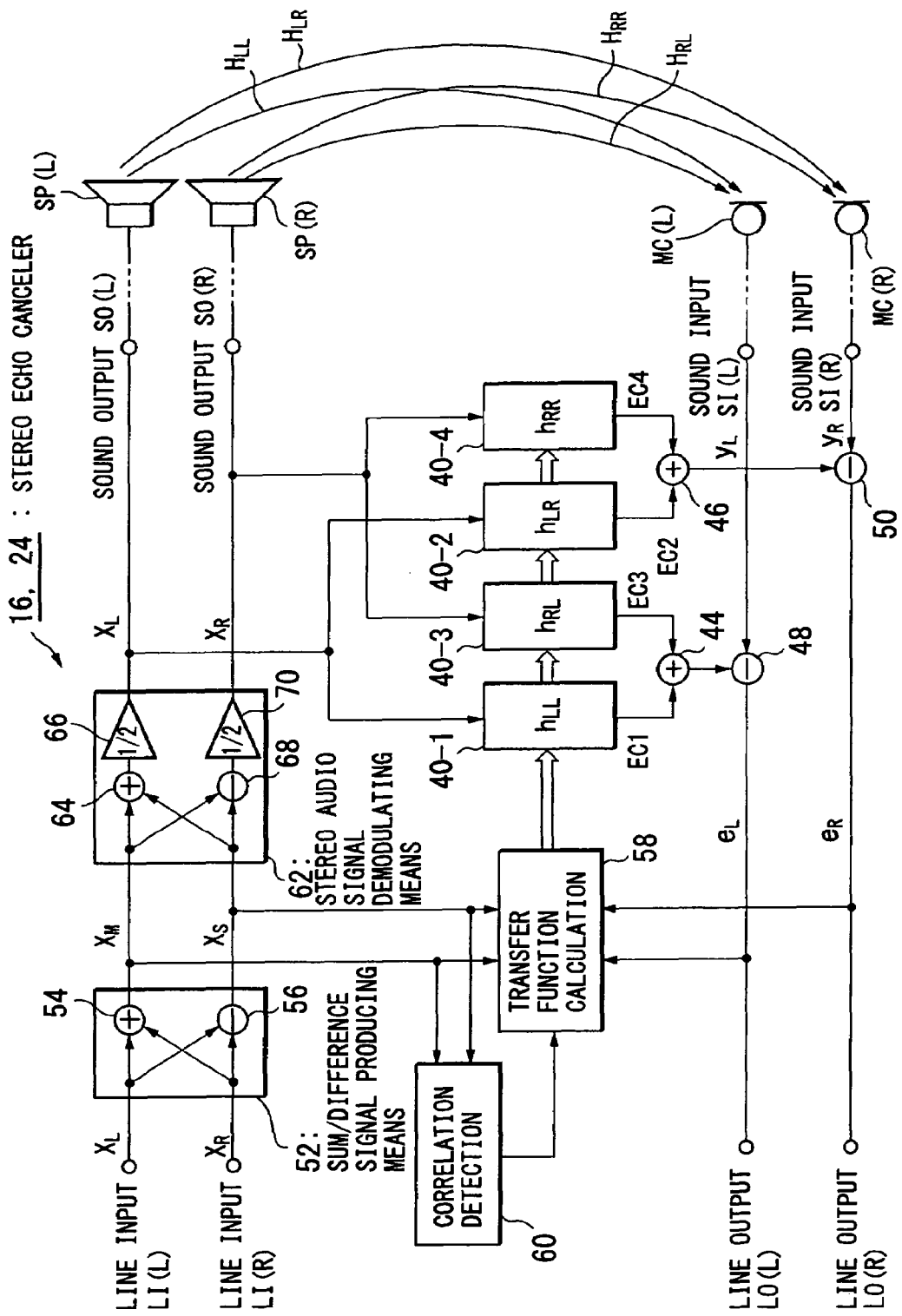
FIG. 9 is a block diagram showing another structural example in the stereo echo canceller 16, 24 of FIG. 2.

FIG. 9 shows another structural example in the stereo echo canceller 16, 24 of FIG. 2, wherein sum/difference signal producing means is arranged on transmission lines to loudspeakers. The same symbols are used with respect to those portions common to the foregoing structure of FIG. 1. Left/right two-channel stereo signals $x_L$ and $x_R$ transmitted from the spot on the counterpart side and inputted into line input ends LI(L) and LI(R) are inputted into sum/difference signal producing means 52. The sum/difference signal producing means 52 performs addition of the stereo signals $x_L$ and $x_R$ using an adder 54 so as to produce a sum signal $x_M(=x_L+x_R)$, while performs subtraction thereof using a subtracter 56 so as to produce a difference signal $x_S\{=x_L-x_R$ (or it may also be $x_R-x_L)\}$. Stereo audio signal demodulating means 62 performs addition of the sum and difference signals $x_M$ and $x_S$ using an adder 64, and further, gives thereto a coefficient ½ using a coefficient multiplier 66 to recover the original signal $x_L$, while performs subtraction of the sum and difference signals $x_M$ and $x_S$ using a subtracter 68, and further, gives thereto a coefficient ½ using a coefficient multiplier 70 to recover the original signal $x_R$. The recovered signals $x_L$ and $x_R$ are outputted from sound output ends SO(L) and SO(R) and reproduced at loudspeakers SP(L) and SP(R), respectively.

Transfer function calculating means 58 implements a cross-spectrum calculation between the sum signal $x_M$ and the difference signal $x_S$ produced by the sum/difference signal producing means 52 and signals $e_L$ and $e_R$ outputted from subtracters 48 and 50 and, based on this cross-spectrum calculation, performs setting and updating of filter characteristics of filter means 40-1 to 40-4. Operations thereof are the same as those described with respect to the structure of FIG. 1. Operations of the other portions are also the same as those described with respect to the structure of FIG. 1.

Figure 10:
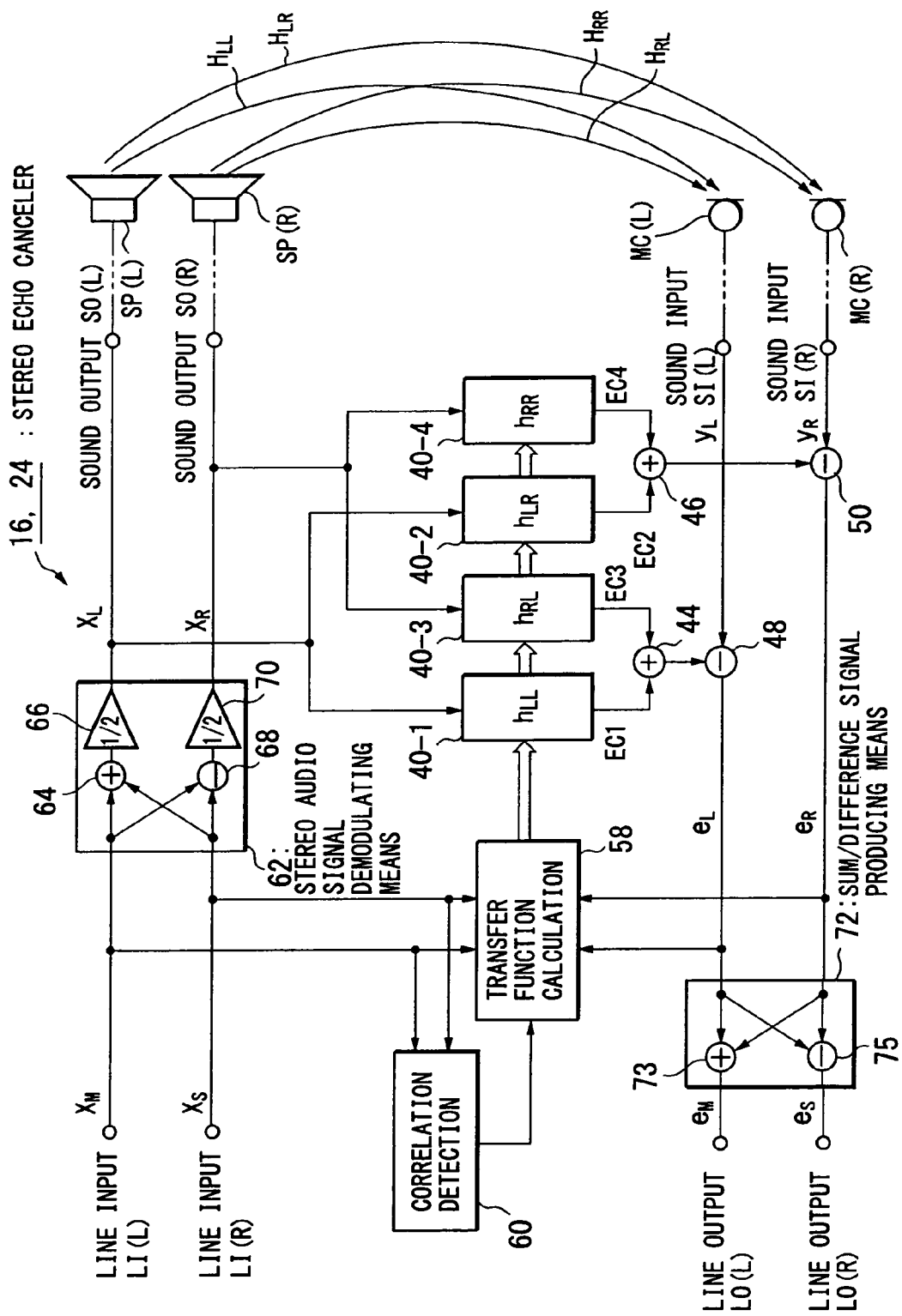
FIG. 10 is a block diagram showing another structural example in the stereo echo canceller 16, 24 of FIG. 2.

FIG. 10 shows another structural example in the stereo echo canceller 16, 24 of FIG. 2, wherein transmission is implemented between the spots A and B of FIG. 2 in the signal form of the sum signal $x_M$ and the difference signal $x_S$, instead of the signal form of the stereo signals $x_L$ and $x_R$. The same symbols are used with respect to those portions common to the foregoing structure of FIG. 1 or 9. A sum signal $x_M(=x_L+x_R)$ and a difference signal $x_S\{=x_L-x_R$ (or it may also be $x_R-x_L)\}$ transmitted from the spot on the counterpart side and inputted into line input ends LI(L) and LI(R) are inputted into stereo audio signal demodulating means 62. The stereo audio signal demodulating means 62 performs addition of the sum and difference signals $x_M$ and $x_S$ using an adder 64, and further, gives thereto a coefficient ½ using a coefficient multiplier 66 to recover the original signal $x_L$, while performs subtraction of the sum and difference signals $x_M$ and $x_S$ using a subtracter 68, and further, gives thereto a coefficient ½ using a coefficient multiplier 70 to recover the original signal $x_R$. The recovered signals $x_L$ and $x_R$ are outputted from sound output ends SO(L) and SO(R) and reproduced at loudspeakers SP(L) and SP(R), respectively.

Transfer function calculating means 58 implements a cross-spectrum calculation between the sum signal $x_M$ and the difference signal $x_S$ inputted from the line input ends LI(L) and LI(R) and signals $e_L$ and $e_R$ outputted from subtracters 48 and 50 and, based on this cross-spectrum calculation, performs setting and updating of filter characteristics of filter means 40-1 to 40-4. Operations thereof are the same as those described with respect to the structure of FIG. 1 or 9. Sum/difference signal producing means 72 performs addition, using an adder 73, of the signals $e_L$ and $e_R$ outputted from the subtracters 48 and 50 so as to produce a sum signal $e_M(=e_L+e_R)$, while performs subtraction thereof using a subtracter 75 so as to produce a difference signal $e_S\{=e_L-e_R$ (or it may also be $e_R-e_L)\}$, then sends them toward the spot on the counterpart side. Operations of the other portions are the same as those described with respect to the structure of FIG. 1 or 9.

Figure 11:
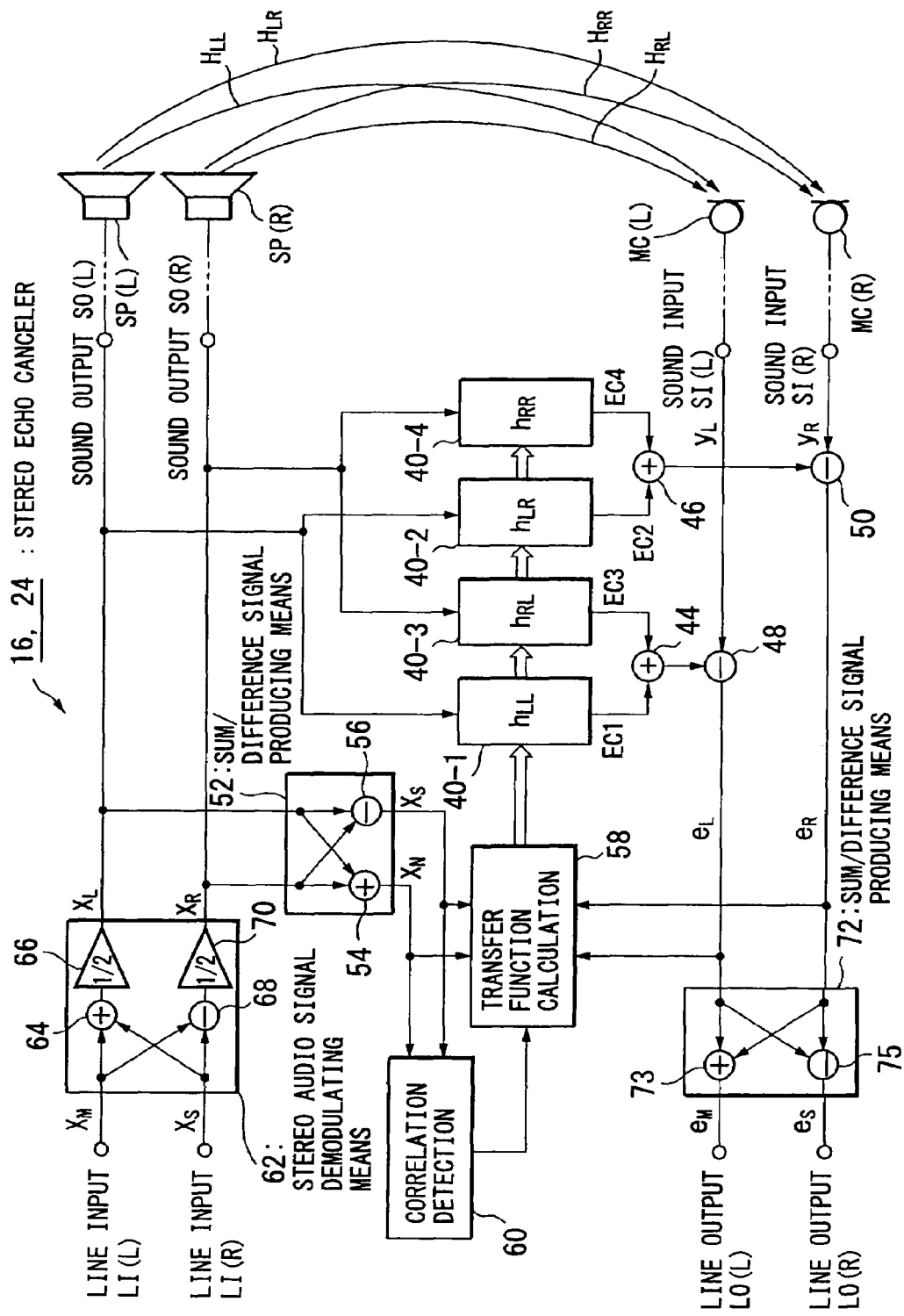
FIG. 11 is a block diagram showing another structural example in the stereo echo canceller 16, 24 of FIG. 2.

FIG. 11 shows another structural example in the stereo echo canceller 16, 24 of FIG. 2. The same symbols are used with respect to those portions common to the foregoing structure of FIG. 1, 9 or 10. A sum signal $x_M(=x_L+x_R)$ and a difference signal $x_S\{=x_L-x_R$ (or it may also be $x_R-x_L\}$ transmitted from the spot on the counterpart side and inputted into line input ends LI(L) and LI(R) are inputted into stereo audio signal demodulating means 62. The stereo audio signal demodulating means 62 performs addition of the sum and difference signals $x_M$ and $x_S$ using an adder 64, and further, gives thereto a coefficient ½ using a coefficient multiplier 66 to recover the original signal $x_L$, while performs subtraction of the sum and difference signals $x_M$ and $x_S$ using a subtracter 68, and further, gives thereto a coefficient ½ using a coefficient multiplier 70 to recover the original signal $x_R$. The recovered signals $x_L$ and $x_R$ are outputted from sound output ends SO(L) and SO(R) and reproduced at loudspeakers SP(L) and SP(R), respectively.

Sum/difference signal producing means 52 performs addition, using an adder 54, of the stereo signals $x_L$ and $x_R$ recovered by the stereo audio signal demodulating means 62 so as to produce a sum signal $x_M(=x_L+x_R)$, while performs subtraction thereof using a subtracter 56 so as to produce a difference signal $x_S\{=x_L-x_R$ (or it may also be $x_R-x_L)\}$. Transfer function calculating means 58 implements a cross-spectrum calculation between the sum signal $x_M$ and the difference signal $x_S$ produced by the sum/difference signal producing means 52 and signals $e_L$ and $e_R$ outputted from subtracters 48 and 50 and, based on this cross-spectrum calculation, performs setting and updating of filter characteristics of filter means 40-1 to 40-4. Operations thereof are the same as those described with respect to the structure of FIG. 1, 9 or 10. Sum/difference signal producing means 72 performs addition, using an adder 73, of the signals $e_L$ and $e_R$ outputted from the subtracters 48 and 50 so as to produce a sum signal $e_M (=e_L+e_R)$, while performs subtraction thereof using a subtracter 75 so as to produce a difference signal $e_S \{=e_L-e_R$ (or it may also be $e_R-e_L)\}$, then sends them toward the spot on the counterpart side. Operations of the other portions are the same as those described with respect to the structure of FIG. 1, 9 or 10.

Figure 12:
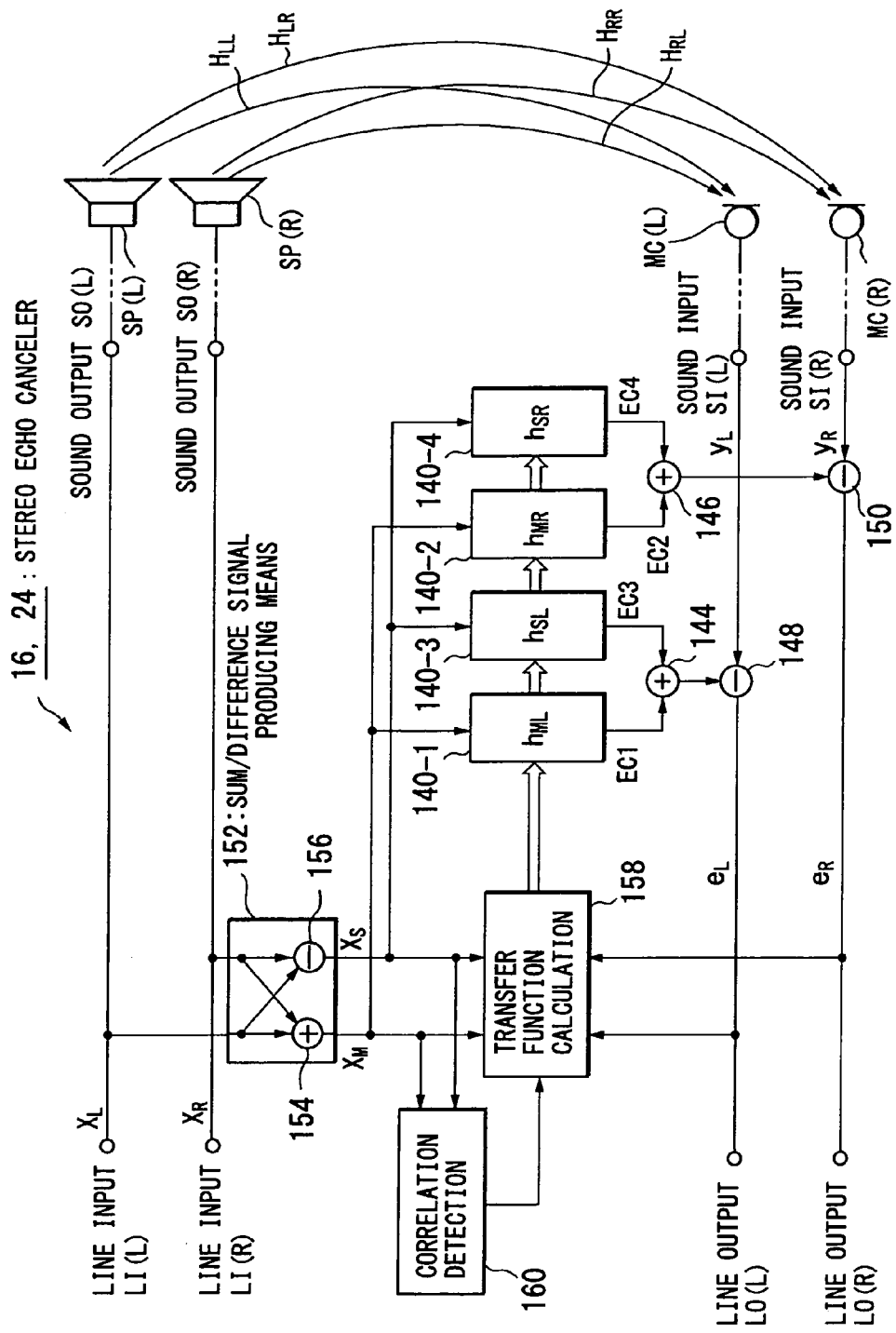
FIG. 12 is a block diagram showing another structural example in the stereo echo canceller 16, 24 of FIG. 2.

FIG. 12 shows a structural example in the stereo echo canceller 16, 24. Left/right two-channel stereo signals $x_L$ and $x_R$ transmitted from the spot on the counterpart side and inputted into line input ends LI(L) and LI (R) are outputted from sound output ends SO(L) and SO(R) as they are (i.e. not through sum/difference signal producing means 152), and reproduced at loudspeakers SP(L) and SP(R), respectively.

The sum/difference signal producing means 152 performs addition, using an adder 154, of the left/right two-channel stereo signals $x_L$ and $x_R$ inputted into the line input ends LI(L) and LI(R) so as to produce a sum signal $x_M (=x_L+x_R)$, while performs subtraction thereof using a subtracter 156 so as to produce a difference signal $x_S \{=x_L-x_R$ (or $x_R-x_L)\}$.

Filer means 140-1 to 140-4 are formed by, for example, FIR filters. These filter means 140-1 to 140-4 are each set with an impulse response corresponding to a composite transfer function in the form of combination of transfer functions of suitable two systems among transfer functions $H_{LL}$, $H_{LR}$, $H_{RL}$ and $H_{RR}$ of four audio transfer systems between the loudspeakers SP(L) and SP(R) and microphones MC(L) and MC(R), respectively, and perform a convolution calculation of the sum and difference signals (low-correlation composite signals) using such impulse responses, thereby producing echo cancel signals EC1 to EC4, respectively.

An adder 144 performs a calculation of EC1+EC3. An adder 146 performs a calculation of EC2+EC4. A subtracter 148 subtracts an echo cancel signal EC1+EC3 from a collected audio signal of the microphone MC(L) inputted from a sound input end SI(L), thereby to perform echo cancellation. A subtracter 150 subtracts an echo cancel signal EC2+EC4 from a collected audio signal of the microphone MC(R) inputted from a sound input end SI(R), thereby to perform echo cancellation. These echo-canceled signals of the respective left and right channels are outputted from line output ends LO(L) and LO(R), respectively, and transmitted toward the spot on the counterpart side.

Transfer function calculating means 158 implements a cross-spectrum calculation between the sum signal $x_M$ and the difference signal $x_S$ produced by the sum/difference signal producing means 152 and signals $e_L$ and $e_R$ outputted from the subtracters 148 and 150 and, based on this cross-spectrum calculation, performs setting and updating of filter characteristics (impulse responses) of the filter means 140-1 to 140-4. Specifically, upon starting the system, the filter characteristics of the filter means 140-1 to 140-4 are not set, i.e. coefficients are all set to zero, so that the echo cancel signals EC1 to EC4 are zero, and thus the collected audio signals of the microphones MC(L) and MC(R) themselves are outputted from the subtracters 148 and 150. Therefore, at this time, the transfer function calculating means 158 performs the cross-spectrum calculation between the sum signal $x_M$ and the difference signal $x_S$ produced by the sum/difference signal producing means 152 and the collected audio signals $e_L$ and $e_R$ of the microphones MC(L) and MC(R) outputted from the subtracters 148 and 150 and, based on this cross-spectrum calculation, derives a plurality of composite transfer functions each in the form of combination of transfer functions of suitable two systems among transfer functions $H_{LL}$, $H_{LR}$, $H_{RL}$ and $H_{RR}$ of four audio transfer systems between the loudspeakers SP(L) and SP(R) and the microphones MC(L) and MC(R), respectively, and implements initial setting of the filter characteristics of the filter means 140-1 to 140-4 to values corresponding to such composite transfer functions. After the initial setting, since the echo cancel signals are produced by the filter means 140-1 to 140-4, the echo cancel error signals $e_L$ and $e_R$ corresponding to difference signals between the collected audio signals of the microphones MC(L) and MC(R) and the echo cancel signals EC1 to EC4 are outputted from the subtracters 148 and 150. Therefore, at this time, the transfer function calculating means 158 performs the cross-spectrum calculation between the sum signal $x_M$ and the difference signal $x_S$ produced by the sum/difference signal producing means 152 and the echo cancel error signals $e_L$ and $e_R$ outputted from the subtracters 148 and 150 and, based on this cross-spectrum calculation, derives estimated errors of the foregoing composite transfer functions, respectively, and updates the filter characteristics of the filter means 140-1 to 140-4 to values that cancel such estimated errors, respectively. By repeating this updating operation per prescribed time period, the echo cancel error can be converged to a minimum value. Further, even if the transfer functions change due to movement of the microphone positions or the like, the echo cancel error can be converged to a minimum value by sequentially updating the filter characteristics of the filter means 140-1 to 140-4 depending thereon.

Correlation detecting means 160 detects a correlation between the sum signal $x_M$ and the difference signal $x_S$ based on a correlation value calculation or the like, and stops updating of the foregoing filter characteristics when the correlation value is no less than a prescribed value. When the correlation value becomes lower than the prescribed value, updating of the foregoing filter characteristics is restarted.

Herein, the filter characteristics (impulse responses) that are set to the filter means 140-1 to 140-4 by the transfer function calculating means 158 will be described. In the transfer function calculating means 158, the following calculation is performed.

(In Case of Fixed Type Operation)
The signals $x_L$ and $x_R$ are $$x_L = (x_M + x_S)/2$$

$$x_R = (x_M - x_S)/2$$

hence, output signals $Y_L$ and $Y_R$ of the microphones MC(L) and MC(R) become $$Y_L = (X_M + X_S)H_{LL}/2 + (X_M - X_S)H_{RL}/2 \quad (25)$$
$$= X_M \{(H_{LL} + H_{RL})/2\} + X_S \{(H_{LL} - H_{RL})/2\}$$

$$Y_R = (X_M + X_S)H_{LR}/2 + (X_M - X_S)H_{RR}/2 \quad (26)$$
$$= X_M \{(H_{LR} + H_{RR})/2\} + X_S \{(H_{LR} - H_{RR})/2\}.$$

When the composite transfer functions are given as $$H_{ML} = (H_{LL} + H_{RL})/2$$

$$H_{SL} = (H_{LL} - H_{RL})/2$$

$$H_{MR} = (H_{LR} + H_{RR})/2$$

$$H_{SR} = (H_{LR} - H_{RR})/2$$

the equations (25) and (26) respectively become $$Y_L = X_M \cdot H_{ML} + X_S \cdot H_{SL} \qquad (25')$$

$$Y_R = X_M \cdot H_{MR} + X_S \cdot H_{SR} \qquad (26')$$

When both sides of the equations (25') and (26') are multiplied by complex conjugates $X_M^*$ and $X_S^*$ of $X_M$ and $X_S$ and ensemble-averaged, $$\Sigma X_M^* \cdot Y_L = \Sigma X_M^* \cdot X_M \cdot H_{ML} + \Sigma X_M^* \cdot X_S \cdot H_{SL} \qquad (27)$$

$$\Sigma X_S^* \cdot Y_L = \Sigma X_S^* \cdot X_M \cdot H_{ML} + \Sigma X_S^* \cdot X_S \cdot H_{SL} \qquad (28)$$

$$\Sigma X_M^* \cdot Y_R = \Sigma X_M^* \cdot X_M \cdot H_{MR} + \Sigma X_M^* \cdot X_S \cdot H_{SR} \qquad (29)$$

$$\Sigma X_S^* \cdot Y_R = \Sigma X_S^* \cdot X_M \cdot H_{MR} + \Sigma X_S^* \cdot X_S \cdot H_{SR} \qquad (30)$$

are respectively obtained.

In the equations (27) to (30), since $X_M$ and $X_S$ are approximately uncorrelated with each other, such a term having $X_M^* \cdot X_S$ or $X_S^* \cdot X_M$ becomes approximately zero when ensemble-averaged. Further, $$X_M^* \cdot X_M = |X_M|^2$$

$$X_S^* \cdot X_S = |X_S|^2$$

hence, the equations (27) to (30) respectively become $$\Sigma X_M^* \cdot Y_L = \Sigma |X_M|^2 H_{ML} \qquad (27')$$

$$\Sigma X_S^* \cdot Y_L = \Sigma |X_S|^2 H_{SL} \qquad (28')$$

$$\Sigma X_M^* \cdot Y_R = \Sigma |X_M|^2 H_{MR} \qquad (29')$$

$$\Sigma X_S^* \cdot Y_R = \Sigma |X_S|^2 H_{SR} \qquad (30')$$

From the equations (27') to (30'), $$H_{ML} = \Sigma X_M^* \cdot Y_L / \Sigma |X_M|^2 \qquad (31)$$

$$H_{SL} = \Sigma X_S^* \cdot Y_L / \Sigma |X_S|^2 \qquad (32)$$

$$H_{MR} = \Sigma X_M^* \cdot Y_R / \Sigma |X_M|^2 \qquad (33)$$

$$H_{SR} = \Sigma X_S^* \cdot Y_R / \Sigma |X_S|^2 \qquad (34)$$

are respectively derived.

Impulse responses $h_{ML}$, $h_{SL}$, $h_{MR}$ and $h_{SR}$ obtained by applying the inverse Fourier transformation to these derived composite transfer functions $H_{ML}$, $H_{SL}$, $H_{MR}$ and $H_{SR}$ are the filter characteristics to be set to the filter means 140-1, 140-2, 140-3 and 140-4, respectively. Therefore, the transfer function calculating means 158 derives the respective composite transfer functions $H_{ML}$, $H_{SL}$, $H_{MR}$ and $H_{SR}$ from the equations (31) to (34) based on the sum signal $x_M$, the difference signal $x_S$, and output signals $y_L$ and $y_R$ of the microphones MC(L) and MC(R) that are inputted, derives the impulse responses $h_{ML}$, $h_{SL}$, $h_{MR}$ and $h_{SR}$ by applying the inverse Fourier transformation to those derived composite transfer functions, sets the derived impulse responses to the filter means 140-1, 140-2, 140-3 and 140-4, respectively, and further, updates the impulse responses by repeating this calculation per suitably determined prescribed time period (e.g. time period of performing ensemble averaging).

(In Case of Adaptive Type Operation)

Assuming that the filter characteristics set to the filter means 140-1, 140-2, 140-3 and 140-4 are given as $\hat{H}_{ML}$, $\hat{H}_{SL}$, $\hat{H}_{MR}$ and $\hat{H}_{SR}$ ($\hat{h}_{ML}$, $\hat{h}_{SL}$, $\hat{h}_{MR}$ and $\hat{h}_{SR}$ when expressed in terms of the impulse responses), the signals $e_L$ and $e_R$ outputted from the subtracters 148 and 150 become $$\begin{aligned}
E_L &= Y_L - (X_M \cdot \hat{H}_{ML} + X_S \cdot \hat{H}_{SL}) \\
&= \{(X_M + X_S)H_{LL}/2 + (X_M - X_S)H_{RL}/2\} - \\
&\quad (X_M \cdot \hat{H}_{ML} + X_S \cdot \hat{H}_{SL}) \\
&= X_M\{(H_{LL} + H_{RL})/2 - \hat{H}_{ML}\} + \\
&\quad X_S\{(H_{LL} - H_{RL})/2 - \hat{H}_{SL}\}
\end{aligned} \qquad (35)$$

$$\begin{aligned}
E_R &= Y_R - (X_M \cdot \hat{H}_{MR} + X_S \cdot \hat{H}_{SR}) \\
&= \{(X_M + X_S)H_{LR}/2 + (X_M - X_S)H_{RR}/2\} - \\
&\quad (X_M \cdot \hat{H}_{MR} + X_S \cdot \hat{H}_{SR}) \\
&= X_M\{(H_{LR} + H_{RR})/2 - \hat{H}_{MR}\} + \\
&\quad X_S\{(H_{LR} - H_{RR})/2 - \hat{H}_{SR}\}.
\end{aligned} \qquad (36)$$

When the composite transfer functions are given as $$H_{ML} = (H_{LL} + H_{RL})/2$$

$$H_{SL} = (H_{LL} - H_{RL})/2$$

$$H_{MR} = (H_{LR} + H_{RR})/2$$

$$H_{SR} = (H_{LR} - H_{RR})/2$$

the equations (35) and (36) respectively become $$E_L = X_M(H_{ML} - \hat{H}_{ML}) + X_S(H_{SL} - \hat{H}_{SL}) \qquad (35')$$

$$E_R = X_M(H_{MR} - \hat{H}_{MR}) + X_S(H_{SR} - \hat{H}_{SR}) \qquad (36')$$

When the estimated errors of the composite transfer functions are given as $$\Delta H_{ML} = H_{ML} - \hat{H}_{ML}$$

$$\Delta H_{SL} = H_{SL} - \hat{H}_{SL}$$

$$\Delta H_{MR} = H_{MR} - \hat{H}_{MR}$$

$$\Delta H_{SR} = H_{SR} - \hat{H}_{SR}$$

the equations (35') and (36') respectively become $$E_L = X_M \cdot \Delta H_{ML} + X_S \cdot \Delta H_{SL} \qquad (35'')$$

$$E_R = X_M \cdot \Delta H_{MR} + X_S \cdot \Delta H_{SR} \qquad (36'')$$

When both sides of the equations (35") and (36") are multiplied by complex conjugates $X_M^*$ and $X_S^*$ of $X_M$ and $X_S$ and ensemble-averaged, $$\Sigma X_M^* \cdot E_L = \Sigma X_M^* \cdot X_M \cdot \Delta H_{ML} + \Sigma X_M^* \cdot X_S \cdot \Delta H_{SL} \qquad (37)$$

$$\Sigma X_S^* \cdot E_L = \Sigma X_S^* \cdot X_M \cdot \Delta H_{ML} + \Sigma X_S^* \cdot X_S \cdot \Delta H_{SL} \qquad (38)$$

$$\Sigma X_M^* \cdot E_R = \Sigma X_M^* \cdot X_M \cdot \Delta H_{MR} + \Sigma X_M^* \cdot X_S \cdot \Delta H_{SR} \qquad (39)$$

$$\Sigma X_S^* \cdot E_R = \Sigma X_S^* \cdot X_M \cdot \Delta H_{MR} + \Sigma X_S^* \cdot X_S \cdot \Delta H_{SR} \qquad (40)$$

are respectively obtained.

In the equations (37) to (40), since $X_M$ and $X_S$ are approximately uncorrelated with each other, such a term having $X_M^* \cdot X_S$ or $X_S^* \cdot X_M$ becomes approximately zero when ensemble-averaged. Further, $$X_M^* \cdot X_M = |X_M|^2$$

$$X_S^* \cdot X_S = |X_S|^2$$

hence, the equations (37) to (40) respectively become $$\Sigma X_M^* \cdot E_L = \Sigma |X_M|^2 \Delta H_{ML} \quad (37')$$

$$\Sigma X_S^* \cdot E_L = \Sigma |X_S|^2 \Delta H_{SL} \quad (38')$$

$$\Sigma X_M^* \cdot E_R = \Sigma |X_M|^2 \Delta H_{MR} \quad (39')$$

$$\Sigma X_S^* \cdot E_R = \Sigma |X_S|^2 \Delta H_{SR} \quad (40').$$

From the equations (37') to (40'), $$\Delta H_{ML} = \Sigma X_M^* \cdot E_L / \Sigma |X_M|^2 \quad (41)$$

$$\Delta H_{SL} = \Sigma X_S^* \cdot E_L / \Sigma |X_S|^2 \quad (42)$$

$$\Delta H_{MR} = \Sigma X_M^* \cdot E_R / \Sigma |X_M|^2 \quad (43)$$

$$\Delta H_{SR} = \Sigma X_S^* \cdot E_R / \Sigma |X_S|^2 \quad (44)$$

are respectively derived.

Using the estimated errors $\Delta H_{ML}$, $\Delta H_{SL}$, $\Delta H_{MR}$ and $\Delta H_{SR}$ derived from the equations (40) to (44), the filter characteristics of the filter means 140-1, 140-2, 140-3 and 140-4 are updated per suitably determined prescribed time period (e.g. time period of performing ensemble averaging). For example, assuming that impulse responses $h_{ML}$, $h_{SL}$, $h_{MR}$ and $h_{SR}$ after K-th updating are given as $h_{ML}(k)$, $h_{SL}(k)$, $h_{MR}(k)$ and $h_{SR}(k)$, using impulse responses $\Delta h_{ML}$, $\Delta h_{SL}$, $\Delta h_{MR}$ and $\Delta h_{SR}$ corresponding to the derived estimated errors $\Delta H_{ML}$, $\Delta H_{SL}$, $\Delta H_{MR}$ and $\Delta H_{SR}$, $$h_{ML}(k+1) = h_{ML}(k) + \alpha \Delta h_{ML} \quad (45)$$

$$h_{SL}(k+1) = h_{SL}(k) + \alpha \Delta h_{SL} \quad (46)$$

$$h_{MR}(k+1) = h_{MR}(k) + \alpha \Delta h_{MR} \quad (47)$$

$$h_{SR}(k+1) = h_{SR}(k) + \alpha \Delta h_{SR} \quad (48).$$

Using these updating equations, (k+1)th impulse responses $h_{ML}(k+1)$, $h_{SL}(k+1)$, $h_{MR}(k+1)$ and $h_{SR}(k+1)$ are derived and set to the filter means 140-1, 140-2, 140-3 and 140-4, respectively, which is repeated per suitably determined prescribed time period (e.g. time period of performing ensemble averaging).

Figure 13:
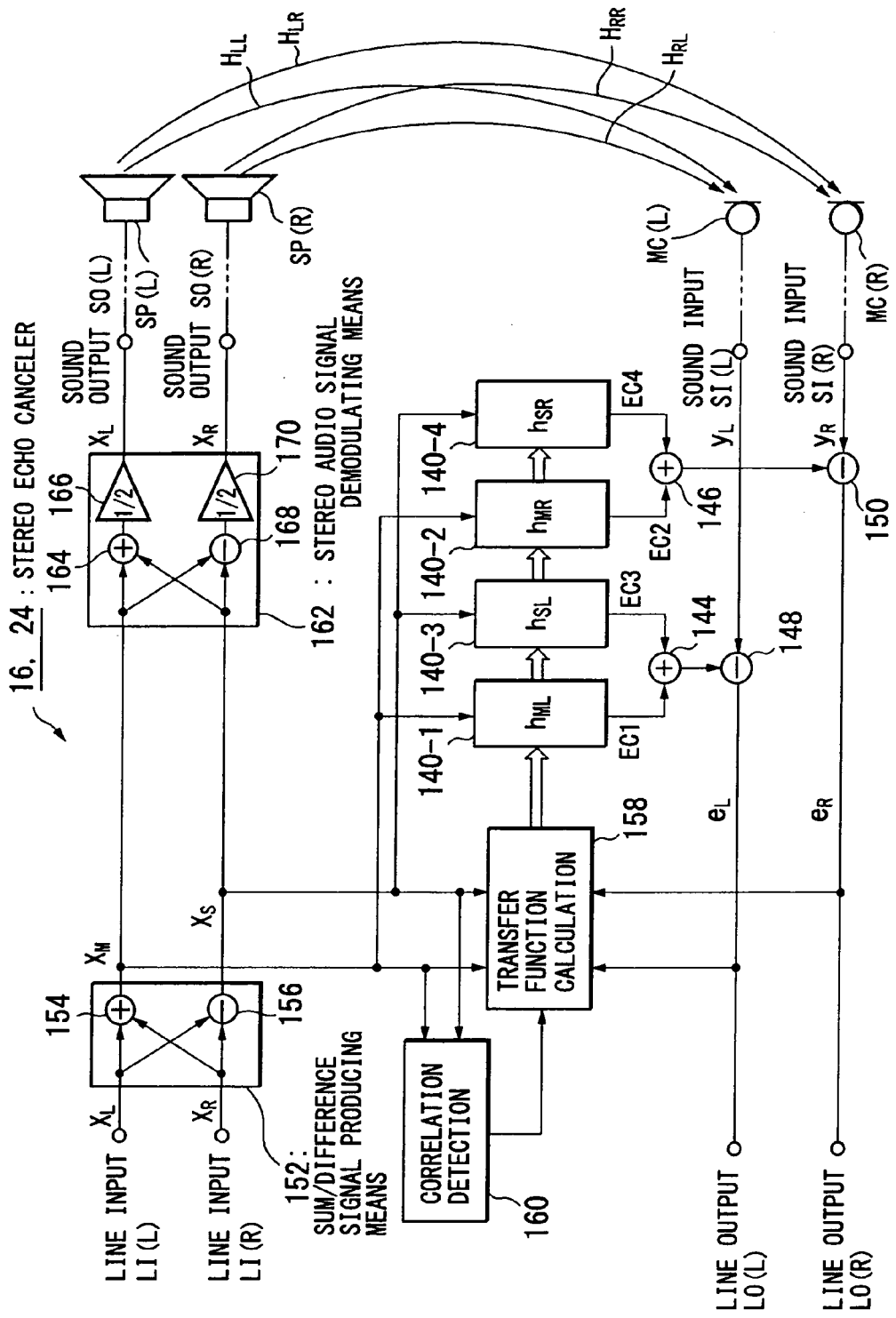
FIG. 13 is a block diagram showing another structural example in the stereo echo canceller 16, 24 of FIG. 2.

FIG. 13 shows another structural example in the stereo echo canceller 16, 24 of FIG. 2, wherein sum/difference signal producing means is arranged on transmission lines to loudspeakers. The same symbols are used with respect to those portions common to the foregoing structure of FIG. 12. Left/right two-channel stereo signals $x_L$ and $x_R$ transmitted from the spot on the counterpart side and inputted into line input ends LI(L) and LI(R) are inputted into sum/difference signal producing means 152. The sum/difference signal producing means 152 performs addition of the stereo signals $x_L$ and $x_R$ using an adder 154 so as to produce a sum signal $x_M(=x_L+x_R)$, while performs subtraction thereof using a subtracter 156 so as to produce a difference signal $x_S\{=x_L-x_R$ (or it may also be $x_R-x_L)\}$. Stereo audio signal demodulating means 162 performs addition of the sum and difference signals $x_M$ and $x_S$ using an adder 164, and further, gives thereto a coefficient ½ using a coefficient multiplier 166 to recover the original signal $x_L$, while performs subtraction of the sum and difference signals $x_M$ and $x_S$ using a subtracter 168, and further, gives thereto a coefficient ½ using a coefficient multiplier 170 to recover the original signal $x_R$. The recovered signals $x_L$ and $x_R$ are outputted from sound output ends SO(L) and SO(R) and reproduced at loudspeakers SP(L) and SP(R), respectively.

Transfer function calculating means 158 implements a cross-spectrum calculation between the sum signal $x_M$ and the difference signal $x_S$ produced by the sum/difference signal producing means 152 and signals $e_L$ and $e_R$ outputted from subtracters 148 and 150 and, based on this cross-spectrum calculation, performs setting and updating of filter characteristics of filter means 140-1 to 140-4. Operations thereof are the same as those described with respect to the structure of FIG. 12. Operations of the other portions are also the same as those described with respect to the structure of FIG. 12.

Figure 14:
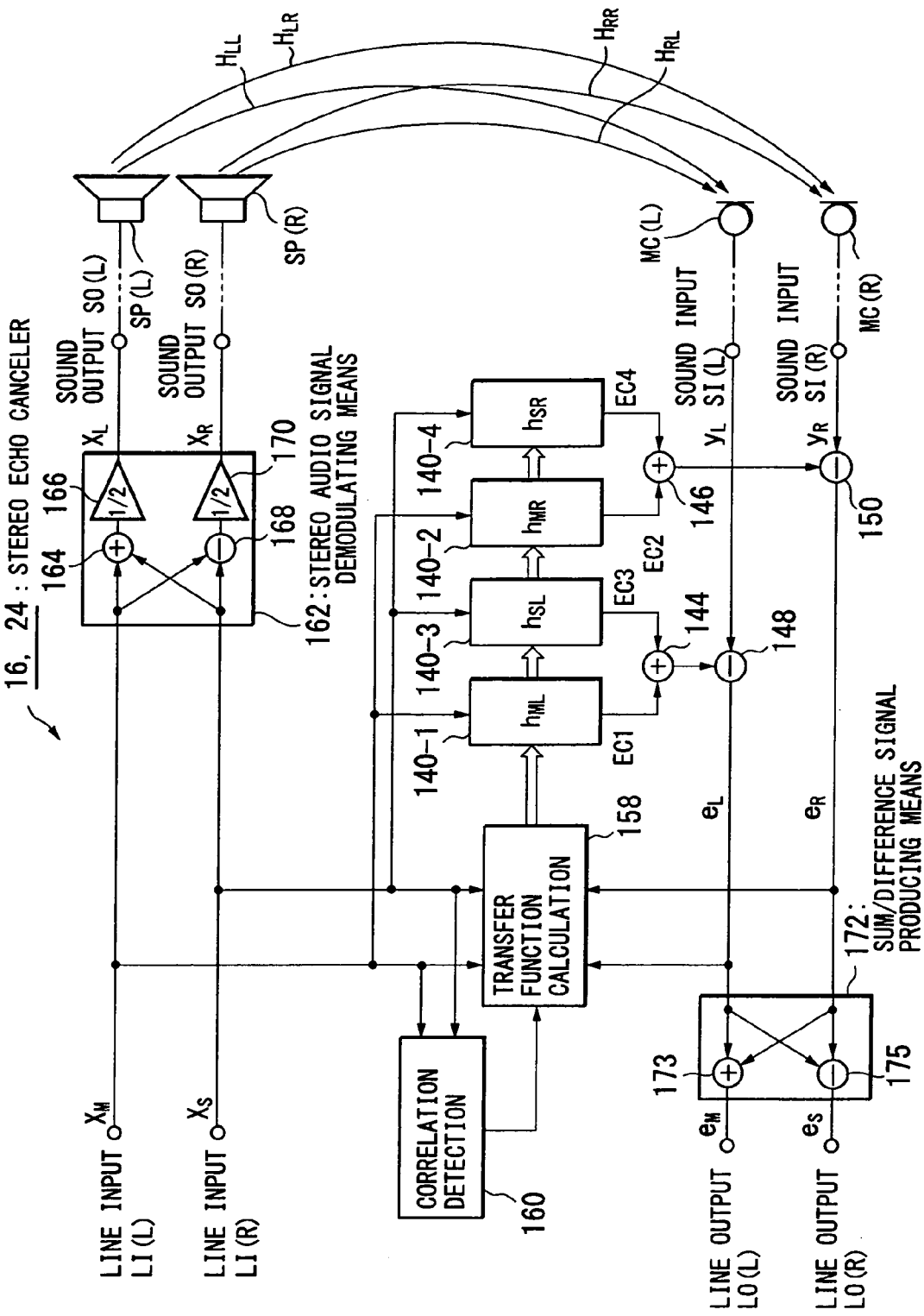
FIG. 14 is a block diagram showing another structural example in the stereo echo canceller 16, 24 of FIG. 2.

FIG. 14 shows another structural example in the stereo echo canceller 16, 24 of FIG. 2, wherein transmission is implemented between the spots A and B of FIG. 2 in the signal form of the sum signal $x_M$ and the difference signal $x_S$, instead of the signal form of the stereo signals $x_L$ and $x_R$. The same symbols are used with respect to those portions common to the foregoing structure of FIG. 12 or 13. A sum signal $x_M(=x_L+x_R)$ and a difference signal $x_S\{=x_L-x_R$ (or it may also be $x_R-x_L)\}$ transmitted from the spot on the counterpart side and inputted into line input ends LI(L) and LI(R) are inputted into stereo audio signal demodulating means 162. The stereo audio signal demodulating means 162 performs addition of the sum and difference signals $x_M$ and $x_S$ using an adder 164, and further, gives thereto a coefficient ½ using a coefficient multiplier 166 to recover the original signal $x_L$, while performs subtraction of the sum and difference signals $x_M$ and $x_S$ using a subtracter 168, and further, gives thereto a coefficient ½ using a coefficient multiplier 170 to recover the original signal $x_R$. The recovered signals $x_L$ and $x_R$ are outputted from sound output ends SO(L) and SO(R) and reproduced at loudspeakers SP(L) and SP(R), respectively.

Transfer function calculating means 158 implements a cross-spectrum calculation between the sum signal $x_M$ and the difference signal $x_S$ inputted from the line input ends LI(L) and LI(R) and signals $e_L$ and $e_R$ outputted from subtracters 148 and 150 and, based on this cross-spectrum calculation, performs setting and updating of filter characteristics of filter means 140-1 to 140-4. Operations thereof are the same as those described with respect to the structure of FIG. 12 or 13. Sum/difference signal producing means 172 performs addition, using an adder 173, of the signals $e_L$ and $e_R$ outputted from the subtracters 148 and 150 so as to produce a sum signal $e_M(=e_L+e_R)$, while performs subtraction thereof using a subtracter 175 so as to produce a difference signal $e_S\{=e_L-e_R$ (or it may also be $e_R-e_L)\}$, then sends them toward the spot on the counterpart side. Operations of the other portions are the same as those described with respect to the structure of FIG. 12 or 13.

Figure 15:
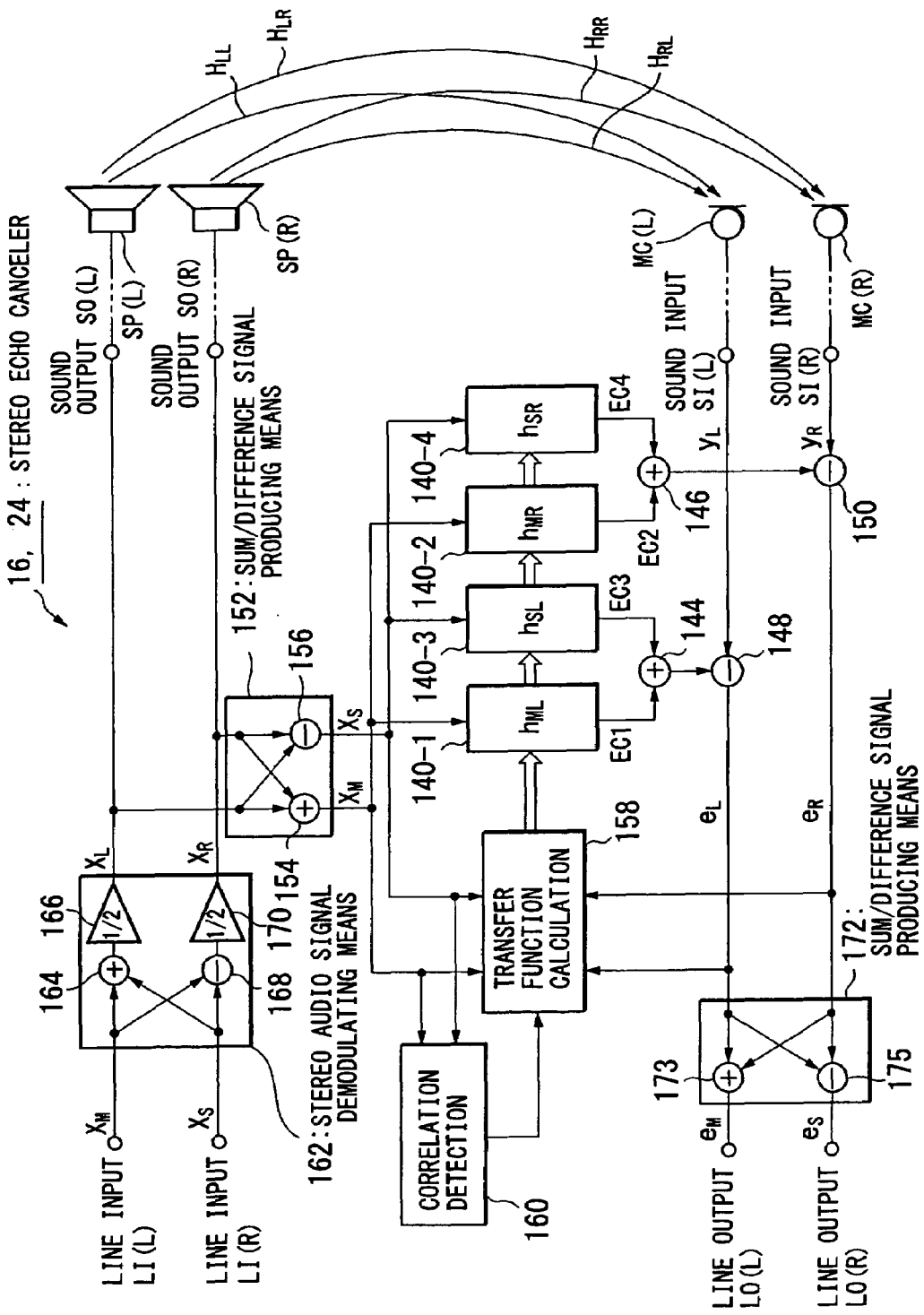
FIG. 15 is a block diagram showing another structural example in the stereo echo canceller 16, 24 of FIG. 2.

FIG. 15 shows another structural example in the stereo echo canceller 16, 24 of FIG. 2. The same symbols are used with respect to those portions common to the foregoing structure of FIG. 12, 13 or 14. A sum signal $x_M(=x_L+x_R)$ and a difference signal $x_S\{=x_L-x_R$ (or it may also be $x_R-x_L)\}$ transmitted from the spot on the counterpart side and inputted into line input ends LI(L) and LI(R) are inputted into stereo audio signal demodulating means 162. The stereo audio signal demodulating means 162 performs addition of the sum and difference signals $x_M$ and $x_S$ using an adder 164, and further, gives thereto a coefficient ½ using a coefficient multiplier 166 to recover the original signal $x_L$, while performs subtraction of the sum and difference signals $x_M$ and $x_S$ using a subtracter 168, and further, gives thereto a coefficient ½ using a coefficient multiplier 170 to recover the original signal $x_R$. The recovered signals $x_L$ and $x_R$ are outputted from sound output ends SO(L) and SO(R) and reproduced at loudspeakers SP(L) and SP(R), respectively.

Sum/difference signal producing means 152 performs addition, using an adder 154, of the stereo signals $x_L$ and $x_R$ recovered by the stereo audio signal demodulating means 162 so as to produce a sum signal $x_M(=x_L+x_R)$, while performs subtraction thereof using a subtracter 156 so as to produce a difference signal $x_S\{=x_L-x_R$ (or it may also be $x_R-x_L)\}$. Transfer function calculating means 158 implements a cross-spectrum calculation between the sum signal $x_M$ and the difference signal $x_S$ produced by the sum/difference signal producing means 152 and signals $e_L$ and $e_R$ outputted from subtracters 148 and 150 and, based on this cross-spectrum calculation, performs setting and updating of filter characteristics of filter means 140-1 to 140-4. Operations thereof are the same as those described with respect to the structure of FIG. 12, 13 or 14. Sum/difference signal producing means 172 performs addition, using an adder 173, of the signals $e_L$ and $e_R$ outputted from the subtracters 148 and 150 so as to produce a sum signal $e_M(=e_L+e_R)$, while performs subtraction thereof using a subtracter 175 so as to produce a difference signal $e_S\{=e_L-e_R$ (or it may also be $e_R-e_L)\}$, then sends them toward the spot on the counterpart side. Operations of the other portions are the same as those described with respect to the structure of FIG. 12, 13 or 14.

Figure 16:
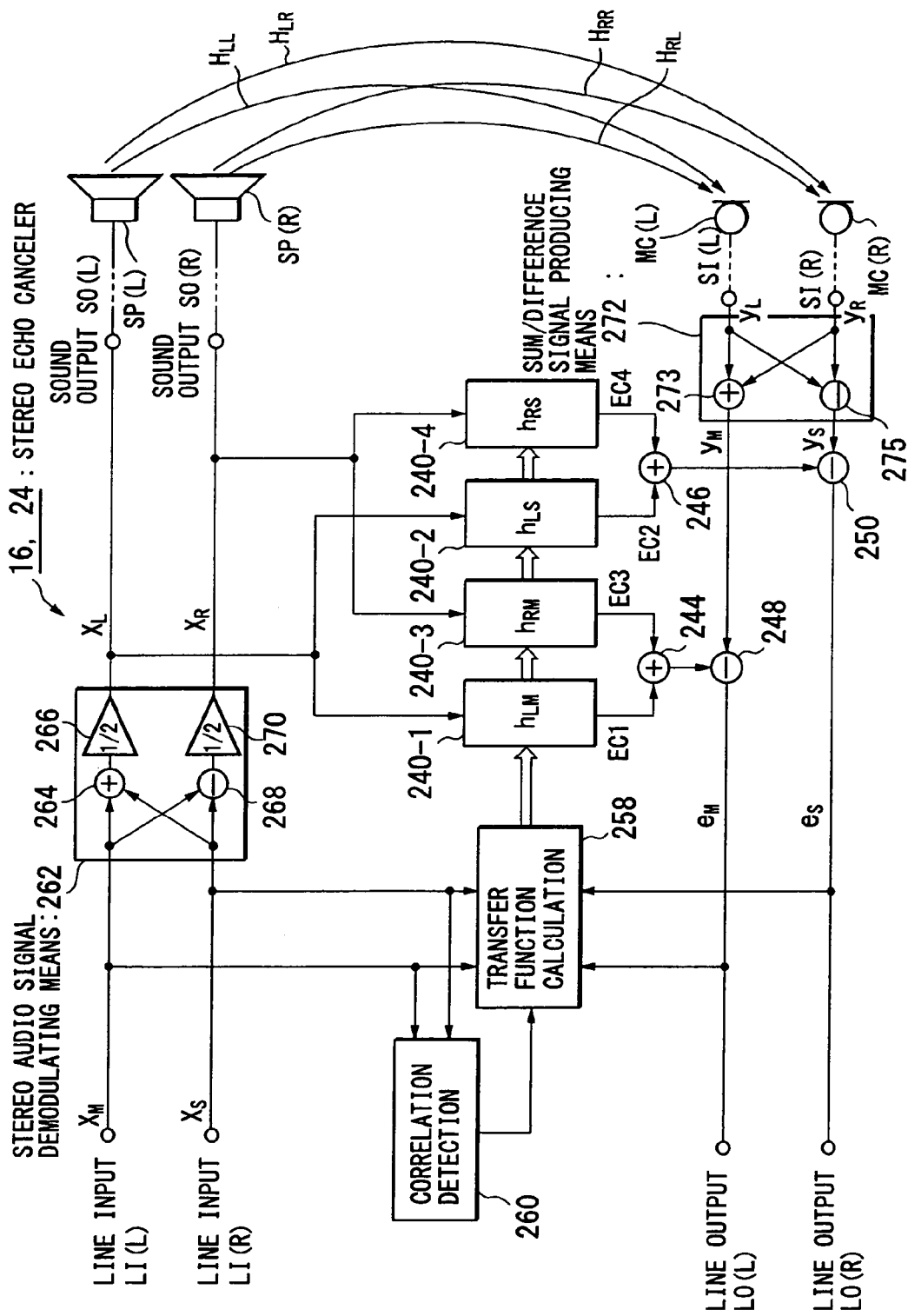
FIG. 16 is a block diagram showing another structural example in the stereo echo canceller 16, 24 of FIG. 2.

FIG. 16 shows another structural example in the stereo echo canceller 16, 24. A sum signal $x_M(=x_L+x_R)$ and a difference signal $x_S\{=x_L-x_R$ (or it may also be $x_R-x_L)\}$ transmitted from the spot on the counterpart side and inputted into line input ends LI(L) and LI(R) are inputted into stereo audio signal demodulating means 262. The stereo audio signal demodulating means 262 performs addition of the sum and difference signals $x_M$ and $x_S$ using an adder 264, and further, gives thereto a coefficient ½ using a coefficient multiplier 266 to recover the original signal $x_L$, while performs subtraction of the sum and difference signals $x_M$ and $x_S$ using a subtracter 268, and further, gives thereto a coefficient ½ using a coefficient multiplier 270 to recover the original signal $x_R$. The recovered signals $x_L$ and $x_R$ are outputted from sound output ends SO(L) and SO(R) and reproduced at loudspeakers SP(L) and SP(R), respectively.

Collected audio signals $y_L$ and $y_R$ of microphones MC(L) and MC(R) are inputted into sum/difference signal producing means 272. The sum/difference signal producing means 272 implements addition of the microphone collected audio signals $y_L$ and $y_R$ using an adder 273 so as to produce a sum signal $y_M$, while implements subtraction thereof using a subtracter 275 so as to produce a difference signal $y_S$.

Filer means 240-1 to 240-4 are formed by, for example, FIR filters. These filter means 240-1 to 240-4 are each set with an impulse response corresponding to a composite transfer function in the form of combination of transfer functions of suitable two systems among transfer functions $H_{LL}$, $H_{LR}$, $H_{RL}$ and $H_{RR}$ of four audio transfer systems between the loudspeakers SP(L) and SP(R) and microphones MC(L) and MC(R), respectively, and perform a convolution calculation of the left/right two-channel stereo signals $x_L$ and $x_R$ using such impulse responses, thereby producing echo cancel signals EC1 to EC4, respectively.

An adder 244 performs a calculation of EC1+EC3. An adder 246 performs a calculation of EC2+EC4. A subtracter 248 subtracts an echo cancel signal EC1+EC3 from the sum signal $y_M$, thereby to perform echo cancellation. A subtracter 250 subtracts an echo cancel signal EC2+EC4 from the difference signal $y_S$, thereby to perform echo cancellation. Signals $e_M$ and $e_S$ outputted from the subtracters 248 and 250 are outputted from line output ends LO(L) and LO(R), respectively, and transmitted toward the spot on the counterpart side.

Transfer function calculating means 258 implements a cross-spectrum calculation between the sum signal $x_M$ and the difference signal $x_S$ inputted from the line input ends LI(L) and LI(R) and the signals $e_M$ and $e_S$ outputted from the subtracters 248 and 250 and, based on this cross-spectrum calculation, performs setting and updating of filter characteristics (impulse responses) of the filter means 240-1 to 240-4. Specifically, upon starting the system, the filter characteristics of the filter means 240-1 to 240-4 are not set, i.e. coefficients are all set to zero, so that the echo cancel signals EC1 to EC4 are zero, and thus the sum signal $y_M$ and the difference signal $y_S$ outputted from the sum/difference signal producing means 272, as they are, are outputted from the subtracters 248 and 250. Therefore, at this time, the transfer function calculating means 258 performs the cross-spectrum calculation between the sum signal $x_M$ and the difference signal $x_S$ inputted from the line input ends LI(L) and LI(R) and the sum signal $y_M$ and the difference signal $y_S$ outputted from the subtracters 248 and 250 and, based on this cross-spectrum calculation, derives a plurality of composite transfer functions each in the form of combination of transfer functions of suitable two systems among transfer functions $H_{LL}$, $H_{LR}$, $H_{RL}$ and $H_{RR}$ of four audio transfer systems between the loudspeakers SP(L) and SP(R) and the microphones MC(L) and MC(R), respectively, and implements initial setting of the filter characteristics of the filter means 240-1 to 240-4 to values corresponding to such composite transfer functions. After the initial setting, since the echo cancel signals are produced by the filter means 240-1 to 240-4, the echo cancel error signals $e_M$ and $e_S$ corresponding to difference signals between the sum signal $y_M$ and the difference signal $y_S$ outputted from the sum/difference signal producing means 272 and the echo cancel signals EC1 to EC4 are outputted from the subtracters 248 and 250. Therefore, at this time, the transfer function calculating means 258 performs the cross-spectrum calculation between the sum signal $x_M$ and the difference signal $x_S$ inputted from the line input ends LI(L) and LI(R) and the echo cancel error signals $e_M$ and $e_S$ outputted from the subtracters 248 and 250 and, based on this cross-spectrum calculation, derives estimated errors of the foregoing composite transfer functions, respectively, and updates the filter characteristics of the filter means 240-1 to 240-4 to values that cancel such estimated errors, respectively. By repeating this updating operation per prescribed time period, the echo cancel error can be converged to a minimum value. Further, even if the transfer functions change due to movement of the microphone positions or the like, the echo cancel error can be converged to a minimum value by sequentially updating the filter characteristics of the filter means 240-1 to 240-4 depending thereon.

Correlation detecting means 260 detects a correlation between the sum signal $x_M$ and the difference signal $x_S$ based on a correlation value calculation or the like, and stops updating of the foregoing filter characteristics when the correlation value is no less than a prescribed value. When the correlation value becomes lower than the prescribed value, updating of the foregoing filter characteristics is restarted.

Herein, the filter characteristics (impulse responses) that are set to the filter means 240-1 to 240-4 by the transfer function calculating means 258 will be described. In the transfer function calculating means 258, the following calculation is performed.

(In Case of Fixed Type Operation)

The sum and difference signals $y_M$ and $y_S$ of the output signals $y_L$ and $y_R$ of the microphones MC(L) and MC(R), assuming that frequency-axis expressions of $y_M$ and $y_S$ are respectively given as $y_M$ and $y_S$, become $$Y_M = Y_L + Y_R \quad (49)$$
$$= (X_L \cdot H_{LL} + X_R \cdot H_{RL}) + (X_L \cdot H_{LR} + X_R \cdot H_{RR})$$
$$= X_L(H_{LL} + H_{LR}) + X_R(H_{RL} + H_{RR})$$

$$Y_S = Y_L - Y_R \quad (50).$$
$$= (X_L \cdot H_{LL} + X_R \cdot H_{RL}) - (X_L \cdot H_{LR} + X_R \cdot H_{RR})$$
$$= X_L(H_{LL} - H_{LR}) + X_R(H_{RL} - H_{RR}).$$

When the composite transfer functions are given as $$H_{LM} = H_{LL} + H_{LR}$$

$$H_{RM} = H_{RL} + H_{RR}$$

$$H_{LS} = H_{LL} - H_{LR}$$

$$H_{RS} = H_{RL} - H_{RR}$$

then $$X_L = (X_M + X_S)/2$$

$$X_R = (X_M - X_S)/2$$

hence, the equations (49) and (50) respectively become $$Y_M = (X_M + X_S)H_{LM}/2 + (X_M - X_S)H_{RM}/2$$
$$= X_M(H_{LM} + H_{RM})/2 + X_S(H_{LM} - H_{RM})/2$$

$$Y_S = (X_M + X_S)H_{LS}/2 + (X_M - X_S)H_{RS}/2$$
$$= X_M(H_{LS} + H_{RS})/2 + X_S(H_{LS} - H_{RS})/2$$

thus $$2Y_M = X_M(H_{LM} + H_{RM}) + X_S(H_{LM} - H_{RM}) \quad (49')$$

$$2Y_S = X_M(H_{LS} + H_{RS}) + X_S(H_{LS} - H_{RS}) \quad (50')$$

When both sides of the equations (49') and (50') are multiplied by complex conjugates $X_M^*$ and $X_S^*$ of $X_M$ and $X_S$ and ensemble-averaged, $$\Sigma X_M^* \cdot Y_M = \Sigma X_M^* \cdot X_M(H_{LM} + H_{RM}) + \Sigma X_M^* \cdot X_S(H_{LM} - H_{RM}) \quad (51)$$

$$\Sigma X_S^* \cdot Y_M = \Sigma X_S^* \cdot X_M(H_{LM} + H_{RM}) + \Sigma X_S^* \cdot X_S(H_{LM} - H_{RM}) \quad (52)$$

$$\Sigma X_M^* \cdot Y_S = \Sigma X_M^* \cdot X_M(H_{LS} + H_{RS}) + \Sigma X_M^* \cdot X_S(H_{LS} - H_{RS}) \quad (53)$$

$$\Sigma X_S^* \cdot Y_S = \Sigma X_S^* \cdot X_M(H_{LS} + H_{RS}) + \Sigma X_M^* \cdot X_S(H_{LS} - H_{RS}) \quad (54)$$

are respectively obtained.

In the equations (51) to (54), since $X_M$ and $X_S$ are approximately uncorrelated with each other, such a term having $X_M^* \cdot X_S$ or $X_S^* \cdot X_M$ becomes approximately zero when ensemble-averaged. Further, $$X_M^* \cdot X_M = |X_M|^2$$

$$X_S^* \cdot X_S = |X_S|^2$$

hence, the equations (51) to (54) respectively become $$\Sigma X_M^* \cdot Y_M = \Sigma |X_M|^2 (H_{LM} + H_{RM}) \quad (51')$$

$$\Sigma X_S^* \cdot Y_M = \Sigma |X_S|^2 (H_{LM} - H_{RM}) \quad (52')$$

$$\Sigma X_M^* \cdot Y_S = \Sigma |X_M|^2 (H_{LS} + H_{RS}) \quad (53')$$

$$\Sigma X_S^* \cdot Y_S = \Sigma |X_S|^2 (H_{LS} - H_{RS}) \quad (54').$$

By transforming the equations (51') to (54'), the following composite transfer functions are respectively derived.

$$H_{LM} + H_{RM} = \Sigma X_M^* \cdot Y_M / \Sigma |X_M|^2 \quad (51'')$$

$$H_{LM} - H_{RM} = \Sigma X_S^* \cdot Y_M / \Sigma |X_S|^2 \quad (52'')$$

$$H_{LS} + H_{RS} = \Sigma X_M^* \cdot Y_S / \Sigma |X_M|^2 \quad (53'')$$

$$H_{LS} - H_{RS} = \Sigma X_S^* \cdot Y_S / \Sigma |X_S|^2 \quad (54'')$$

From the equations (51'') to (54''), $$H_{LM} = \Sigma X_M^* \cdot Y_M / \Sigma |X_M|^2 + \Sigma X_S^* \cdot Y_M / \Sigma |X_S|^2 \quad (55)$$

$$H_{RM} = \Sigma X_M^* \cdot Y_M / \Sigma |X_M|^2 - \Sigma X_S^* \cdot Y_M / \Sigma |X_S|^2 \quad (56)$$

$$H_{LS} = \Sigma X_M^* \cdot Y_S / \Sigma |X_M|^2 + \Sigma X_S^* \cdot Y_S / \Sigma |X_S|^2 \quad (57)$$

$$H_{RS} = \Sigma X_M^* \cdot Y_S / \Sigma |X_M|^2 - \Sigma X_S^* \cdot Y_S / \Sigma |X_S|^2 \quad (58)$$

are respectively derived.

Impulse responses $h_{LM}$, $h_{RM}$, $h_{LS}$ and $h_{RS}$ obtained by applying the inverse Fourier transformation to these derived composite transfer functions $H_{LM}$, $H_{RM}$, $H_{LS}$ and $H_{RS}$ are the filter characteristics to be set to the filter means 240-1, 240-2, 240-3 and 240-4, respectively. Therefore, the transfer function calculating means 258 derives the respective composite transfer functions $H_{LM}$, $H_{RM}$, $H_{LS}$ and $H_{RS}$ from the equations (55) to (58) based on the sum signal $x_M$ and the difference signal $x_S$ inputted into the line input ends LI(L) and LI(R) and the sum signal $y_M$ and the difference signal $y_S$ outputted from the sum/difference signal producing means 272, derives the impulse responses $h_{LM}$, $h_{RM}$, $h_{LS}$ and $h_{RS}$ by applying the inverse Fourier transformation to those derived composite transfer functions, sets the derived impulse responses to the filter means 240-1, 240-2, 240-3 and 240-4, respectively, and further, updates the impulse responses by repeating this calculation per suitably determined prescribed time period (e.g. time period of performing ensemble averaging).

(In Case of Adaptive Type Operation)

The signals $e_M$ and $e_S$ outputted from the subtracters 248 and 250, assuming that frequency-axis expressions of $e_M$ and $e_S$ are respectively given as $E_M$ and $E_S$ and the filter characteristics set to the filter means 240-1, 240-2, 240-3 and 240-4 are given as $\hat{H}_{LM}$, $\hat{H}_{RM}$, $\hat{H}_{LS}$ and $\hat{H}_{RS}$ ($\hat{h}_{LM}$, $\hat{h}_{RM}$, $\hat{h}_{LS}$ and $\hat{h}_{RS}$ when expressed in terms of the impulse responses), become $$E_M = \{L(H_{LL} + H_{LR}) + X_R(H_{RL} + H_{RR})\} - \quad (59)$$
$$(X_L \cdot \hat{H}_{LM} + X_R \cdot \hat{H}_{RM})$$
$$= L\{(H_{LL} + H_{LR}) - \hat{H}_{LM}\} + X_R\{(H_{RL} + H_{RR}) - \hat{H}_{RM}\}$$

$$E_S = \{L(H_{LL} - H_{LR}) + X_R(H_{RL} - H_{RR})\} - \quad (60)$$
$$(X_L \cdot \hat{H}_{LS} + X_R \cdot \hat{H}_{RS})$$
$$= L\{(H_{LL} - H_{LR}) - \hat{H}_{LS}\} + X_R\{(H_{RL} - H_{RR}) - \hat{H}_{RS}\}$$

When the composite transfer functions are given as $$H_{LM} = H_{LL} + H_{LR}$$

$$H_{RM} = H_{RL} + H_{RR}$$

$$H_{LS} = H_{LL} - H_{LR}$$

$H_{RS}=H_{RL}-H_{RR}$ then $X_L=(X_M+X_S)/2$ $X_R=(X_M-X_S)/2$ hence, the equations (59) and (60) respectively become $E_M=(X_M+X_S)\cdot(H_{LM}-H'_{LM})/2+(X_M-X_S)\cdot(H_{RM}-H'_{RM})/2$ (61)

$E_S=(X_M+X_S)\cdot(H_{LS}-H'_{LS})/2+(X_M-X_S)\cdot(H_{RS}-H'_{RS})/2$ (62).

When the estimated errors of the composite transfer functions are given as $\Delta H_{LM}=H_{LM}-H'_{LM}$ $\Delta H_{RM}=H_{RM}-H'_{RM}$ $\Delta H_{LS}=H_{LS}-H'_{LS}$ $\Delta H_{RS}=H_{RS}-H'_{RS}$ the equations (61) and (62) respectively become $E_M=X_M(\Delta H_{LM}+\Delta H_{RM})/2+X_S(\Delta H_{LM}-\Delta H_{RM})/2$ $E_S=X_M(\Delta H_{LS}+\Delta H_{RS})/2+X_S(\Delta H_{LS}-\Delta H_{RS})/2$ hence $2E_M=X_M(\Delta H_{LM}+\Delta H_{RM})+X_S(\Delta H_{LM}-\Delta H_{RM})$ (61')

$2E_S=X_M(\Delta H_{LS}+\Delta H_{RS})+X_S(\Delta H_{LS}-\Delta H_{RS})$ (62').

When both sides of the equations (61') and (62') are multiplied by complex conjugates $X_M^*$ and $X_S^*$ of $X_M$ and $X_S$ and ensemble-averaged, $\Sigma X_M^*\cdot 2E_M=\Sigma X_M^*\cdot X_M(\Delta H_{LM}+\Delta H_{RM})+\Sigma X_M^*\cdot X_S(\Delta H_{LM}-\Delta H_{RM})$ (63)

$\Sigma X_S^*\cdot 2E_M=\Sigma X_S^*\cdot X_M(\Delta H_{LM}+\Delta H_{RM})+\Sigma X_S^*\cdot X_S(\Delta H_{LM}-\Delta H_{RM})$ (64)

$\Sigma X_M^*\cdot 2E_S=\Sigma X_M^*\cdot X_M(\Delta H_{LS}+\Delta H_{RS})+\Sigma X_M^*\cdot X_S(\Delta H_{LS}-\Delta H_{RS})$ (65)

$\Sigma X_S^*\cdot 2E_S=\Sigma X_S^*\cdot X_M(\Delta H_{LS}+\Delta H_{RS})+\Sigma X_S^*\cdot X_S(\Delta H_{LS}-\Delta H_{RS})$ (66)

are respectively obtained.

In the equations (63) to (66), since $X_M$ and $X_S$ are approximately uncorrelated with each other, such a term having $X_M^*\cdot X_S$ or $X_S^*\cdot X_M$ becomes approximately zero when ensemble-averaged. Further, $X_M^*\cdot X_M=|X_M|^2$ $X_S^*\cdot X_S=|X_S|^2$ hence, the equations (63) to (66) respectively become $\Sigma X_M^*\cdot 2E_M=\Sigma|X_M|^2(\Delta H_{LM}+H_{RM})$ (63')

$\Sigma X_S^*\cdot 2E_M=\Sigma|X_S|^2(\Delta H_{LM}-H_{RM})$ (64')

$\Sigma X_M^*\cdot 2E_S=\Sigma|X_M|^2(\Delta H_{LS}+H_{RS})$ (65')

$\Sigma X_S^*\cdot 2E_S=\Sigma|X_S|^2(\Delta H_{LS}-H_{RS})$ (66').

By transforming the equations (63') to (66'), the following composite transfer functions are respectively derived.

$\Delta H_{LM}+\Delta H_{RM}=\Sigma X_M^*\cdot 2E_M/\Sigma|X_M|^2$ (63'')

$\Delta H_{LM}-\Delta H_{RM}=\Sigma X_S^*\cdot 2E_M/\Sigma|X_S|^2$ (64'')

$\Delta H_{LS}+\Delta H_{RS}=\Sigma X_M^*\cdot 2E_S/\Sigma|X_M|^2$ (65'')

$\Delta H_{LS}-\Delta H_{RS}=\Sigma X_S^*\cdot 2E_S/\Sigma|X_S|^2$ (66'')

From the equations (63'') to (66''), $\Delta H_{LM}=\Sigma X_M^*\cdot 2E_M/\Sigma|X_M|^2+\Sigma_S^*\cdot 2E_M/\Sigma|X_S|^2$ (67)

$\Delta H_{RM}=\Sigma X_M^*\cdot 2E_M/\Sigma|X_M|^2-\Sigma_S^*\cdot 2E_M/\Sigma|X_S|^2$ (68)

$\Delta H_{LS}=\Sigma X_M^*\cdot 2E_S/\Sigma|X_M|^2+\Sigma_S^*\cdot 2E_S/\Sigma|X_S|^2$ (69)

$\Delta H_{RS}=\Sigma X_M^*\cdot 2E_S/\Sigma|X_M|^2-\Sigma_S^*\cdot 2E_S/\Sigma|X_S|^2$ (70)

are respectively derived.

Using the estimated errors $\Delta H_{LM}$, $\Delta H_{RM}$, $\Delta H_{LS}$ and $\Delta H_{RS}$ derived from the equations (67) to (70), the filter characteristics of the filter means 240-1, 240-2, 240-3 and 240-4 are updated per suitably determined prescribed time period (e.g. time period of performing ensemble averaging). For example, assuming that impulse responses $h_{LM}$, $h_{RM}$, $h_{LS}$ and $h_{RS}$ after K-th updating are given as $h_{LM}(k)$, $h_{RM}(k)$, $h_{LS}(k)$ and $h_{RS}(k)$, using impulse responses $\Delta h_{LM}$, $\Delta h_{RM}$, $\Delta h_{LS}$ and $\Delta h_{RS}$ corresponding to the derived estimated errors $\Delta H_{LM}$, $\Delta H_{RM}$, $\Delta H_{LS}$ and $\Delta H_{RS}$, $h_{LM}(k+1)=h_{LM}(k)+\alpha\Delta h_{LM}$ (71)

$h_{RM}(k+1)=h_{RM}(k)+\alpha\Delta h_{RM}$ (72)

$h_{LS}(k+1)=h_{LS}(k)+\alpha\Delta h_{LS}$ (73)

$h_{RS}(k+1)=h_{RS}(k)+\alpha\Delta h_{RS}$ (74).

Using these updating equations, (k+1)th impulse responses $h_{LM}(k+1)$, $h_{RM}(k+1)$, $h_{LS}(k+1)$ and $h_{RS}(k+1)$ are derived and set to the filter means 240-1, 240-2, 240-3 and 240-4, respectively, which is repeated per suitably determined prescribed time period (e.g. time period of performing ensemble averaging).

Figure 17:
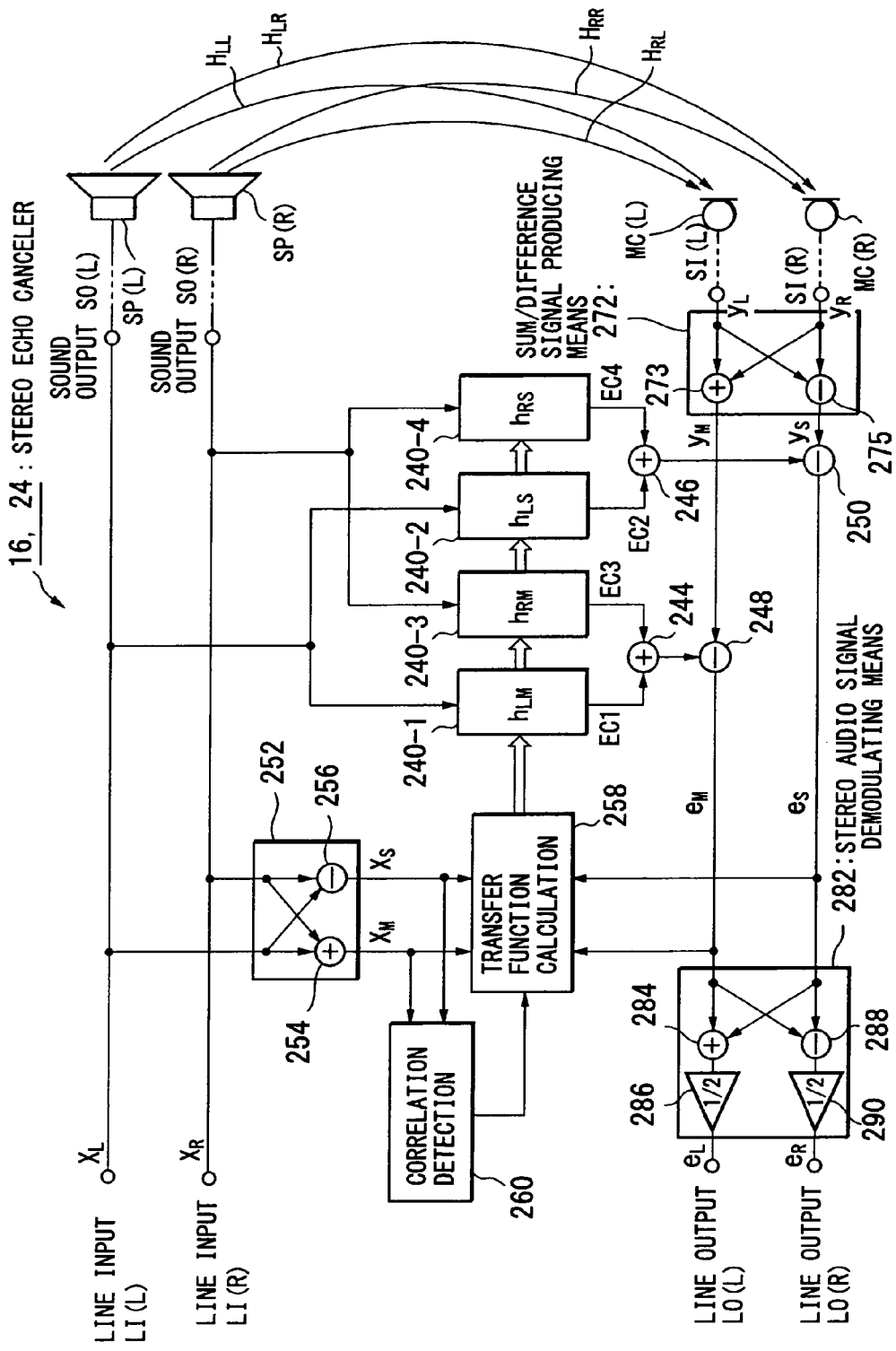
FIG. 17 is a block diagram showing another structural example in the stereo echo canceller 16, 24 of FIG. 2.

FIG. 17 shows another structural example in the stereo echo canceller 16, 24 of FIG. 2. The same symbols are used with respect to those portions common to the foregoing structure of FIG. 16. Left/right two-channel stereo signals $x_L$ and $x_R$ transmitted from the spot on the counterpart side and inputted into line input ends LI(L) and LI(R) are outputted from sound output ends SO(L) and SO(R) as they are (i.e. not through sum/difference signal producing means 252), and reproduced at loudspeakers SP(L) and SP(R), respectively. The sum/difference signal producing means 252 performs addition of such stereo signals $x_L$ and $x_R$ using an adder 254 so as to produce a sum signal $x_M(=x_L+x_R)$, while performs subtraction thereof using a subtracter 256 so as to produce a difference signal $x_S\{=x_L-x_R$ (or it may also be $x_R-x_L)\}$.

Transfer function calculating means 258 implements a cross-spectrum calculation between the sum signal $x_M$ and the difference signal $x_S$ produced by the sum/difference signal producing means 252 and signals $e_M$ and $e_S$ outputted from subtracters 248 and 250 and, based on this cross-spectrum calculation, performs setting and updating of filter characteristics of the filter means 240-1 to 240-4. Operations thereof are the same as those described with respect to the structure of FIG. 16. The signals $e_M$ and $e_S$ outputted from the subtracters 248 and 250 are inputted into stereo audio signal demodulating means 282. The stereo audio signal demodulating means 282 performs addition of the signals $e_M$ and $e_S$ using an adder 284, and further, gives thereto a coefficient ½ using a coefficient multiplier 286 to recover a left-channel signal $e_L$, while performs subtraction of the signals $e_M$ and $e_S$ using a subtracter 288, and further, gives thereto a coefficient ½ using a coefficient multiplier 290 to recover a right-channel signal $e_R$. The recovered signals $e_L$ and $e_R$ are respectively outputted from line output ends LO(L) and LO(R) and transmitted toward the spot on the counterpart side. Operations of the other portions are the same as those described with respect to the structure of FIG. 16.

Figure 18:
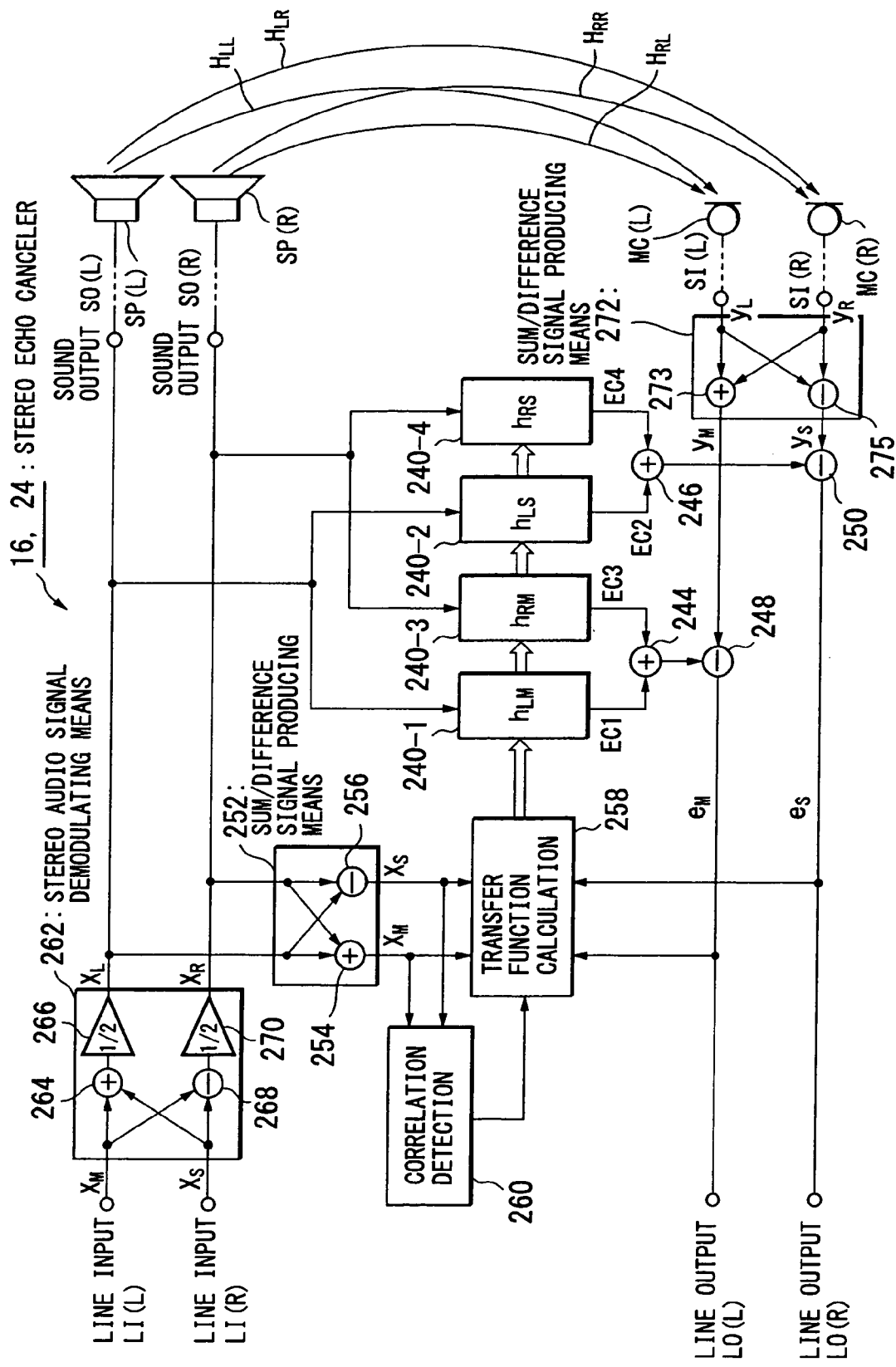
FIG. 18 is a block diagram showing another structural example in the stereo echo canceller 16, 24 of FIG. 2.

FIG. 18 shows another structural example in the stereo echo canceller 16, 24 of FIG. 2. The same symbols are used with respect to those portions common to the foregoing structure of FIG. 16 or 17. A sum signal $x_M(=x_L+x_R)$ and a difference signal $x_S\{=x_L-x_R$ (or it may also be $x_R-x_L)\}$ transmitted from the spot on the counterpart side and inputted into line input ends LI(L) and LI(R) are inputted into stereo audio signal demodulating means 262. The stereo audio signal demodulating means 262 performs addition of the sum and difference signals $x_M$ and $x_S$ using an adder 264, and further, gives thereto a coefficient ½ using a coefficient multiplier 266 to recover the original signal $x_L$, while performs subtraction of the sum and difference signals $x_M$ and $x_S$ using a subtracter 268, and further, gives thereto a coefficient ½ using a coefficient multiplier 270 to recover the original signal $x_R$. The recovered signals $x_L$ and $x_R$ are outputted from sound output ends SO(L) and SO(R) and reproduced at loudspeakers SP(L) and SP(R), respectively. Sum/difference signal producing means 252 performs addition of such stereo signals $x_L$ and $x_R$ using an adder 254 so as to produce a sum signal $x_M(=x_L+x_R)$, while performs subtraction thereof using a subtracter 256 so as to produce a difference signal $x_S\{=x_L-x_R$ (or it may also be $x_R-x_L)\}$.

Transfer function calculating means 258 implements a cross-spectrum calculation between the sum signal $x_M$ and the difference signal $x_S$ produced by the sum/difference signal producing means 252 and signals $e_M$ and $e_S$ outputted from subtracters 248 and 250 and, based on this cross-spectrum calculation, performs setting and updating of filter characteristics of filter means 240-1 to 240-4. Operations thereof are the same as those described with respect to the structure of FIG. 16 or 17. The signals $e_M$ and $e_S$ outputted from the subtracters 248 and 250 are respectively outputted from line output ends LO(L) and LO(R) and transmitted toward the spot on the counterpart side. Operations of the other portions are the same as those described with respect to the structure of FIG. 16 or 17.

Figure 19:
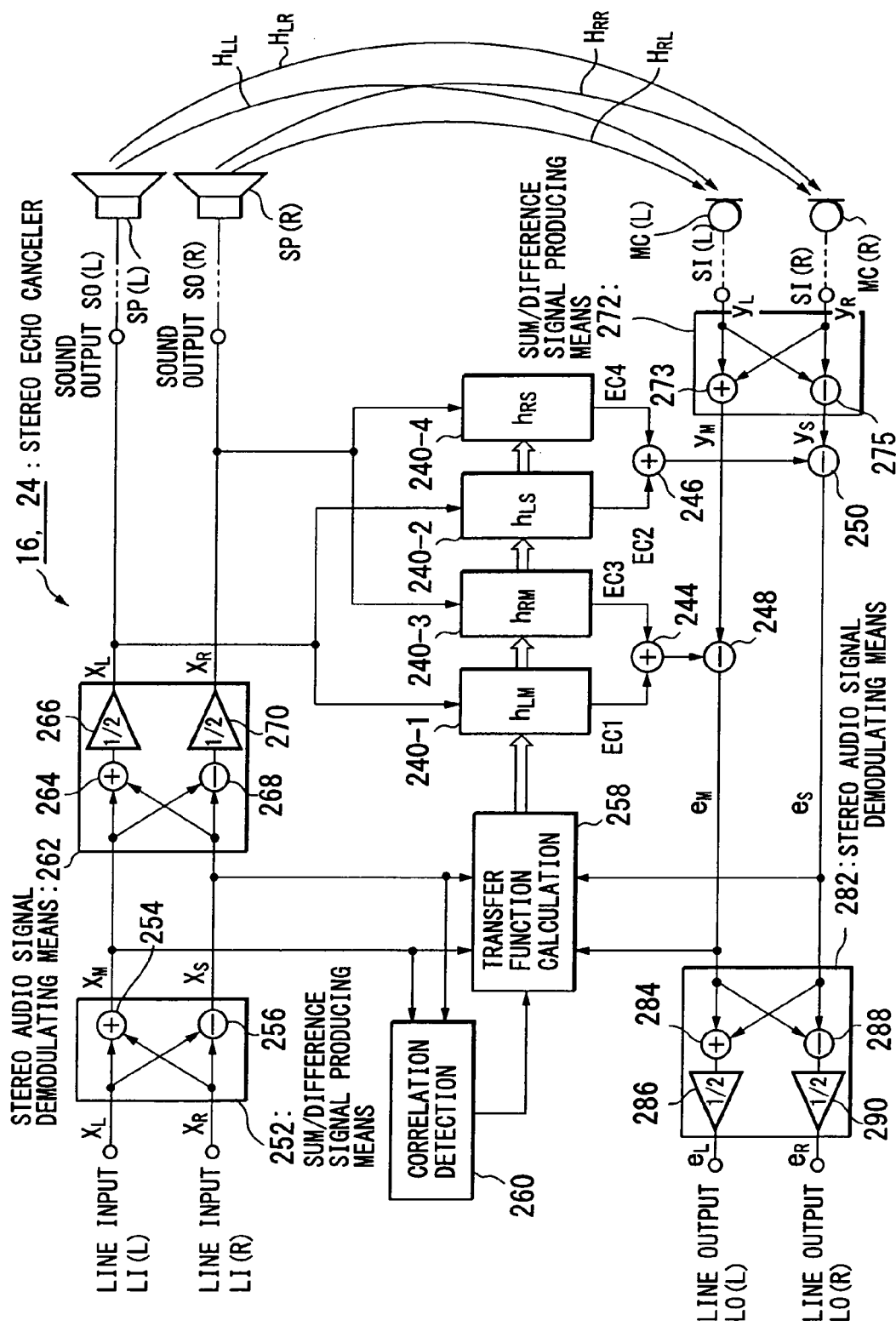
FIG. 19 is a block diagram showing another structural example in the stereo echo canceller 16, 24 of FIG. 2.

FIG. 19 shows another structural example in the stereo echo canceller 16, 24 of FIG. 2. The same symbols are used with respect to those portions common to the foregoing structure of FIG. 16, 17 or 18. Left/right two-channel stereo signals $x_L$ and $x_R$ transmitted from the spot on the counterpart side and inputted into line input ends LI(L) and LI(R) are inputted into sum/difference signal producing means 252. The sum/difference signal producing means 252 performs addition of the stereo signals $x_L$ and $x_R$ using an adder 254 so as to produce a sum signal $x_M(=x_L+x_R)$, while performs subtraction thereof using a subtracter 256 so as to produce a difference signal $x_S\{=x_L-x_R$ (or it may also be $x_R-x_L)\}$. The produced sum signal $x_M$ and difference signal $x_S$ are inputted into stereo audio signal demodulating means 262. The stereo audio signal demodulating means 262 performs addition of the sum and difference signals $x_M$ and $x_S$ using an adder 264, and further, gives thereto a coefficient ½ using a coefficient multiplier 266 to recover the original signal $x_L$, while performs subtraction of the sum and difference signals $x_m$ and $x_S$ using a subtracter 268, and further, gives thereto a coefficient ½ using a coefficient multiplier 270 to recover the original signal $x_R$. The recovered signals $x_L$ and $x_R$ are outputted from sound output ends SO(L) and SO(R) and reproduced at loudspeakers SP(L) and SP(R), respectively.

Transfer function calculating means 258 implements a cross-spectrum calculation between the sum signal $x_M$ and the difference signal $x_S$ produced by the sum/difference signal producing means 252 and signals $e_M$ and $e_S$ outputted from subtracters 248 and 250 and, based on this cross-spectrum calculation, performs setting and updating of filter characteristics of the filter means 240-1 to 240-4. Operations thereof are the same as those described with respect to the structure of FIG. 16, 17 or 18. The signals $e_M$ and $e_S$ outputted from the subtracters 248 and 250 are inputted into stereo audio signal demodulating means 282. The stereo audio signal demodulating means 282 performs addition of the signals $e_M$ and $e_S$ using an adder 284, and further, gives thereto a coefficient ½ using a coefficient multiplier 286 to recover a left-channel signal $e_L$, while performs subtraction of the signals $e_M$ and $e_S$ using a subtracter 288, and further, gives thereto a coefficient ½ using a coefficient multiplier 290 to recover a right-channel signal $e_R$. The recovered signals $e_L$ and $e_R$ are respectively outputted from line output ends LO(L) and LO(R) and transmitted toward the spot on the counterpart side. Operations of the other portions are the same as those described with respect to the structure of FIG. 16, 17 or 18.

Figure 20:
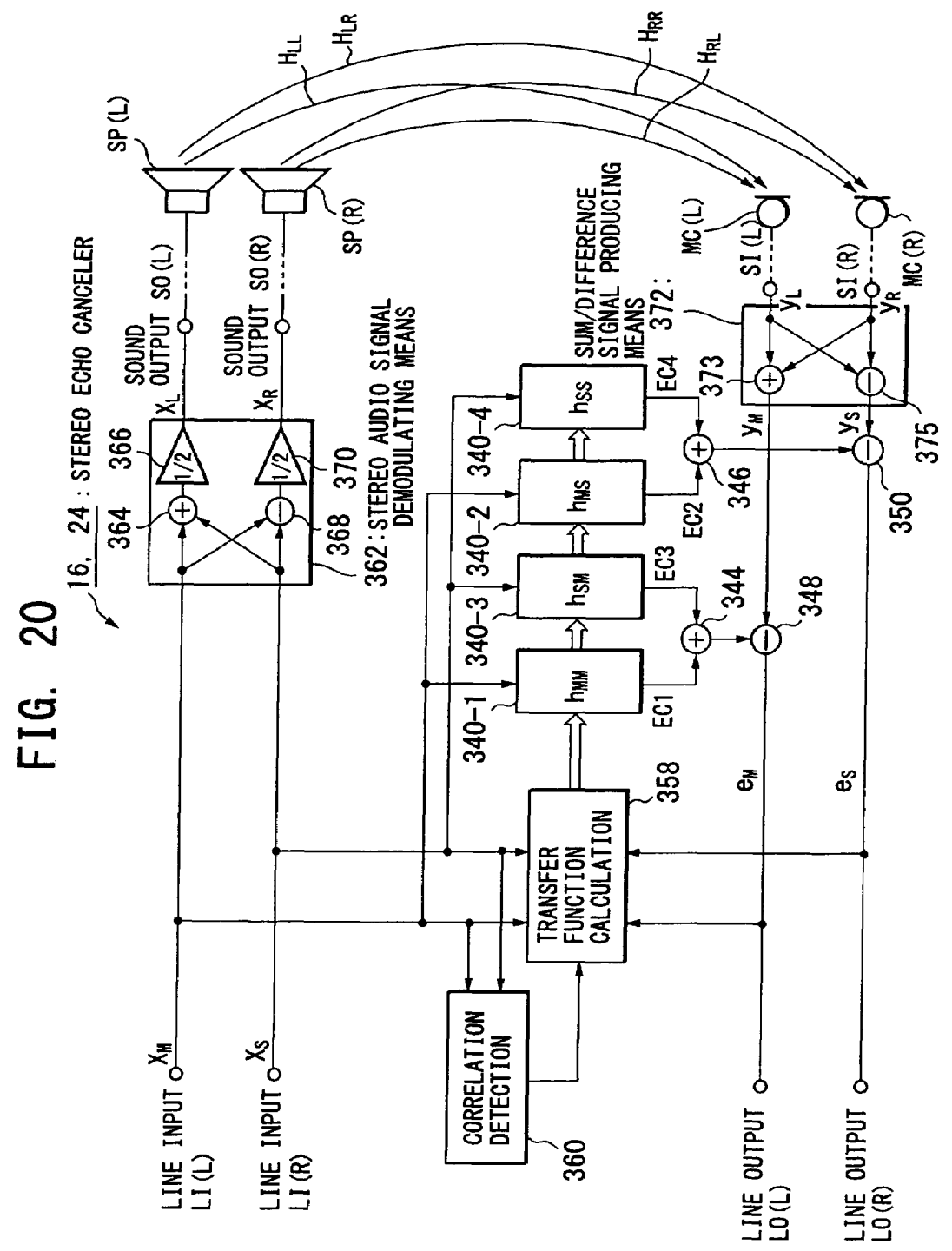

FIG. 20 shows another structural example in the stereo echo canceller 16, 24. A sum signal $x_M(=x_L+x_R)$ and a difference signal $x_S\{=x_L-x_R$ (or it may also be $x_R-x_L)\}$ transmitted from the spot on the counterpart side and inputted into line input ends LI(L) and LI(R) are inputted into stereo audio signal demodulating means 362. The stereo audio signal demodulating means 362 performs addition of the sum and difference signals $x_M$ and $x_S$ using an adder 364, and further, gives thereto a coefficient ½ using a coefficient multiplier 366 to recover the original signal $x_L$, while performs subtraction of the sum and difference signals $x_M$ and $x_S$ using a subtracter 368, and further, gives thereto a coefficient ½ using a coefficient multiplier 370 to recover the original signal $x_R$. The recovered signals $x_L$ and $x_R$ are outputted from sound output ends SO(L) and SO(R) and reproduced at loudspeakers SP(L) and SP(R), respectively.

Collected audio signals $y_L$ and $y_R$ of microphones MC(L) and MC(R) are inputted into sum/difference signal producing means 372. The sum/difference signal producing means 372 implements addition of the microphone collected audio signals $y_L$ and $y_R$ using an adder 373 so as to produce a sum signal $y_M$, while implements subtraction thereof using a subtracter 375 so as to produce a difference signal $y_S$.

Filer means 340-1 to 340-4 are formed by, for example, FIR filters. These filter means 340-1 to 340-4 are each set with an impulse response corresponding to a composite transfer function in the form of combination of transfer functions $H_{LL}$, $H_{LR}$, $H_{RL}$ and $H_{RR}$ of four audio transfer systems between the loudspeakers SP(L) and SP(R) and microphones MC(L) and MC(R), respectively, and perform, using such impulse responses, a convolution calculation of the sum signal $x_M$ and the difference signal $x_S$ inputted from the line input ends LI(L) and LI(R), thereby producing echo cancel signals EC1 to EC4, respectively.

An adder 344 performs a calculation of EC1+EC3. An adder 346 performs a calculation of EC2+EC4. A subtracter 348 subtracts an echo cancel signal EC1+EC3 from the sum signal $y_M$, thereby to perform echo cancellation. A subtracter 350 subtracts an echo cancel signal EC2+EC4 from the difference signal $y_S$, thereby to perform echo cancellation. Signals $e_M$ and $e_S$ outputted from the subtracters 348 and 350 are outputted from line output ends LO(L) and LO(R), respectively, and transmitted toward the spot on the counterpart side.

Transfer function calculating means 358 implements a cross-spectrum calculation between the sum signal $x_M$ and the difference signal $x_S$ inputted from the line input ends LI(L) and LI(R) and the signals $e_M$ and $e_S$ outputted from the subtracters 348 and 350 and, based on this cross-spectrum calculation, performs setting and updating of filter characteristics (impulse responses) of the filter means 340-1 to 340-4. Specifically, upon starting the system, the filter characteristics of the filter means 340-1 to 340-4 are not set, i.e. coefficients are all set to zero, so that the echo cancel signals EC1 to EC4 are zero, and thus the sum signal $y_M$ and the difference signal $y_S$ outputted from the sum/difference signal producing means 372, as they are, are outputted from the subtracters 348 and 350. Therefore, at this time, the transfer function calculating means 358 performs the cross-spectrum calculation between the sum signal $x_M$ and the difference signal $x_S$ inputted from the line input ends LI(L) and LI(R) and the sum signal $e_M$ and the difference signal $e_S$ outputted from the subtracters 348 and 350 and, based on this cross-spectrum calculation, derives a plurality of composite transfer functions each in the form of combination of transfer functions $H_{LL}$, $H_{LR}$, $H_{RL}$ and $H_{RR}$ of four audio transfer systems between the loudspeakers SP(L) and SP(R) and the microphones MC(L) and MC(R), respectively, and implements initial setting of the filter characteristics of the filter means 340-1 to 340-4 to values corresponding to such composite transfer functions. After the initial setting, since the echo cancel signals are produced by the filter means 340-1 to 340-4, the echo cancel error signals $e_M$ and $e_S$ corresponding to difference signals between the sum signal $y_M$ and the difference signal $y_S$ outputted from the sum/difference signal producing means 372 and the echo cancel signals EC1 to EC4 are outputted from the subtracters 348 and 350. Therefore, at this time, the transfer function calculating means 358 performs the cross-spectrum calculation between the sum signal $x_M$ and the difference signal $x_S$ inputted from the line input ends LI(L) and LI(R) and the echo cancel error signals $e_M$ and $e_S$ outputted from the subtracters 348 and 350 and, based on this cross-spectrum calculation, derives estimated errors of the foregoing composite transfer functions, respectively, and updates the filter characteristics of the filter means 340-1 to 340-4 to values that cancel such estimated errors, respectively. By repeating this updating operation per prescribed time period, the echo cancel error can be converged to a minimum value. Further, even if the transfer functions change due to movement of the microphone positions or the like, the echo cancel error can be converged to a minimum value by sequentially updating the filter characteristics of the filter means 340-1 to 340-4 depending thereon.

Correlation detecting means 360 detects a correlation between the sum signal $x_M$ and the difference signal $x_S$ based on a correlation value calculation or the like, and stops updating of the foregoing filter characteristics when the correlation value is no less than a prescribed value. When the correlation value becomes lower than the prescribed value, updating of the foregoing filter characteristics is restarted.

Herein, the filter characteristics (impulse responses) that are set to the filter means 340-1 to 340-4 by the transfer function calculating means 358 will be described. In the transfer function calculating means 358, the following calculation is performed.

(In Case of Fixed Type Operation)

The sum and difference signals $y_M$ and $y_S$ of the output signals $y_L$ and $y_R$ of the microphones MC(L) and MC(R) become $$Y_M = Y_L + Y_R \qquad (71)$$
$$= (X_L \cdot H_{LL} + X_R \cdot H_{RL}) + (X_L \cdot H_{LR} + X_R \cdot H_{RR})$$
$$= X_L(H_{LL} + H_{LR}) + X_R(H_{RL} + H_{RR})$$

$$Y_S = Y_L - Y_R \qquad (72)$$
$$= (X_L \cdot H_{LL} + X_R \cdot H_{RL}) - (X_L \cdot H_{LR} + X_R \cdot H_{RR})$$
$$= X_L(H_{LL} - H_{LR}) + X_R(H_{RL} - H_{RR}).$$

$$X_L = (X_M + X_S)/2$$

$$X_R = (X_M - X_S)/2$$

hence, the equations (71) and (72) respectively become $$Y_M = (X_M + X_S) \cdot (H_{LL} + H_{LR})/2 + \qquad (71')$$
$$(X_M - X_S) \cdot (H_{RL} + H_{RR})/2$$
$$= X_M(H_{LL} + H_{LR} + H_{RL} + H_{RR})/2 +$$
$$X_S(H_{LL} + H_{LR} - H_{RL} - H_{RR})/2$$

$$Y_S = (X_M + X_S) \cdot (H_{LL} - H_{LR})/2 + \qquad (72')$$
$$(X_M - X_S) \cdot (H_{RL} - H_{RR})/2$$
$$= X_M(H_{LL} - H_{LR} + H_{RL} - H_{RR})/2 +$$
$$X_S(H_{LL} - H_{LR} - H_{RL} + H_{RR})/2$$

When the composite transfer functions are given as $$H_{MM} = (H_{LL} + H_{LR} + H_{RL} + H_{RR})/2$$

$$H_{SM} = (H_{LL} + H_{LR} - H_{RL} - H_{RR})/2$$

$$H_{MS} = (H_{LL} - H_{LR} + H_{RL} - H_{RR})/2$$

$$H_{SS} = (H_{LL} - H_{LR} - H_{RL} + H_{RR})/2$$

the equations (71') and (72') respectively become $$Y_M = X_M \cdot H_{MM} + X_S \cdot H_{SM} \qquad (71'')$$

$$Y_S = X_M \cdot H_{MS} + X_S \cdot H_{SS} \qquad (72'').$$

When both sides of the equations (71'') and (72'') are multiplied by complex conjugates $X_M^*$ and $X_S^*$ of $X_M$ and $X_S$ and ensemble-averaged, $$\Sigma X_M^* \cdot Y_M = \Sigma X_M^* \cdot X_M \cdot H_{MM} + \Sigma X_M^* \cdot X_S \cdot H_{SM} \qquad (73)$$

$$\Sigma X_S^* \cdot Y_M = \Sigma X_S^* \cdot X_M \cdot H_{MM} + \Sigma X_S^* \cdot X_S \cdot H_{SM} \qquad (74)$$

$$\Sigma X_M^* \cdot Y_S = \Sigma X_M^* \cdot X_M \cdot H_{MS} + \Sigma X_M^* \cdot X_S \cdot H_{SS} \qquad (75)$$

$$\Sigma X_S^* \cdot Y_S = \Sigma X_M^* \cdot X_M \cdot H_{MS} + \Sigma X_S^* \cdot X_S \cdot H_{SS} \qquad (76)$$

are respectively obtained.

In the equations (73) to (76), since $X_M$ and $X_S$ are approximately uncorrelated with each other, such a term having $X_M^* \cdot X_S$ or $X_S^* \cdot X_M$ becomes approximately zero when ensemble-averaged. Further, $$X_M^* \cdot X_M = |X_M|^2$$

$$X_S^* \cdot X_S = |X_S|^2$$

hence, the equations (73) to (76) respectively become $$\Sigma X_M^* \cdot Y_M = \Sigma |X_M|^2 \cdot H_{MM} \qquad (73')$$

$$\Sigma X_S^* \cdot Y_M = \Sigma |X_S|^2 \cdot H_{SM} \qquad (74')$$

$$\Sigma X_M^* \cdot Y_S = \Sigma |X_M|^2 \cdot H_{MS} \quad (75')$$

$$\Sigma X_S^* \cdot Y_S = \Sigma |X_S|^2 \cdot H_{SS} \quad (76').$$

From the equations (73') to (76'), $$H_{MM} = \Sigma X_M^* \cdot Y_M / \Sigma |X_M|^2 \quad (77)$$

$$H_{SM} = \Sigma X_S^* \cdot Y_M / \Sigma |X_S|^2 \quad (78)$$

$$H_{MS} = \Sigma X_M^* \cdot Y_S / \Sigma |X_M|^2 \quad (79)$$

$$H_{SS} = \Sigma X_S^* \cdot Y_S / \Sigma |X_S|^2 \quad (80)$$

are respectively derived.

Impulse responses $h_{MM}$, $h_{SM}$, $h_{MS}$ and $h_{SS}$ obtained by applying the inverse Fourier transformation to these derived composite transfer functions $H_{MM}$, $H_{SM}$, $H_{MS}$ and $H_{SS}$ are the filter characteristics to be set to the filter means 340-1, 340-2, 340-3 and 340-4, respectively. Therefore, the transfer function calculating means 358 derives the respective composite transfer functions $H_{MM}$, $H_{SM}$, $H_{MS}$ and $H_{SS}$ from the equations (77) to (80) based on the sum signal $x_M$ and the difference signal $x_S$ inputted into the line input ends LI(L) and LI(R) and the sum signal $y_M$ and the difference signal $y_S$ outputted from the sum/difference signal producing means 372, derives the impulse responses $h_{MM}$, $h_{SM}$, $h_{MS}$ and $h_{SS}$ by applying the inverse Fourier transformation to those derived composite transfer functions, sets the derived impulse responses to the filter means 340-1, 340-2, 340-3 and 340-4, respectively, and further, updates the impulse responses by repeating this calculation per suitably determined prescribed time period (e.g. time period of performing ensemble averaging).

(In Case of Adaptive Type Operation)

Assuming that the filter characteristics set to the filter means 340-1, 340-2, 340-3 and 340-4 are given as $H\hat{}_{MM}$, $H\hat{}_{SM}$, $H\hat{}_{MS}$ and $H\hat{}_{SS}$ ($h\hat{}_{MM}$, $h\hat{}_{SM}$, $h\hat{}_{MS}$ and $h\hat{}_{SS}$ when expressed in terms of the impulse responses), the signals $e_M$ and $e_S$ outputted from the subtracters 348 and 350 become $$E_M = \{(X_M + X_S) \cdot (H_{LL} + H_{LR})/2 + (X_M - X_S) \cdot \quad (81)$$
$$(H_{RL} + H_{RR})/2\} - (X_M \cdot H\hat{}_{MM} + X_S \cdot H\hat{}_{SM})$$
$$= X_M[\{(H_{LL} + H_{LR} + H_{RL} + H_{RR})/2\} - H\hat{}_{MM}] +$$
$$X_S[\{(H_{LL} + H_{LR} - H_{RL} - H_{RR})/2\} - H\hat{}_{SM}]$$

$$E_S = \{(X_M + X_S) \cdot (H_{LL} - H_{LR})/2 + (X_M - X_S) \cdot \quad (82)$$
$$(H_{RL} - H_{RR})/2\} - (X_M \cdot H\hat{}_{MS} + X_S \cdot H\hat{}_{SS})$$
$$= X_M[\{(H_{LL} - H_{LR} + H_{RL} - H_{RR})/2\} - H\hat{}_{MS}] +$$
$$X_S[\{(H_{LL} - H_{LR} - H_{RL} + H_{RR})/2\} - H\hat{}_{SS}]$$

When the composite transfer functions are given as $$H_{MM} = (H_{LL} + H_{LR} + H_{RL} + H_{RR})/2$$

$$H_{SM} = (H_{LL} + H_{LR} - H_{RL} - H_{RR})/2$$

$$H_{MS} = (H_{LL} - H_{LR} + H_{RL} - H_{RR})/2$$

$$H_{SS} = (H_{LL} - H_{LR} - H_{RL} + H_{RR})/2$$

the equations (81) and (82) respectively become $$E_M = X_M(H_{MM} - H\hat{}_{MM}) + X_S(H_{SM} - H\hat{}_{SM}) \quad (81')$$

$$(82') \quad E_S = X_M(H_{MS} - H\hat{}_{MS}) + X_S(H_{SS} - H\hat{}_{SS})$$

When $$\Delta H_{MM} = H_{MM} - H\hat{}_{MM}$$

$$\Delta H_{SM} = H_{SM} - H\hat{}_{SM}$$

$$\Delta H_{MS} = H_{MS} - H\hat{}_{MS}$$

$$\Delta H_{SS} = H_{SS} - H\hat{}_{SS}$$

are given, the equations (81') and (82') respectively become $$E_M = X_M \cdot \Delta H_{MM} + X_S \cdot \Delta H_{SM} \quad (81'')$$

$$E_S = X_M \cdot \Delta H_{MS} + X_S \cdot \Delta H_{SS} \quad (82'').$$

When both sides of the equations (81'') and (82'') are multiplied by complex conjugates $X_M^*$ and $X_S^*$ of $X_M$ and $X_S$ and ensemble-averaged, $$\Sigma X_M^* \cdot E_M = \Sigma X_M^* \cdot X_M \cdot \Delta H_{MM} + \Sigma X_M^* \cdot X_S \cdot \Delta H_{SM} \quad (83)$$

$$\Sigma X_S^* \cdot E_M = \Sigma X_S^* \cdot X_M \cdot \Delta H_{MM} + \Sigma X_S^* \cdot X_S \cdot \Delta H_{SM} \quad (84)$$

$$\Sigma X_M^* \cdot E_S = \Sigma X_M^* \cdot X_M \cdot \Delta H_{MS} + \Sigma X_M^* \cdot X_S \cdot \Delta H_{SS} \quad (85)$$

$$\Sigma X_S^* \cdot E_S = \Sigma X_S^* \cdot X_M \cdot \Delta H_{MS} + \Sigma X_S^* \cdot X_S \cdot \Delta H_{SS} \quad (86)$$

are respectively obtained.

In the equations (83) to (86), since $X_M$ and $X_S$ are approximately uncorrelated with each other, such a term having $X_M^* \cdot X_S$ or $X_S^* \cdot X_M$ becomes approximately zero when ensemble-averaged. Further, $$X_M^* \cdot X_M = |X_M|^2$$

$$X_S^* \cdot X_S = |X_S|^2$$

hence, the equations (83) to (86) respectively become $$\Sigma X_M^* \cdot E_M = \Sigma |X_M|^2 \cdot \Delta H_{MM} \quad (83')$$

$$\Sigma X_S^* \cdot E_M = \Sigma |X_S|^2 \cdot \Delta H_{SM} \quad (84')$$

$$\Sigma X_M^* \cdot E_S = \Sigma |X_M|^2 \cdot \Delta H_{MS} \quad (85')$$

$$\Sigma X_S^* \cdot E_S = \Sigma |X_S|^2 \cdot \Delta H_{SS} \quad (86').$$

From the equations (83') to (86'), $$\Delta H_{MM} = \Sigma X_M^* \cdot E_M / \Sigma |X_M|^2 \quad (87)$$

$$\Delta H_{SM} = \Sigma X_S^* \cdot E_M / \Sigma |X_S|^2 \quad (88)$$

$$\Delta H_{MS} = \Sigma X_M^* \cdot E_S / \Sigma |X_M|^2 \quad (89)$$

$$\Delta H_{SS} = \Sigma X_S^* \cdot E_S / \Sigma |X_S|^2 \quad (90)$$

are respectively derived.

Using the estimated errors $\Delta H_{MM}$, $\Delta H_{SM}$, $\Delta H_{MS}$ and $\Delta H_{SS}$ derived from the equations (87) to (90), the filter characteristics of the filter means 340-1, 340-2, 340-3 and 340-4 are updated per suitably determined prescribed time period (e.g. time period of performing ensemble averaging). For example, assuming that impulse responses $h_{MM}$, $h_{SM}$, $h_{MS}$ and $h_{SS}$ after K-th updating are given as $h_{MM}(k)$, $h_{SM}(k)$, $h_{MS}(k)$ and $h_{SS}(k)$, using impulse responses $\Delta h_{MM}$, $\Delta h_{MS}$, $\Delta h_{MS}$ and $\Delta h_{SS}$ corresponding to the derived estimated errors $\Delta H_{MM}$, $\Delta H_{SM}$, $\Delta H_{MS}$ and $\Delta H_{SS}$, $$h_{MM}(k+1) = h_{MM}(k) + \alpha \Delta h_{MM} \quad (91)$$

$$h_{SM}(k+1) = h_{SM}(k) + \alpha \Delta h_{SM} \quad (92)$$

$$h_{MS}(k+1) = h_{MS}(k) + \alpha \Delta h_{MS} \quad (93)$$

$$h_{SS}(k+1) = h_{SS}(k) + \alpha \Delta h_{SS} \quad (94).$$

Using these updating equations, (k+1)th impulse responses $h_{MM}(k+1)$, $h_{SM}(k+1)$, $h_{MS}(k+1)$ and $h_{SS}(k+1)$ are derived and set to the filter means 340-1, 340-2, 340-3 and 340-4, respectively, which is repeated per suitably determined prescribed time period (e.g. time period of performing ensemble averaging).

Figure 21:
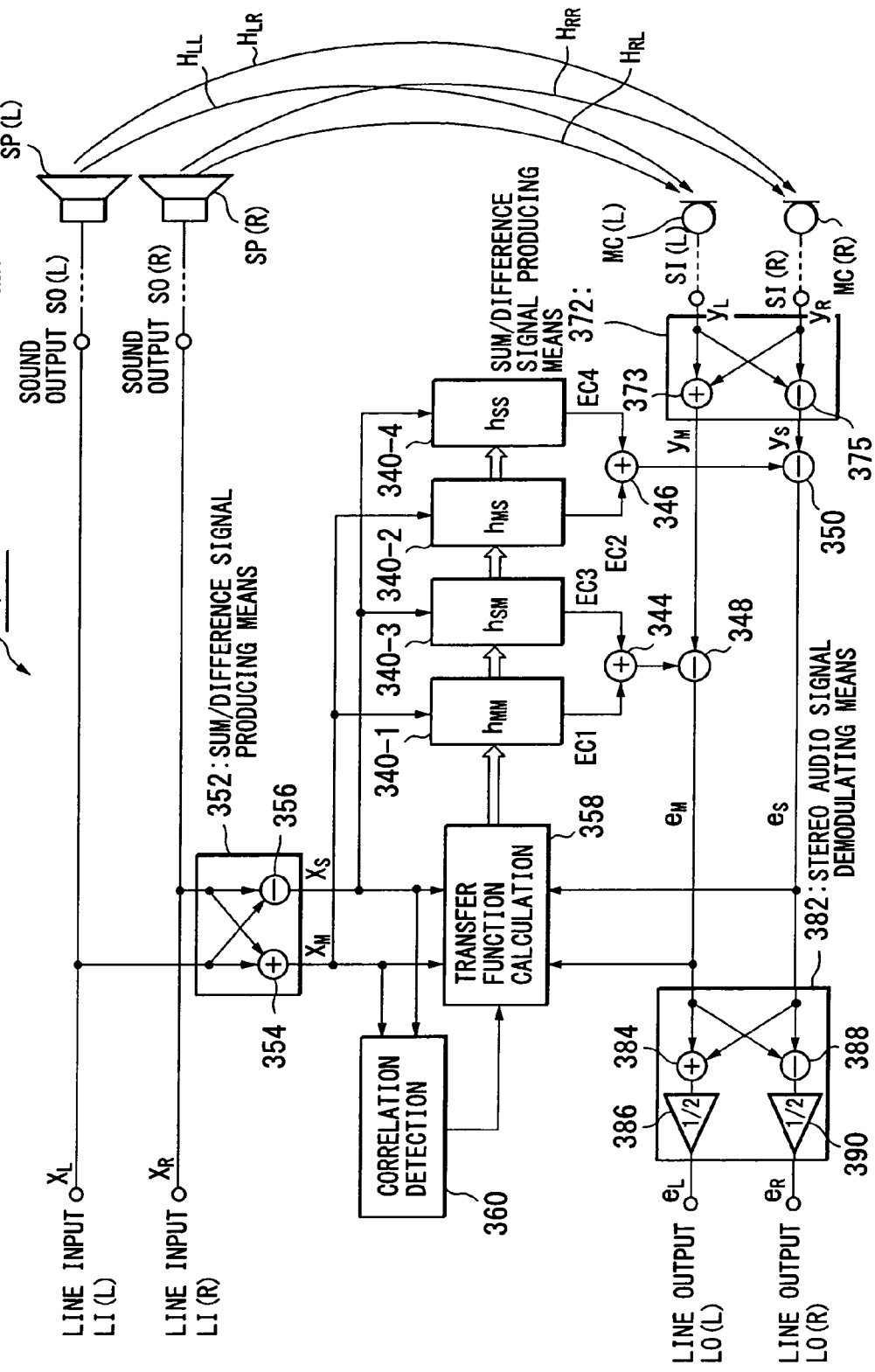
FIG. 21 is a block diagram showing another structural example in the stereo echo canceller 16, 24 of FIG. 2.

FIG. 21 shows another structural example in the stereo echo canceller 16, 24 of FIG. 2. The same symbols are used with respect to those portions common to the foregoing structure of FIG. 20. Left/right two-channel stereo signals $x_L$ and $x_R$ transmitted from the spot on the counterpart side and inputted into line input ends LI(L) and LI(R) are outputted from sound output ends SO(L) and SO(R) as they are (i.e. not through sum/difference signal producing means 352), and reproduced at loudspeakers SP(L) and SP(R), respectively. The sum/difference signal producing means 352 performs addition of such stereo signals $x_L$ and $x_R$ using an adder 354 so as to produce a sum signal $x_M(=x_L+x_R)$, while performs subtraction thereof using a subtracter 356 so as to produce a difference signal $x_S\{=x_L-x_R \text{ (or it may also be } x_R-x_L)\}$.

Transfer function calculating means 358 implements a cross-spectrum calculation between the sum signal $x_M$ and the difference signal $x_S$ produced by the sum/difference signal producing means 352 and signals $e_M$ and $e_S$ outputted from subtracters 348 and 350 and, based on this cross-spectrum calculation, performs setting and updating of filter characteristics of the filter means 340-1 to 340-4. Operations thereof are the same as those described with respect to the structure of FIG. 20. The signals $e_M$ and $e_S$ outputted from the subtracters 348 and 350 are inputted into stereo audio signal demodulating means 382. The stereo audio signal demodulating means 382 performs addition of the signals $e_M$ and $e_S$ using an adder 384, and further, gives thereto a coefficient ½ using a coefficient multiplier 386 to recover a left-channel signal $e_L$, while performs subtraction of the signals $e_M$ and $e_S$ using a subtracter 388, and further, gives thereto a coefficient ½ using a coefficient multiplier 390 to recover a right-channel signal $e_R$. The recovered signals $e_L$ and $e_R$ are respectively outputted from line output ends LO(L) and LO(R) and transmitted toward the spot on the counterpart side. Operations of the other portions are the same as those described with respect to the structure of FIG. 20.

Figure 22:
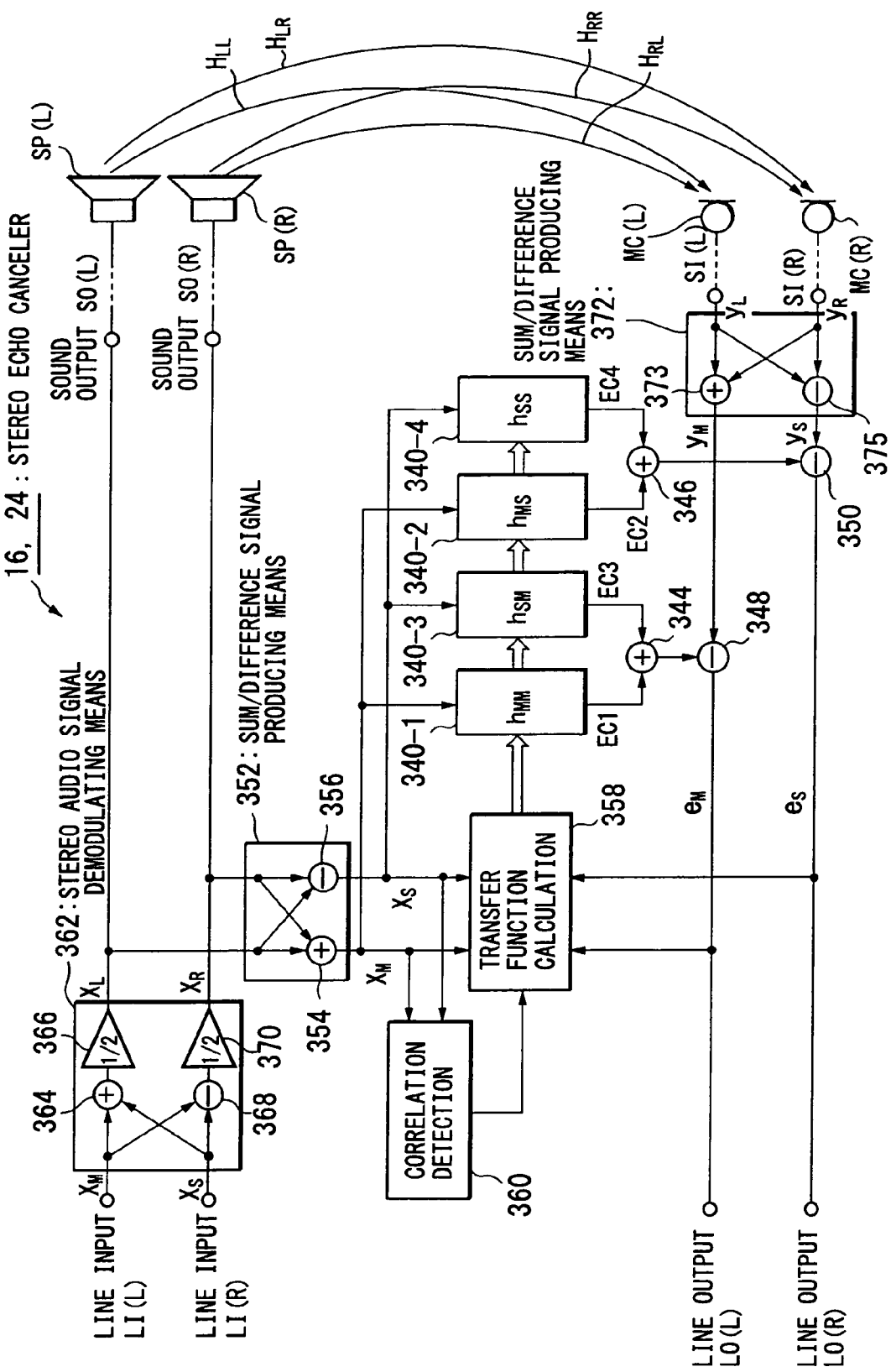
FIG. 22 is a block diagram showing another structural example in the stereo echo canceller 16, 24 of FIG. 2.

FIG. 22 shows another structural example in the stereo echo canceller 16, 24 of FIG. 2. The same symbols are used with respect to those portions common to the foregoing structure of FIG. 20 or 21. A sum signal $x_M(=x_L+x_R)$ and a difference signal $x_S\{=x_L-x_R \text{ (or it may also be } x_R-x_L)\}$ transmitted from the spot on the counterpart side and inputted into line input ends LI(L) and LI(R) are inputted into stereo audio signal demodulating means 362. The stereo audio signal demodulating means 362 performs addition of the sum and difference signals $x_M$ and $x_S$ using an adder 364, and further, gives thereto a coefficient ½ using a coefficient multiplier 366 to recover the original signal $x_L$, while performs subtraction of the sum and difference signals $x_M$ and $x_S$ using a subtracter 368, and further, gives thereto a coefficient ½ using a coefficient multiplier 370 to recover the original signal $x_R$. The recovered signals $x_L$ and $x_R$ are outputted from sound output ends SO(L) and SO(R) and reproduced at loudspeakers SP(L) and SP(R), respectively. Sum/difference signal producing means 352 performs addition of such stereo signals $x_L$ and $x_R$ using an adder 354 so as to produce a sum signal $x_M(=x_L+x_R)$, while performs subtraction thereof using a subtracter 356 so as to produce a difference signal $x_S\{=x_L-x_R$ (or it may also be $x_R-x_L)\}$.

Transfer function calculating means 358 implements a cross-spectrum calculation between the sum signal $x_M$ and the difference signal $x_S$ produced by the sum/difference signal producing means 352 and signals $e_M$ and $e_S$ outputted from subtracters 348 and 350 and, based on this cross-spectrum calculation, performs setting and updating of filter characteristics of filter means 340-1 to 340-4. Operations thereof are the same as those described with respect to the structure of FIG. 20 or 21. The signals $e_M$ and $e_S$ outputted from the subtracters 348 and 350 are respectively outputted from line output ends LO(L) and LO(R) and transmitted toward the spot on the counterpart side. Operations of the other portions are the same as those described with respect to the structure of FIG. 20 or 21.

Figure 23:
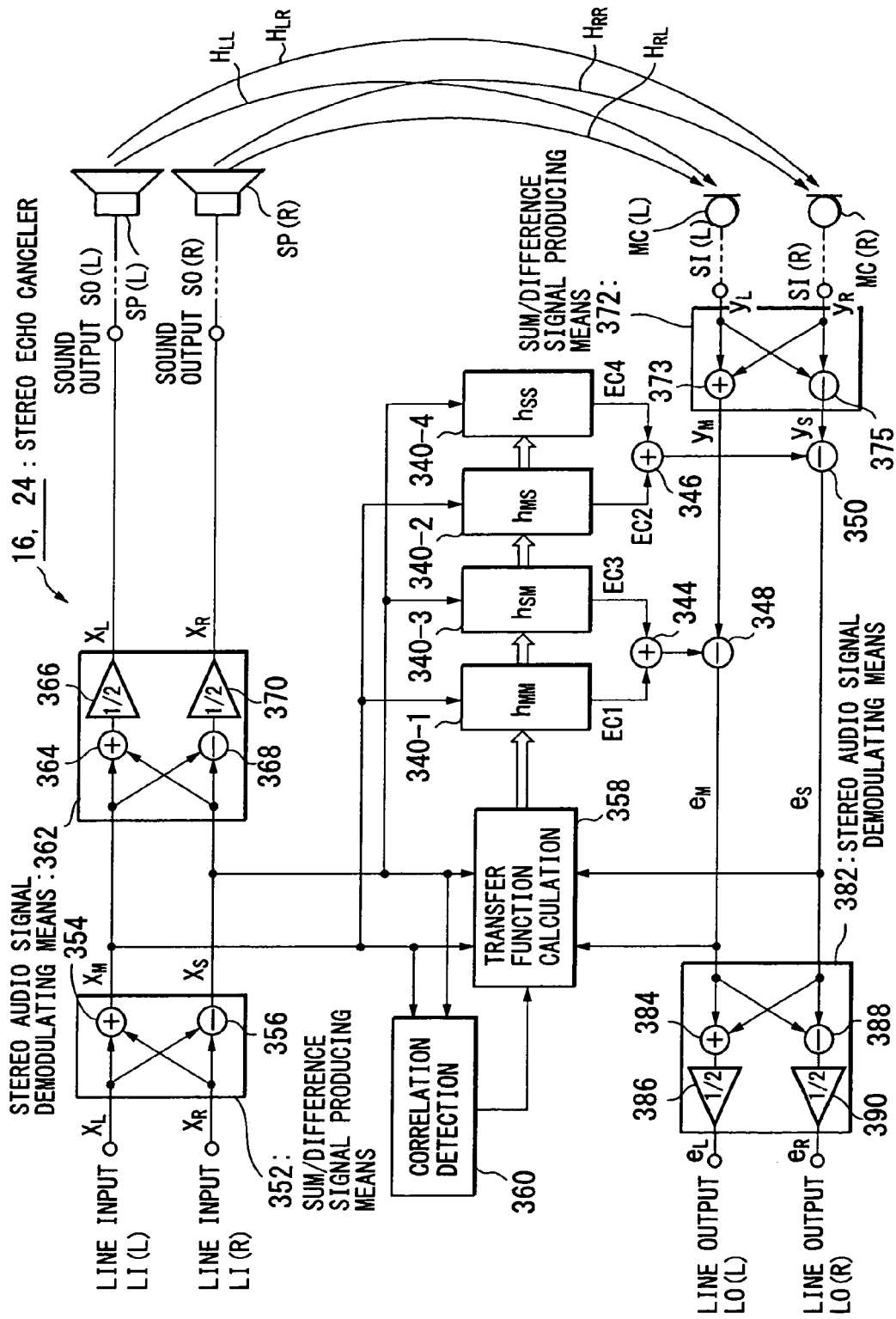
FIG. 23 is a block diagram showing another structural example in the stereo echo canceller 16, 24 of FIG. 2.

FIG. 23 shows another structural example in the stereo echo canceller 16, 24 of FIG. 2. The same symbols are used with respect to those portions common to the foregoing structure of FIG. 20, 21 or 22. Left/right two-channel stereo signals $x_L$ and $x_R$ transmitted from the spot on the counterpart side and inputted into line input ends LI(L) and LI(R) are inputted into sum/difference signal producing means 352. The sum/difference signal producing means 352 performs addition of the stereo signals $x_L$ and $x_R$ using an adder 354 so as to produce a sum signal $x_M(=x_L+x_R)$, while performs subtraction thereof using a subtracter 356 so as to produce a difference signal $x_S\{=x_L-x_R \text{ (or it may also be } x_R-x_L)\}$. The produced sum signal $x_M$ and difference signal $x_S$ are inputted into stereo audio signal demodulating means 362. The stereo audio signal demodulating means 362 performs addition of the sum and difference signals $x_M$ and $x_S$ using an adder 364, and further, gives thereto a coefficient ½ using a coefficient multiplier 366 to recover the original signal $x_L$, while performs subtraction of the sum and difference signals $x_M$ and $x_S$ using a subtracter 368, and further, gives thereto a coefficient ½ using a coefficient multiplier 370 to recover the original signal $x_R$. The recovered signals $x_L$ and $x_R$ are outputted from sound output ends SO(L) and SO(R) and reproduced at loudspeakers SP(L) and SP(R), respectively.

Transfer function calculating means 358 implements a cross-spectrum calculation between the sum signal $x_M$ and the difference signal $x_S$ produced by the sum/difference signal producing means 352 and signals $e_M$ and $e_S$ outputted from subtracters 348 and 350 and, based on this cross-spectrum calculation, performs setting and updating of filter characteristics of the filter means 340-1 to 340-4. Operations thereof are the same as those described with respect to the structure of FIG. 20, 21 or 22. The signals $e_M$ and $e_S$ outputted from the subtracters 348 and 350 are inputted into stereo audio signal demodulating means 382. The stereo audio signal demodulating means 382 performs addition of the signals $e_M$ and $e_S$ using an adder 384, and further, gives thereto a coefficient ½ using a coefficient multiplier 386 to recover a left-channel signal $e_L$, while performs subtraction of the signals $e_M$ and $e_S$ using a subtracter 388, and further, gives thereto a coefficient ½ using a coefficient multiplier 390 to recover a right-channel signal $e_R$. The recovered signals $e_L$ and $e_R$ are respectively outputted from line output ends LO(L) and LO(R) and transmitted toward the spot on the counterpart side. Operations of the other portions are the same as those described with respect to the structure of FIG. 20, 21 or 22.

Figure 24:
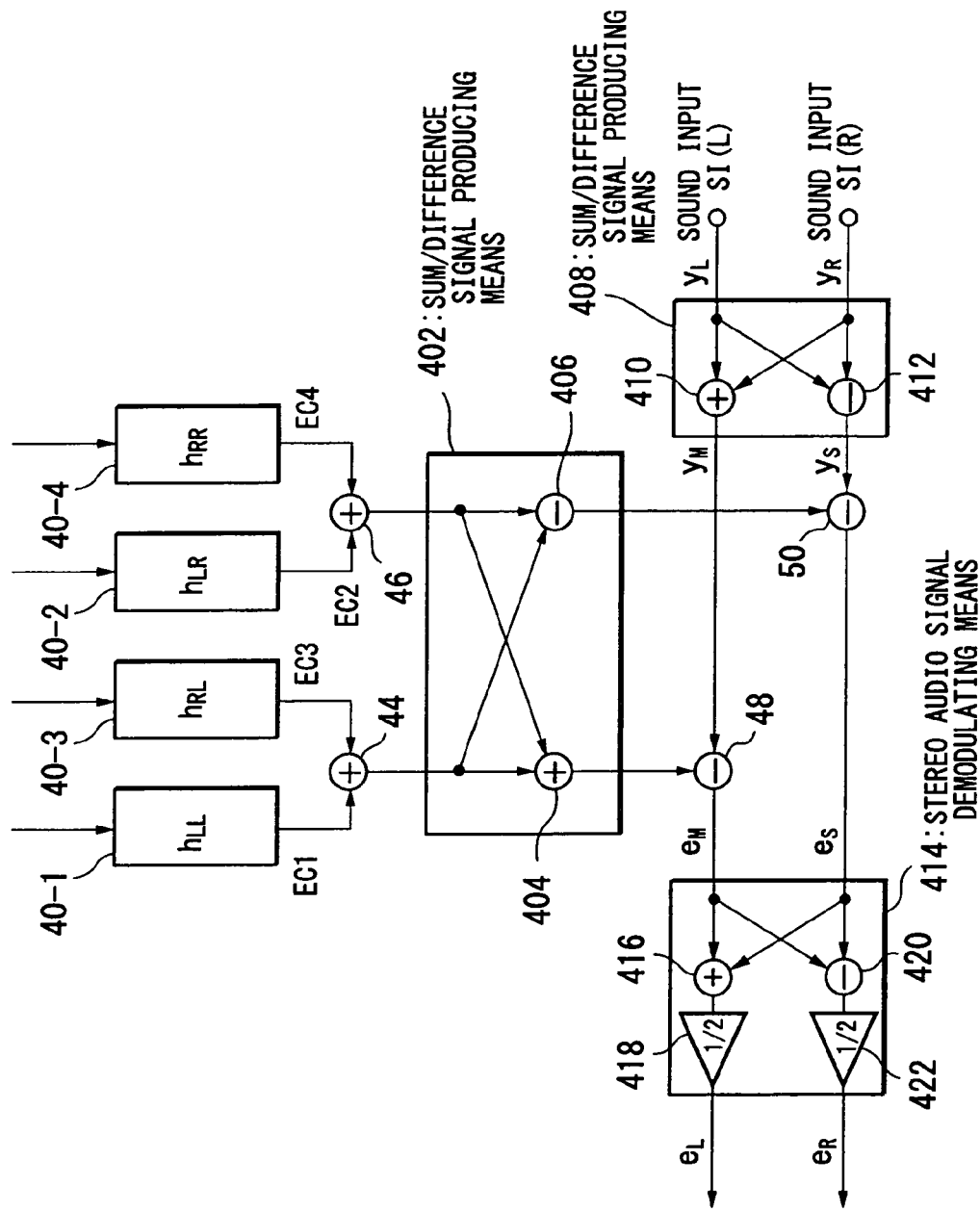
FIG. 24 is a block diagram showing a modification of the structures of FIGS. 1, 9 to 11.

This invention can take various structures in addition to the structures as shown in the foregoing embodiments. For example, part of the structures of FIGS. 1, 9 to 11 can be changed like FIG. 24. Specifically, sum/difference signal producing means 402 is disposed between the adders 44 and 46 and the subtracters 48 and 50, so as to perform addition of the echo cancel signals EC1+EC3 and EC2+EC4 using an adder 404 to produce an echo cancel signal (EC1+EC3)+(EC2+EC4), while perform subtraction thereof using a subtracter 406 to produce (EC1+EC3)−(EC2+EC4). Further, sum/difference signal producing means 408 is disposed between the sound input ends SI(L) and SI(R) and the subtracters 48 and 50, so as to perform addition of the collected audio signals $y_L$ and $y_R$ of the microphones MC(L) and MC(R) using an adder 410 to produce a sum signal $y_M$, while perform subtraction thereof using a subtracter 412 to produce a difference signal $y_S$. The subtracter 48 subtracts the echo cancel signal (EC1+EC3)+(EC2+EC4) from the sum signal $y_M$ to implement echo cancellation. The subtracter 50 subtracts the echo cancel signal (EC1+EC3)−(EC2+EC4) from the difference signal $y_S$ to implement echo cancellation. The signals $e_M$ and $e_S$ outputted from the subtracters 48 and 50 are inputted into stereo audio signal demodulating means 414. The stereo audio signal demodulating means 414 performs addition of the signals $e_M$ and $e_S$ using an adder 416, and further, gives thereto a coefficient ½ using a coefficient multiplier 418 to recover a left-channel signal $e_L$, while performs subtraction of the signals $e_M$ and $e_S$ using a subtracter 420, and further, gives thereto a coefficient ½ using a coefficient multiplier 422 to recover a right-channel signal $e_R$. The other portions are the same as those described with respect to the structures of FIGS. 1, 9 to 11.

Figure 25:
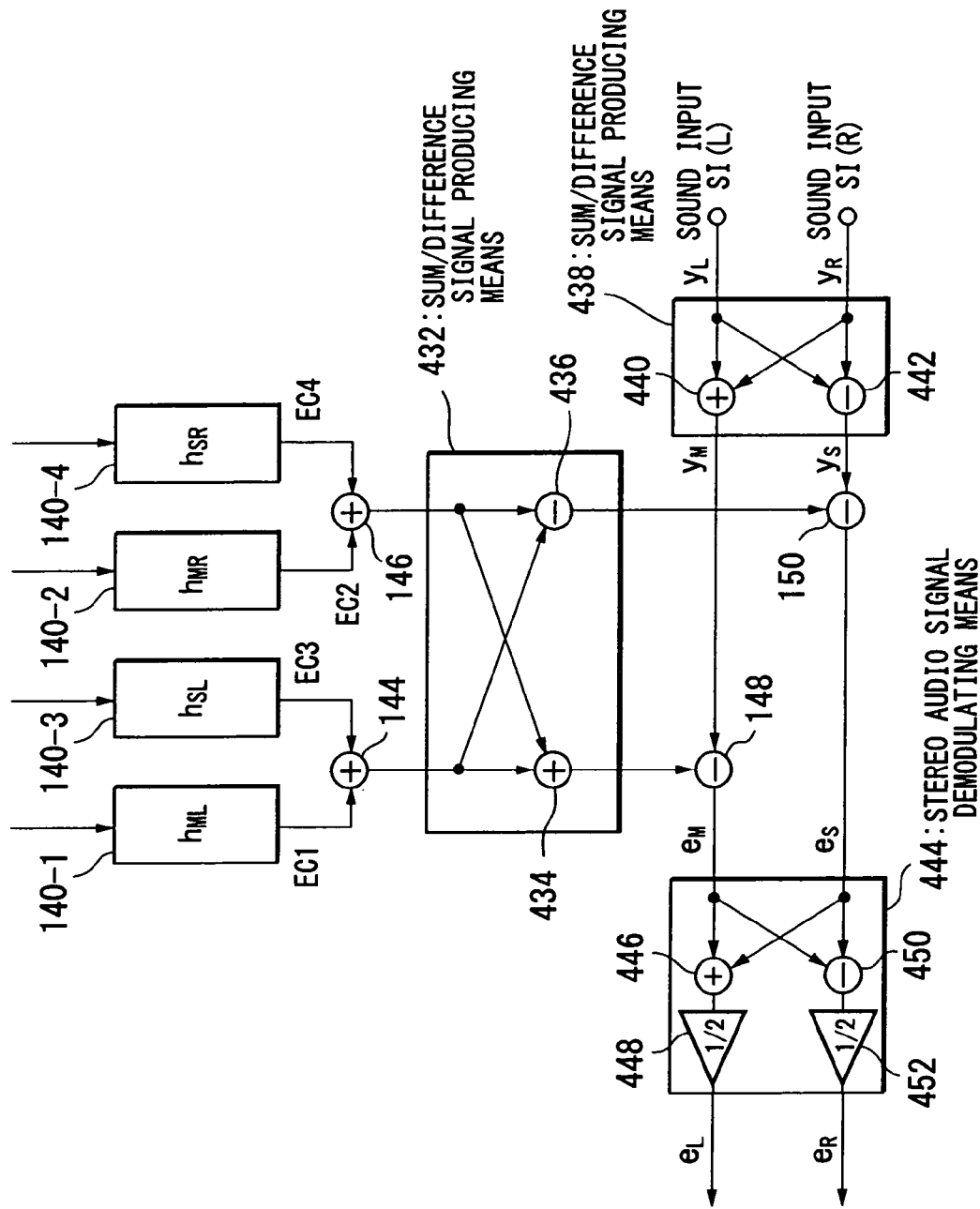
FIG. 25 is a block diagram showing a modification of the structures of FIGS. 12 to 15.

On the other hand, part of the structures of FIGS. 12 to 15 can be changed like FIG. 25. Specifically, sum/difference signal producing means 432 is disposed between the adders 144 and 146 and the subtracters 148 and 150, so as to perform addition of the echo cancel signals EC1+EC3 and EC2+EC4 using an adder 434 to produce an echo cancel signal (EC1+EC3)+(EC2+EC4), while perform subtraction thereof using a subtracter 436 to produce (EC1+EC3)−(EC2+EC4). Further, sum/difference signal producing means 438 is disposed between the sound input ends SI(L) and SI(R) and the subtracters 148 and 150, so as to perform addition of the collected audio signals $y_L$ and $y_R$ of the microphones MC(L) and MC(R) using an adder 440 to produce a sum signal $y_M$, while perform subtraction thereof using a subtracter 442 to produce a difference signal $y_S$. The subtracter 148 subtracts the echo cancel signal (EC1+EC3)+(EC2+EC4) from the sum signal $y_M$ to implement echo cancellation. The subtracter 150 subtracts the echo cancel signal (EC1+EC3)−(EC2+EC4) from the difference signal $y_S$ to implement echo cancellation. The signals $e_M$ and $e_S$ outputted from the subtracters 148 and 150 are inputted into stereo audio signal demodulating means 444. The stereo audio signal demodulating means 444 performs addition of the signals $e_M$ and $e_S$ using an adder 446, and further, gives thereto a coefficient ½ using a coefficient multiplier 448 to recover a left-channel signal $e_L$, while performs subtraction of the signals $e_M$ and $e_S$ using a subtracter 450, and further, gives thereto a coefficient ½ using a coefficient multiplier 452 to recover a right-channel signal $e_R$. The other portions are the same as those described with respect to the structures of FIGS. 12 to 15.

Figure 26:
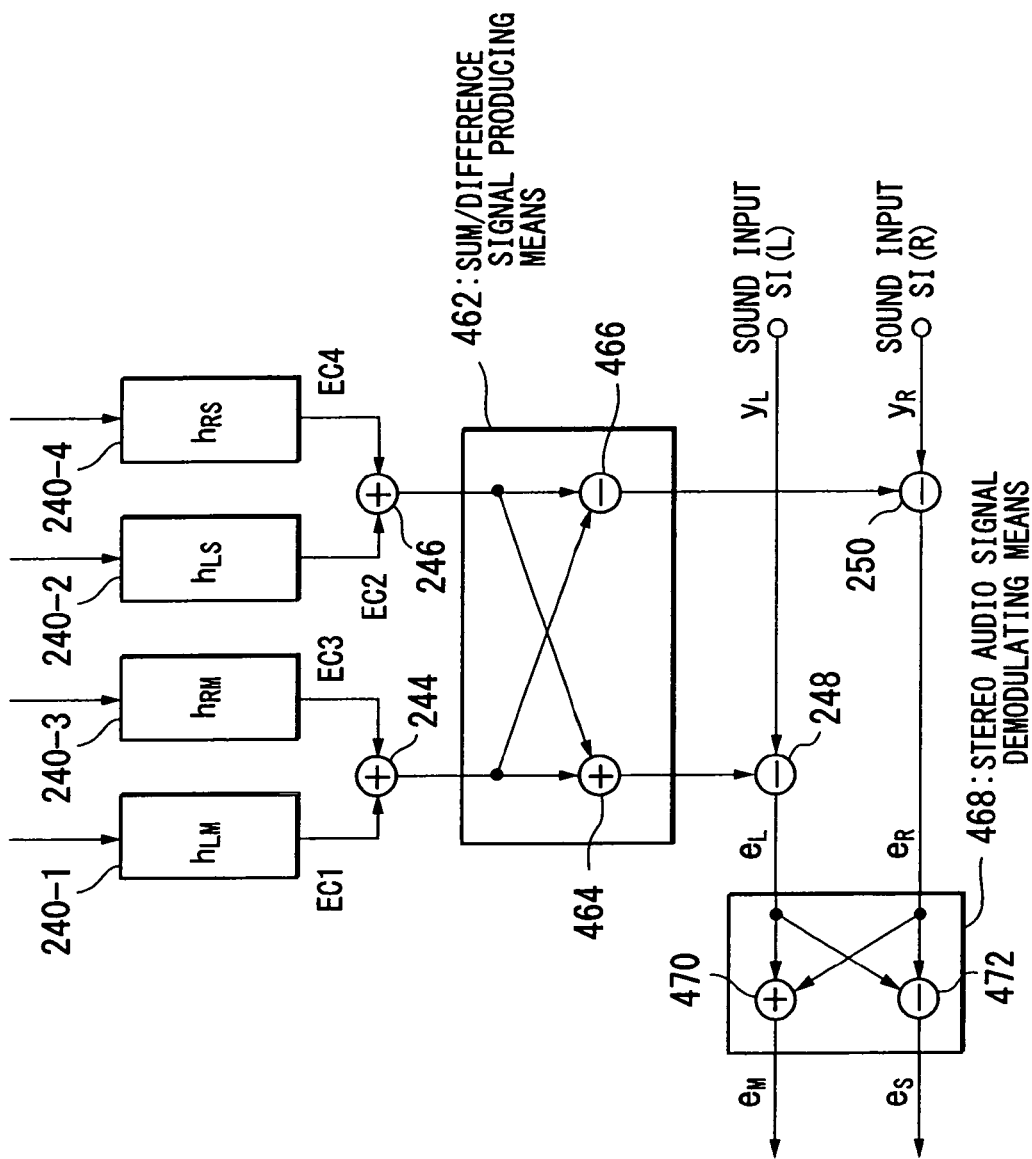
FIG. 26 is a block diagram showing a modification of the structures of FIGS. 16 to 19.

On the other hand, part of the structures of FIGS. 16 to 19 can be changed like FIG. 26. Specifically, sum/difference signal producing means 462 is disposed between the adders 244 and 246 and the subtracters 248 and 250, so as to perform addition of the echo cancel signals EC1+EC3 and EC2+EC4 using an adder 464 to produce an echo cancel signal (EC1+EC3)+(EC2+EC4), while perform subtraction thereof using a subtracter 466 to produce (EC1+EC3)−(EC2+EC4). The sum/difference signal producing means 272 of FIGS. 16 to 19 is not required. The subtracter 248 subtracts the echo cancel signal (EC1+EC3)+(EC2+EC4) from the collected audio signal $y_L$ of the microphone MC(L) to implement echo cancellation. The subtracter 250 subtracts the echo cancel signal (EC1+EC3)−(EC2+EC4) from the collected audio signal $y_R$ of the microphone MC(R) to implement echo cancellation. Sum/difference signal producing means 468 is disposed on the output side of the subtracters 248 and 250, so as to perform addition of the output signals $e_L$ and $e_R$ of the subtracters 248 and 250 using an adder 470 to produce a sum signal $e_M$, while perform subtraction thereof using a subtracter 472 to produce a difference signal $e_S$. The other portions are the same as those described with respect to the structures of FIGS. 16 to 19.

Figure 27:
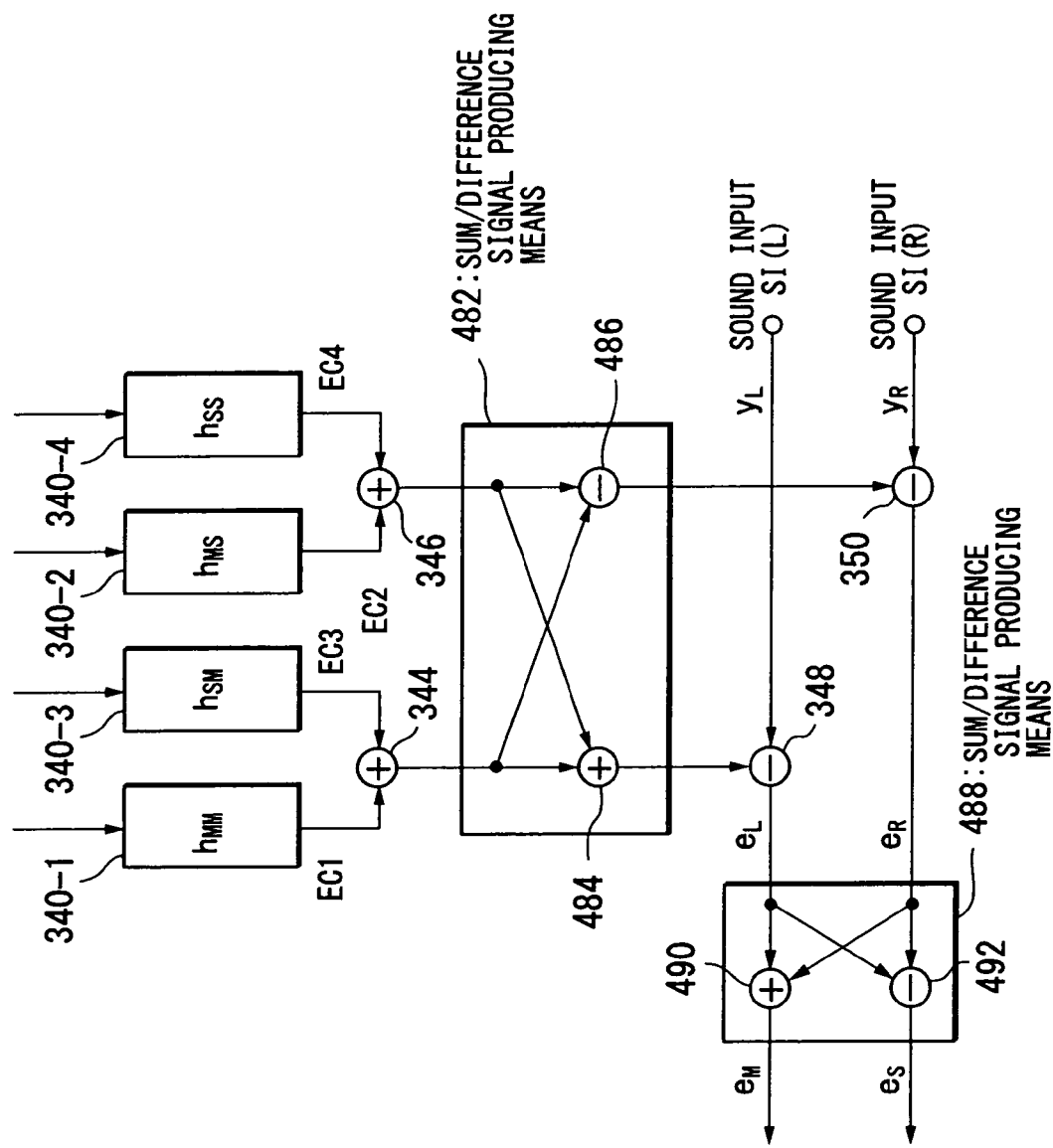
FIG. 27 is a block diagram showing a modification of the structures of FIGS. 20 and 21.

On the other hand, part of the structures of FIGS. 20 and 21 can be changed like FIG. 27. Specifically, sum/difference signal producing means 482 is disposed between the adders 344 and 346 and the subtracters 348 and 350, so as to perform addition of the echo cancel signals EC1+EC3 and EC2+EC4 using an adder 484 to produce an echo cancel signal (EC1+EC3)+(EC2+EC4), while perform subtraction thereof using a subtracter 486 to produce (EC1+EC3)−(EC2+EC4). The sum/difference signal producing means 372 of FIGS. 20 to 23 is not required. The subtracter 348 subtracts the echo cancel signal (EC1+EC3)+(EC2+EC4) from the collected audio signal $y_L$ of the microphone MC(L) to implement echo cancellation. The subtracter 350 subtracts the echo cancel signal (EC1+EC3)−(EC2+EC4) from the collected audio signal $y_R$ of the microphone MC(R) to implement echo cancellation. Sum/difference signal producing means 488 is disposed on the output side of the subtracters 348 and 350, so as to perform addition of the output signals $e_L$ and $e_R$ of the subtracters 348 and 350 using an adder 490 to produce a sum signal $e_M$, while perform subtraction thereof using a subtracter 492 to produce a difference signal $e_S$. The other portions are the same as those described with respect to the structures of FIGS. 20 to 23.

Figure 28:
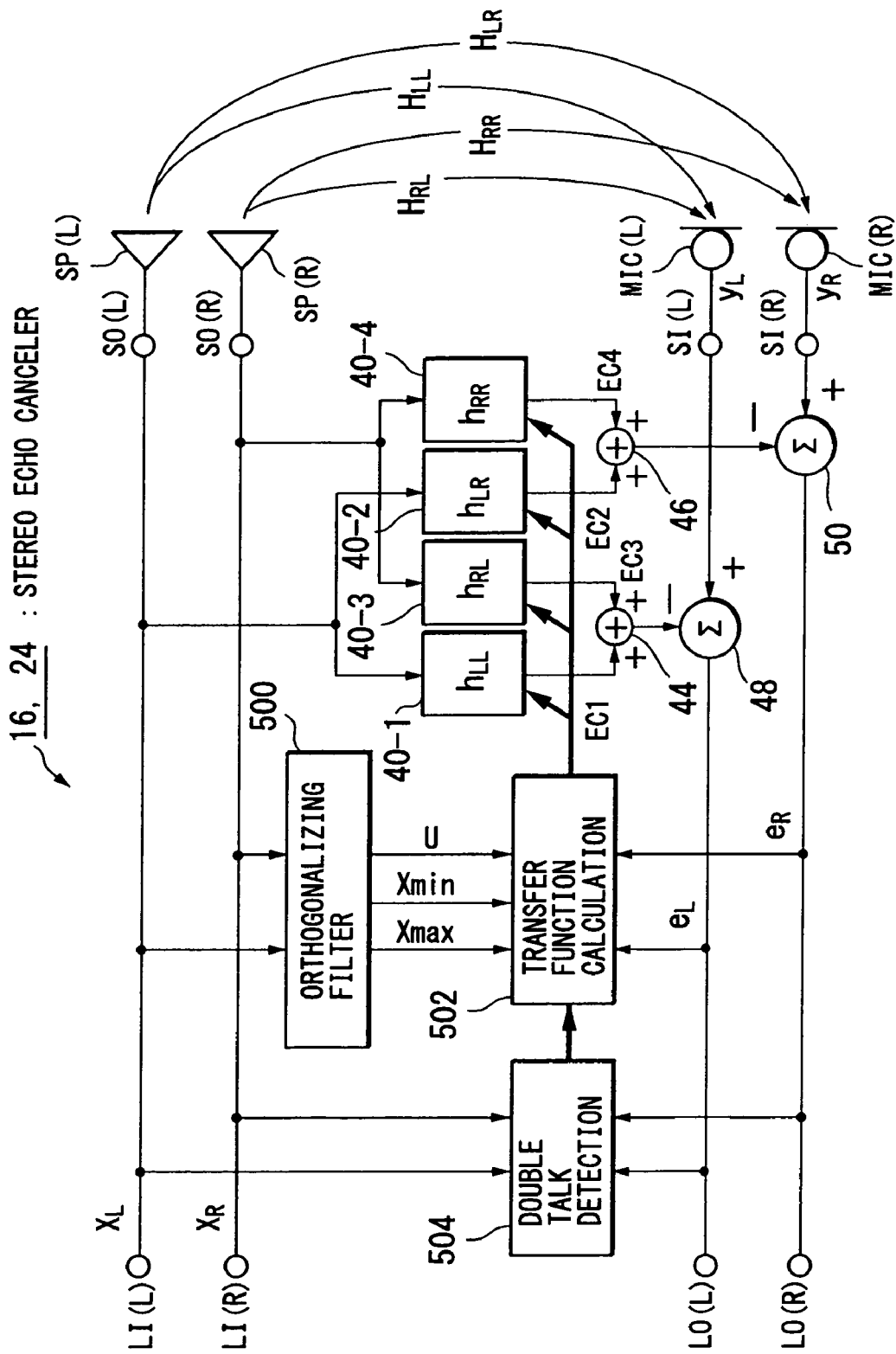
FIG. 28 is a block diagram showing another structural example in the stereo echo canceller 16, 24 of FIG. 2.

FIG. 28 shows another structural example in the stereo echo canceller 16, 24 of FIG. 2. The same symbols are used with respect to those portions common to the foregoing structure of FIG. 1. Left/right two-channel stereo signals $x_L$ and $x_R$ transmitted from the spot on the counterpart side and inputted into line input ends LI(L) and LI(R) are outputted from sound output ends SO(L) and SO(R) as they are (i.e. not through an orthogonalizing filter 500), and reproduced at loudspeakers SP(L) and SP(R), respectively.

Filter means 40-1 is set with an impulse response corresponding to a transfer function between the loudspeaker SP(L) and a microphone MC(L), filter means 40-2 is set with an impulse response corresponding to a transfer function between the loudspeaker SP(L) and a microphone MC(R), filter means 40-3 is set with an impulse response corresponding to a transfer function between the loudspeaker SP(R) and the microphone MC(L), and filter means 40-4 is set with an impulse response corresponding to a transfer function between the loudspeaker SP(R) and the microphone MC(R).

The orthogonalizing filter 500 performs a principal component analysis with respect to the input stereo signals $x_L$ and $x_R$ per prescribed time period, and converts such input stereo signals $x_L$ and $x_R$ into two signals that are orthogonal to each other. Transfer function calculating means 502 implements a cross-spectrum calculation between the mutually orthogonal two signals produced at the orthogonalizing filter 500 and signals $e_L$ and $e_R$ outputted from subtracters 48 and 50 and, based on this cross-spectrum calculation, sets filter characteristics (impulse responses) of the filter means 40-1 to 40-4. Specifically, upon starting the system, the filter characteristics of the filter means 40-1 to 40-4 are not set, i.e. coefficients are all set to zero, so that echo cancel signals EC1 to EC4 are zero, and thus collected audio signals of the microphones MC(L) and MC(R) themselves are outputted from the subtracters 48 and 50. Therefore, at this time, the transfer function calculating means 502 performs the cross-spectrum calculation between the mutually orthogonal two signals produced at the orthogonalizing filter 500 and the collected audio signals $e_L$ and $e_R$ of the microphones MC(L) and MC(R) outputted from the subtracters 48 and 50 and, based on this cross-spectrum calculation, derives transfer functions of four audio transfer systems between the loudspeakers SP(L) and SP(R) and the microphones MC(L) and MC(R), respectively, and implements initial setting of the filter characteristics of the filter means 40-1 to 40-4 to values corresponding to such transfer functions. After the initial setting, since the echo cancel signals are produced by the filter means 40-1 to 40-4, the echo cancel error signals $e_L$ and $e_R$ corresponding to difference signals between the collected audio signals of the microphones MC(L) and MC(R) and the echo cancel signals EC1 to EC4 are outputted from the subtracters 48 and 50. Therefore, at this time, the transfer function calculating means 502 performs the cross-spectrum calculation between the mutually orthogonal two signals produced at the orthogonalizing filter 500 and the echo cancel error signals $e_L$ and $e_R$ outputted from the subtracters 48 and 50 and, based on this cross-spectrum calculation, derives estimated errors of the transfer functions of the four audio transfer systems between the loudspeakers SP(L) and SP(R) and the microphones MC(L) and MC(R), respectively, and updates the filter characteristics of the filter means 40-1 to 40-4 to values that cancel the estimated errors, respectively. By repeating this updating operation per prescribed time period, the echo cancel error can be converged to a minimum value. Further, even if the transfer functions change due to movement of the microphone positions or the like, the echo cancel error can be converged to a minimum value by sequentially updating the filter characteristics of the filter means 40-1 to 40-4 depending thereon.

According to the known technique based on comparison between the left/right two-channel stereo signals $x_L$ and $x_R$ inputted into the line input ends LI(L) and LI(R) and the signals $e_L$ and $e_R$ to be outputted from line output ends LO(L) and LO(R), double talk detecting means 504 detects the double talk where sounds other than those reproduced by the loudspeakers SP(L) and SP(R) are inputted into the microphones MC(L) and MC(R). The transfer function calculating means 502 makes relatively longer an update period of the filter characteristics of the filter means 40-1 to 40-4 while the double talk is detected, whereas makes relatively shorter the update period of the filter characteristics while the double talk is not detected. This makes it possible to fully converge estimated errors when the double talk exists, and further, quicken convergence of estimated errors when there is no double talk.

Figure 29:
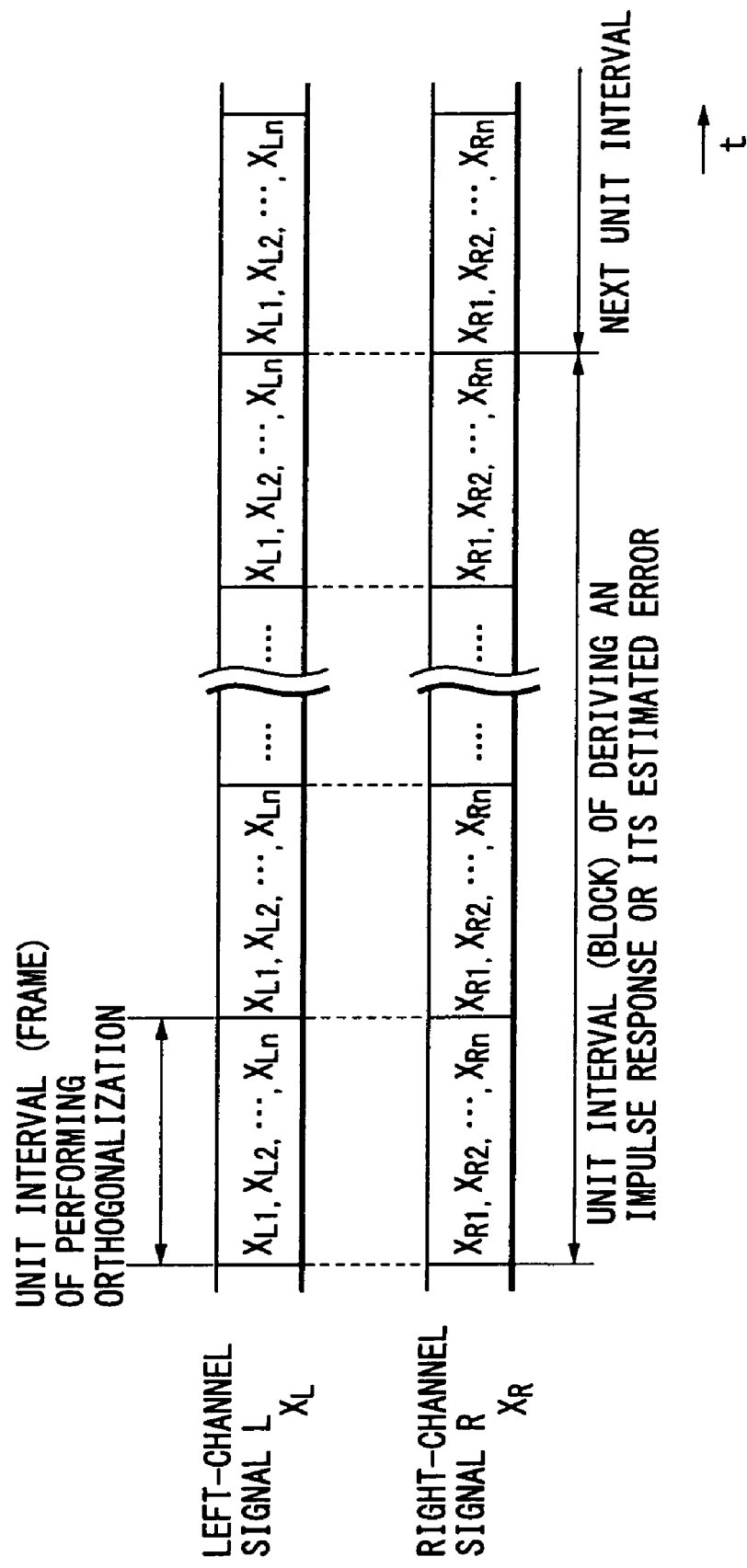
FIG. 29 is a time chart showing an example of unit intervals for orthogonalization processing and deriving an impulse response or its estimated error in the stereo echo canceller of FIG. 28.
Figure 49:
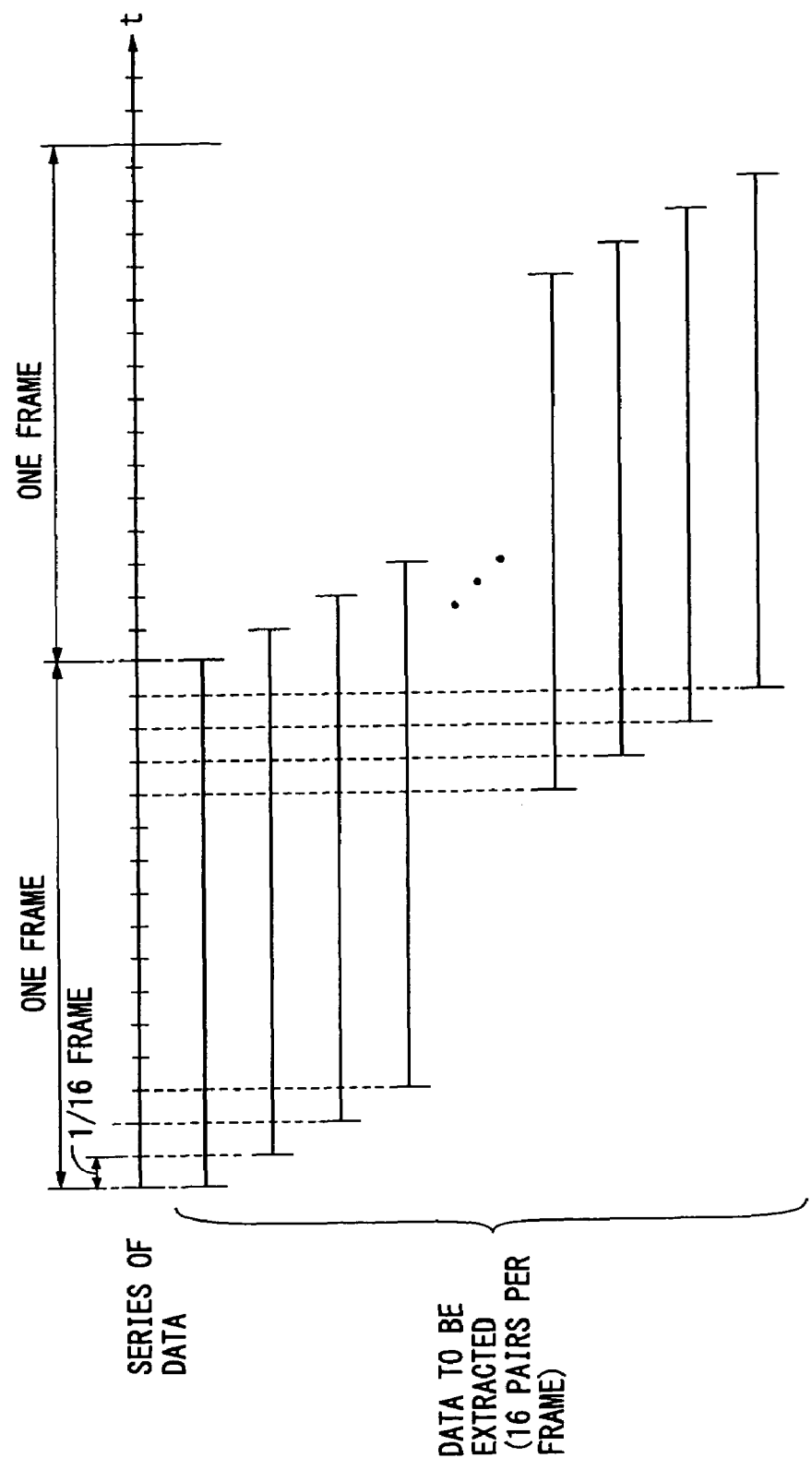
FIG. 49 is an exemplary diagram for explaining an ensemble averaging process according to overlap processing.

An orthogonalization process of the orthogonalizing filter 500 will be described. The orthogonalization process is implemented per prescribed time period of the input stereo signals. Herein, the orthogonalization process is carried out per frame (e.g. 512 samples) as shown in FIG. 29 (however, overlap processing may be implemented as shown in FIG. 49 which will be described later). A vector having as its elements a sample group of one frame of the left-channel input signal $x_L$ inputted into the orthogonalizing filter 500, and a vector having as its elements a sample group of one frame of the right-channel input signal $x_R$ are given as $$\overline{x}_L = (x_{L1}, x_{L2}, x_{L3}, \ldots, x_{Ln})$$

$$\overline{x}_R = (x_{R1}, x_{R2}, x_{R3}, \ldots, x_{Rn}) \qquad \text{[Equation 1]}$$

Since $x_L$ and $x_R$ are the stereo signals, they mutually have a correlation. The orthogonalization process is carried out by performing a principal component analysis, using $x_L$ and $x_R$ as two variables, with respect to a sample group composed of combinations of such two variables per frame so as to derive eigenvectors of the first principal component and the second principal component that are mutually orthogonal, and projecting the respective samples composed of combinations of such two variables onto the derived eigenvectors of the first principal component and the second principal component, respectively.

Concrete contents of calculation of the orthogonalization process will be described. Now, assuming that an observation matrix B is given as $$B = \begin{pmatrix} x_{L1}, x_{L2}, x_{L3}, \ldots, x_{Ln} \\ x_{R1}, x_{R2}, x_{R3}, \ldots, x_{Rn} \end{pmatrix} \qquad \text{[Equation 2]}$$

then, a covariance matrix S of B becomes $$S = \frac{1}{n-1} B B^T \quad (B^T \text{ is a transposed matrix of } B) \qquad \text{[Equation 3]}$$

$$= \frac{1}{n-1} \begin{pmatrix} x_{L1}, x_{L2}, x_{L3}, \ldots, x_{Ln} \\ x_{R1}, x_{R2}, x_{R3}, \ldots, x_{Rn} \end{pmatrix} \begin{pmatrix} x_{L1} & x_{R1} \\ x_{L2} & x_{R2} \\ \cdot & \cdot \\ \cdot & \cdot \\ x_{Ln} & x_{Rn} \end{pmatrix}$$

$$= \frac{1}{n-1} \begin{pmatrix} \sum_{k=1}^{n} x_{Lk}^2 & \sum_{k=1}^{n} x_{Lk} x_{Rk} \\ \sum_{k=1}^{n} x_{Lk} x_{Rk} & \sum_{k=1}^{n} x_{Rk}^2 \end{pmatrix}$$

$$= \begin{pmatrix} S_{11} & S_{12} \\ S_{21} & S_{22} \end{pmatrix}$$

($S_{11}$ is variance of $x_L$, $S_{22}$ is variance of $x_R$, and $S_{12}(=S_{21})$ is covariance of $x_L$ and $x_R$)

Hence, from $$\begin{pmatrix} S_{11} - \lambda & S_{12} \\ S_{21} & S_{22} - \lambda \end{pmatrix} = 0 \qquad \text{[Equation 4]}$$

$$(S_{11} - \lambda)(S_{22} - \lambda) - S_{12} S_{21} = 0 \qquad \text{[Equation 5]}$$

is solved, thus $$\lambda = \frac{S_{11} + S_{22} \pm \sqrt{(S_{11} + S_{22})^2 - 4(S_{11} S_{22} - S_{12}^2)}}{2} \qquad \text{[Equation 6]}$$

so that two solutions for eigenvalues $\lambda$ are derived.

Assuming that one of the two eigenvalues having greater variance (eigenvalue of the first principal component) is $\lambda_1$, an eigenvector $U_{max}$ corresponding to the eigenvalue $\lambda_1$ is $$\begin{pmatrix} u_{11} \\ u_{12} \end{pmatrix} \qquad \text{[Equation 8]}$$

which establishes $$\begin{pmatrix} S_{11} & S_{12} \\ S_{21} & S_{22} \end{pmatrix} \begin{pmatrix} u_{11} \\ u_{12} \end{pmatrix} = \lambda_1 \begin{pmatrix} u_{11} \\ u_{12} \end{pmatrix} \qquad \text{[Equation 7]}$$

where $u_{11}^2 + u_{12}^2 = 1$
By solving $u_{11}$ and $u_{12}$, $$u_{11} = \pm \frac{S_{12}}{\sqrt{S_{12}^2 - (\lambda_1 - S_{11})^2}} \qquad \text{[Equation 9]}$$

$$u_{12} = \pm \frac{\lambda_1 - S_{11}}{\sqrt{S_{12}^2 - (\lambda_1 - S_{11})^2}}$$

(double signs in same order)

are derived. Regardless of the sign of $u_{11}$ and $u_{12}$ being plus or minus, the axis represented by the first principal component is the same.

On the other hand, assuming that one of the two eigenvalues having smaller variance (eigenvalue of the second principal component) is $\lambda_2$, an eigenvector $U_{min}$ corresponding to the eigenvalue $\lambda_2$ is $$\begin{pmatrix} u_{21} \\ u_{22} \end{pmatrix} \qquad \text{[Equation 11]}$$

which establishes $$\begin{pmatrix} S_{11} & S_{12} \\ S_{21} & S_{22} \end{pmatrix} \begin{pmatrix} u_{21} \\ u_{22} \end{pmatrix} = \lambda_2 \begin{pmatrix} u_{21} \\ u_{22} \end{pmatrix} \qquad \text{[Equation 10]}$$

where $u_{21}^2 + u_{22}^2 = 1$
By solving $u_{21}$ and $u_{22}$, $$u_{21} = \pm \frac{S_{12}}{\sqrt{S_{12}^2 - (\lambda_2 - S_{11})^2}} \qquad \text{[Equation 12]}$$

$$u_{22} = \pm \frac{\lambda_2 - S_{11}}{\sqrt{S_{12}^2 - (\lambda_2 - S_{11})^2}}$$

(double signs in same order)

are derived. Regardless of the sign of $u_{21}$ and $u_{22}$ being plus or minus, the axis represented by the second principal component is the same.

From the foregoing, the eigenvector $U_{max}$ of the first principal component and the eigenvector $U_{min}$ of the second principal component are derived as follows.

$$\vec{U_{max}} = \begin{pmatrix} u_{11} \\ u_{12} \end{pmatrix}, \vec{U_{min}} = \begin{pmatrix} u_{21} \\ u_{22} \end{pmatrix} \qquad \text{[Equation 13]}$$

With respect to the eigenvectors $U_{max}$ and $U_{min}$ obtained from the covariance matrix, it is not possible to predict in which quadrant it appears due to its nature. If the quadrant in which the eigenvector $U_{max}$ appears changes per frame, $U_{max}$'s mutually cancel themselves upon ensemble-averaging $U_{max}$'s per block later. If the quadrant in which the eigenvector $U_{min}$ appears changes per frame, $U_{min}$'s mutually cancel themselves upon ensemble-averaging $U_{min}$'s per block later. Therefore, a conversion operation is performed for fixing the quadrants in which the eigenvectors $U_{max}$ and $U_{min}$ appear. For example, when fixing the eigenvector $U_{max}$ to the first quadrant and the eigenvector $U_{min}$ to the fourth quadrant, it can be realized by the following conversion operation.

Of the eigenvectors $U_{max}$ and $U_{min}$,
one existing in the first quadrant (positive, positive) or the third quadrant (negative, negative) is given as $U_{max}'$, and
one existing in the second quadrant (negative, positive) or the fourth quadrant (positive, negative) is given as $U_{min}'$.
Then, conversion is executed such that
when $U_{max}'$ exists in the first quadrant, $U_{max} = U_{max}'$
when $U_{max}'$ exists in the third quadrant, $U_{max} = -U_{max}'$
when $U_{min}'$ exists in the second quadrant, $U_{min} = -U_{min}'$
when $U_{min}'$ exists in the fourth quadrant, $U_{min} = U_{min}'$.

Through such a conversion operation, the quadrants in which the eigenvectors $U_{max}$ and $U_{min}$ appear can be fixed.

Onto the eigenvector $U_{max}$ of the first principal component and the eigenvector $U_{min}$ of the second principal component that are obtained as described above, a column vector of the observation matrix B given as $$\vec{b} = \begin{pmatrix} x_{Ln} \\ x_{Rn} \end{pmatrix} \qquad \text{[Equation 14]}$$

is projected. A value of an output signal $x_{max}$ obtained by projecting the observation matrix B onto the eigenvector $U_{max}$ is derived as $$x_{max} = \vec{b} \bullet \vec{U_{max}} (\bullet \text{ represents inner product}) \qquad \text{[Equation 15]}$$

Further, a value of an output signal $x_{min}$ obtained by projecting the observation matrix B onto the eigenvector $U_{min}$ is derived as $$x_{min} = \vec{b} \bullet \vec{U_{min}} (\bullet \text{ represents inner product}) \qquad \text{[Equation 16]}$$

The transfer function calculation process of the transfer function calculating means 502 will be described.

(In Case of Fixed Type Operation)

A filter characteristic of the orthogonalizing filter 500 is given as U. The filter characteristic U is a characteristic that projects the input signals $x_L$ and $x_R$ onto the mutually uncorrelated signals $x_{max}$ and $x_{min}$ based on the principal component analysis, and the following relationship is established.

[Equation 17] (95)

$$\begin{pmatrix} \vec{x_{max}} \\ \vec{x_{min}} \end{pmatrix} = U \begin{pmatrix} \vec{x_L} \\ \vec{x_R} \end{pmatrix}$$

$$U = \begin{pmatrix} u_{11} & u_{12} \\ u_{21} & u_{22} \end{pmatrix}$$

An inverse characteristic of the filter characteristic U is given as V. The inverse filter characteristic V is a characteristic that restores the signals $x_{max}$ and $x_{min}$ to the original signals $x_L$ and $x_R$, and the following relationship is established.

[Equation 18] (96)

$$UV = VU = I \text{ ($I$ is a unit matrix)}$$
$$V = \begin{pmatrix} v_{11} & v_{12} \\ v_{21} & v_{22} \end{pmatrix}$$

Output signals $y_L$ and $y_R$ of the microphones MC(L) and MC(R) are expressed as $$Y_L = H_{LL} \cdot X_L + H_{RL} \cdot X_R \quad (97)$$

$$Y_R = H_{LR} \cdot X_L + H_{RR} \cdot X_R \quad (98)$$

From the equations (95) and (96),

[Equation 19] (99)

$$\begin{pmatrix} x_L \\ x_R \end{pmatrix} = \begin{pmatrix} v_{11} & v_{12} \\ v_{21} & v_{22} \end{pmatrix} \begin{pmatrix} x_{\max} \\ x_{\min} \end{pmatrix}$$

hence, assuming that frequency-axis expressions of $x_{max}$ and $x_{min}$ are respectively given as $X_{max}$ and $X_{min}$, the equations (97) and (98) respectively become $$Y_L = H_{LL}(v_{11} \cdot X_{max} + v_{12} \cdot X_{min}) + H_{RL}(v_{21} \cdot X_{max} + v_{22} \cdot X_{min}) \quad (97')$$

$$Y_R = H_{LR}(v_{11} \cdot X_{max} + v_{12} \cdot X_{min}) + H_{RR}(v_{21} \cdot X_{max} + v_{22} \cdot X_{min}) \quad (98')$$

When both sides of the equation (97') are multiplied by complex conjugates $X^*_{max}$ and $X^*_{min}$ of $X_{max}$ and $X_{min}$ (i.e. deriving cross spectra) and ensemble-averaged, because $X_{max}$ and $X_{min}$ are mutually orthogonal, expected values of $X^*_{max} \cdot X_{min}$ and $X^*_{min} \cdot X_{max}$ become zero, respectively, so that the following two equations are obtained (note: E[ ] represents the ensemble average).

$$E[X^*_{max} \cdot Y_L] = E[X^*_{max} \cdot H_{LL} \cdot v_{11} \cdot X_{max} + X^*_{max} \cdot H_{RL} \cdot v_{21} \cdot X_{max}] \quad (100)$$

$$E[X^*_{min} \cdot Y_L] = E[X^*_{min} \cdot H_{LL} \cdot v_{12} \cdot X_{min} + X^*_{min} \cdot H_{RL} \cdot v_{22} \cdot X_{min}] \quad (101)$$

Similarly, when both sides of the equation (98') are multiplied by complex conjugates $X^*_{max}$ and $X^*_{min}$ of $X_{max}$ and $X_{min}$ and ensemble-averaged, the following two equations are obtained.

$$E[X^*_{max} \cdot Y_R] = E[X^*_{max} \cdot H_{LR} \cdot v_{11} \cdot X_{max} + X^*_{max} \cdot H_{RR} \cdot v_{21} \cdot X_{max}] \quad (102)$$

$$E[X^*_{min} \cdot Y_R] = E[X^*_{min} \cdot H_{LR} \cdot v_{12} \cdot X_{min} + X^*_{min} \cdot H_{RR} \cdot v_{22} \cdot X_{min}] \quad (103)$$

Here, if a change of the eigenvalues $\lambda$ is small in a time period of performing ensemble averaging,

[Equation 20] (104)

$$U = \begin{pmatrix} u_{11} & u_{12} \\ u_{21} & u_{22} \end{pmatrix} \approx E[U] = \begin{pmatrix} E[u_{11}] & E[u_{12}] \\ E[u_{21}] & E[u_{22}] \end{pmatrix}$$
$$V = \begin{pmatrix} v_{11} & v_{12} \\ v_{21} & v_{22} \end{pmatrix} \approx E[V] = \begin{pmatrix} E[v_{11}] & E[v_{12}] \\ E[v_{21}] & E[v_{22}] \end{pmatrix}$$

is established, so that the equations (100) to (103) are rewritten as the following equations (100') to (103').

$$E[X^*_{max} \cdot Y_L] \approx E[|X_{max}|^2] \cdot H_{LL} \cdot E[v_{11}] + E[|X_{max}|^2] \cdot H_{RL} \cdot E[v_{21}] \quad (100')$$

$$E[X^*_{min} \cdot Y_L] \approx E[|X_{min}|^2] \cdot H_{LL} \cdot E[v_{12}] + E[|X_{min}|^2] \cdot H_{RL} \cdot E[v_{22}] \quad (101')$$

$$E[X^*_{max} \cdot Y_R] \approx E[|X_{max}|^2] \cdot H_{LR} \cdot E[v_{11}] + E[|X_{max}|^2] \cdot H_{RR} \cdot E[v_{21}] \quad (102')$$

$$E[X^*_{min} \cdot Y_R] \approx E[|X_{min}|^2] \cdot H_{LR} \cdot E[v_{12}] + E[|X_{min}|^2] \cdot H_{RR} \cdot E[v_{22}] \quad (103')$$

When both sides of the equations (100') and (102') are divided by $E[|X_{max}|^2]$ and both sides of the equations (101') and (103') are divided by $E[|X_{min}|^2]$, respectively, $$E[X^*_{max} \cdot Y_L]/E[|X_{max}|^2] \approx H_{LL} \cdot E[v_{11}] + H_{RL} \cdot E[v_{21}]$$

$$E[X^*_{min} \cdot Y_L]/E[|X_{min}|^2] \approx H_{LL} \cdot E[v_{12}] + H_{RL} \cdot E[v_{22}]$$

$$E[X^*_{max} \cdot Y_R]/E[|X_{max}|^2] \approx H_{LR} \cdot E[v_{11}] + H_{RR} \cdot E[v_{21}]$$

$$E[X^*_{min} \cdot Y_R]/E[|X_{min}|^2] \approx H_{LR} \cdot E[v_{12}] + H_{RR} \cdot E[v_{22}]$$

hence

[Equation 21] (105)

$$\begin{pmatrix} \frac{E[X^*_{\max} \cdot Y_L]}{E[|X_{\max}|^2]} & \frac{E[X^*_{\min} \cdot Y_L]}{E[|X_{\min}|^2]} \\ \frac{E[X^*_{\max} \cdot Y_R]}{E[|X_{\max}|^2]} & \frac{E[X^*_{\min} \cdot Y_R]}{E[|X_{\min}|^2]} \end{pmatrix} \approx \begin{pmatrix} H_{LL} & H_{RL} \\ H_{LR} & H_{RR} \end{pmatrix} \begin{pmatrix} E[v_{11}] & E[v_{12}] \\ E[v_{21}] & E[v_{22}] \end{pmatrix}$$

is obtained. From $E[U] \cdot E[V] \approx I$, the equation (105) is rewritten as

[Equation 22] (106)

$$\begin{pmatrix} H_{LL} & H_{RL} \\ H_{LR} & H_{RR} \end{pmatrix} \approx \begin{pmatrix} \frac{E[X^*_{\max} \cdot Y_L]}{E[|X_{\max}|^2]} & \frac{E[X^*_{\min} \cdot Y_L]}{E[|X_{\min}|^2]} \\ \frac{E[X^*_{\max} \cdot Y_R]}{E[|X_{\max}|^2]} & \frac{E[X^*_{\min} \cdot Y_R]}{E[|X_{\min}|^2]} \end{pmatrix} \begin{pmatrix} E[u_{11}] & E[u_{12}] \\ E[u_{21}] & E[u_{22}] \end{pmatrix}$$

Impulse responses $h_{LL}$, $h_{RL}$, $h_{LR}$ and $h_{RR}$ obtained by applying the inverse Fourier transformation to the transfer functions $H_{LL}$, $H_{RL}$, $H_{LR}$ and $H_{RR}$ derived from the equation (106) are the filter characteristics to be set to the filter means 40-1, 40-2, 40-3 and 40-4, respectively. Therefore, the transfer function calculating means 502 derives the respective transfer functions $H_{LL}$, $H_{RL}$, $H_{LR}$ and $H_{RR}$ based on the signals $x_{max}$ and $x_{min}$ outputted from the orthogonalizing filter 500, the filter characteristic U of the orthogonalizing filter 500 and the output signals $y_L$ and $y_R$ of the microphones MC(L) and MC(R), derives the impulse responses $h_{LL}$, $h_{RL}$, $h_{LR}$ and $h_{RR}$ by applying the inverse Fourier transformation to those derived transfer functions, sets the derived impulse responses to the filter means 40-1, 40-2, 40-3 and 40-4, respectively, and further, updates the impulse responses by repeating this calculation per suitably determined prescribed time period (e.g. time period of performing ensemble averaging).

(In Case of Adaptive Type Operation)

Assuming that the filter characteristics set to the filter means 40-1, 40-2, 40-3 and 40-4 are given as $H\hat{}_{LL}$, $H\hat{}_{RL}$, $H\hat{}_{LR}$ and $H\hat{}_{RR}$ ($h\hat{}_{LL}$, $h\hat{}_{RL}$, $h\hat{}_{LR}$ and $h\hat{}_{RR}$ when expressed in terms of the impulse responses), the signals $e_L$ and $e_R$ outputted from the subtracters 48 and 50 of FIG. 28 are expressed as $$E_L = (H_{LL} \cdot X_L + H_{RL} \cdot X_R) - (H\hat{}_{LL} \cdot X_L + H\hat{}_{RL} \cdot X_R) \quad (107)$$

$$E_R = (H_{LR} \cdot X_L + H_{RR} \cdot X_R) - (H\hat{}_{LR} \cdot X_L + H\hat{}_{RR} \cdot X_R) \quad (108)$$

From the foregoing equation (99), the equations (107) and (108) respectively become $$E_L = (H_{LL} - H^\frown_{LL})(v_{11} \cdot X_{max} + v_{12} \cdot X_{min}) + (H_{RL} - H^\frown_{RL})(v_{21} \cdot X_{max} + v_{22} \cdot X_{min}) \quad (107')$$

$$E_R = (H_{LR} - H^\frown_{LR})(v_{11} \cdot X_{max} + v_{12} \cdot X_{min}) + (H_{RR} - H^\frown_{RR})(v_{21} \cdot X_{max} + V_{22} \cdot X_{min}) \quad (108').$$

When the estimated errors of the transfer functions are given as $$\Delta H_{LL} = H_{LL} - H^\frown_{LL}$$

$$\Delta H_{RL} = H_{RL} - H^\frown_{RL}$$

$$\Delta H_{LR} = H_{LR} - H^\frown_{LR}$$

$$\Delta H_{RR} = H_{RR} - H^\frown_{RR}$$

the equations (107') and (108') respectively become $$E_L = \Delta H_{LL}(v_{11} \cdot X_{max} + v_{12} \cdot X_{min}) + \Delta H_{RL}(v_{21} \cdot X_{max} + v_{22} \cdot X_{min}) \quad (107'')$$

$$E_R = \Delta H_{LR}(v_{11} \cdot X_{max} + v_{12} \cdot X_{min}) + \Delta H_{RR}(v_{21} \cdot X_{max} + v_{22} \cdot X_{min}) \quad (108'').$$

When both sides of the equation (107'') are multiplied by complex conjugates $X^*_{max}$ and $X^*_{min}$ of $X_{max}$ and $X_{min}$ (i.e. deriving cross spectra) and ensemble-averaged, because $X_{max}$ and $X_{min}$ are mutually orthogonal, expected values of $X^*_{max} \cdot X_{min}$ and $X^*_{min} \cdot X_{max}$ become zero, respectively, so that the following two equations are obtained (note: E[ ] represents the ensemble average).

$$E[X^*_{max} \cdot E_L] = E[X^*_{max} \cdot \Delta H_{LL} \cdot v_{11} \cdot X_{max} + X^*_{max} \cdot \Delta H_{RL} \cdot v_{21} \cdot X_{max}] \quad (109)$$

$$E[X^*_{min} \cdot E_L] = E[X^*_{min} \cdot \Delta H_{LL} \cdot v_{12} \cdot X_{min} + X^*_{min} \cdot \Delta H_{RL} \cdot v_{22} \cdot X_{min}] \quad (110)$$

Similarly, when both sides of the equation (108'') are multiplied by complex conjugates $X^*_{max}$ and $X^*_{min}$ of $X_{max}$ and $X_{min}$ and ensemble-averaged, the following two equations are obtained.

$$E[X^*_{max} \cdot E_R] = E[X^*_{max} \cdot \Delta H_{LR} \cdot v_{11} \cdot X_{max} + X^*_{max} \cdot \Delta H_{RR} \cdot v_{21} \cdot X_{max}] \quad (111)$$

$$E[X^*_{min} \cdot E_R] = E[X^*_{min} \cdot \Delta H_{LR} \cdot v_{12} \cdot X_{min} + X^*_{min} \cdot \Delta H_{RR} \cdot v_{22} \cdot X_{min}] \quad (112)$$

Here, if a change of the eigenvalues λ is small in a time period of performing ensemble averaging, the foregoing equation (104) is established so that the equations (109) to (112) are rewritten as the following equations (109') to (112').

$$E[X^*_{max} \cdot E_L] \approx E[|X_{max}|^2] \cdot \Delta H_{LL} \cdot E[v_{11}] + E[|X_{max}|^2] \cdot \Delta H_{RL} \cdot E[v_{21}] \quad (109')$$

$$E[X^*_{min} \cdot E_L] \approx E[|X_{min}|^2] \cdot \Delta H_{LL} \cdot E[v_{12}] + E[|X_{min}|^2] \cdot \Delta H_{RL} \cdot E[v_{22}] \quad (110')$$

$$E[X^*_{max} \cdot E_R] \approx E[|X_{max}|^2] \cdot \Delta H_{LR} \cdot E[v_{11}] + E[|X_{max}|^2] \cdot \Delta H_{RR} \cdot E[v_{21}] \quad (111')$$

$$E[X^*_{min} \cdot E_R] \approx E[|X_{min}|^2] \cdot \Delta H_{LR} \cdot E[v_{12}] + E[|X_{min}|^2] \cdot \Delta H_{RR} \cdot E[v_{22}] \quad (112')$$

When both sides of the equations (109') and (111') are divided by $E[|X_{max}|^2]$ and both sides of the equations (110') and (112') are divided by $E[|X_{min}|^2]$, respectively, $$E[X^*_{max} \cdot E_L]/E[|X_{max}|^2] \approx \Delta H_{LL} \cdot E[v_{11}] + \Delta H_{RL} \cdot E[v_{21}]$$

$$E[X^*_{min} \cdot E_L]/E[|X_{min}|^2] \approx \Delta H_{LL} \cdot E[v_{12}] + \Delta H_{RL} \cdot E[v_{22}]$$

$$E[X^*_{max} \cdot E_R]/E[|X_{max}|^2] \approx \Delta H_{LR} \cdot E[v_{11}] + \Delta H_{RR} \cdot E[v_{21}]$$

$$E[X^*_{min} \cdot E_R]/E[|X_{min}|^2] \approx \Delta H_{LR} \cdot E[v_{11}] + \Delta H_{RR} \cdot E[v_{22}]$$

hence

[Equation 23] (113)

$$\begin{pmatrix} \frac{E[X^*_{max} \cdot E_L]}{E[|X_{max}|^2]} & \frac{E[X^*_{min} \cdot E_L]}{E[|X_{min}|^2]} \\ \frac{E[X^*_{max} \cdot E_R]}{E[|X_{max}|^2]} & \frac{E[X^*_{min} \cdot E_R]}{E[|X_{min}|^2]} \end{pmatrix} \approx \begin{pmatrix} \Delta H_{LL} & \Delta H_{RL} \\ \Delta H_{LR} & \Delta H_{RR} \end{pmatrix} \begin{pmatrix} E[v_{11}] & E[v_{12}] \\ E[v_{21}] & E[v_{22}] \end{pmatrix}$$

is obtained. From $E[U] \cdot E[V] \approx I$, the equation (113) is rewritten as

[Equation 24] (114)

$$\begin{pmatrix} \Delta H_{LL} & \Delta H_{RL} \\ \Delta H_{LR} & \Delta H_{RR} \end{pmatrix} \approx$$

$$\begin{pmatrix} \frac{E[X^*_{max} \cdot E_L]}{E[|X_{max}|^2]} & \frac{E[X^*_{min} \cdot E_L]}{E[|X_{min}|^2]} \\ \frac{E[X^*_{max} \cdot E_R]}{E[|X_{max}|^2]} & \frac{E[X^*_{min} \cdot E_R]}{E[|X_{min}|^2]} \end{pmatrix} \begin{pmatrix} E[u_{11}] & E[u_{12}] \\ E[u_{21}] & E[u_{22}] \end{pmatrix}$$

Using the estimated errors $\Delta H_{LL}$, $\Delta H_{RL}$, $\Delta H_{LR}$ and $\Delta H_{RR}$ derived from the equation (114), the filter characteristics of the filter means 40-1, 40-2, 40-3 and 40-4 are updated per suitably determined prescribed time period (e.g. time period of performing ensemble averaging). For example, assuming that impulse responses $h_{LL}$, $h_{RL}$, $h_{LR}$ and $h_{RR}$ after K-th updating are given as $h_{LL}(k)$, $h_{RL}(k)$, $h_{LR}(k)$ and $h_{RR}(k)$, using impulse responses $\Delta h_{LL}$, $\Delta h_{RL}$, $\Delta h_{LR}$ and $\Delta h_{RR}$ corresponding to the derived estimated errors $\Delta H_{LL}$, $\Delta H_{RL}$, $\Delta H_{LR}$ and $\Delta H_{RR}$, $$h_{LL}(k+1) = h_{LL}(k) + \alpha \Delta h_{LL}$$

$$h_{RL}(k+1) = h_{RL}(k) + \alpha \Delta h_{RL}$$

$$h_{LR}(k+1) = h_{LR}(k) + \alpha \Delta h_{LR}$$

$$h_{RR}(k+1) = h_{RR}(k) + \alpha \Delta h_{RR}.$$

Using these updating equations, (k+1)th impulse responses $h_{LL}(k+1)$, $h_{RL}(k+1)$, $h_{LR}(k+1)$ and $h_{RR}(k+1)$ are derived and set to the filter means 40-1, 40-2, 40-3 and 40-4, respectively, which is repeated per suitably determined prescribed time period (e.g. time period of performing ensemble averaging).

Figure 30:
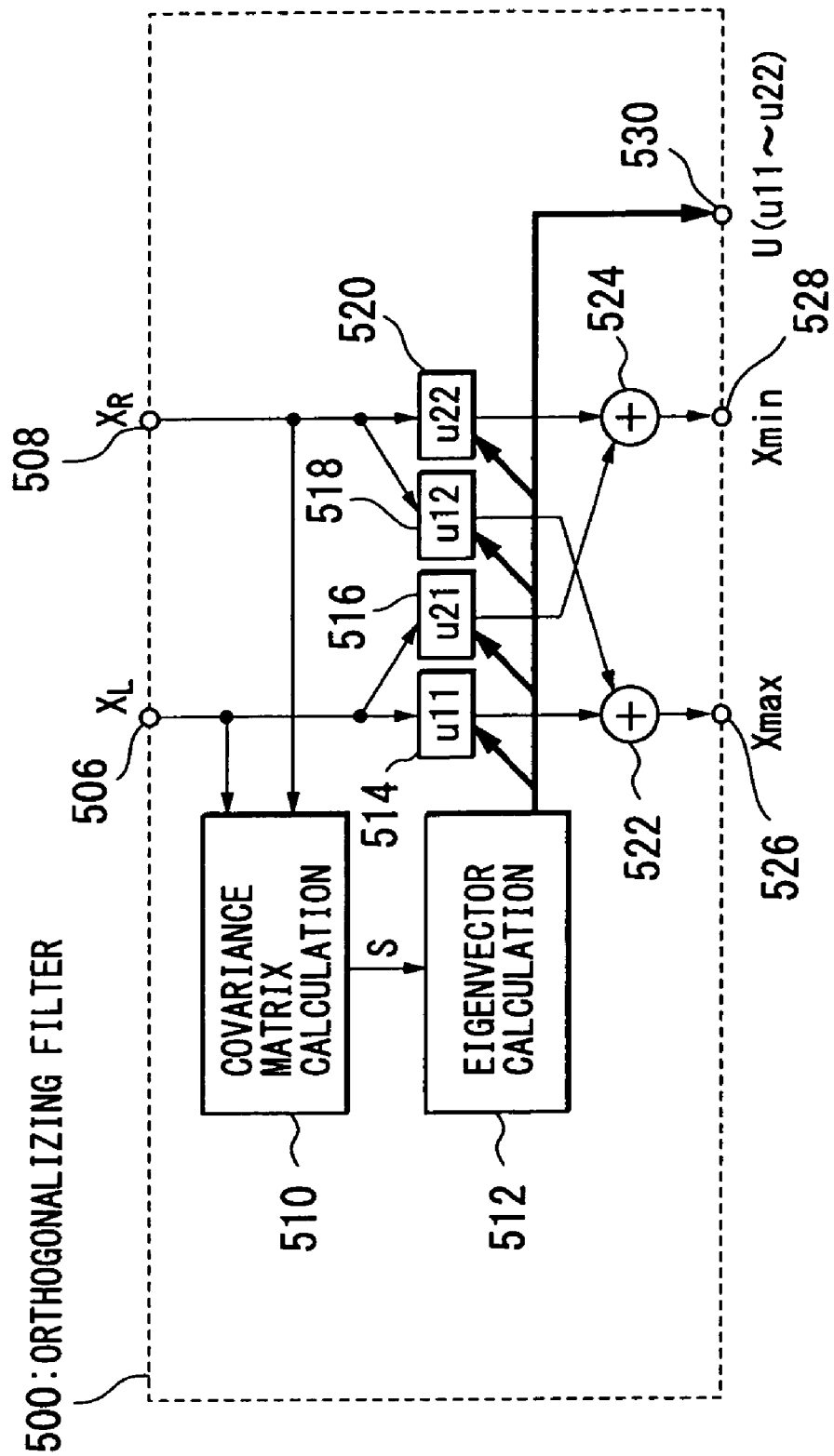
FIG. 30 is a diagram showing one example of functional blocks of an orthogonalizing filter 500 of FIG. 28.

FIG. 30 shows functional blocks of the orthogonalizing filter 500 of FIG. 28. The input stereo signals $x_L$ and $x_R$ are inputted from input ends 506 and 508, respectively. Covariance matrix calculating means 510 derives a covariance matrix S of the input stereo signals $x_L$ and $x_R$ per frame. Based on the derived covariance matrix S, eigenvector calculating means 512 derives coefficients $u_{11}$, $u_{12}$, $u_{21}$ and $u_{22}$ of eigenvectors $U_{max}$ and $U_{min}$ of the first and second principal components per frame. The derived coefficients $u_{11}$, $u_{21}$, $u_{12}$ and $u_{22}$ are set to coefficient multipliers 514, 516, 518 and 520, respectively. The coefficient multipliers 514 and 516 give the coefficients $u_{11}$ and $u_{21}$ to the input signal $x_L$ to derive $x_L \cdot u_{11}$ and $x_L \cdot u_{21}$, respectively. The coefficient multipliers 518 and 520 give the coefficients $u_{12}$ and $u_{22}$ to the input signal $x_R$ to derive $x_R \cdot u_{12}$ and $x_R \cdot u_{22}$, respectively. An adder 522 derives $x_L \cdot u_{11} + x_R \cdot u_{12}$ as a signal $x_{max}$ obtained by projecting the input stereo signals $x_L$ and $x_R$ onto the eigenvector $U_{max}$. An adder 524 derives $x_L \cdot u_{21} + x_R \cdot u_{22}$ as a signal $x_{min}$ obtained by projecting the input stereo signals $x_L$ and $x_R$ onto the eigenvector $U_{min}$. The signals $x_{max}$ and $x_{min}$ are respectively outputted from output ends 526 and 528, while the coefficients $u_{11}$, $u_{21}$, $u_{12}$ and $u_{22}$ of the eigenvectors are outputted from an output end 530.

Figure 31:
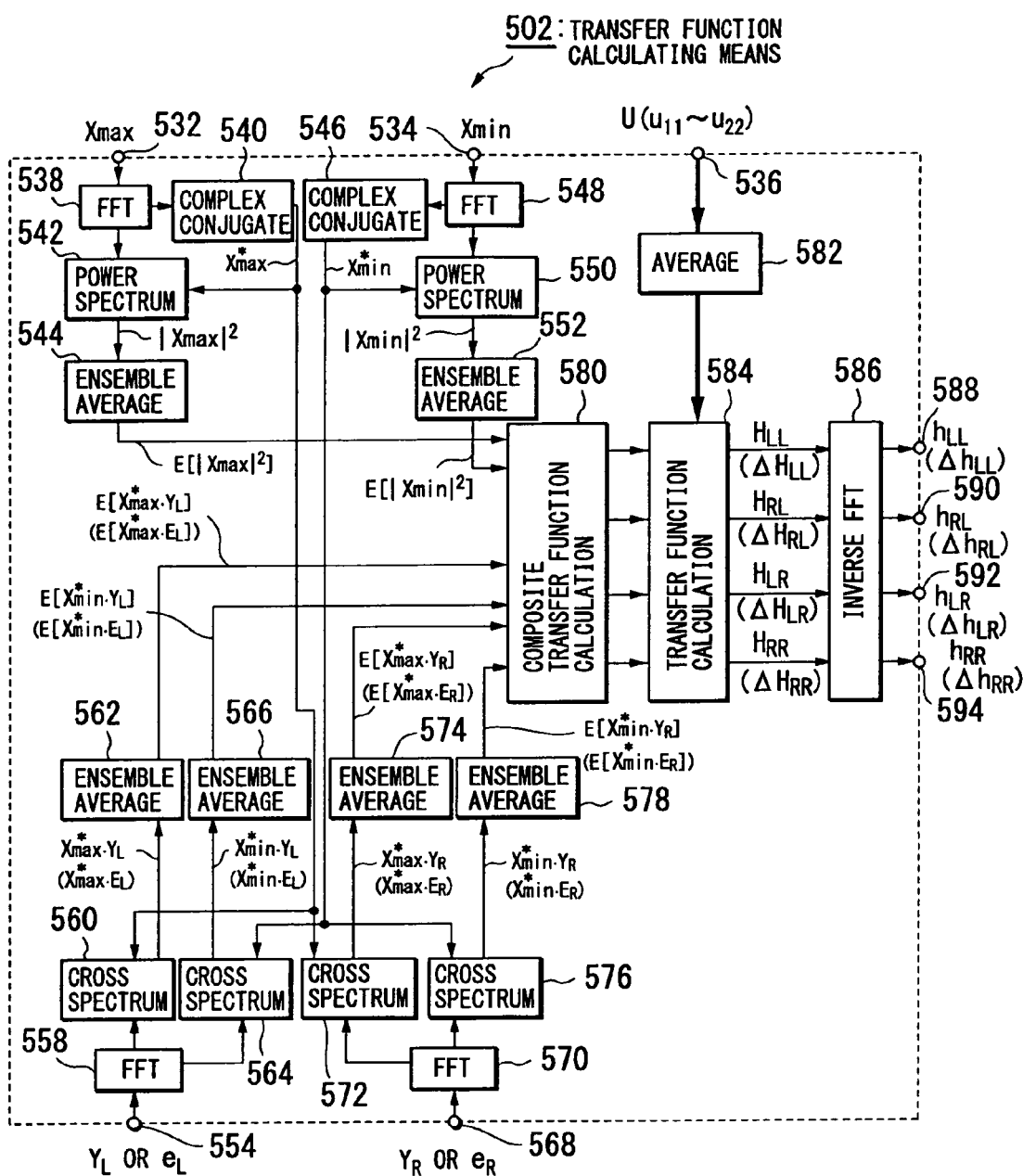
FIG. 31 is a diagram showing one example of functional blocks of transfer function calculating means 502 of FIG. 28.

FIG. 31 shows functional blocks of the transfer function calculating means 502 of FIG. 28. The signals $x_{max}$ and $x_{min}$ are respectively inputted from input ends 532 and 534, while the coefficients $u_{11}$, $u_{21}$, $u_{12}$ and $u_{22}$ of the eigenvectors are inputted from an input end 536. FFT means 538 applies the fast Fourier transformation to the signal $x_{max}$. Complex conjugate calculating means 540 calculates a complex conjugate $X^*_{max}$ of $X_{max}$. Power spectrum calculating means 542 calculates $X_{max} \cdot X^*_{max} = |X_{max}|^2$. Ensemble averaging means 544 calculates $E[|X_{max}|^2]$. FFT means 546 applies the fast Fourier transformation to the signal $x_{min}$. Complex conjugate calculating means 548 calculates a complex conjugate $X^*_{min}$ of $X_{min}$. Power spectrum calculating means 550 calculates $X_{min} \cdot X^*_{min} = |X_{min}|^2$. Ensemble averaging means 552 calculates $E[|X_{min}|^2]$.

An input end 554 is inputted with an output signal $y_L$ of the microphone MC(L) (or output signal $E_L$ of the subtracter 48). FFT means 558 applies the fast Fourier transformation to the signal $y_L$ (or signal $E_L$). Cross spectrum calculating means 560 derives $X^*_{max} \cdot Y_L$ (or $X^*_{max} \cdot E_L$), and ensemble averaging means 562 derives $E[X^*_{max} \cdot Y_L]$ (or $E[X^*_{max} \cdot E_L]$). Cross spectrum calculating means 564 derives $X^*_{min} \cdot Y_L$ (or $X^*_{min} \cdot E_L$), and ensemble averaging means 566 derives $E[X^*_{min} \cdot Y_L]$ (or $E[X^*_{min} \cdot E_L]$).

An input end 568 is inputted with an output signal $y_R$ of the microphone MC(R) (or output signal $E_R$ of the subtracter 50). FFT means 570 applies the fast Fourier transformation to the signal $y_R$ (or signal $E_R$). Cross spectrum calculating means 572 derives $X^*_{max} \cdot Y_R$ (or $X^*_{max} \cdot E_R$), and ensemble averaging means 574 derives $E[X^*_{max} \cdot Y_R]$ (or $E[X^*_{max} \cdot E_R]$). Cross spectrum calculating means 576 derives $X^*_{min} \cdot Y_R$ (or $X^*_{min} \cdot E_R$), and ensemble averaging means 578 derives $E[X^*_{min} \cdot Y_R]$ (or $E[X^*_{min} \cdot E_R]$).

Composite transfer function calculating means 580 derives the first term on the right side of the equation (106) {or the equation (114)} based on $E[|X_{max}|^2]$, $E[|X_{min}|^2]$, $E[X^*_{max} \cdot Y_L]$ (or $E[X^*_{max} \cdot E_L]$), $E[X^*_{min} \cdot Y_L]$ (or $E[X^*_{min} \cdot E_L]$), $E[X^*_{max} \cdot Y_R]$ (or $E[X^*_{max} \cdot E_R]$), and $E[X^*_{min} \cdot Y_R]$ (or $E[X^*_{min} \cdot E_R]$) which are derived as described above. Averaging means 582 averages the coefficients $u_{11}$, $u_{21}$, $u_{12}$ and $u_{22}$ of the eigenvectors individually to derive $E[v_{11}]$, $E[v_{12}]$, $E[v_{21}]$ and $E[v_{22}]$.

Figure 32:
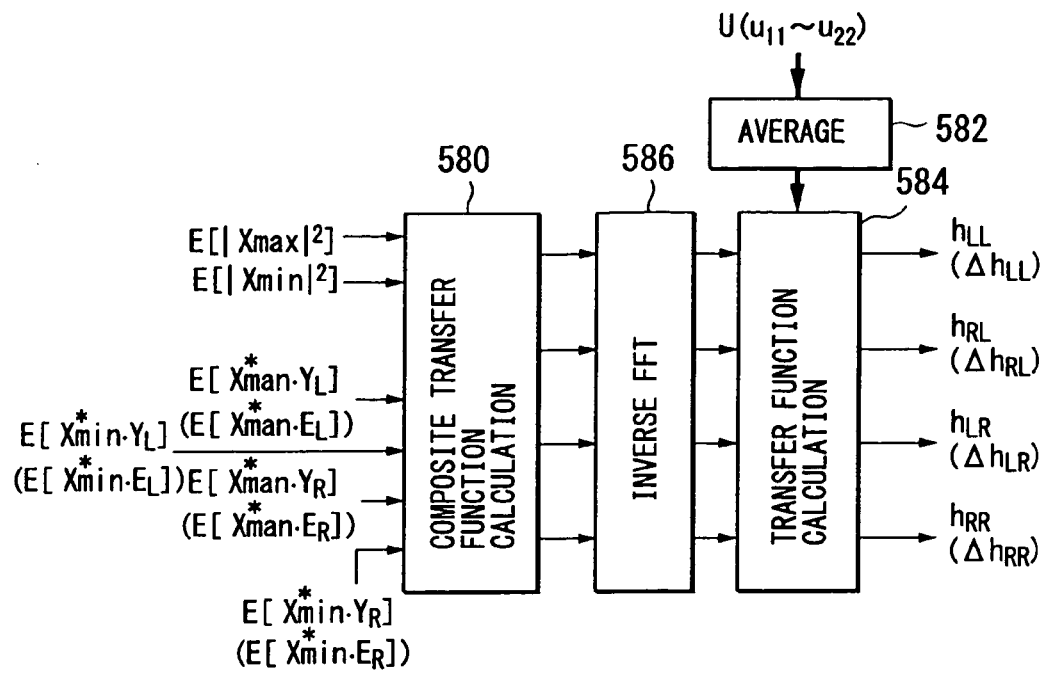
FIG. 32 is a functional block diagram showing a modification of the transfer function calculating means 502 of FIG. 31.

Based on the outputs of the composite transfer function calculating means 580 and the averaging means 582, transfer function calculating means 584 performs a calculation of the right side of the equation (106) {or the equation (114)} to derive individual transfer functions $H_{LL}$, $H_{RL}$, $H_{LR}$ and $H_{RR}$ (or their estimated errors $\Delta H_{LL}$, $\Delta H_{RL}$, $\Delta H_{LR}$ and $\Delta H_{RR}$). Inverse FFT means 586 applies the inverse fast Fourier transformation to the derived transfer functions $H_{LL}$, $H_{RL}$, $H_{LR}$ and $H_{RR}$ (or their estimated errors $\Delta H_{LL}$, $\Delta H_{RL}$, $\Delta H_{LR}$ and $\Delta H_{RR}$) to derive corresponding impulse responses $h_{LL}$, $h_{RL}$, $h_{LR}$ and $h_{RR}$ (or their estimated errors $\Delta h_{LL}$, $\Delta h_{RL}$, $\Delta h_{LR}$ and $\Delta h_{RR}$), and outputs them from output ends 588, 590, 592 and 594, respectively. As shown in FIG. 32, the transfer function calculating means 584 and the inverse FFT means 586 may be exchanged therebetween in their positions.

With respect to the thus structured stereo echo canceller 16, 24 of FIG. 28, the results of carrying out adaptive type operation simulations are shown in FIGS. 33 to 48 in connection with one audio transfer system. FIGS. 33 to 40 show time-domain variations in echo cancellation amount, while FIGS. 41 to 48 show time-domain variations in transfer function estimated error. Herein, the simulations were conducted under the following conditions.

Sampling Frequency: 11.025 kHz
The Number of Samples in One Frame: 4096 samples
The Number of Frames in One Block: variable (2 frames, 4 frames, 8 frames, 16 frames)
Update Period of Filter Characteristic: per block (about 0.75 seconds in case of the number of frames in one block being two, about 1.5 seconds in case of 4 frames, about 3 seconds in case of 8 frames, about 6 seconds in case of 16 frames)
The Mean Number of Times of Ensemble Averaging in One Block: 31 times in case of the number of frames in one block being two, 63 times in case of 4 frames, 127 times in case of 8 frames, 255 times in case of 16 frames {For the purpose of increasing the mean number of times, as shown in FIG. 49, one frame is divided into 16 intervals, and data corresponding to one frame is extracted from the head of each divisional interval while overlapping data extraction successively, thereby to derive individual parameter values to be ensemble-averaged, and the derived individual parameter values are respectively ensemble-averaged in one block. Therefore, the mean number of times N of ensemble averaging becomes such that N=(16×the number of frames in one block−1).}

In any case, the filter characteristics are not set in the first block, and the initial setting is implemented in the second block, and thereafter, updating is performed per block. The axis of ordinates (dB) is defined such that 0 dB represents the initial state where the filter characteristics are not set. Differences in simulation condition with respect to FIGS. 33 to 48 are as follows.

TABLE 2

Figure 33:
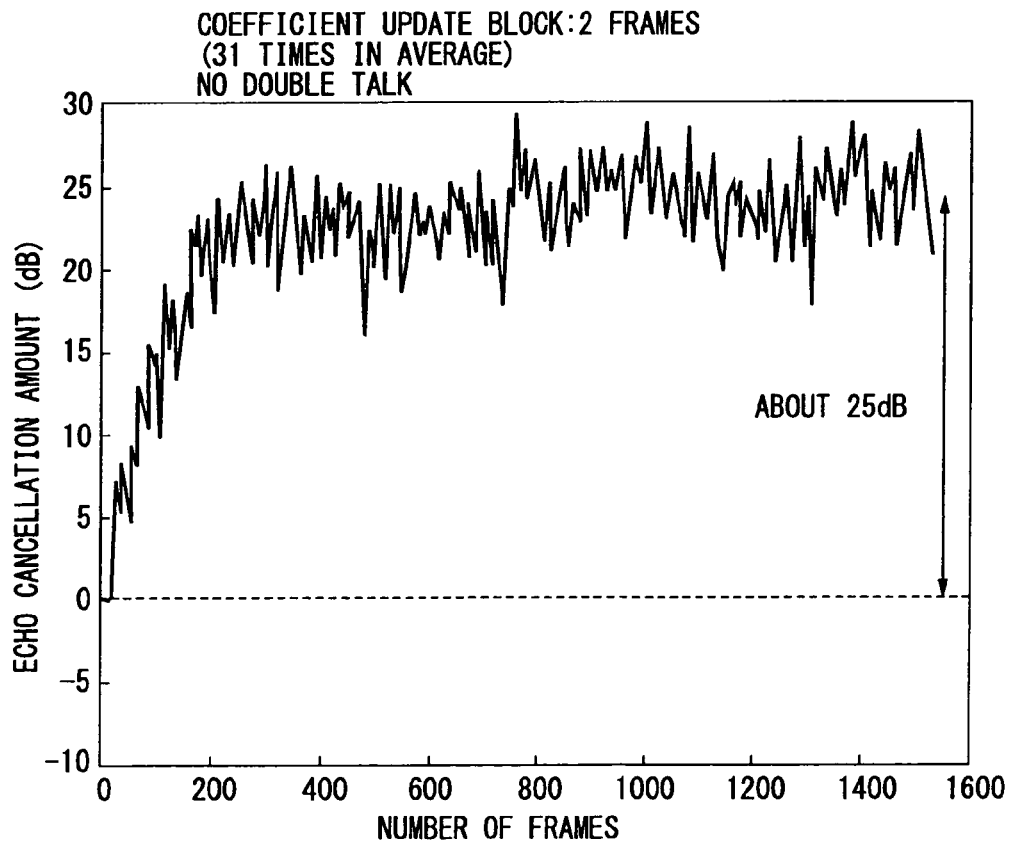
FIG. 33 is a diagram showing the simulation measurement result with respect to a time-domain variation in echo cancellation amount of the stereo echo canceller 16, 24 of FIG. 28 when there is no double talk.
Figure 34:
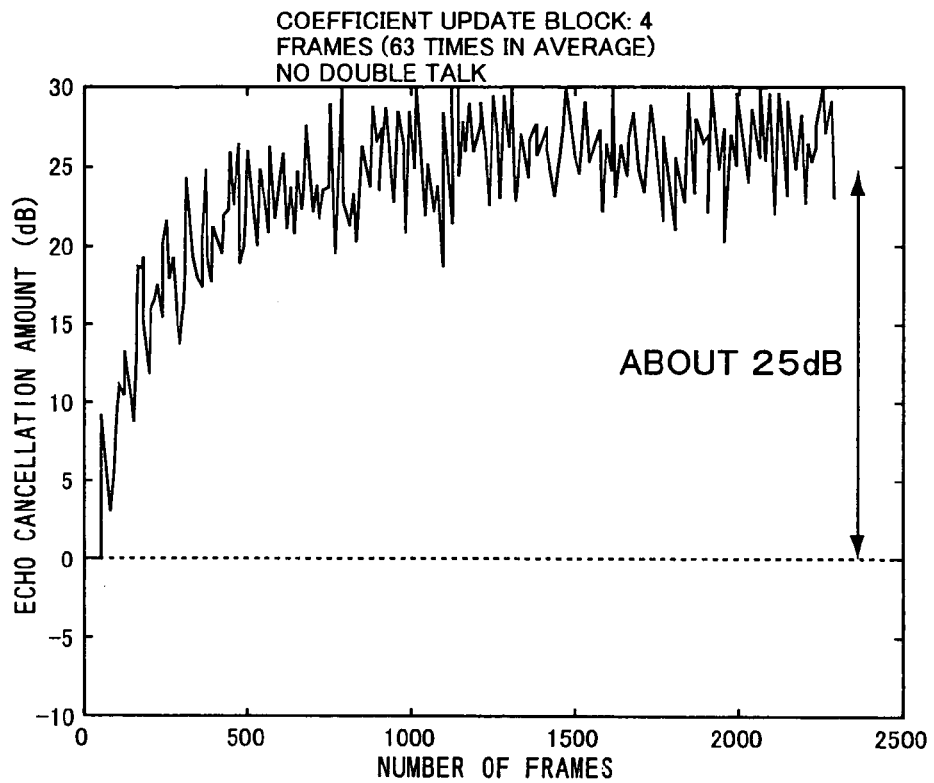
FIG. 34 is a diagram showing the simulation measurement result with respect to a time-domain variation in echo cancellation amount of the stereo echo canceller 16, 24 of FIG. 28 when there is no double talk.
Figure 35:
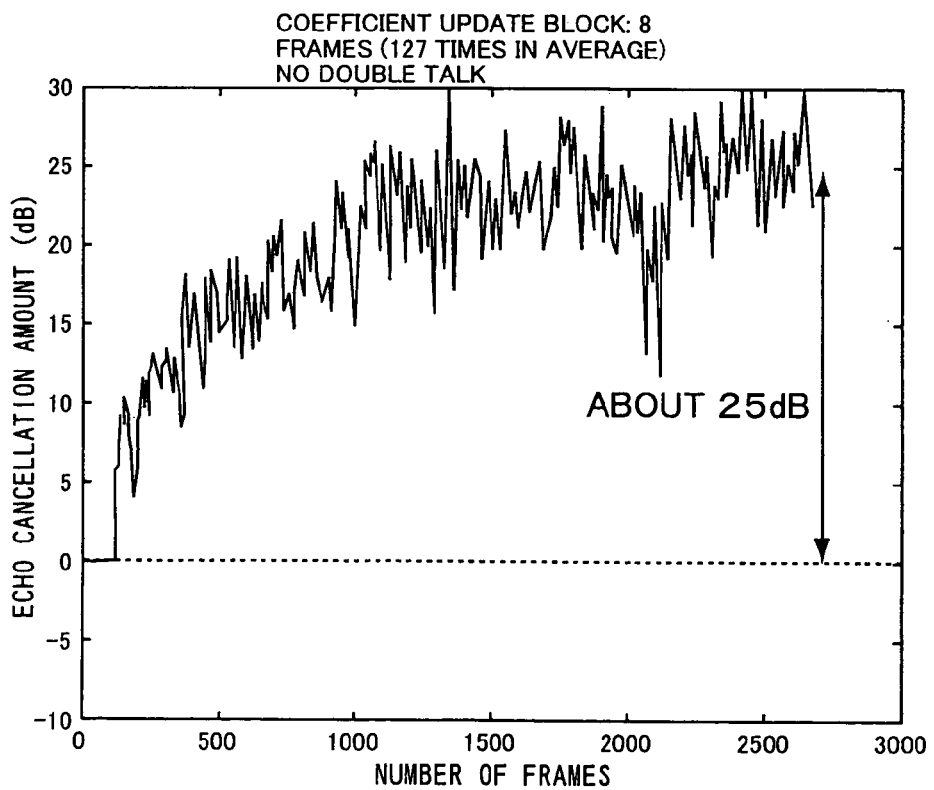
FIG. 35 is a diagram showing the simulation measurement result with respect to a time-domain variation in echo cancellation amount of the stereo echo canceller 16, 24 of FIG. 28 when there is no double talk.
Figure 36:
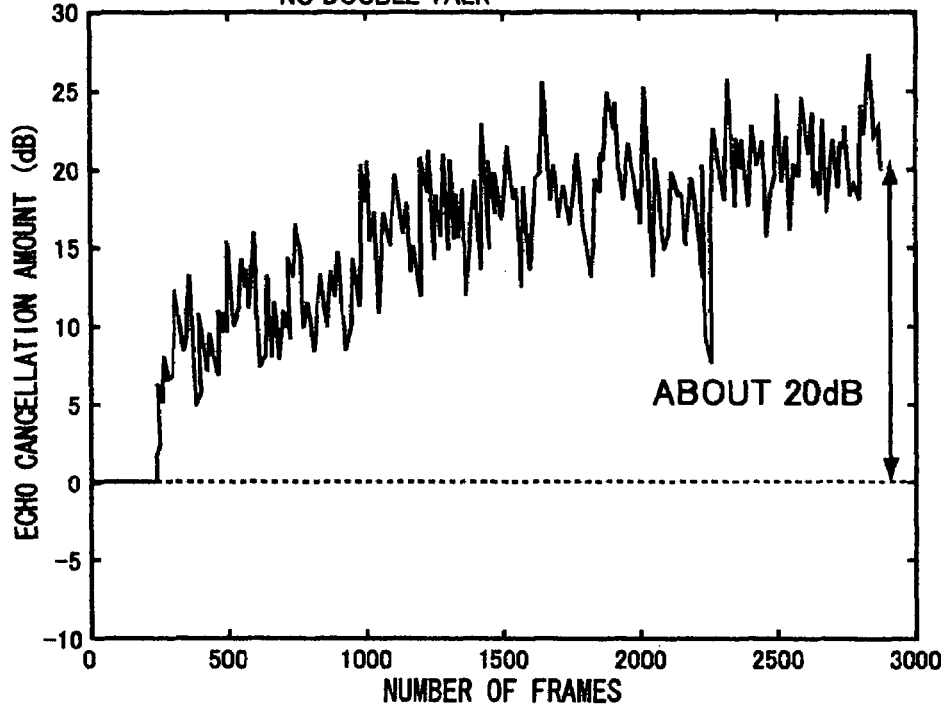
FIG. 36 is a diagram showing the simulation measurement result with respect to a time-domain variation in echo cancellation amount of the stereo echo canceller 16, 24 of FIG. 28 when there is no double talk.
Figure 37:
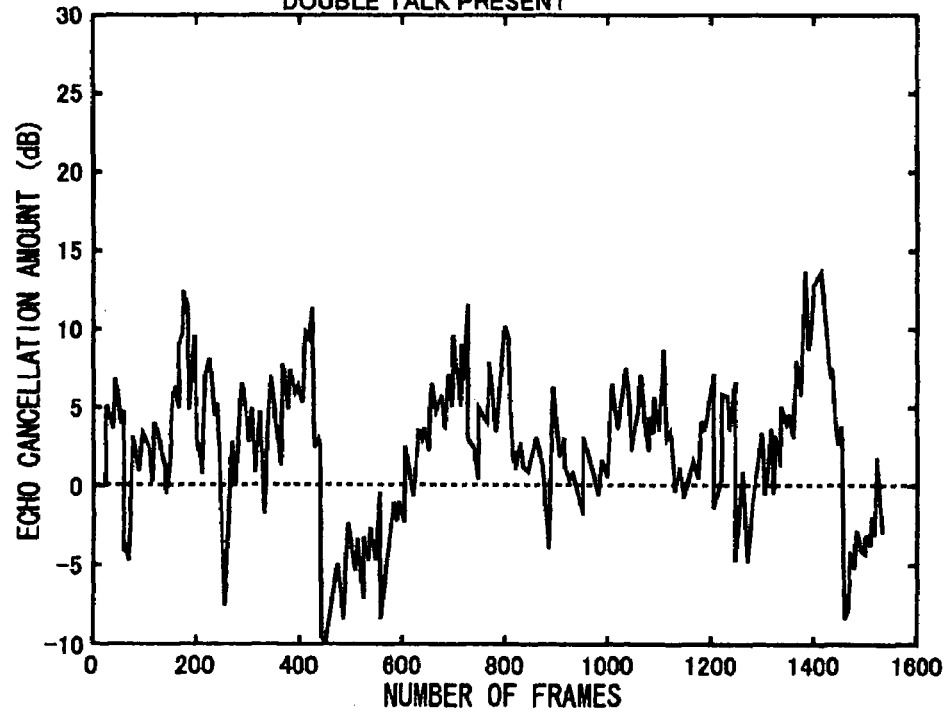
FIG. 37 is a diagram showing the simulation measurement result with respect to a time-domain variation in echo cancellation amount of the stereo echo canceller 16, 24 of FIG. 28 when there is double talk.
Figure 38:
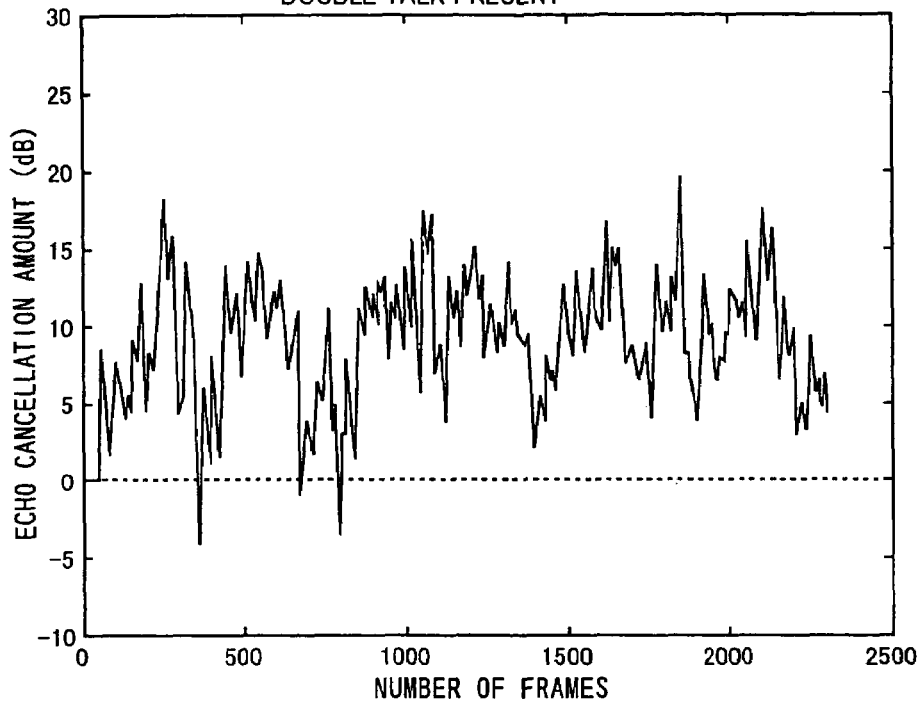
FIG. 38 is a diagram showing the simulation measurement result with respect to a time-domain variation in echo cancellation amount of the stereo echo canceller 16, 24 of FIG. 28 when there is double talk.
Figure 39:
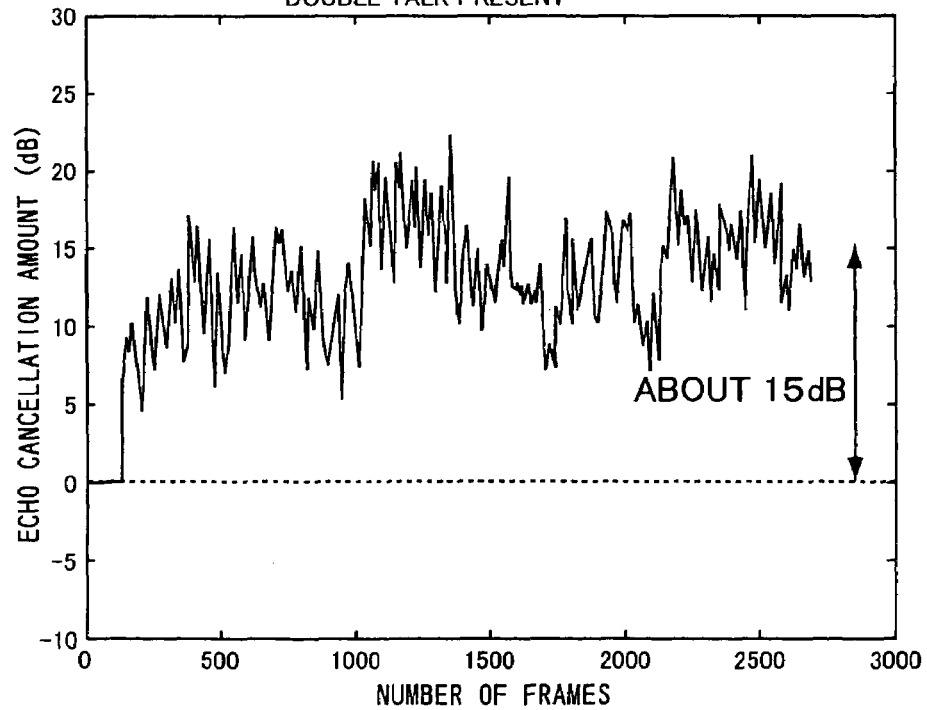
FIG. 39 is a diagram showing the simulation measurement result with respect to a time-domain variation in echo cancellation amount of the stereo echo canceller 16, 24 of FIG. 28 when there is double talk.
Figure 40:
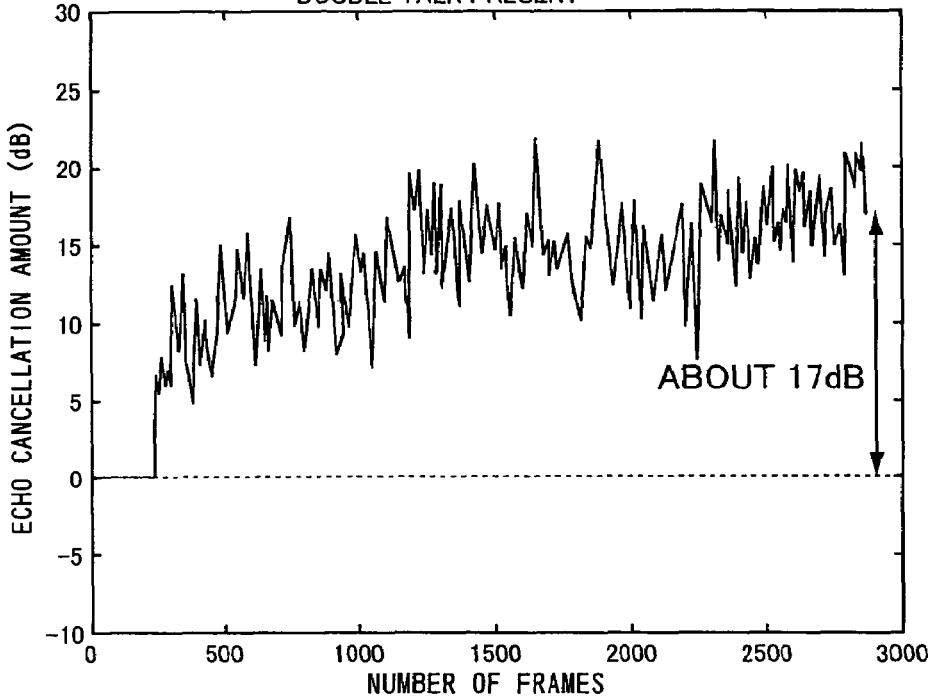
FIG. 40 is a diagram showing the simulation measurement result with respect to a time-domain variation in echo cancellation amount of the stereo echo canceller 16, 24 of FIG. 28 when there is double talk.
Figure 41:
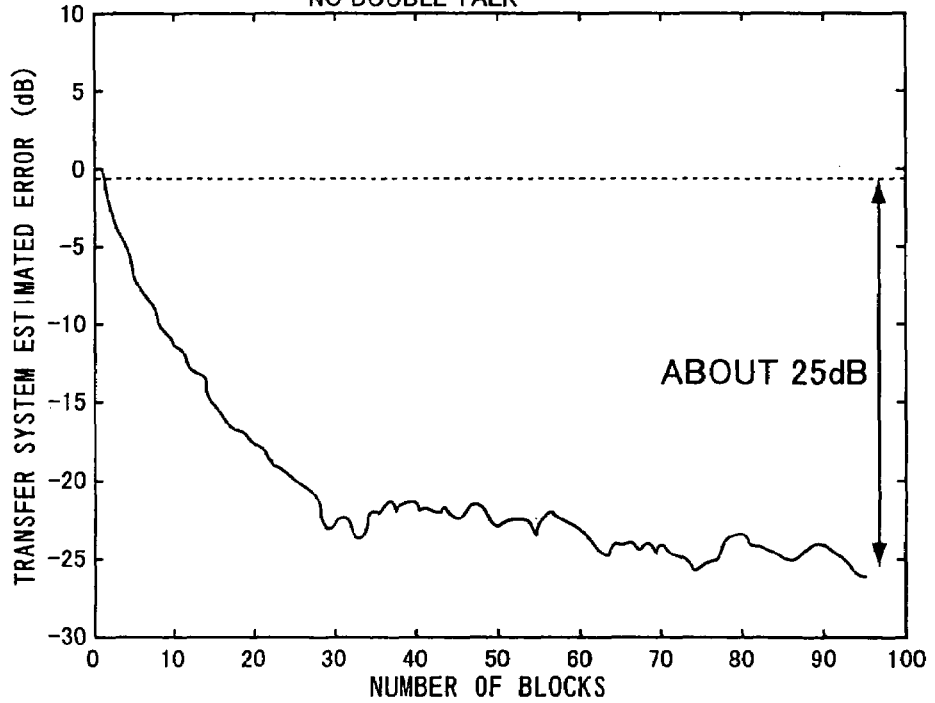
FIG. 41 is a diagram showing the simulation measurement result with respect to a time-domain variation in transfer function estimated error of the stereo echo canceller 16, 24 of FIG. 28 when there is no double talk.
Figure 42:
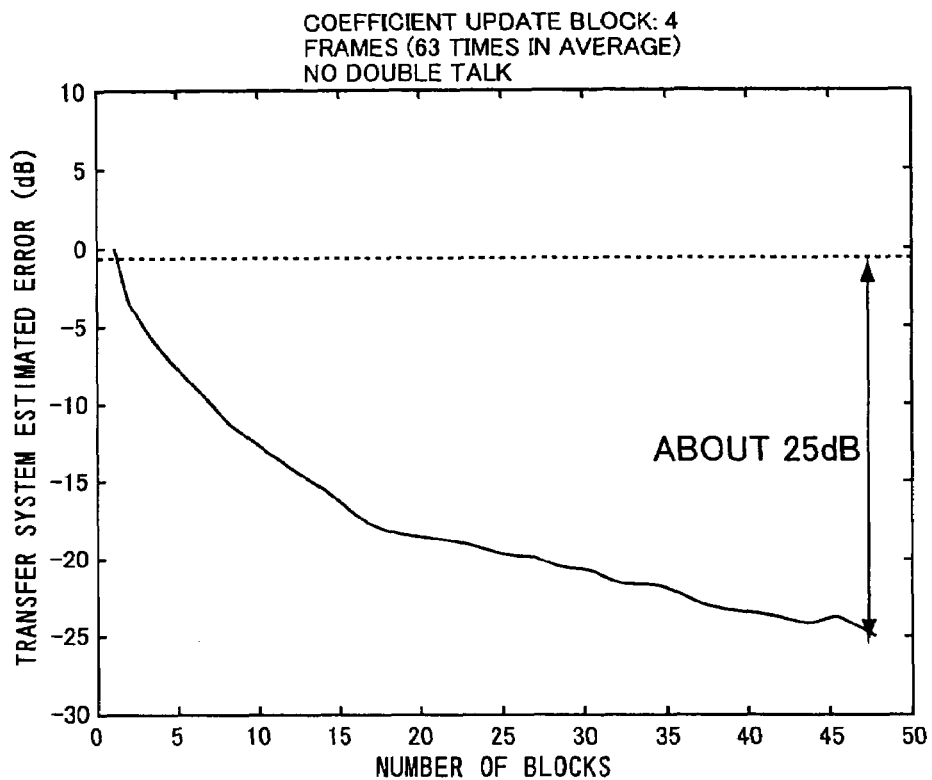
FIG. 42 is a diagram showing the simulation measurement result with respect to a time-domain variation in transfer function estimated error of the stereo echo canceller 16, 24 of FIG. 28 when there is no double talk.
Figure 43:
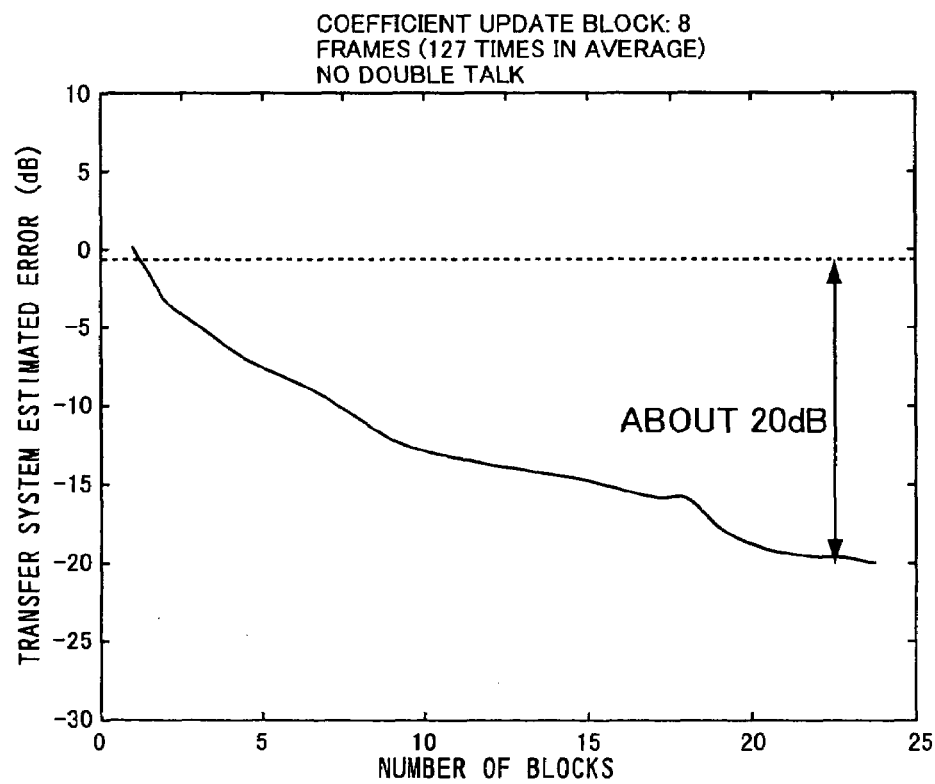
FIG. 43 is a diagram showing the simulation measurement result with respect to a time-domain variation in transfer function estimated error of the stereo echo canceller 16, 24 of FIG. 28 when there is no double talk.
Figure 44:
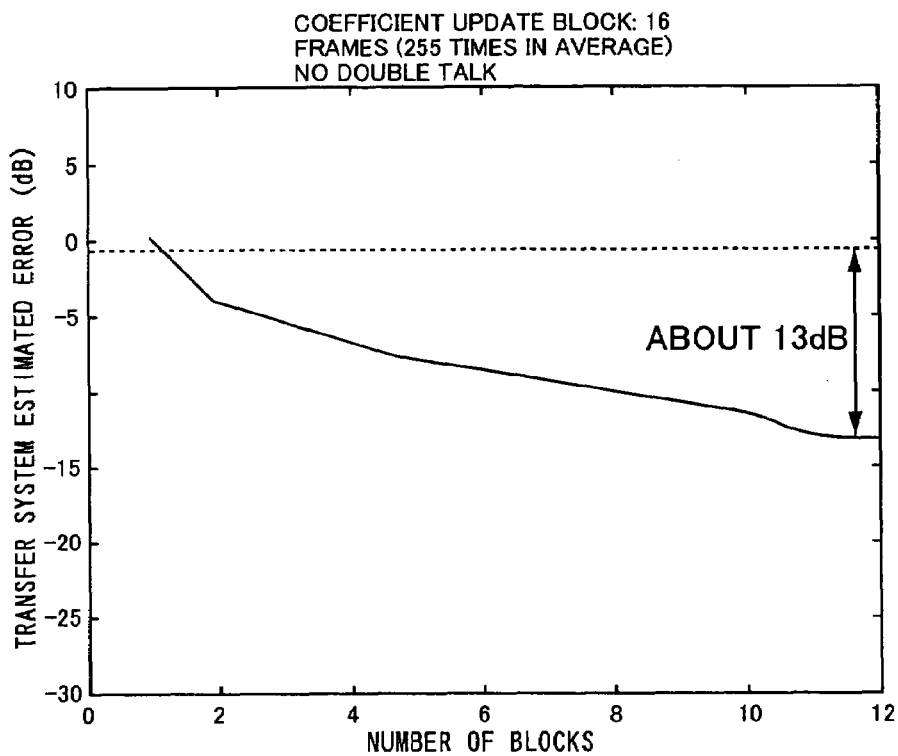
FIG. 44 is a diagram showing the simulation measurement result with respect to a time-domain variation in transfer function estimated error of the stereo echo canceller 16, 24 of FIG. 28 when there is no double talk.
Figure 45:
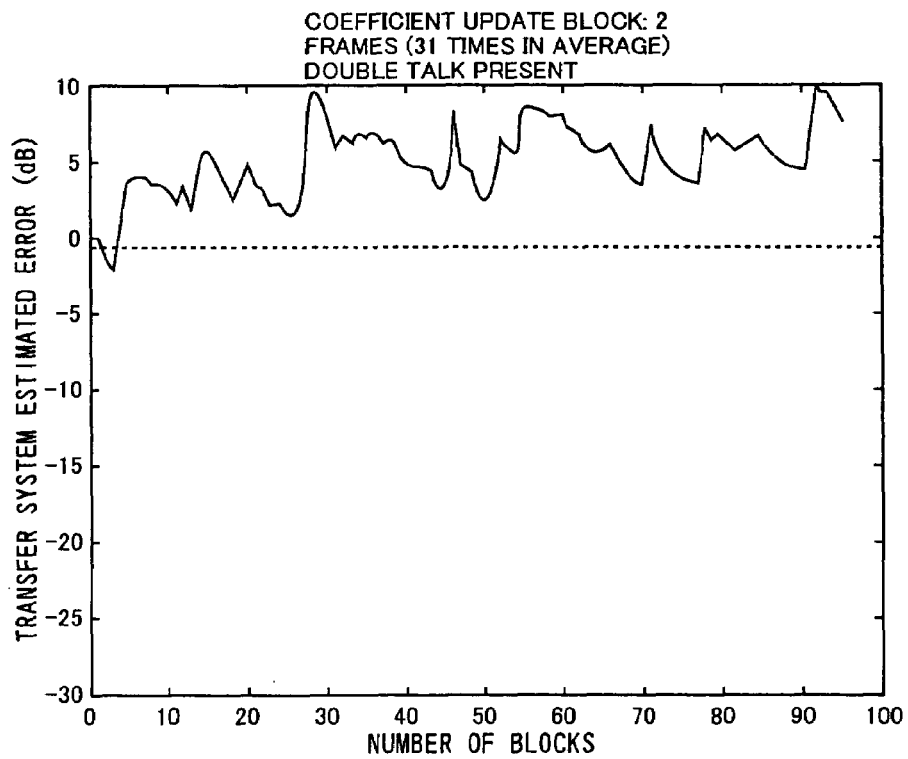
FIG. 45 is a diagram showing the simulation measurement result with respect to a time-domain variation in transfer function estimated error of the stereo echo canceller 16, 24 of FIG. 28 when there is double talk.
Figure 46:
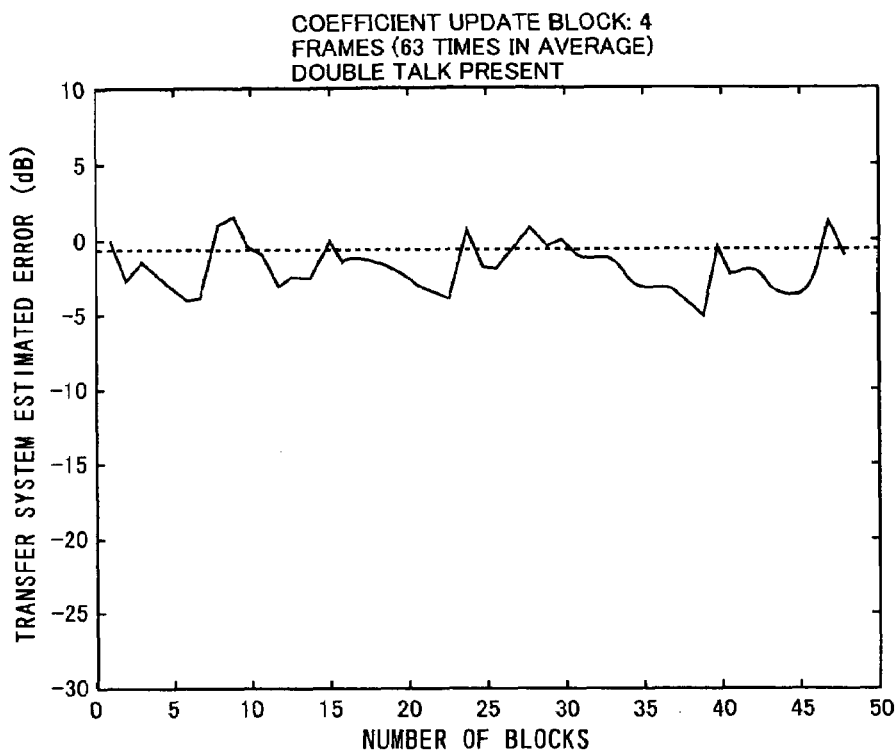
FIG. 46 is a diagram showing the simulation measurement result with respect to a time-domain variation in transfer function estimated error of the stereo echo canceller 16, 24 of FIG. 28 when there is double talk.
Figure 47:
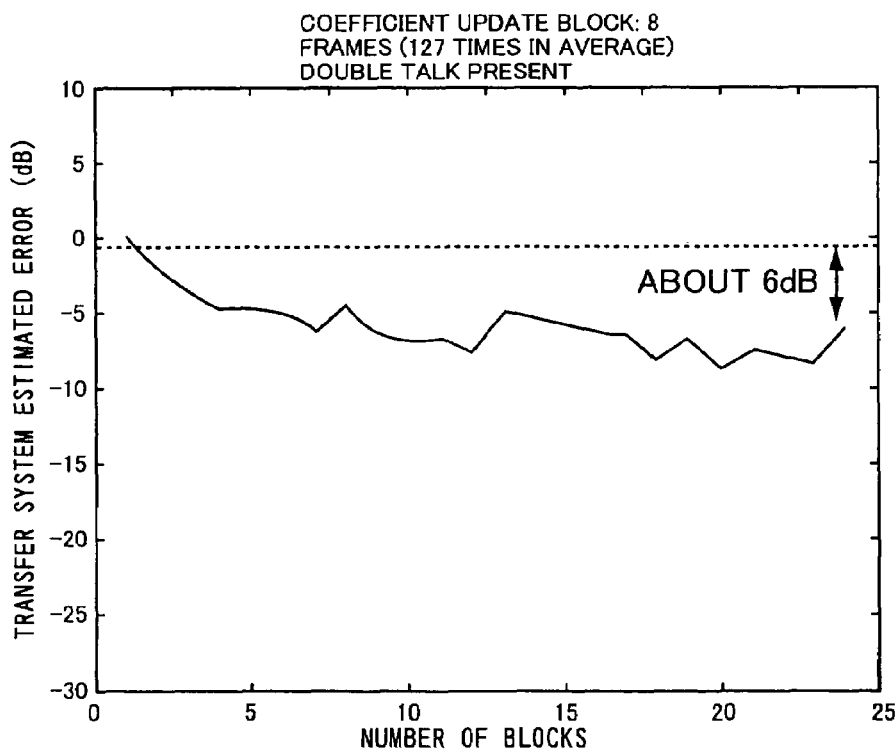
FIG. 47 is a diagram showing the simulation measurement result with respect to a time-domain variation in transfer function estimated error of the stereo echo canceller 16, 24 of FIG. 28 when there is double talk.
Figure 48:
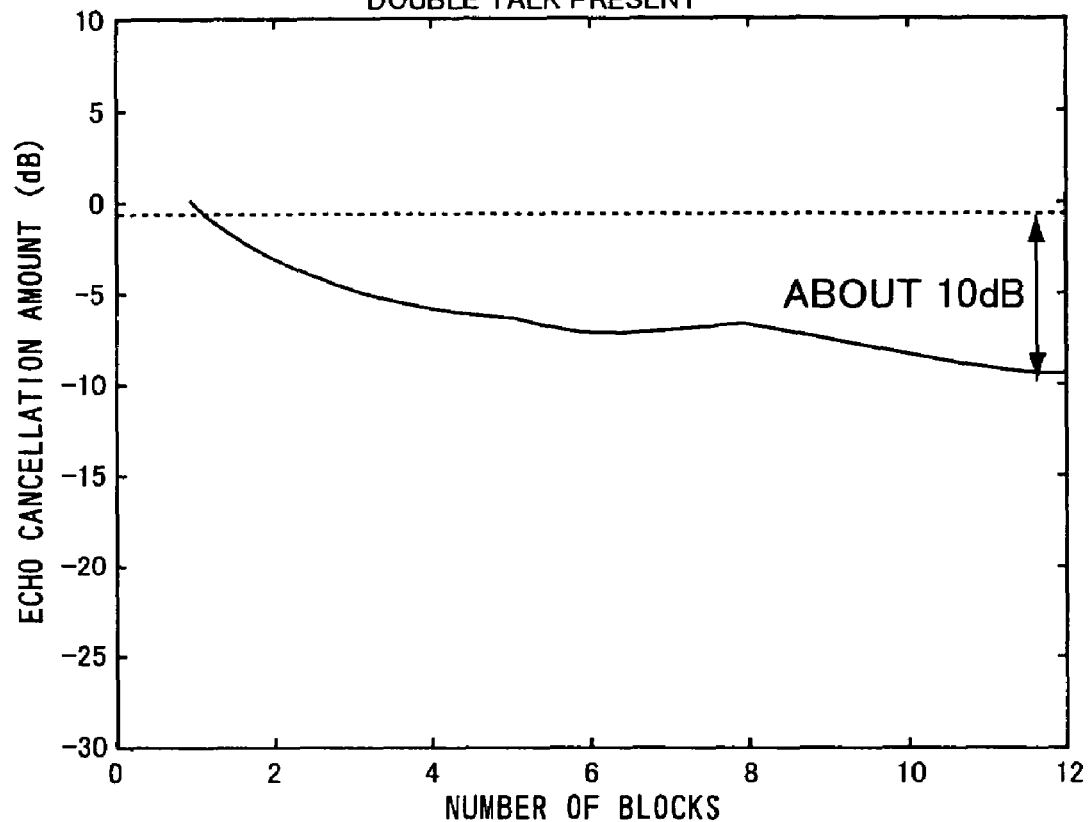
FIG. 48 is a diagram showing the simulation measurement result with respect to a time-domain variation in transfer function estimated error of the stereo echo canceller 16, 24 of FIG. 28 when there is double talk.

| Figure Number | Presence/Absence of Double Talk | Number of Frames in One Block |
|---|---|---|
| FIG. 33, FIG. 41 | Absent | 2 |
| FIG. 34, FIG. 42 | | 4 |
| FIG. 35, FIG. 43 | | 8 |
| FIG. 36, FIG. 44 | | 16 |
| FIG. 37, FIG. 45 | Present | 2 |
| FIG. 38, FIG. 46 | | 4 |
| FIG. 39, FIG. 47 | | 8 |
| FIG. 40, FIG. 48 | | 16 |

The simulation results of FIGS. 33 to 48 are considered.

(1) In Case of Absence of Double Talk

Since the rising speed of the echo cancellation amount is FIG. 33>FIG. 34>FIG. 35>FIG. 36, the rising speed of the echo cancellation amount becomes faster as one block (update period) becomes shorter (the number of frames per block becomes smaller). When the number of frames in one block is 2, 4 or 8, the echo cancellation amount of about 25 dB is obtained (FIG. 33, 34 or 35). When the number of frames in one block increases, i.e. 16 frames, the echo cancellation amount requires a long time for reduction thereof (FIG. 36). Since the estimated error convergence speed is FIG. 41>FIG. 42>FIG. 43>FIG. 44, the estimated error convergence speed becomes faster as one block becomes shorter.

(2) In Case of Presence of Double Talk

When the number of frames in one block is 2 or 4 frames, the echo cancellation amount is not increased (FIG. 37 or 38), and the estimated error is not converged (FIG. 45 or 46) and thus can not be estimated. When the number of frames in one block is 8, the echo cancellation amount of about 15 dB is obtained (FIG. 39), and the estimated error is converged to about −6 dB (FIG. 47). When the number of frames in one block is 16, the echo cancellation amount of about 17 dB is obtained (FIG. 40), and the estimated error is converged to about 10 dB and thus the fairly stable estimation can be achieved.

From the foregoing simulation results, the followings can be said.

(a) When the double talk is not detected, the convergence of the estimated error can be quickened by relatively shortening the update period of the filter characteristic.
(b) When the double talk is detected, the estimated error can be fully converged by relatively prolonging the update period of the filter characteristic.

Therefore, as described above, the transfer function calculating means 502 of FIG. 28 makes relatively longer the update period of the filter characteristics of the filter means 40-1 to 40-4 while the double talk is detected, whereas makes relatively shorter the update period of the filter characteristics while the double talk is not detected. This makes it possible to fully converge the estimated errors when the double talk exists, and further, quicken the convergence of the estimated errors when there is no double talk.

Figure 50:
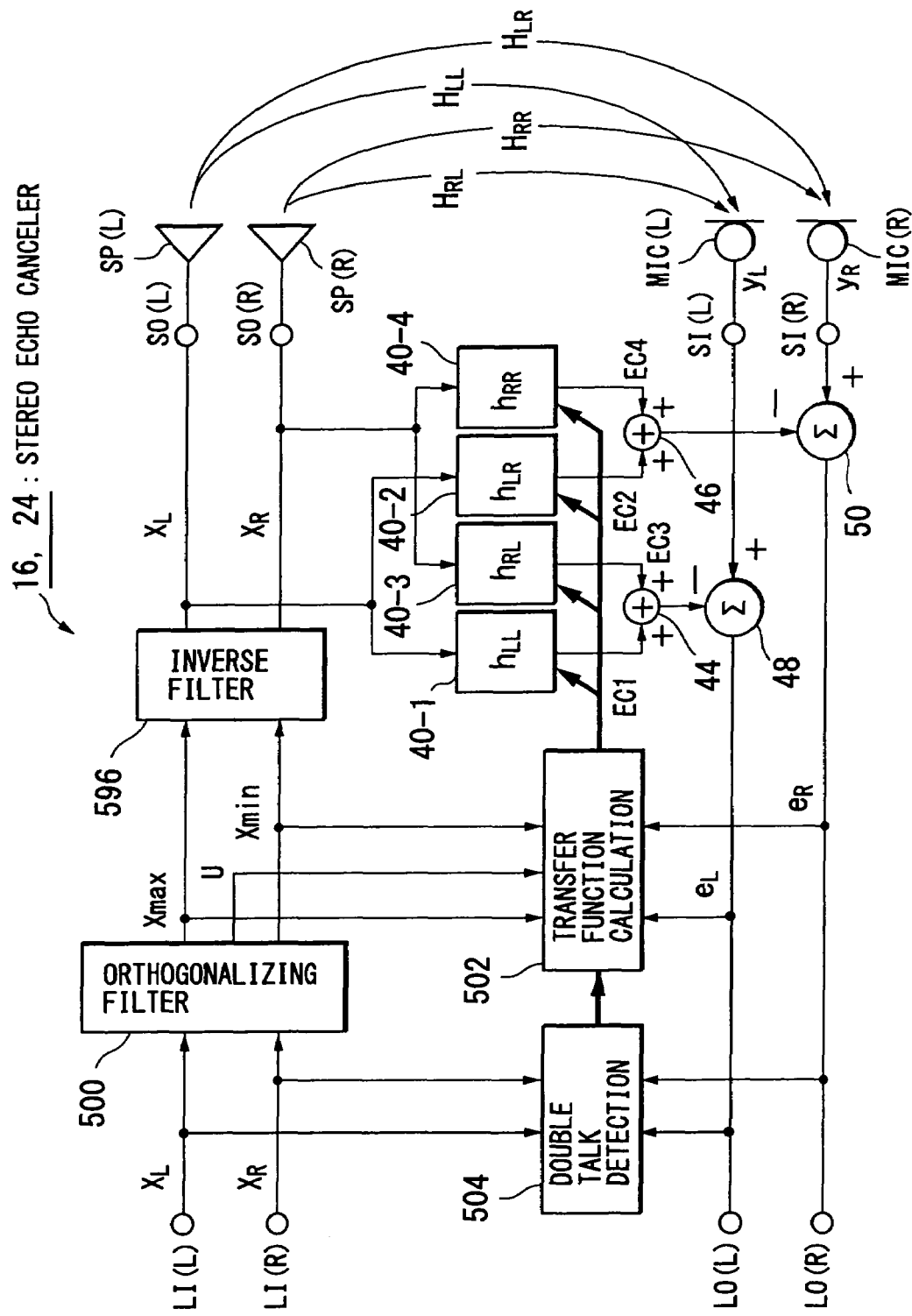
FIG. 50 is a block diagram showing a modification of the stereo echo canceller 16, 24 of FIG. 28.

FIG. 50 shows a modification of the stereo echo canceller 16, 24 of FIG. 28. The same symbols are used with respect to those portions common to FIG. 28. In this modification, an orthogonalizing filter is disposed on signal lines of loudspeakers SP(L) and SP(R). An inverse filter 596 has an inverse characteristic of the orthogonalizing filter 500 {the inverse filter characteristic V of the foregoing equation (96)}, thereby to restore output signals $x_{max}$ and $x_{min}$ of the orthogonalizing filter 500 to the original signal $x_L$ and $x_R$, and feeds them to the loudspeakers SP(L) and SP(R).

Figure 51:
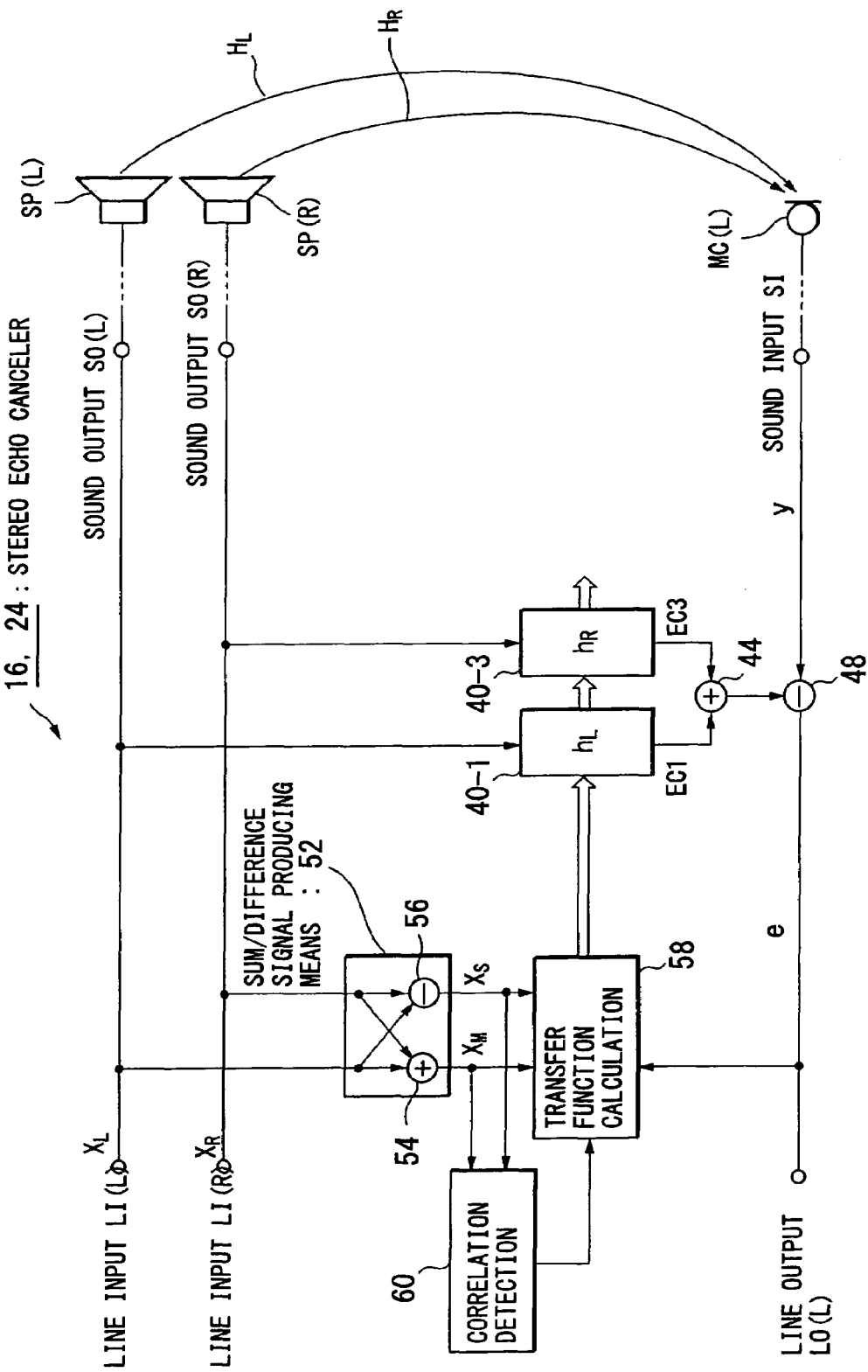
FIG. 51 is a block diagram showing a structural example wherein the number of microphones is modified to one in FIG. 1.

In the foregoing embodiments, the number of the loudspeakers is two and the number of the microphones is two. However, it may also be configured that the number of the loudspeakers is two, while the number of the microphones is one. FIG. 51 shows a structural example as a result of modifying FIG. 1 in such a manner. The same symbols are used with respect to those portions common to FIG. 1. Left/right two-channel stereo signals $x_L$ and $x_R$ transmitted from the spot on the counterpart side and inputted into line input ends LI(L) and LI(R) are outputted from sound output ends SO(L) and SO(R) as they are (i.e. not through sum/difference signal producing means 52), and reproduced at loudspeakers SP(L) and SP(R), respectively.

Filter means 40-1 is set with an impulse response corresponding to a transfer function $H_L$ between the loudspeaker SP(L) and a microphone MC and performs, using such an impulse response, a convolution calculation of a signal $x_L$ to be outputted from the sound output end SO(L), thereby producing an echo cancel signal EC1 corresponding to a signal $y_L$ obtained such that the signal $x_L$ outputted from the sound output end SO(L) is reproduced at the loudspeaker SP(L), collected by the microphone MC and inputted into a sound input end SI. Filter means 40-3 is set with an impulse response corresponding to a transfer function $H_R$ between the loudspeaker SP(R) and the microphone MC and performs, using such an impulse response, a convolution calculation of a signal $x_R$ to be outputted from the sound output end SO(R), thereby producing an echo cancel signal EC3 corresponding to a signal $y_R$ obtained such that the signal $x_R$ outputted from the sound output end SO(R) is reproduced at the loudspeaker SP(R), collected by the microphone MC and inputted into the sound input end SI. An adder 44 performs a calculation of EC1+EC3. A subtracter 48 subtracts an echo cancel signal EC1+EC3 from a collected audio signal $y(=y_L+y_R)$ of the microphone MC inputted from the sound input end SI, thereby to perform echo cancellation. An echo-canceled signal $e(=e_L+e_R)$ is outputted from a line output end LO and transmitted toward the spot on the counterpart side.

The sum/difference signal producing means 52 performs addition, using an adder 54, of the left/right two-channel stereo signals $x_L$ and $x_R$ inputted into the line input ends LI(L) and LI(R) so as to produce a sum signal $x_M(=x_L+x_R)$, while performs subtraction thereof using a subtracter 56 so as to produce a difference signal $x_S\{=x_L-x_R$ (or it may also be $x_R-x_L)\}$. Transfer function calculating means 58 implements a cross-spectrum calculation between the sum signal $x_M$ and the difference signal $x_S$ produced by the sum/difference signal producing means 52 and the signal e outputted from the subtracter 48 and, based on this cross-spectrum calculation, sets filter characteristics (impulse responses) of the filter means 40-1 and 40-3. Specifically, upon starting the system, the filter characteristics of the filter means 40-1 and 40-3 are not set, i.e. coefficients are all set to zero, so that the echo cancel signals EC1 and EC3 are zero, and thus the collected audio signal of the microphone MC itself is outputted from the subtracter 48. Therefore, at this time, the transfer function calculating means 58 performs the cross-spectrum calculation between the sum signal $x_M$ and the difference signal $x_S$ produced by the sum/difference signal producing means 52 and the collected audio signal e of the microphones MC outputted from the subtracter 48 and, based on this cross-spectrum calculation, derives transfer functions of two audio transfer systems between the loudspeakers SP(L) and SP(R) and the microphone MC, respectively, and implements initial setting of the filter characteristics of the filter means 40-1 and 40-3 to values corresponding to such transfer functions. After the initial setting, since the echo cancel signals are produced by the filter means 40-1 and 40-3, the echo cancel error signal e corresponding to a difference signal between the collected audio signal of the microphone MC and the echo cancel signal EC1+EC3 is outputted from the subtracter 48. Therefore, at this time, the transfer function calculating means 58 performs the cross-spectrum calculation between the sum signal $x_M$ and the difference signal $x_S$ produced by the sum/difference signal producing means 52 and the echo cancel error signal e outputted from the subtracter 48 and, based on this cross-spectrum calculation, derives estimated errors of the transfer functions of the two audio transfer systems between the loudspeakers SP(L) and SP(R) and the microphone MC, respectively, and updates the filter characteristics of the filter means 40-1 and 40-3 to values that cancel the estimated errors, respectively. By repeating this updating operation per prescribed time period, the echo cancel error can be converged to a minimum value. Further, even if the transfer functions change due to movement of the microphone positions or the like, the echo cancel error can be converged to a minimum value by sequentially updating the filter characteristics of the filter means 40-1 and 40-3 depending thereon.

Correlation detecting means 60 detects a correlation between the sum signal $x_M$ and the difference signal $x_S$ based on a correlation value calculation or the like, and stops updating of the foregoing filter characteristics when the correlation value is no less than a prescribed value. When the correlation value becomes lower than the prescribed value, updating of the foregoing filter characteristics is restarted. Also in the embodiments other than FIG. 1, it can be configured that the number of the loudspeakers is two, while the number of the microphones is one.

The stereo echo canceller 16, 24 shown in each of the foregoing embodiments can be formed by the dedicated hardware or can also be realized through software processing in a general computer. For example, the functions of the respective blocks as shown in FIG. 1 and so forth can be accomplished by a CPU (Central Processing Unit) and storing means such as a RAM or ROM constituting the computer. Namely, the CPU may be caused to function as the echo canceller according to a program stored in the storing means such as the ROM or RAM.

In the foregoing embodiments, the description has been made about the case where the two-channel stereo signals are handled. However, the echo cancellation can also be implemented using the technique of this invention with respect to those signals of three channels or more having a correlation with each other.

What is claimed is:

1. A stereo echo canceller associated to a space provided therein with two loudspeakers and two microphones for forming four audio transfer systems through which stereo sounds are reproduced by said respective loudspeakers and are collected by said respective microphones, the canceller comprising: first and second filter sections that are provided corresponding to the first and second microphones for subjecting an audio signal supplied to the first loudspeaker to convolution calculations so as to produce first and second echo cancel signals, respectively;

third and fourth filter sections that are provided corresponding to the first and second microphones for subjecting another audio signal supplied to the second loudspeaker to convolution calculations so as to produce third and fourth echo cancel signals, respectively;

a first subtracting section that performs echo cancellation by subtracting said first and third echo cancel signals from a collected audio signal of the first microphone; and a second subtracting section that performs echo cancellation by subtracting said second and fourth echo cancel signals from another collected audio signal of the second microphone, wherein said stereo echo canceller further comprises a transfer function calculating section that respectively derives filter characteristics corresponding to transfer functions of said four audio transfer systems based on a cross-spectrum calculation between a sum signal and difference signal of stereo audio signals to be reproduced by said respective loudspeakers and the collected audio signals of said respective microphones, thereby to set said derived filter characteristics to corresponding ones of said first to fourth filter sections, respectively.

2. A stereo echo canceller as recited in claim 1, further comprising:

an input section that inputs said stereo audio signals;

a sum/difference signal producing section that produces said sum signal and said difference signal of the stereo audio signals inputted from said input section; and a main signal transmission system that transmits the stereo audio signals inputted from said input section to said respective loudspeakers without passing through said sum/difference signal producing section, wherein said transfer function calculating section derives the filter characteristics corresponding to the transfer functions of said four audio transfer systems based on the cross-spectrum calculation between the sum signal and difference signal produced by said sum/difference signal producing section and the collected audio signals of said respective microphones, and sets the derived filter characteristics to corresponding ones of said first to fourth filter sections, respectively.

3. A stereo sound transfer apparatus associated to two spaces each forming said four audio transfer systems, wherein the stereo echo canceller recited in claim 1 is arranged in each space, so that the stereo audio signals, which have been echo-canceled by said stereo echo cancellers, are transmitted between said two spaces.

4. A stereo echo canceller associated to a space provided therein with two loudspeakers and two microphones for forming four audio transfer systems through which stereo sounds are reproduced by said respective loudspeakers and are collected by said respective microphones, the canceller comprising: first and second filter sections that are provided corresponding to the first and second microphones for subjecting an audio signal supplied to the first loudspeaker to convolution calculations so as to produce first and second echo cancel signals, respectively;

third and fourth filter sections that are provided corresponding to the first and second microphones for subjecting another audio signal supplied to the second loudspeaker to convolution calculations so as to produce third and fourth echo cancel signals, respectively;

a first subtracting section performs echo cancellation by subtracting said first and third echo cancel signals from a collected audio signal of the first microphone; and a second subtracting section that performs echo cancellation by subtracting said second and fourth echo cancel signals from another collected audio signal of the second microphone, wherein said stereo echo canceller further comprises a transfer function calculating section respectively derives estimated errors of transfer functions of said four audio transfer systems based on a cross-spectrum calculation between respective one of a sum signal and a difference signal of stereo audio signals to be reproduced by said respective loudspeakers and respective one of echo cancel error signals obtained by subtracting the corresponding echo cancel signals from the collected audio signals of said two microphones, thereby to update filter characteristics of said first to fourth filter sections to values that cancel said estimated errors, respectively.

5. A stereo echo canceller as recited in claim 4, further comprising:

an input section that inputs said stereo audio signals;

a sum/difference signal producing section that produces said sum signal and said difference signal of the stereo audio signals inputted from said input section; and a main signal transmission system that transmits the stereo audio signals inputted from said input section to said respective loudspeakers without passing through said sum/difference signal producing section, wherein said transfer function calculating section derives the estimated errors of the transfer functions of said four audio transfer systems based on the cross-spectrum calculation between the sum signal and difference signal produced by said sum/difference signal producing section and the respective echo cancel error signals, and updates the filter characteristics of said first to fourth filter sections to the values that cancel said estimated errors, respectively.

6. A stereo echo canceller as recited in claim 4, further comprising a correlation detecting section that detects a correlation between the sum signal and the difference signal of said stereo audio signals, and that stops the updating of said filter characteristics when a value of said correlation is no less than a predetermined value.

7. A multi-channel echo cancel method associated to a space provided therein with a plurality of loudspeakers and at least one microphone for forming a plurality of audio transfer systems, the method comprising:
inputting multi-channel audio signals from an outside, which have a correlation with each other, and which are reproduced by said respective loudspeakers and collected by said at least one microphone through the audio transfer systems;
estimating individual transfer functions of said plurality of said audio transfer systems so as to set corresponding filter characteristics, respectively;
producing echo cancel signals respectively by applying said set filter characteristics to corresponding ones of said multi-channel audio signals to be reproduced by said respective loudspeakers; and
subtracting said echo cancel signals from corresponding individual collected audio signals of said at least one microphone, thereby performing echo cancellation,
wherein, reference signals are determined as a set of a plurality of low-correlation composite signals which correspond to signals obtained by suitably combining said multi-channel audio signals and which have a lower correlation with each other than that among said multi-channel audio signals, for deriving said individual transfer functions of the respective audio transfer systems thereby setting said corresponding filter characteristics.

8. A multi-channel echo cancel method as recited in claim 7, wherein calculation is conducted for respectively deriving the individual transfer functions of the respective audio transfer systems with using the set of the plurality of the low-correlation composite signals as the reference signals, such that the calculation is based on a cross-spectrum calculation between the plurality of the low-correlation composite signals and the individual collected audio signals of the at least one microphone.

9. A multi-channel sound transfer method associated to two spaces each forming said plurality of said audio transfer systems, wherein the multi-channel echo cancel method recited in claim 7 is carried out respectively in the two spaces, so that the multi-channel audio signals, which have been echo-canceled by performing said method, are transmitted between said two spaces.

10. A multi-channel echo channel method as recited in claim 7, wherein the multi-channel audio signals being inputted from an outside and having a correlation with each other are reproduced by said respective loudspeakers without lowering the correlation of the inputted multi-channel audio signals.

11. A multi-channel echo cancel method as recited in claim 7, wherein the multi-channel audio signals being inputted from an outside and having a correlation with each other are provisionally modulated to lower the correlation, then demodulated to restore the correlation, and thereafter reproduced by said respective loudspeakers.

12. A multi-channel echo cancel method as recited in claim 11, wherein the multi-channel audio signals are provisionally modulated to lower the correlation by one of first or second operations, the first operation adding and subtracting the multi-channel audio signals with each other, the second operation orthogonalizing the multi-channel audio signals with each other.

13. A multi-channel echo cancel method associated to a space provided therein with a plurality of loudspeakers at least one microphone for forming a plurality of audio transfer systems through which multi-channel audio signals having a correlation with each other are reproduced by said respective loudspeakers and are collected by said at least one microphone, the method comprising: estimating individual transfer functions of said plurality of said audio transfer systems so as to set corresponding filter characteristics, respectively;
producing echo cancel signals respectively by applying said set filter characteristics to corresponding ones of said multi-channel audio signals to be reproduced by said respective loudspeakers; and
subtracting said echo cancel signals from corresponding individual collected audio signals of said at least one microphone, thereby performing echo cancellation,
wherein, reference signals are determined as a set of a plurality of low-correlation composite signals which correspond to signals obtained by suitably combining said multi-channel audio signals and which have a lower correlation with each other than that among said multi-channel audio signals, for deriving said individual transfer functions of the respective audio transfer systems, thereby setting said corresponding filter characteristics,
wherein calculation is conducted for respectively deriving the individual transfer functions of the respective audio transfer systems with using the set of the plurality of the low-correlation composite signals as the reference signals, such that the calculation is based on a cross-spectrum calculation between the plurality of the low-correlation composite signals and the individual collected audio signals of the at least one microphone, and wherein
the calculation of respectively deriving the individual transfer functions of said plurality of the audio transfer systems is performed by combining said multi-channel audio signals through arithmetic operation to produce a plurality of low-correlation composite signals having a lower correlation with each other than that among said multi-channel audio signals, deriving cross spectra by the cross-spectrum calculation between said plurality of the low-correlation composite signals and the individual collected audio signals of the at least one microphone, and ensemble-averaging each of the cross spectra in a predetermined time period for deriving the individual transfer functions of said plurality of the audio transfer systems.

14. A multi-channel echo cancel method associated to a space provided therein with a plurality of loudspeakers at least one microphone for forming a plurality of audio transfer systems, the method comprising:
inputting multi-channel audio signals from an outside, which have a correlation with each other, and which are reproduced by said respective loudspeakers and collected by said at least one microphone through the audio transfer systems;
estimating individual transfer functions of said plurality of said audio transfer systems so as to set corresponding filter characteristics, respectively;
producing echo cancel signals respectively by applying said set filter characteristics to corresponding ones of said multi-channel audio signals to be reproduced by said respective loudspeakers or a plurality of composite signals obtained by suitably combining said multi-channel audio signals; and
subtracting said echo cancel signals from corresponding individual collected audio signals of said at least one microphones, thereby performing echo cancellation, wherein, reference signals are determined as a set of a plurality of low-correlation composite signals which correspond to signals obtained by suitably combining said multi-channel audio signals and which have a lower correlation with each other than that among said multi-channel audio signals, for deriving estimated errors of said individual transfer functions of the respective audio transfer systems or said plurality of said composite transfer functions obtained by suitably combining said individual transfer functions, thereby updating said corresponding filter characteristics to values that cancel the estimated errors.

15. A multi-channel echo cancel method as recited in claim 14, wherein calculation is conducted for respectively deriving the estimated errors of the individual transfer functions of the respective audio transfer systems with using the set of the plurality of the low-correlation composite signals as the reference signals, such that the calculation is based on a cross-spectrum calculation between the plurality of the low-correlation composite signals and echo cancel error signals obtained by subtracting the echo cancel signals from the corresponding individual collected audio signals of said at least one microphone.

16. A multi-channel echo cancel method associated to a space provided therein with a plurality of loudspeakers and at least one microphone for forming a plurality of audio transfer systems through which multi-channel audio signals having a correlation with each other are reproduced by said respective loudspeakers and are collected by said at least one microphone, the method comprising:
estimating individual transfer functions of said plurality of said audio transfer systems so as to set corresponding filter characteristics, respectively;
producing echo cancel signals respectively by applying said set filter characteristics to corresponding ones of said multi-channel audio signals to be reproduced by said respective loudspeakers; and
subtracting said echo cancel signals from corresponding individual collected audio signals of said at least one microphone, thereby performing echo cancellation,
wherein, reference signals are determined as a set of a plurality of low-correlation composite signals which correspond to signals obtained by suitably combining said multi-channel audio signals and which have a lower correlation with each other than that among said multi-channel audio signals, for deriving estimated errors of said individual transfer functions of the respective audio transfer systems thereby updating said corresponding filter characteristics to values that cancel the estimated errors,
wherein calculation is conducted for respectively deriving the estimated errors of the individual transfer functions of the respective audio transfer systems with using the set of the plurality of the low-correlation composite signals as the reference signals, such that the calculation is based on a cross-spectrum calculation between the plurality of the low-correlation composite signals and echo cancel error signals obtained by subtracting the echo cancel signals from the corresponding individual collected audio signals of said at least one microphone, and
wherein the calculation of respectively deriving the estimated errors of the individual transfer functions of said plurality of the audio transfer systems is performed by combining said multi-channel audio signals through an arithmetic operation to produce a plurality of low-correlation composite signals having a lower correlation with each other than that among said multi-channel audio signals, deriving cross spectra by the cross-spectrum calculation between said plurality of the low-correlation composite signals and the echo cancel error signals obtained by subtracting the echo cancel signals from the corresponding individual collected audio signals of said at least one microphone, and ensemble-averaging each of the cross spectra in a predetermined time period for deriving the estimated errors of the individual transfer functions of said plurality of the audio transfer systems.

17. A multi-channel echo cancel method associated to a space provided therein with a plurality of loudspeakers and at least one microphone for forming a plurality of audio transfer systems through which multi-channel audio signals having a correlation with each other are reproduced by said respective loudspeakers and are collected by said at least one microphone, the method comprising:
estimating individual transfer functions of said plurality of said audio transfer systems so as to set corresponding filter characteristics, respectively;
producing echo cancel signals respectively by applying said set filter characteristics to corresponding ones of said multi-channel audio signals to be reproduced by said respective loudspeakers or; and
subtracting said echo cancel signals from corresponding individual collected audio signals of said at least one microphone, thereby performing echo cancellation,
wherein, reference signals are determined as a set of a plurality of low-correlation composite signals which correspond to signals obtained by suitably combining said multi-channel audio signals and which have a lower correlation with each other than that among said multi-channel audio signals, for deriving estimated errors of said individual transfer functions of the respective audio transfer systems, thereby updating said corresponding filter characteristics to values that cancel the estimated errors, and
wherein the correlation between said plurality of said low-correlation composite signals is detected and, when a value of said correlation is no less than a predetermined value, the updating of said filter characteristics is suspended.

18. A transfer function calculation apparatus being associated to a space provided therein with a plurality of loudspeakers and at least one microphone for forming a plurality of audio transfer systems, and being capable of estimating individual transfer functions of said plurality of audio transfer systems, the apparatus comprising:
an input section that inputs multi-channel audio signals from an outside, which have a correlation with each other, and which are reproduced by said respective loudspeakers and collected by said at least one microphone through the audio transfer systems;
a providing section that provides reference signals as a set of a plurality of low-correlation composite signals which correspond to signals obtained by suitably combining said multi-channel audio signals and which have a lower correlation with each other than that between said multi-channel audio signals; and
a calculation section that estimates the individual transfer functions of the respective audio transfer systems based on the determined reference signals.

19. A transfer function calculation apparatus as recited in claim 18, wherein the calculation section respectively derives the individual transfer functions of the respective audio transfer systems, using as the reference signals the set of the plurality of the low-correlation composite signals, such that calculation of respectively deriving the individual transfer functions of the respective audio transfer systems is based on a cross-spectrum calculation between the plurality of said low-correlation composite signals and individual collected audio signals of the at least one microphone.

20. A transfer function calculation apparatus as recited in claim 19, wherein the providing section produces a plurality of uncorrelated composite signals mutually orthogonal as the reference signals by applying a principal component analysis to said multi-channel audio signals, such that the calculation section derives cross spectra based on said cross-spectrum calculation between said plurality of said uncorrelated composite signals and the individual collected audio signals of the at least one microphone, and ensemble-averages the respective cross spectra in a predetermined time period for deriving the individual transfer functions of said plurality of said audio transfer systems.

21. A transfer function calculation apparatus being associated to a space provided therein with a plurality of loudspeakers and at least one microphone for forming a plurality of audio transfer systems through which multi-channel audio signals having a correlation with each other are reproduced by said respective loudspeakers and are collected by said microphones, and being capable of estimating individual transfer functions of said plurality of audio transfer systems, the apparatus comprising:

a providing section that provides reference signals as a set of a plurality of low-correlation composite signals which correspond to signals obtained by suitably combining said multi-channel audio signals and which have a lower correlation with each other than that between said multi-channel audio signals; and a calculation section that estimates the individual transfer functions of the respective audio transfer systems based on the determined reference signals, wherein the calculation section respectively derives the individual transfer functions of the respective audio transfer systems, using as the reference signals the set of the plurality of the low-correlation composite signals, such that calculation of respectively deriving the individual transfer functions of the respective audio transfer systems is based on a cross-spectrum calculation between the plurality of said low-correlation composite signals and individual collected audio signals of the at least one microphone, and wherein the providing section combines said multi-channel audio signals through an arithmetic operation to produce said plurality of said low-correlation composite signals having a lower correlation with each other than that between said multi-channel audio signals, such that the calculation section derives cross spectra based on said cross-spectrum calculation between said plurality of said low-correlation composite signals and the individual collected audio signals of the at least one microphone, and ensemble-averages the respective cross spectra in a predetermined time period for deriving the individual transfer functions of said plurality of said audio transfer systems.

* * * * *